US012327526B2

(12) United States Patent
Liu et al.

(10) Patent No.: US 12,327,526 B2
(45) Date of Patent: Jun. 10, 2025

(54) DRIVE CONTROL CIRCUIT, GATE DRIVER CIRCUIT, DISPLAY SUBSTRATE, AND DISPLAY APPARATUS

(71) Applicants: Beijing BOE Technology Development Co., Ltd., Beijing (CN); BOE Technology Group Co., Ltd., Beijing (CN)

(72) Inventors: Miao Liu, Beijing (CN); Xing Yao, Beijing (CN); Yipeng Chen, Beijing (CN); Teng Chen, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/023,712

(22) PCT Filed: Jan. 14, 2022

(86) PCT No.: PCT/CN2022/072097
§ 371 (c)(1),
(2) Date: Feb. 27, 2023

(87) PCT Pub. No.: WO2023/133826
PCT Pub. Date: Jul. 20, 2023

(65) Prior Publication Data

US 2024/0282266 A1 Aug. 22, 2024

(51) Int. Cl.
*G09G 3/3266* (2016.01)

(52) U.S. Cl.
CPC ....... *G09G 3/3266* (2013.01); *G09G 2310/08* (2013.01); *G09G 2330/021* (2013.01)

(58) Field of Classification Search
CPC ............. G09G 3/3266; G09G 2310/08; G09G 2330/021
See application file for complete search history.

(56) References Cited

U.S. PATENT DOCUMENTS 7,663,593 B2 2/2010 Jinta
2008/0116944 A1 5/2008 Tobita et al.
(Continued)

FOREIGN PATENT DOCUMENTS

CN 103151076 A 6/2013
CN 104217690 A 12/2014
(Continued)

OTHER PUBLICATIONS

International Search Report for PCT/CN2022/072097 Mailed Oct. 20, 2022.

*Primary Examiner* — Hong Zhou
(74) *Attorney, Agent, or Firm* — Ling Wu; Stephen Yang; Ling and Yang Intellectual Property

(57) ABSTRACT

Disclosed is a drive control circuit including an input circuit (10), a first output circuit (11), and a second output circuit (12). The first output circuit (11) is electrically connected with the input circuit (10) and a first output end (OUT1) and is configured to output a first output signal from the first output end (OUT1) under control of the input circuit (11). The second output circuit (12) is electrically connected with the input circuit (10) and a second output end (OUT2), or electrically connected with the first output end (OUT1) and a second output end (OUT2), and is configured to output a second output signal from the second output end (OUT2) under control of the input circuit (10) or the first output end (OUT1). The first output signal is different from the second output signal.

11 Claims, 33 Drawing Sheets

(56) References Cited

U.S. PATENT DOCUMENTS

| | | | | |
|---|---|---|---|---|
| 2013/0153941 | A1* | 6/2013 | Sasaki | H01L 28/40 257/532 |
| 2016/0055811 | A1 | 2/2016 | Zhu et al. | |
| 2016/0148589 | A1 | 5/2016 | Cao | |
| 2018/0061348 | A1 | 3/2018 | Zhao | |
| 2018/0226020 | A1* | 8/2018 | Wang | G09G 3/3266 |
| 2019/0073948 | A1* | 3/2019 | Wang | G09G 3/3225 |
| 2020/0020291 | A1* | 1/2020 | Huang | G09G 3/3266 |
| 2020/0051656 | A1 | 2/2020 | Feng et al. | |
| 2020/0066201 | A1* | 2/2020 | Shang Guan | G09G 3/3681 |
| 2020/0342808 | A1* | 10/2020 | Han | G09G 3/3266 |
| 2021/0097938 | A1* | 4/2021 | Wu | G09G 3/3266 |
| 2021/0118375 | A1* | 4/2021 | Yang | G09G 3/3266 |
| 2021/0304659 | A1* | 9/2021 | Qing | G09G 3/2092 |
| 2021/0312869 | A1* | 10/2021 | Dai | G09G 3/3266 |
| 2023/0335030 | A1* | 10/2023 | Guo | G09G 3/3266 |

FOREIGN PATENT DOCUMENTS

| | | | |
|---|---|---|---|
| CN | 104537987 | A | 4/2015 |
| CN | 105652534 | A | 6/2016 |
| CN | 110858468 | A | 3/2020 |
| CN | 111210776 | A | 5/2020 |
| CN | 112150960 | A | 12/2020 |
| CN | 112737286 | A | 4/2021 |
| CN | 112908259 | A | 6/2021 |
| CN | 113113069 | A | 7/2021 |
| CN | 113241040 | A | 8/2021 |
| EP | 1231594 | A1 | 8/2002 |
| IN | 1829092 | A | 9/2006 |
| JP | 2002-132203 | A | 5/2002 |
| JP | 2002-258819 | A | 9/2002 |
| JP | 2008-140522 | A | 6/2008 |

* cited by examiner

DRIVE CONTROL CIRCUIT, GATE DRIVER CIRCUIT, DISPLAY SUBSTRATE, AND DISPLAY APPARATUS

CROSS-REFERENCE TO RELATED APPLICATION

The present application is a U.S. National Phase Entry of International Application No. PCT/CN2022/072097 having an international filing date of Jan. 14, 2022, the entire content of which is hereby incorporated by reference.

TECHNICAL FIELD

The present disclosure relates to, but is not limited to, the field of display technologies, in particular to a drive control circuit, a gate driver circuit, a display substrate, and a display apparatus.

BACKGROUND

An Organic Light Emitting Diode (OLED) and a Quantum dot Light Emitting Diode (QLED) are active light emitting display devices, which have advantages of auto-luminescence, wide angle of view, high contrast ratio, low power consumption, extremely high response speed, lightness and thinness, bendability, a low cost, etc.

SUMMARY

The following is a summary of subject matters described herein in detail. The summary is not intended to limit the protection scope of claims.

Embodiments of the present disclosure provide a drive control unit, a gate driver circuit, a display substrate, and a display apparatus.

In one aspect, an embodiment of the present disclosure provides a drive control circuit including an input circuit, a first output circuit, and a second output circuit. The first output circuit is electrically connected with the input circuit and a first output end, and is configured to output a first output signal from the first output end under control of the input circuit. The second output circuit is electrically connected with the input circuit and a second output end, or electrically connected with the first output end and the second output end, and is configured to output a second output signal from the second output end under control of the input circuit or the first output end. The first output signal and the second output signal are different in at least one of following: an absolute value of a voltage of an effective level, a polarity of an effective level, a time length of an effective level within a time length of one frame, and a continuous voltage fluctuation stage after an effective level.

In another aspect, an embodiment of the present disclosure provides a gate driver circuit including multiple cascaded drive control circuits as described above. Among them, a signal input end of a first stage drive control circuit is electrically connected with a start signal line, and a signal input end of an (i+1)-th stage drive control circuit is electrically connected with a first output end of an i-th stage drive control circuit, wherein i is an integer greater than 0.

In another aspect, an embodiment of the present disclosure provides a display substrate including: a display region and a non-display region located at a periphery of the display region, wherein the non-display region is provided with a gate driver circuit, the gate driver circuit includes multiple cascaded drive control circuits, a drive control circuit includes: an input circuit, a first output circuit, and a second output circuit; the first output circuit is electrically connected with the input circuit, and the second output circuit is electrically connected with the input circuit or the first output circuit. In a first direction, the input circuit is located between the first output circuit and the second output circuit, or, the second output circuit is located between the input circuit and the first output circuit.

In another aspect, an embodiment of the present disclosure provides a display apparatus, which includes the aforementioned display substrate.

Other aspects may be understood upon reading and understanding the drawings and the detailed description.

BRIEF DESCRIPTION OF DRAWINGS

Accompanying drawings are used for providing further understanding of technical solutions of the present disclosure, constitute a part of the specification, and together with the embodiments of the present disclosure, are used for explaining the technical solutions of the present disclosure but not to constitute limitations on the technical solutions of the present disclosure. Shapes and sizes of one or more components in the drawings do not reflect true scales, but are only intended to schematically describe contents of the present disclosure.

DETAILED DESCRIPTION

Figure 1:
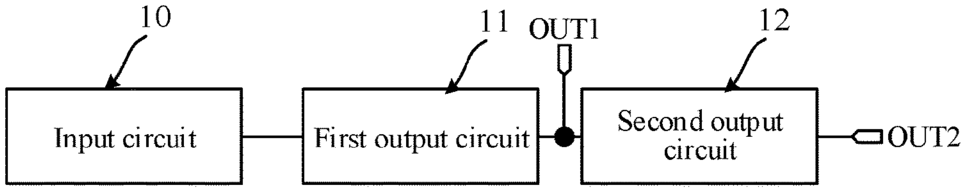
FIG. 1 is a schematic diagram of a structure of a drive control circuit according to at least one embodiment of the present disclosure.

The embodiments of the present disclosure will be described below in combination with the drawings in detail.

Implementations may be implemented in multiple different forms. Those of ordinary skills in the art may easily understand such a fact that implementation modes and contents may be transformed into one or more forms without departing from the purpose and scope of the present disclosure. Therefore, the present disclosure should not be explained as being limited to contents described in following implementation modes only. The embodiments in the present disclosure and features in the embodiments may be combined randomly with each other without conflict.

In the drawings, a size of one or more constituent elements, a thickness of a layer, or a region is sometimes exaggerated for clarity. Therefore, a mode of the present disclosure is not necessarily limited to the size, and a shape and a size of one or more components in the drawings do not reflect a true proportion. In addition, the drawings schematically illustrate ideal examples, and one implementation of the present disclosure is not limited to the shapes, numerical values, or the like shown in the drawings.

Ordinal numerals such as “first”, “second” and “third” in the present disclosure are set to avoid confusion of constituent elements, but not intended for restriction in quantity. In the present disclosure, “multiple” represents two or more than two.

In the present disclosure, for convenience, wordings “central”, “up”, “down”, “front”, “back”, “vertical”, “horizontal”, “top”, “bottom”, “inside”, “outside” and the like indicating orientation or positional relationships are used to illustrate positional relationships between constituent elements with reference to the drawings. These wordings are not intended to indicate or imply that involved devices or elements must have specific orientations and be structured and operated in the specific orientations, but only to facilitate describing the present specification and simplify the description, and thus should not be understood as limitations on the present disclosure. The positional relationships between the constituent elements are changed as appropriate based on directions which are used for describing the constituent elements. Therefore, appropriate replacements may be made according to situations without being limited to the wordings described in the specification.

In the present disclosure, unless otherwise specified and defined, terms “mounting”, “mutual connection” and “connection” should be understood in a broad sense. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skills in the art may understand meanings of the above-mentioned terms in the present disclosure according to situations. An “electrical connection” includes a case where constituent elements are connected together through an element with some electrical effect. The “element having some electrical effect” is not particularly limited as long as electrical signals between the connected constituent elements may be transmitted. Examples of the “element with the certain electrical effect” not only include electrodes and wirings, but also include switching elements (such as transistors), resistors, inductors, capacitors, other elements with one or more functions, etc.

In the present disclosure, a transistor refers to an element at least including three terminals, i.e., a gate electrode (gate), a drain electrode, and a source electrode. The transistor has a channel region between the drain electrode (drain electrode terminal, drain region, or drain) and the source electrode (source electrode terminal, source region, or source), and a current can flow through the drain electrode, the channel region, and the source electrode. In the present disclosure, the channel region refers to a region through which a current mainly flows.

In the present disclosure, for distinguishing two electrodes of a transistor except a gate electrode, one of the electrodes is referred to as a first electrode and the other electrode is referred to as a second electrode. The first electrode may be a source electrode or a drain electrode, and the second electrode may be a drain electrode or a source electrode. In addition, the gate electrode of the transistor is referred to as a control electrode. In a case that transistors with opposite polarities are used, or a current direction changes during operation of a circuit, or the like, functions of the “source electrode” and the “drain electrode” are sometimes interchangeable. Therefore, the “source electrode” and the “drain electrode” are interchangeable in the present disclosure.

In the present disclosure, “parallel” refers to a state in which an angle formed by two straight lines is above −10 degrees and below 10 degrees, and thus may include a state in which the angle is above −5 degrees and below 5 degrees. In addition, “perpendicular” refers to a state in which an angle formed by two straight lines is above 80 degrees and below 100 degrees, and thus may include a state in which the angle is above 85 degrees and below 95 degrees.

In the present disclosure, “film” and “layer” are interchangeable. For example, a “conductive layer” may be replaced with a “conductive film” sometimes. Similarly, an “insulation film” may be replaced with an “insulation layer” sometimes.

In the present disclosure, “about”, “approximate”, and “approximately” refer to a case that a boundary is defined not so strictly and a process and measurement error within a range is allowed.

In the present disclosure, an effective level includes a level for starting a transistor. For example, an effective level for starting a P-type transistor is a low level, and an effective level for starting an N-type transistor is a high level.

In some exemplary implementation modes, the display substrate may include: a display region and a non-display region. For example, the non-display region may be located at a periphery of the display region. However, the embodiment is not limited thereto. The display region at least includes multiple pixel circuits regularly arranged, multiple gate lines (including, for example, a scan line, a reset control line, and a light emitting control line) extending along a first direction, multiple data lines and power supply lines extending along a second direction. The first direction and the second direction are located in a same plane, and the first direction intersects with the second direction, for example, the first direction is perpendicular to the second direction.

In some exemplary implementation modes, the non-display region is provided with a gate driver circuit, the gate driver circuit includes multiple cascaded drive control circuits, and a drive control circuit may be configured to provide a gate drive signal to a pixel circuit of the display region.

An embodiment provides a drive control circuit, which includes an input circuit, a first output circuit, and a second output circuit. The first output circuit is electrically connected with the input circuit and a first output end, and is configured to output a first output signal from the first output end under control of the input circuit. The second output circuit is electrically connected with the input circuit and a second output end, or electrically connected with the first output end and the second output end, and is configured to output a second output signal from the second output end under control of the input circuit or the first output end. The first output signal and the second output signal are different in at least one of following: an absolute value of a voltage of an effective level, a polarity of an effective level, a time length of an effective level within a time length of one frame, and a continuous voltage fluctuation stage after an effective level.

In some exemplary implementation modes, an effective level of the first output signal and an effective level of the second output signal have opposite polarities. In some examples, the effective level of the first output signal may be configured to start a P-type transistor and the effective level of the second output signal may be configured to start an N-type transistor. However, the embodiment is not limited thereto. For example, effective levels of both the first output signal and the second output signal may be configured to start an N-type transistor or a P-type transistor.

In some exemplary implementation modes, a time length of an effective level of the first output signal within a time length of one frame may be different from a time length of an effective level of the second output signal within a time length of one frame. For example, a time length of an effective level of the first output signal within a time length of one frame may be less than or equal to a time length of an effective level of the second output signal within a time length of one frame. However, the embodiment is not limited thereto.

In some exemplary implementation modes, the first output signal has a continuous voltage fluctuation stage after an effective level, and a voltage fluctuation time length is less than a time length of the effective level. The second output signal does not have a continuous voltage fluctuation stage after an effective level. That is, a continuous voltage fluctuation time length of the second output signal after an effective level is zero. However, the embodiment is not limited thereto. For example, continuous voltage fluctuation time lengths of the first output signal and the second output signal after an effective level may both be zero.

In some exemplary implementation modes, phases of the first output signal and the second output signal are opposite. For example, polarities of effective levels of the first output signal and the second output signal are opposite, and a time length of an effective level of the first output signal within a time length of one frame is approximately the same as a time length of an effective level of the second output signal within a time length of one frame. In some examples, an absolute value of a voltage of an effective level of the first output signal and an absolute value of a voltage of an effective level of the second output signal may be approximately the same. However, the embodiment is not limited thereto. For example, an absolute value of a voltage of an effective level of the first output signal may be different from an absolute value of a voltage of an effective level of the second output signal.

In some exemplary implementation modes, polarities of effective levels of the first output signal and the second output signal may be the same, and a time length of an effective level of the first output signal within a time length of one frame may be different from a time length of an effective level of the second output signal within a time length of one frame. For example, effective levels of the first output signal and the second output signal may be configured to start an N-type transistor, and a time length of an effective level of the first output signal within a time length of one frame may be greater than a time length of an effective level of the second output signal within a time length of one frame. However, the embodiment is not limited thereto.

In the embodiment, the first output signal is different from the second output signal. The drive control circuit of the embodiment may provide two different output signals, which may meet requirements of different types of pixel circuits on gate drive signals, thereby improving performance of the pixel circuits. In addition, a quantity of circuits in the non-display region may be reduced, thereby facilitating achievement of a display substrate with a narrow frame.

FIG. 1 is a schematic diagram of a structure of a drive control circuit according to at least one embodiment of the present disclosure. As shown in FIG. 1, the drive control circuit provided in this example may include an input circuit 10, a first output circuit 11, and a second output circuit 12. The first output circuit 11 is electrically connected with the input circuit 10 and a first output end OUT1, and is configured to output a first output signal from the first output end OUT1 under control of the input circuit 10. The second output circuit 12 is electrically connected with the first output end OUT1 and a second output end OUT2, and is configured to output a second output signal from the second output end OUT2 under control of the first output end OUT1.

In some exemplary implementation modes, the second output circuit 12 may include at least one inverting sub-circuit. The inverting sub-circuit is electrically connected with the first output end, the second output end, a first power supply line, and a second power supply line, and is configured to control the second output end to output a first power supply signal provided by the first power supply line or a second power supply signal provided by the second power supply line under control of the first output end. Among them, polarities of effective levels of the first power supply signal and the second power supply signal are different. The first output circuit 11 may include at least one inverting sub-circuit electrically connected with the input circuit and the first output end.

In some exemplary implementation modes, the inverting sub-circuit may include a first semiconductor-type transistor and a second semiconductor-type transistor, and the first semiconductor-type transistor and the second semiconductor-type transistor have different transistor types. A first electrode of the first semiconductor-type transistor is electrically connected with the first power supply line, and a first electrode of the second semiconductor-type transistor is electrically connected with the second power supply line. A polarity of an effective level of the first power supply signal provided by the first power supply line is opposite to that of an effective level for starting the first semiconductor-type transistor, and a polarity of an effective level of the second power supply signal provided by the second power supply line is opposite to that of an effective level for starting the second semiconductor-type transistor. In some examples, the first semiconductor-type transistor may be a P-type transistor and the second semiconductor-type transistor may be an N-type transistor. The N-type transistor may be achieved by doping, or an oxide may be directly used as an active layer without doping. However, the embodiment is not limited thereto.

Figure 2:
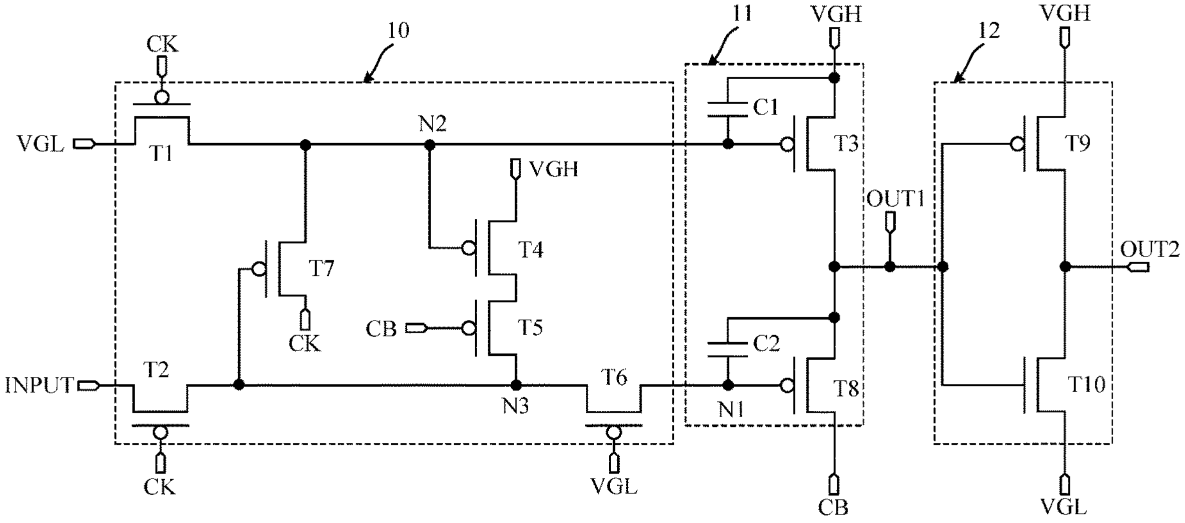
FIG. 2 is an equivalent circuit diagram of a drive control circuit according to at least one embodiment of the present disclosure.
Figure 3:
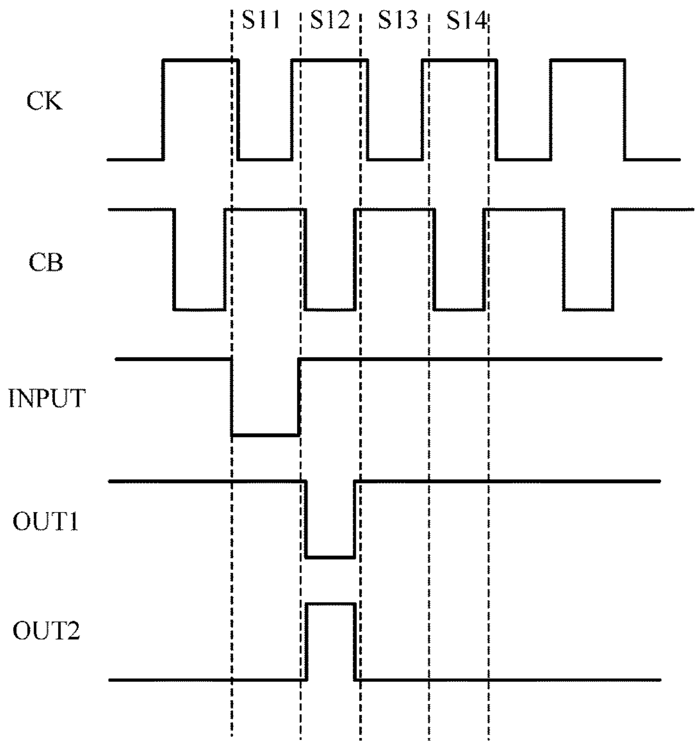
FIG. 3 is a working timing diagram of the drive control circuit provided in FIG. 2.

FIG. 2 is an equivalent circuit diagram of a drive control circuit according to at least one embodiment of the present disclosure. FIG. 3 is a working timing diagram of the drive control circuit provided in FIG. 2.

In some exemplary implementation modes, as shown in FIG. 2, an input circuit 10 is electrically connected with a signal input end INPUT, a first clock end CK, a second clock end CB, a first power supply line VGH, a second power supply line VGL, a first node N1, and a second node N2, and is configured to control potentials of the first node N1 and the second node N2 under control of the signal input end INPUT, the first clock end CK, and the second clock end CB. A first output circuit 11 is electrically connected with the first power supply line VGH, the second clock end CB, a first output end OUT1, the first node N1, and the second node N2, and is configured to control the first output end OUT1 to output a first output signal under control of the first node N1 and the second node N2. A second output circuit 12 is electrically connected with the first power supply line VGH, the second power supply line VGL, the first output end OUT1, and a second output end OUT2, and is configured to control the second output end OUT2 to output a second output signal under control of the first output end OUT1.

In some exemplary implementation modes, as shown in FIG. 2, the input circuit 10 includes a first transistor T1, a second transistor T2, a fourth transistor T4, a fifth transistor T5, a sixth transistor T6, and a seventh transistor T7. The first output circuit 11 includes a third transistor T3, an eighth transistor T8, a first capacitor C1, and a second capacitor C2. The second output circuit 12 includes a ninth transistor T9 and a tenth transistor T10.

In some exemplary implementation modes, as shown in FIG. 2, a control electrode of the first transistor T1 is electrically connected with the first clock end CK, a first electrode of the first transistor T1 is electrically connected with the second power supply line VGL, and a second electrode of the first transistor T1 is electrically connected with the first node N2. A control electrode of the second transistor T2 is electrically connected with the first clock end CK, a first electrode of the second transistor T2 is electrically connected with the signal input end INPUT, and a second electrode of the second transistor T2 is electrically connected with a third node N3. A control electrode of the third transistor T3 is electrically connected with the second node N2, a first electrode of the third transistor T3 is electrically connected with the first power supply line VGH, and a second electrode of the third transistor T3 is electrically connected with the first output end OUT1. A control electrode of the fourth transistor T4 is electrically connected with the second node N2, a first electrode of the fourth transistor T4 is electrically connected with the first power supply line VGH, and a second electrode of the fourth transistor T4 is electrically connected with a first electrode of the fifth transistor T5. A control electrode of the fifth transistor T5 is electrically connected with the second clock end CB, and a second electrode of the fifth transistor T5 is electrically connected with the third node N3. A control electrode of the sixth transistor T6 is electrically connected with the second power supply line VGL, a first electrode of the sixth transistor T6 is electrically connected with the third node N3, and a second electrode of the sixth transistor T6 is electrically connected with the first node N1. A control electrode of the seventh transistor T7 is electrically connected with the third node N3, a first electrode of the seventh transistor T7 is electrically connected with the first clock end CK, and a second electrode of the seventh transistor T7 is electrically connected with the second node N2. A control electrode of the eighth transistor T8 is electrically connected with the first node N1, a first electrode of the eighth transistor T8 is electrically connected with the second clock end CB, and a second electrode of the eighth transistor T8 is electrically connected with the first output end OUT1. A control electrode of the ninth transistor T9 is electrically connected with the first output end OUT1, a first electrode of the ninth transistor T9 is electrically connected with the first power supply line VGH, and a second electrode of the ninth transistor T9 is electrically connected with the second output end OUT2. A control electrode of the tenth transistor T10 is electrically connected with the first output end OUT1, a first electrode of the tenth transistor T10 is electrically connected with the second power supply line VGL, and a second electrode of the tenth transistor T10 is electrically connected with the second output end OUT2. A first electrode plate of the first capacitor C1 is electrically connected with the second node N2, and a second electrode plate of the first capacitor C1 is electrically connected with the first power supply line VGH. A first electrode plate of the second capacitor C2 is electrically connected with the first node N1, and a second electrode plate of the second capacitor C2 is electrically connected with the first output end OUT1.

In this example, the first node N1 is a connection point for the sixth transistor T6, the eighth transistor T8, and the second capacitor C2. The second node N2 is a connection point for the first transistor T1, the seventh transistor T7, the fourth transistor T4, the third transistor T3, and the first capacitor C1. The third node N3 is a connection point for the second transistor T2, the fifth transistor T5, the sixth transistor T6, and the seventh transistor T7.

In this example, both the first node N1 and the second node N2 are output control nodes. The ninth transistor T9 is a first output transistor, and the tenth transistor T10 is a second output transistor.

In an embodiment of the present disclosure, the first power supply line VGH provides a first power supply signal continuously, and the second power supply line VGL provides a second power supply signal continuously. An effective level of the first power supply signal may be a high level, and an effective level of the second power supply signal may be a low level. An absolute value of a voltage of the effective level of the first power supply signal and an absolute value of a voltage of the effective level of the second power supply signal may be approximately the same. However, the embodiment is not limited thereto.

In an embodiment of the present disclosure, the first clock end CK may provide a first clock signal, and the second clock end CB may provide a second clock signal. Both the first clock signal and the second clock signal are pulse signals. For example, duty ratios of the first clock signal and the second clock signal may be approximately the same, and the first clock signal and the second clock signal are not at a low level simultaneously. A duty ratio refers to a proportion of a high-level time length within a pulse period (including a high-level time length and a low-level time length) to a whole pulse period.

In some exemplary implementation modes, the first transistor T1 to the ninth transistor T9 may be first semiconductor-type transistors. The tenth transistor T10 may be a second semiconductor-type transistor. Transistor types of a first semiconductor-type transistor and the second semiconductor-type transistor are opposite. For example, the first transistor T1 to the ninth transistor T9 may be P-type transistors, and the tenth transistor T10 may be an N-type transistor. In some examples, a P-type transistor may be a Low Temperature Poly-Silicon (LTPS) thin film transistor, and the N-type transistor may be an Oxide thin film transistor, such as an Indium Gallium Zinc Oxide (IGZO) thin film transistor. In addition, in the embodiment of the present disclosure, a thin film transistor with a bottom gate structure or a thin film transistor with a top gate structure may be selected, or a thin film transistor with a bottom gate plus top gate structure may be adopted, as long as a switch function may be achieved. However, the embodiment is not limited thereto.

With reference to FIG. 3, a working process of the drive control circuit shown in FIG. 2 will be described below by taking a working process of a first stage drive control circuit as an example. Among them, a signal input end INPUT of the first stage drive control circuit may be electrically connected with a start signal line. The drive control circuit of the embodiment may include: ten transistor units (i.e., the first transistor T1 to the tenth transistor T10), two capacitor units (i.e., the first capacitor C1 and the second capacitor C2), three input ends (i.e., the first clock end CK, the second clock end CB, and the signal input end INPUT), two output ends (i.e., the first output end OUT1 and the second output end OUT2), and two power supply ends (i.e., the first power supply line VGH and the second power supply line VGL). The first power supply line VGH may provide a high-level first power supply signal continuously, and the second power supply line VGL may provide a low-level second power supply signal continuously.

As shown in FIG. 3, the working process of the drive control circuit of this example may include following stages.

In a first stage S11, the first clock end CK provides a low-level signal, the second clock end CB provides a high-level signal, and the signal input end INPUT provides a low-level signal.

The first clock end CK provides the low-level signal, and the first transistor T1 and the second transistor T2 are turned on. The low-level signal provided by the signal input end INPUT is transmitted to the third node N3 via the turned-on second transistor T2, and then transmitted to the first node N1 via the turned-on sixth transistor T6, so that the third node N3 and the first node N1 are at a low potential. The seventh transistor T7 and the eighth transistor T8 are turned on. The high-level signal provided by the second clock end CB is transmitted to the first output end OUT1 via the turned-on eighth transistor T8. The low-level second power supply signal provided by the second power supply line VGL is transmitted to the second node N2 via the turned-on first transistor T1, and the low-level signal provided by the first clock end CK is transmitted to the second node N2 via the turned-on seventh transistor T7, so that the second node N2 is at a low potential. The fourth transistor T4 and the third transistor T3 are turned on. The second clock end CB provides the high-level signal, and the fifth transistor T5 is turned off. The high-level first power supply signal provided by the first power supply line VGH is transmitted to the first output end OUT1 via the turned-on third transistor T3. The first output end OUT1 outputs a high-level signal. The ninth transistor T9 is turned off, the tenth transistor T10 is turned on, and the low-level second power supply signal provided by the second power supply line VGL is transmitted to the second output end OUT2 via the turned-on tenth transistor T10. The second output end OUT2 outputs a low-level signal.

In a second stage S12, the first clock end CK provides a high-level signal, the second clock end CB provides a low-level signal, and the signal input end INPUT provides a high-level signal.

The first clock end CK provides the high-level signal, and the first transistor T1 and the second transistor T2 are turned off. The sixth transistor T6 is turned on. The third node N3 and the first node N1 are kept at a low potential. The seventh transistor T7 and the eighth transistor T8 are turned on. The high-level signal provided by the first clock end CK is transmitted to the second node N2 via the turned-on seventh transistor T7, so that the second node N2 is at a high potential. The fourth transistor T4 and the third transistor T3 are turned off. The second clock end CB provides the low-level signal and the fifth transistor T5 is turned on. The low-level signal provided by the second clock end CB is transmitted to the first output end OUT1 via the turned-on eighth transistor T8. The first output end OUT1 outputs a low-level signal. The ninth transistor T9 is turned on, the tenth transistor T10 is turned off, and the high-level first power supply signal provided by the first power supply line VGH is transmitted to the second output end OUT2 via the turned-on ninth transistor T9. The second output end OUT2 outputs a high-level signal.

In a third stage S13, the first clock end CK provides a low-level signal, the second clock end CB provides a high-level signal, and the signal input end INPUT provides a high-level signal.

The first clock end CK provides the low-level signal, and the first transistor T1 and the second transistor T2 are turned on. The high-level signal provided by the signal input end INPUT is transmitted to the third node N3 via the turned-on second transistor T2, and then transmitted to the first node N1 via the turned-on sixth transistor T6, so that the third node N3 and the first node N1 are at a high potential. The seventh transistor T7 and the eighth transistor T8 are turned off. The low-level second power supply signal provided by the second power supply line VGL is transmitted to the second node N2 via the turned-on first transistor T1, so that the second node N2 is at a low potential. The fourth transistor T4 and the third transistor T3 are turned on. The second clock end CB provides the high-level signal, and the fifth transistor T5 is turned off. The high-level first power supply signal provided by the first power supply line VGH is transmitted to the first output end OUT1 via the turned-on third transistor T3. The first output end OUT1 outputs a high-level signal. The ninth transistor T9 is turned off, the tenth transistor T10 is turned on, and the low-level second power supply signal provided by the second power supply line VGL is transmitted to the second output end OUT2 via the turned-on tenth transistor T10. The second output end OUT2 outputs a low-level signal.

In a fourth stage S14, the first clock end CK provides a high-level signal, the second clock end CB provides a low-level signal, and the signal input end INPUT provides a high-level signal.

The first clock end CK provides the high-level signal, and the first transistor T1 and the second transistor T2 are turned off. The sixth transistor T6 is turned on. The third node N3 and the first node N1 are kept at a high potential. The seventh transistor T7 and the eighth transistor T8 are turned off. The second node N2 is kept at a low potential, and the third transistor T3 and the fourth transistor T4 are turned on. The second clock end CB provides the low-level signal and the fifth transistor T5 is turned on. The high-level first power supply signal provided by the first power supply line VGH is transmitted to the third node N3 via the fourth transistor T4 and the fifth transistor T5 which are turned on, so that the third node N3 is kept at a high potential. The high-level first power supply signal provided by the first power supply line VGH is transmitted to the first output end OUT1 via the turned-on third transistor T3. The first output end OUT1 outputs a high-level signal. The ninth transistor T9 is turned off, the tenth transistor T10 is turned on, and the low-level second power supply signal provided by the second power supply line VGL is transmitted to the second output end OUT2 via the turned-on tenth transistor T10. The second output end OUT2 outputs a low-level signal.

After the fourth stage S14, the third stage S13 and the fourth stage S14 may be repeated until a low-level signal is input at the signal input end INPUT, and then the process is restarted from the first stage S11.

According to the abovementioned working process of the drive control circuit, in the second stage S12, the first output end OUT1 outputs a low-level signal, and the second output end OUT2 outputs a high-level signal; and in other stages, the first output end OUT1 outputs a high-level signal, and the second output end OUT2 outputs a low-level signal. A phase of a first output signal outputted by the first output end OUT1 and a phase of a second output signal outputted by the second output end OUT2 are opposite. An effective level of the first output signal may be a low level, and an effective level of the second output signal may be a high level. Within a time length of one frame, a time length of an effective level of a first output signal and a time length of an effective level of a second output signal may be approximately the same. An absolute value of a voltage of the effective level of the first output signal and an absolute value of a voltage of the effective level of the second output signal are approximately the same.

In this exemplary implementation mode, a second output circuit 12 includes an inverting sub-circuit. The inverting sub-circuit includes a ninth transistor T9 and a tenth transistor T10. A polarity of an effective level (i.e., a high level) of a first power supply signal is opposite to a polarity of an effective level (i.e., a low level) for starting the ninth transistor T9, and a polarity of an effective level (i.e., a low level) of a second power supply signal is opposite to a polarity of an effective level (i.e., a high level) for starting the tenth transistor T10. The inverting sub-circuit may perform an inverting processing on a first output signal output by a first output end OUT1 to obtain a second output signal.

In some exemplary implementation modes, a first output signal provided by the first output end OUT1 may be configured to start a P-type transistor in a pixel circuit, and a second output signal provided by the second output end OUT2 may be configured to start an N-type transistor in a pixel circuit. For example, a first output signal may be provided as a scan signal to a P-type transistor in a pixel circuit and a second output signal may be provided as a scan signal to an N-type transistor in a pixel circuit. In some examples, a first output signal provided by a first output end of a present stage drive control circuit may be transmitted to a signal input end of a next stage drive control circuit as an input signal of the next stage drive control circuit. However, the embodiment is not limited thereto.

Figure 4:
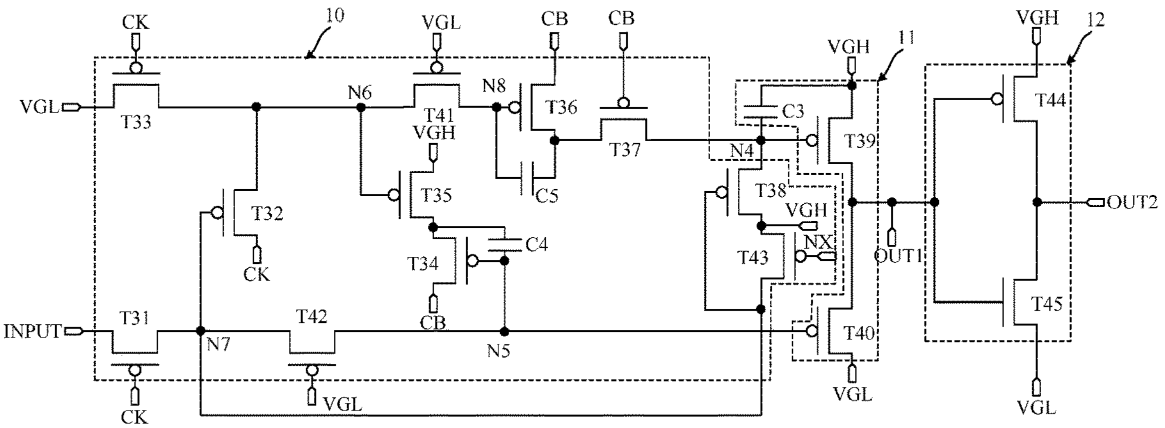
FIG. 4 is another equivalent circuit diagram of a drive control circuit according to at least one embodiment of the present disclosure.
Figure 5:
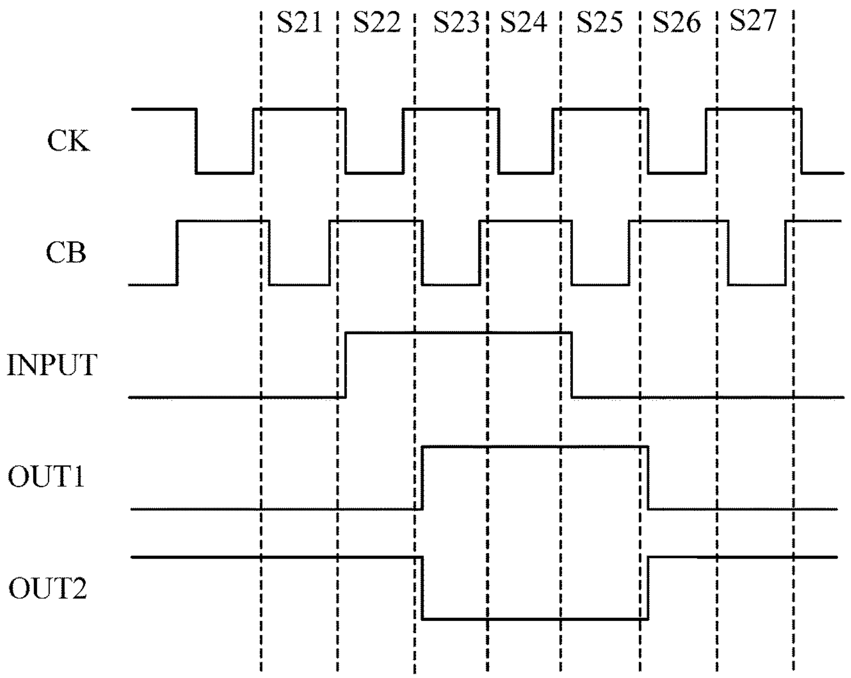
FIG. 5 is a working timing diagram of the drive control circuit provided in FIG. 4.

FIG. 4 is another equivalent circuit diagram of a drive control circuit according to at least one embodiment of the present disclosure. FIG. 5 is a working timing diagram of the drive control circuit provided in FIG. 4.

In some exemplary implementation modes, as shown in FIG. 4, the drive control circuit of the exemplary embodiment includes an input circuit 10, a first output circuit 11, and a second output circuit 12. The input circuit 10 is electrically connected with a signal input end INPUT, a first control end NX, a first clock end CK, a second clock end CB, a first power supply line VGH, a second power supply line VGL, a fourth node N4, and a fifth node N5, and is configured to control potentials of the fourth node N4 and the fifth node N5 under control of the signal input end INPUT, the first control end NX, the first clock end CK, and the second clock end CB. The first output circuit 11 is electrically connected with the first power supply line VGH, the second power supply line VGL, the fourth node N4, the fifth node N5, and a first output end OUT1, and is configured to control the first output end OUT1 to output a first output signal under control of the fourth node N4 and the fifth node N5. The second output circuit 12 is electrically connected with the first power supply line VGH, the second power supply line VGL, the first output end OUT1, and a second output end OUT2, and is configured to control the second output end OUT2 to output a second output signal under control of the first output end OUT1.

In some exemplary implementation modes, as shown in FIG. 4, the input circuit 10 may include a thirty-first transistor T31, a thirty-second transistor T32, a thirty-third transistor T33, a thirty-fourth transistor T34, a thirty-fifth transistor T35, a thirty-sixth transistor T36, a thirty-seventh transistor T37, a thirty-eighth transistor T38, a forty-first transistor T41, a forty-second transistor T42, a forty-third transistor T43, a fourth capacitor C4, and a fifth capacitor C5. The first output circuit 11 may include a thirty-ninth transistor T39, a fortieth transistor T40, and a third capacitor C3. The second output circuit 12 may include a forty-fourth transistor T44 and a forty-fifth transistor T45.

In some exemplary implementation modes, as shown in FIG. 4, a control electrode of the thirty-first transistor T31 is electrically connected with a first clock end CK, a first electrode of the thirty-first transistor T31 is electrically connected with a signal input end INPUT, and a second electrode of the thirty-first transistor T31 is electrically connected with a seventh node N7. A control electrode of the thirty-second transistor T32 is electrically connected with the seventh node N7, a first electrode of the thirty-second transistor T32 is electrically connected with the first clock end CK, and a second electrode of the thirty-second transistor T32 is electrically connected with a sixth node N6. A control electrode of the thirty-third transistor T33 is electrically connected with the first clock end CK, a first electrode of the thirty-third transistor T33 is electrically connected with a second power supply line VGL, and a second electrode of the thirty-third transistor T33 is electrically connected with the sixth node N6. A control electrode of the thirty-fourth transistor T34 is electrically connected with a fifth node N5, a first electrode of the thirty-fourth transistor T34 is electrically connected with a second clock end CB, and a second electrode of the thirty-fourth transistor T34 is electrically connected with a second electrode of the thirty-fifth transistor T35. A control electrode of the thirty-fifth transistor T35 is electrically connected with the sixth node N6, and a first electrode of the thirty-fifth transistor T35 is electrically connected with a first power supply line VGH. A control electrode of the thirty-sixth transistor T36 is electrically connected with an eighth node N8, a first electrode of the thirty-sixth transistor T36 is electrically connected with the second clock end CB, and a second electrode of the thirty-sixth transistor T36 is electrically connected with a first electrode of the thirty-seventh transistor T37. A control electrode of the thirty-seventh transistor T37 is electrically connected with the second clock end CB, and a second electrode of the thirty-seventh transistor T37 is electrically connected with a fourth node N4. A control electrode of the thirty-eighth transistor T38 is electrically connected with the seventh node N7, a first electrode of the thirty-eighth transistor T38 is electrically connected with the first power supply line VGH, and a second electrode of the thirty-eighth transistor T38 is electrically connected with a fourth node N4. A control electrode of the thirty-ninth transistor T39 is electrically connected with the fourth node N4, a first electrode of the thirty-ninth transistor T39 is electrically connected with the first power supply line VGH, and a second electrode of the thirty-ninth transistor T39 is electrically connected with a first output end OUT1. A control electrode of the fortieth transistor T40 is electrically connected with a fifth node N5, a first electrode of the fortieth transistor T40 is electrically connected with the second power supply line VGL, and a second electrode of the fortieth transistor T40 is electrically connected with the first output end OUT1. A control electrode of the forty-first transistor T41 is electrically connected with the second power supply line VGL, a first electrode of the forty-first transistor T41 is electrically connected with the sixth node N6, and a second electrode of the forty-first transistor T41 is electrically connected with the eighth node N8. A control electrode of the forty-second transistor T42 is electrically connected with the second power supply line VGL, a first electrode of the forty-second transistor T42 is electrically connected with the seventh node N7, and a second electrode of the forty-second transistor T42 is electrically connected with the fifth node N5. A control electrode of the forty-third transistor T43 is electrically connected with a first control end NX, a first electrode of the forty-third transistor T43 is electrically connected with the first power supply line VGH, and a second electrode of the forty-third transistor T43 is electrically connected with the seventh node N7. A control electrode of the forty-fourth transistor T44 is electrically connected with the first output end OUT1, a first electrode of the forty-fourth transistor T44 is electrically connected with the first power supply line VGH, and a second electrode of the forty-fourth transistor T44 is electrically connected with a second output end OUT2. A control electrode of the forty-fifth transistor T45 is electrically connected with the first output end OUT1, a first electrode of the forty-fifth transistor T45 is electrically connected with the second power supply line VGL, and a second electrode of the forty-fifth transistor T45 is electrically connected with the second output end OUT2. A first electrode plate of the third capacitor C3 is electrically connected with the fourth node N4, and a second electrode plate of the third capacitor C3 is electrically connected with the first power supply line VGH. A first electrode plate of the fourth capacitor C4 is electrically connected with the fifth node N5, and a second electrode plate of the fourth capacitor C4 is electrically connected with the second electrode of the thirty-fifth transistor T35. A first electrode plate of the fifth capacitor C5 is electrically connected with the eighth node N8, and a second electrode plate of the fifth capacitor C5 is electrically connected with the first electrode of the thirty-seventh transistor T37.

In this example, the fourth node N4 is a connection point for the thirty-seventh transistor T37, the thirty-eighth transistor T38, the thirty-ninth transistor T39, and the third capacitor C3. The fifth node N5 is a connection point for the thirty-fourth transistor T34, the fortieth transistor T40, the forty-second transistor T42, and the fourth capacitor C4. The sixth node N6 is a connection point for the thirty-second transistor T32, the thirty-third transistor T33, the thirty-fifth transistor T35, and the forty-first transistor T41. The seventh node N7 is a connection point for the thirty-first transistor T31, the thirty-second transistor T32, the forty-second transistor T42, the thirty-eighth transistor T38, and the forty-third transistor T43. The eighth node N8 is a connection point for the thirty-sixth transistor T36, the forty-first transistor T41, and the fifth capacitor C5.

In this example, the fourth node N4 and the fifth node N5 are output control nodes. The forty-fourth transistor T44 is a first output transistor, and the forty-fifth transistor T45 is a second output transistor.

In some exemplary implementation modes, the thirty-first transistor T31 to the forty-fourth transistor T44 may be first semiconductor-type transistors, such as P-type transistors, and the forty-fifth transistor T45 may be a second semiconductor-type transistor, such as an N-type transistor. For example, a P-type transistor may be an LTPS thin film transistor, and the N-type transistor may be an oxide thin film transistor, such as an IGZO thin film transistor. However, the embodiment is not limited thereto.

With reference to FIG. 5, a working process of the drive control circuit shown in FIG. 4 will be described below by taking a working process of a first stage drive control circuit as an example. Among them, a signal input end INPUT of the first stage drive control circuit may be electrically connected with a start signal line. The drive control circuit of the embodiment may include: fifteen transistor units (i.e., the thirty-first transistor T31 to the forty-fifth transistor T45), three capacitor units (i.e., the third capacitor C3 to the fifth capacitor C5), three input ends (i.e., the first clock end CK, the second clock end CB, and the signal input end INPUT), two output ends (i.e., the first output end OUT1 and the second output end OUT2), and two power supply ends (i.e., the first power supply line VGH and the second power supply line VGL). The first power supply line VGH may provide a high-level first power supply signal continuously, and the second power supply line VGL may provide a low-level second power supply signal continuously.

In this exemplary implementation mode, in a normal display period, the first control end NX continuously provides a high-level signal so that the forty-third transistor T43 is turned off without affecting a potential of the seventh node N7. In an abnormal display period (for example, before displaying a first frame, or a blanking stage), the first control end NX may provide a low-level signal so that the forty-third transistor T43 is turned on, and a high-level first power supply signal provided by the first power supply line VGH is transmitted to the seventh node N7. In this way, the seventh node N7 and the fifth node N5 may be at a high potential, the fortieth transistor T40 is turned off, and the first output end OUT1 cannot output an effective low-level signal, so that screen flashing or false light emitting can be prevented in an abnormal display period.

As shown in FIG. 5, the normal display period of the drive control circuit of the exemplary embodiment may include following stages. In a first stage S21 to a seventh stage S27, the first control end NX provides a high-level signal, and the forty-third transistor T43 is turned off.

In the first stage S21, the first clock end CK provides a high-level signal, the second clock end CB provides a low-level signal, and the signal input end INPUT provides a low-level signal.

The first clock end CK provides the high-level signal, the thirty-first transistor T31 and the thirty-third transistor T33 are turned off, the forty-second transistor T42 is turned on, the seventh node N7 and the fifth node N5 are kept at a low potential of a previous stage, and the thirty-second transistor T32, the thirty-fourth transistor T34, the thirty-eighth transistor T38, and the fortieth transistor T40 are turned on. The high-level signal provided by the first clock end CK is transmitted to the sixth node N6 via the turned-on thirty-second transistor T32, the forty-first transistor T41 is turned on, the sixth node N6 and the eighth node N8 are at a high potential, and the thirty-fifth transistor T35 and the thirty-sixth transistor T36 are turned off. The low-level signal provided by the second clock end CB is transmitted to the second electrode plate of the fourth capacitor C4 via the turned-on thirty-fourth transistor T34, and the first electrode plate (i.e., the fifth node N5) of the fourth capacitor C4 is kept at a lower potential due to a holding function of a capacitor. The thirty-eighth transistor T38 is turned on so that a potential of the fourth node N4 is pulled up to a high potential, and the thirty-ninth transistor T39 is turned off. The fortieth transistor T40 is turned on so that the first output end OUT1 outputs a low-level second power supply signal provided by the first power supply line VGL. The forty-fourth transistor T44 is turned on, the forty-fifth transistor T45 is turned off, and the second output end OUT2 outputs a high-level first power supply signal provided by the first power supply line VGH.

In a second stage S22, the first clock end CK provides a low-level signal, the second clock end CB provides a high-level signal, and the signal input end INPUT provides a high-level signal.

The first clock end CK provides the low-level signal, and the thirty-first transistor T31 and the thirty-third transistor T33 are turned on. The turned-on thirty-first transistor T31 transmits the high-level signal provided by the signal input end INPUT to the seventh node N7, and the forty-second transistor T42 is turned on so that potentials of the seventh node N7 and the fifth node N5 are pulled high. The thirty-second transistor T32, the thirty-fourth transistor T34, the thirty-eighth transistor T38, and the fortieth transistor T40 are turned off. The turned-on thirty-third transistor T33 transmits a low-level second power supply signal provided by the second power supply line VGL to the sixth node N6, and the forty-first transistor T41 is turned on, so that the sixth node N6 and the eighth node N8 are at a low potential, and the thirty-fifth transistor T35 and the thirty-sixth transistor T36 are turned on. The high-level first power supply signal provided by the first power supply line VGH is transmitted to the second electrode plate of the fourth capacitor C4 via the turned-on thirty-fifth transistor T35, and the first electrode plate of the fourth capacitor (i.e., the fifth node N5) is kept at a stable high level under a jumping action of the fourth capacitor C4. The second clock end CB inputs a high-level signal, the thirty-seventh transistor T37 is turned off, the fourth node N4 is kept at a high potential provided by the first power supply line VGH under a storage action of the third capacitor C3, and the thirty-ninth transistor T39 is turned off. Since both the thirty-ninth transistor T39 and the fortieth transistor T40 are turned off, the first output end OUT1 keeps a previous low-level output. The forty-fourth transistor T44 is turned on, the forty-fifth transistor T45 is turned off, and the second output end OUT2 outputs a high-level first power supply signal provided by the first power supply line VGH.

In a third stage S23, the first clock end CK inputs a high-level signal, the second clock end CB inputs a low-level signal, and the signal input end INPUT inputs a high-level signal.

The first clock end CK inputs the high-level signal, the thirty-first transistor T31 and the thirty-third transistor T33 are turned off, the forty-second transistor T42 is turned on, the seventh node N7 and the fifth node N5 are kept at a high potential of a previous stage. The thirty-second transistor T32, the thirty-fourth transistor T34, the thirty-eighth transistor T38, and the fortieth transistor T40 are turned off. The forty-first transistor T41 is turned on, the sixth node N6 and the eighth node N8 are kept at a low potential, and the thirty-fifth transistor T35 and the thirty-sixth transistor T36 are turned on. The high-level first power supply signal provided by the first power supply line VGH is transmitted to the second electrode plate of the fourth capacitor C4 via the turned-on thirty-fifth transistor T35, so that the fifth node N5 is kept at a stable high potential. The second clock end CB inputs the low-level signal, the thirty-seventh transistor T37 is turned on, the low-level signal provided by the second clock end CB is transmitted to the fourth node N4 via the thirty-sixth transistor T36 and the thirty-seventh transistor T37 which are turned-on, the thirty-ninth transistor T39 is turned on, and a high-level first power supply signal provided by the first power supply line VGH is provided to the first output end OUT1. The forty-fourth transistor T44 is turned off, the forty-fifth transistor T45 is turned on, and the second output end OUT2 outputs a low-level second power supply signal provided by the second power supply line VGL.

In a fourth stage S24, the first clock end CK inputs a low-level signal, the second clock end CB inputs a high-level signal, and the signal input end INPUT inputs a high-level signal.

The first clock end CK inputs the low-level signal, and the thirty-first transistor T31 and the thirty-third transistor T33 are turned on. The turned-on thirty-first transistor T31 transmits the high-level signal input by the signal input end INPUT to the seventh node N7, the forty-second transistor T42 is turned on, and the seventh node N and the fifth node N5 are at a high potential. The thirty-second transistor T32, the thirty-fourth transistor T34, the thirty-eighth transistor T38, and the fortieth transistor T40 are turned off. The turned-on thirty-third transistor T33 transmits a low-level signal provided by the second power supply line to the sixth node N6, the forty-first transistor T41 is turned on, the sixth node N6 and the eighth node N8 are at a low potential, and the thirty-fifth transistor T35 and the thirty-sixth transistor T36 are turned on. The second clock end CB inputs the high-level signal, the thirty-seventh transistor T37 is turned off, the fourth node N4 is kept at a low potential of a previous stage under a storage action of the third capacitor C3, the thirty-ninth transistor T39 is turned on, and the first output end OUT1 outputs a high-level first power supply signal provided by the first power supply line VGH. The forty-fourth transistor T44 is turned off, the forty-fifth transistor T45 is turned on, and the second output end OUT2 outputs a low-level second power supply signal provided by the second power supply line VGL.

In a fifth stage S25, the first clock end CK inputs a high-level signal, the second clock end CB inputs a low-level signal, and the signal input end INPUT inputs a low-level signal.

The first clock end CK inputs the high-level signal, the thirty-first transistor T31 and the thirty-third transistor T33 are turned off, the forty-second transistor T42 is turned on, the seventh node N7 and the fifth node N5 are kept at a high potential of a previous stage. The thirty-second transistor T32, the thirty-fourth transistor T34, the thirty-eighth transistor T38, and the fortieth transistor T40 are turned off. The forty-first transistor T41 is turned on, the sixth node N6 and the eighth node N8 are kept at a low potential, and the thirty-fifth transistor T35 and the thirty-sixth transistor T36 are turned on. The second clock end CB inputs the low-level signal, and the thirty-seventh transistor T37 is turned on. The thirty-sixth transistor T36 and the thirty-seventh transistor T37 which are turned on transmit the low-level signal provided by the second clock end CB to the fourth node N4, the thirty-ninth transistor T39 is turned on, and the first output end OUT1 outputs the high-level first power supply signal provided by the first power supply line VGH. The forty-fourth transistor T44 is turned off, the forty-fifth transistor T45 is turned on, and the second output end OUT2 outputs a low-level second power supply signal provided by the second power supply line VGL.

In a sixth stage S26, the first clock end CK inputs a low-level signal, the second clock end CB inputs a high-level signal, and the signal input end INPUT inputs a low-level signal.

The first clock end CK inputs the low-level signal, and the thirty-first transistor T31 and the thirty-third transistor T33 are turned on. The forty-second transistor T42 is turned on, and potentials of the seventh node N7 and the fifth node N5 are pulled down. The thirty-second transistor T32, the thirty-fourth transistor T34, the thirty-eighth transistor T38, and the fortieth transistor T40 are turned on. The turned-on thirty-eighth transistor T38 transmits a high-level signal provided by the first power supply line VGH to the fourth node N4, and the thirty-ninth transistor T39 is turned off. The turned-on fortieth transistor T40 transmits a low-level signal provided by the second power supply line VGL to the first output end OUT1. The turned-on thirty-second transistor T32 transmits the low-level signal provided by the first clock end CK to the sixth node N6, the forty-first transistor T41 is turned on, the sixth node N6 and the eighth node N8 are at a low potential, and the thirty-fifth transistor T35 and the thirty-sixth transistor T36 are turned on. The second clock end CB inputs the high-level signal, and the thirty-seventh transistor T37 is turned off. The forty-fourth transistor T44 is turned on, the forty-fifth transistor T45 is turned off, and the second output end OUT2 outputs the high-level signal provided by the first power supply line VGH.

In a seventh stage S27, the first clock end CK inputs a high-level signal, the second clock end CB inputs a low-level signal, and the signal input end INPUT inputs a low-level signal.

The first clock end CK inputs the high-level signal, and the thirty-first transistor T31 and the thirty-third transistor T33 are turned off. The forty-second transistor T42 is turned on, the seventh node N7 and the fifth node N5 are kept at a low potential of a previous stage, and the thirty-second transistor T32, the thirty-fourth transistor T34, the thirty-eighth transistor T38, and the fortieth transistor T40 are turned on. The turned-on thirty-second transistor T32 transmits the high-level signal provided by the first clock end CK to the sixth node N6, the forty-first transistor T41 is turned on, potentials of the sixth node N6 and the eighth node N8 are pulled high, and the thirty-fifth transistor T35 and the thirty-sixth transistor T36 are turned off. The turned-on thirty-eighth transistor T38 transmits a high-level signal provided by the first power supply line VGH to the fourth node N4, and the thirty-ninth transistor T39 is turned off. The fortieth transistor T10 is turned on and outputs a low-level signal provided by the second power supply line VGL to the first output end OUT1. The forty-fourth transistor T44 is turned on, the forty-fifth transistor T45 is turned off, and the second output end OUT2 outputs the high-level signal provided by the first power supply line VGH.

The sixth stage S26 and the seventh stage t27 may be repeated after the seventh stage S27, until the signal input end INPUT inputs a high-level signal, and the process is restarted from the second stage S22.

According to the abovementioned working process of the drive control circuit, in the third stage S23 to the fifth stage S25, the first output end OUT1 may output a high-level signal, the second output end OUT2 outputs a low-level signal; in other stages, the first output end OUT1 outputs a low-level signal; and the second output end OUT2 outputs a high-level signal. A phase of a first output signal provided by the first output end OUT1 and a phase of a second output signal provided by the second output end OUT2 are opposite. An effective level of the first output signal is a low level, and an effective level of the second output signal is a high level. Within a time length of one frame, a time length of an effective level of a first output signal and a time length of an effective level of a second output signal may be approximately the same. An absolute value of a voltage of the effective level of the first output signal and an absolute value of a voltage of the effective level of the second output signal may be approximately the same.

In this exemplary implementation mode, the second output circuit 12 may include an inverting sub-circuit, and the inverting sub-circuit includes the forty-fourth transistor T44 and the forty-fifth transistor T45. A polarity of an effective level (i.e., a high level) of a first power supply signal is opposite to a polarity of an effective level (i.e., a low level) for starting the forty-fourth transistor T44, and a polarity of an effective level (i.e., a low level) of a second power supply signal is opposite to a polarity of an effective level (i.e., a high level) for starting the forty-fifth transistor T45. The inverting sub-circuit may perform an inverting processing on a first output signal output by the first output end OUT1 to obtain a second output signal.

In some exemplary implementation modes, a first output signal provided by the first output end OUT1 may be configured to start an N-type transistor in a pixel circuit, and a second output signal provided by the second output end OUT2 may be configured to start a P-type transistor in a pixel circuit. In some examples, the first output signal and the second output signal may be transmitted to a pixel circuit through a light emitting control line as light emitting control signals, or may be transmitted to a pixel circuit through a scan line as scan signals. In some examples, a first output signal provided by a first output end of a present stage drive control circuit may be transmitted to a signal input end of a next stage drive control circuit as an input signal of the next stage drive control circuit. However, the embodiment is not limited thereto.

In other exemplary implementation modes, the forty-first transistor T41 and the forty-second transistor T42 in FIG. 4 may be omitted, i.e., the fifth node N5 and the seventh node N7 are directly electrically connected, and the eighth node N8 and the sixth node N6 are directly electrically connected. However, the embodiment is not limited thereto.

Figure 6:
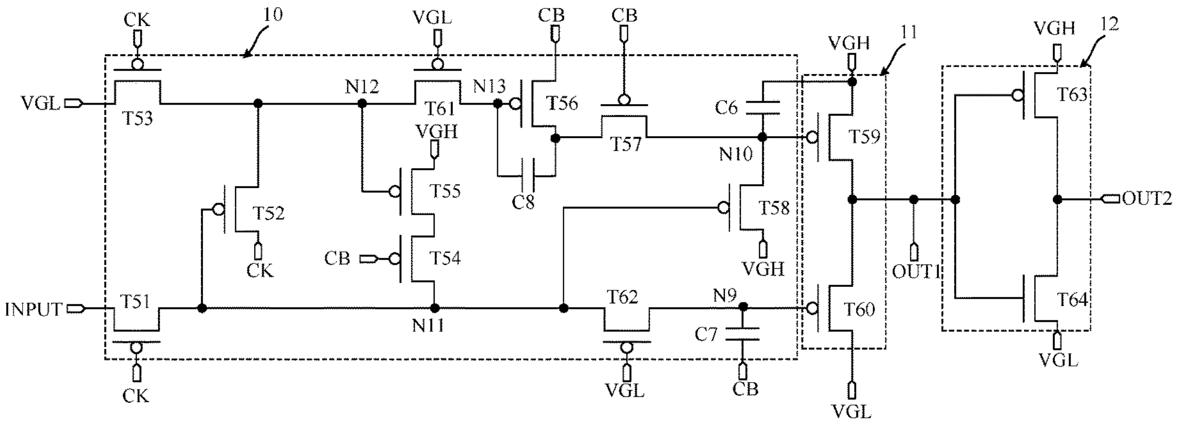
FIG. 6 is another equivalent circuit diagram of a drive control circuit according to at least one embodiment of the present disclosure.
Figure 7:
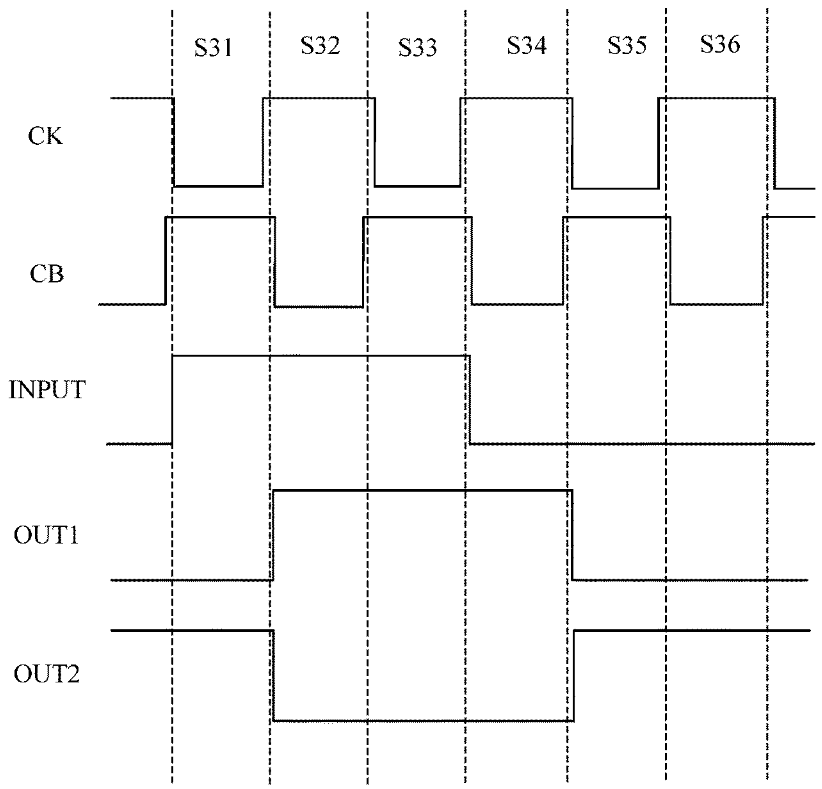
FIG. 7 is a working timing diagram of the drive control circuit provided in FIG. 6.

FIG. 6 is another equivalent circuit diagram of a drive control circuit according to at least one embodiment of the present disclosure. FIG. 7 is a working timing diagram of the drive control circuit provided in FIG. 6.

In some exemplary implementation modes, as shown in FIG. 6, the drive control circuit of the exemplary embodiment includes an input circuit 10, a first output circuit 11, and a second output circuit 12. The input circuit 10 is electrically connected with a signal input end INPUT, a first clock end CK, a second clock end CB, a first power supply line VGH, a second power supply line VGL, a ninth node N9, and a tenth node N10, and is configured to control potentials of the ninth node N9 and the tenth node N10 under control of the signal input end INPUT, the first clock end CK, and the second clock end CB. The first output circuit 11 is electrically connected with the first power supply line VGH, the second power supply line VGL, the ninth node N9, the tenth node N10, and a first output end OUT1, and is configured to control the first output end OUT1 to output a first output signal under control of the ninth node N9 and the tenth node N10. The second output circuit 12 is electrically connected with the first power supply line VGH, the second power supply line VGL, the first output end OUT1, and a second output end OUT2, and is configured to control the second output end OUT2 to output a second output signal under control of the first output end OUT1.

In some exemplary implementation modes, as shown in FIG. 6, the input circuit 10 may include a fifty-first transistor T51, a fifty-second transistor T52, a fifty-third transistor T53, a fifty-fourth transistor T54, a fifty-fifth transistor T55, a fifty-sixth transistor T56, a fifty-seventh transistor T57, a fifty-eighth transistor T58, a sixty-first transistor T61, a sixty-second transistor T62, a sixth capacitor C6, a seventh capacitor C7, and an eighth capacitor C8. The first output circuit 11 may include a fifty-ninth transistor T59 and a sixtieth transistor T60. The second output circuit 12 may include a sixty-third transistor T63 and a sixty-fourth transistor T64.

In some exemplary implementation modes, as shown in FIG. 6, a control electrode of the fifty-first transistor T51 is electrically connected with the first clock end CK, a first electrode of the fifty-first transistor T51 is electrically connected with the signal input end INPUT, and a second electrode of the fifty-first transistor T51 is electrically connected with an eleventh node N11. A control electrode of the fifty-second transistor T52 is electrically connected with the eleventh node N11, a first electrode of the fifty-second transistor T52 is electrically connected with the first clock end CK, and a second electrode of the fifty-second transistor T52 is electrically connected with a twelfth node N12. A control electrode of the fifty-third transistor T53 is electrically connected with the first clock end CK, a first electrode of the fifty-third transistor T53 is electrically connected with the second power supply line VGL, and a second electrode of the fifty-third transistor T53 is electrically connected with the twelfth node N12. A control electrode of the fifty-fourth transistor T54 is electrically connected with the second clock end CB, a first electrode of the fifty-fourth transistor T54 is electrically connected with a second electrode of the fifty-fifth transistor T55, and a second electrode of the fifty-fourth transistor T54 is electrically connected with the eleventh node N11. A control electrode of the fifty-fifth transistor T55 is electrically connected with the twelfth node N12, and a first electrode of the fifty-fifth transistor T55 is electrically connected with the first power supply line VGH. A control electrode of the fifty-sixth transistor T56 is electrically connected with a thirteenth node N13, a first electrode of the fifty-sixth transistor T56 is electrically connected with the second clock end CB, and a second electrode of the fifty-sixth transistor T56 is electrically connected with a first electrode of the fifty-seventh transistor T57. A control electrode of the fifty-seventh transistor T57 is electrically connected with the second clock end CB and a second electrode of the fifty-seventh transistor T57 is electrically connected with the tenth node N10. A control electrode of the fifty-eighth transistor T58 is electrically connected with the eleventh node N11, a first electrode of the fifty-eighth transistor T58 is electrically connected with the first power supply line VGH, and a second electrode of the fifty-eighth transistor T58 is electrically connected with the tenth node N10. A control electrode of the fifty-ninth transistor T59 is electrically connected with the tenth node N10, a first electrode of the fifty-ninth transistor T59 is electrically connected with the first power supply line VGH, and a second electrode of the fifty-ninth transistor T59 is electrically connected with the first output end OUT1. A control electrode of the sixtieth transistor T60 is electrically connected with the ninth node N9, a first electrode of the sixtieth transistor T60 is electrically connected with the second power supply line VGL, and a second electrode of the sixtieth transistor T60 is electrically connected with the first output end OUT1. A control electrode of the sixty-first transistor T61 is electrically connected with the second power supply line VGL, a first electrode of the sixty-first transistor T61 is electrically connected with the twelfth node N12, and a second electrode of the sixty-first transistor T61 is electrically connected with the thirteenth node N13. A control electrode of the sixty-second transistor T62 is electrically connected with the second power supply line VGL, a first electrode of the sixty-second transistor T62 is electrically connected with the eleventh node N11, and a second electrode of the sixty-second transistor T62 is electrically connected with the ninth node N9. A control electrode of the sixty-third transistor T63 is electrically connected with the first output end OUT1, a first electrode of the sixty-third transistor T63 is electrically connected with the first power supply line VGH, and a second electrode of the sixty-third transistor T63 is electrically connected with the second output end OUT2. A control electrode of the sixty-fourth transistor T64 is electrically connected with the first output end OUT1, a first electrode of the sixty-fourth transistor T64 is electrically connected with the second power supply line VGL, and a second electrode of the sixty-fourth transistor T64 is electrically connected with the second output end OUT2. A first electrode plate of the sixth capacitor C6 is electrically connected with the tenth node N10, and a second electrode plate of the sixth capacitor C6 is electrically connected with the first power supply line VGH. A first electrode plate of the seventh capacitor C7 is electrically connected with the second clock end CB, and a second electrode plate of the seventh capacitor C7 is electrically connected with the ninth node N9. A first electrode plate of the eighth capacitor C8 is electrically connected with the thirteenth node N13, and a second electrode plate of the eighth capacitor C8 is electrically connected with the first electrode of the fifty-seventh transistor T57.

In this example, the ninth node N9 is a connection point for the sixty-second transistor T62, the sixtieth transistor T60, and the seventh capacitor C7. The tenth node N10 is a connection point for the fifty-seventh transistor T57, the fifty-eighth transistor T58, the fifty-ninth transistor T59, and the sixth capacitor C6. The eleventh node N11 is a connection point for the fifty-first transistor T51, the fifty-second transistor T52, the fifty-fourth transistor T54, the fifty-eighth transistor T58, and the sixty-second transistor T62. The twelfth node N12 is a connection point for the fifty-second transistor T52, the fifty-third transistor T53, the fifty-fifth transistor T55, and the sixty-first transistor T61. The thirteenth node N13 is a connection point for the fifty-sixth transistor T56, the sixty-first transistor T61, and the eighth capacitor C8.

In this example, the ninth node N9 and the tenth node N10 are output control nodes. The sixty-third transistor T63 is a first output transistor, and the sixty-fourth transistor T64 is a second output transistor.

In some exemplary implementation modes, the fifty-first transistor T51 to the sixty-third transistor T63 may be first semiconductor-type transistor, for example, may be P-type transistors; the sixty-fourth transistor T64 may be a second semiconductor-type transistor, for example, may be an N-type transistor. For example, a P-type transistor may be an LTPS thin film transistor, and the N-type transistor may be an oxide thin film transistor, such as an IGZO thin film transistor. However, the embodiment is not limited thereto.

With reference to FIG. 7, a working process of the drive control circuit shown in FIG. 6 will be described below by taking a working process of a first stage drive control circuit as an example. Among them, a signal input end INPUT of the first stage drive control circuit may be electrically connected with a start signal line. The drive control circuit of the embodiment includes: fourteen transistor units (i.e., the fifty-first transistor T51 to the sixty-fourth transistor T64), three capacitor units (i.e., the sixth capacitor C6 to the eighth capacitor C8), three input ends (i.e., the first clock end CK, the second clock end CB, and the signal input end INPUT), two output ends (i.e., the first output end OUT1 and the second output end OUT2), and two power supply ends (i.e., the first power supply line VGH and the second power supply line VGL). The first power supply line VGH may provide a high-level first power supply signal continuously, and the second power supply line VGL may provide a low-level second power supply signal continuously.

As shown in FIG. 7, the working process of the drive control circuit of this example may include following stages.

In a first stage S31, the signal input end INPUT provides a high-level signal, the first clock end CK provides a low-level signal, and the second clock end CB provides a high-level signal.

The first clock end CK provides the low-level signal, the fifty-first transistor T51 and the fifty-fifth transistor T53 are turned on, the sixty-second transistor T62 is turned on, the eleventh node N11 and the ninth node N9 are at a high potential, and the fifty-second transistor T52, the fifty-eighth transistor T58, and the sixtieth transistor T60 are turned off. A low-level signal provided by the second power supply line VGL is transmitted to the twelfth node N12 via the turned-on fifty-third transistor T53, the sixty-first transistor T61 is turned on, the twelfth node N12 and the thirteenth node N13 are at a low potential, and the fifty-fifth transistor T55 and the fifty-sixth transistor T56 are turned on. The second clock end CB provides the high-level signal, and the fifty-fourth transistor T54 and the fifty-seventh transistor T57 are turned off. The tenth node N10 is kept at a high level of a previous stage, and the fifty-ninth transistor T59 is turned off. Since both the fifty-ninth transistor T59 and the sixtieth transistor T60 are turned off, the first output end OUT1 keeps outputting a previous low-level signal. The sixty-third transistor T63 is turned on, the sixty-fourth transistor T64 is turned off, and the second output end OUT2 outputs a high-level signal provided by the first power supply line VGH.

In a second stage S32, the signal input end INPUT provides a high-level signal, the first clock end CK provides a high-level signal, and the second clock end CB provides a low-level signal.

The second clock end CB provides the low-level signal, and the fifty-fourth transistor T54 and the fifty-seventh transistor T57 are turned on. The first clock end CK provides the high-level signal, the fifty-first transistor T51 and the fifty-third transistor T53 are turned off, and the twelfth node N12 and the thirteenth node N13 are kept at a low potential of a previous stage under a storage action of the eighth capacitor C8. The fifty-fifth transistor T55 and the fifty-sixth transistor T56 are turned on. The high-level signal provided by the first power supply line VGH is transmitted to the eleventh node N11 through the fifty-fifth transistor T55 and the fifty-fourth transistor T54 which are turned on, so that potentials of the eleventh node N11 and the ninth node N9 are pulled high. The fifty-second transistor T52, the fifty-eighth transistor T58, and the sixtieth transistor T60 are turned off. The low-level signal provided by the second clock end CB is transmitted to the tenth node N10 through the fifty-sixth transistor T56 and the fifty-seventh transistor T57 which are turned on, so that the tenth node N10 is at a low potential, the fifty-ninth transistor T59 is turned on, and the first output end OUT1 outputs a high-level signal. The sixty-third transistor T63 is turned off, the sixty-fourth transistor T64 is turned on, and the second output end OUT2 outputs a low-level signal.

In a third stage S33, the signal input end INPUT provides a high-level signal, the first clock end CK provides a low-level signal, and the second clock end CB provides a high-level signal.

The first clock end CK provides the low-level signal, the fifty-first transistor T51 and the fifty-third transistor T53 are turned on, the ninth node N9 and the eleventh node N11 are at a high potential, and the fifty-second transistor T52, the fifty-eighth transistor T58, and the sixtieth transistor T60 are turned off. The twelfth node N12 and the thirteenth node T13 are at a low potential, and the fifty-fifth transistor T55 and the fifty-sixth transistor T56 are turned on. The second clock end CB provides the high-level signal, and the fifty-fourth transistor T54 and the fifty-seventh transistor T57 are turned off. The tenth node N10 is kept at a low level of a previous stage, and the fifty-ninth transistor T59 is turned on. The first output end OUT1 outputs a high-level signal. The sixty-third transistor T63 is turned off, the sixty-fourth transistor T64 is turned on, and the second output end OUT2 outputs a low-level signal.

In a fourth stage S24, the signal input end INPUT provides a low-level signal, the first clock end CK provides a high-level signal, and the second clock end CB provides a low-level signal.

The second clock end CB provides the low-level signal, and the fifty-fourth transistor T54 and the fifty-seventh transistor T57 are turned on. The first clock end CK provides the high-level signal, the fifty-first transistor T51 and the fifty-third transistor T53 are turned off, the ninth node N9 and the eleventh node N11 are a high potential of a previous stage under a storage action of the seventh capacitor C7, and the fifty-second transistor T52, the fifty-eighth transistor T58, and the sixtieth transistor T60 are turned off. Under a storage action of the eighth capacitor C8, the twelfth node N12 and the thirteenth node N13 are kept at a low potential, and the fifty-fifth transistor T55 and the fifty-sixth transistor T56 are turned on. The low-level signal provided by the second clock end CB is transmitted to the tenth node N10 through the fifty-sixth transistor T56 and the fifty-seventh transistor T57 which are turned on, so that the tenth node N10 is at a low potential, the fifty-ninth transistor T59 is turned on, and the first output end OUT1 outputs a high-level signal. The sixty-third transistor T63 is turned off, the sixty-fourth transistor T64 is turned on, and the second output end OUT2 outputs a low-level signal.

In a fifth stage S35, the signal input end INPUT provides a low-level signal, the first clock end CK provides a low-level signal, and the second clock end CB provides a high-level signal.

The first clock end CK provides the low-level signal, the fifty-first transistor T51 and the fifty-third transistor T53 are turned on, the ninth node N9 and the eleventh node N11 are at a low potential, and the fifty-second transistor T52, the fifty-eighth transistor T58, and the sixtieth transistor T60 are turned on. The twelfth node N12 and the thirteenth node N13 are at a low potential, and the fifty-fifth transistor T55 and the fifty-sixth transistor T56 are turned on. The second clock end CB provides the high-level signal, and the fifty-fourth transistor T54 and the fifty-seventh transistor T57 are turned off. The tenth node N10 is at a high potential, and the fifty-ninth transistor T59 is turned off. The first output end OUT1 outputs a low-level signal. The sixty-third transistor T63 is turned on, the sixty-fourth transistor T64 is turned off, and the second output end OUT2 outputs a high-level signal.

In a sixth stage S36, the signal input end INPUT provides a low-level signal, the first clock end CK provides a high-level signal, and the second clock end CB provides a low-level signal.

The first clock end CK provides the high-level signal, the fifty-first transistor T51 and the fifty-third transistor T53 are turned off, the ninth node N9 and the eleventh node N11 are kept at a low potential, and the fifty-second transistor T52, the fifty-eighth transistor T58, and the sixtieth transistor T60 are turned on. The twelfth node N12 and the thirteenth node N13 are at a high potential, and the fifty-fifth transistor T55 and the fifty-sixth transistor T56 are turned off. The second clock end CB provides the low-level signal, and the fifty-fourth transistor T54 and the fifty-seventh transistor T57 are turned on. The tenth node N10 is at a high potential, and the fifty-ninth transistor T59 is turned off. The first output end OUT1 outputs a low-level signal. The sixty-third transistor T63 is turned on, the sixty-fourth transistor T64 is turned off, and the second output end OUT2 outputs a high-level signal.

The fifth stage S35 and the sixth stage S36 may be repeated after the sixth stage S36, until the signal input end INPUT inputs a high-level signal, and the process is restarted from the first stage S31.

According to the abovementioned working process of the drive control circuit, in the second stage S32 to the fourth stage S34, the first output end OUT1 may output a high-level signal, the second output end OUT2 outputs a low-level signal; in other stages, the first output end OUT1 outputs a low-level signal; and the second output end OUT2 outputs a high-level signal. A phase of a first output signal provided by the first output end OUT1 and a phase of a second output signal provided by the second output end OUT2 are opposite. An effective level of the first output signal is a low level, and an effective level of the second output signal is a high level. Within a time length of one frame, a time length of an effective level of a first output signal and a time length of an effective level of a second output signal may be approximately the same. An absolute value of a voltage of the effective level of the first output signal and an absolute value of a voltage of the effective level of the second output signal may be approximately the same.

In this exemplary implementation mode, the second output circuit 12 may include an inverting sub-circuit, and the inverting sub-circuit may include the sixty-third transistor T63 and the sixty-fourth transistor T64. A polarity of an effective level (i.e., a high level) of a first power supply signal is opposite to a polarity of an effective level (i.e., a low level) for starting the sixty-third transistor T63, and a polarity of an effective level (i.e., a low level) of a second power supply signal is opposite to a polarity of an effective level (i.e., a high level) for starting the sixty-fourth transistor T64. The inverting sub-circuit performs an inverting processing on a first output signal output by the first output end OUT1 to obtain a second output signal.

In some exemplary implementation modes, a first output signal provided by the first output end OUT1 may be configured to start an N-type transistor in a pixel circuit, and a second output signal provided by the second output end OUT2 may be configured to start a P-type transistor in a pixel circuit. In some examples, the first output signal and the second output signal may be transmitted to a pixel circuit through a light emitting control line as light emitting control signals. In some examples, a first output signal provided by a first output end of a present stage drive control circuit may be transmitted to a signal input end of a next stage drive control circuit as an input signal of the next stage drive control circuit. However, the embodiment is not limited thereto.

In other exemplary implementation modes, the sixty-first transistor T61 and the sixty-second transistor T62 in FIG. 6 may be omitted, i.e., the eleventh node N11 and the ninth node N9 may be directly electrically connected, and the twelfth node N12 and the thirteenth node N13 may be directly electrically connected. However, the embodiment is not limited thereto.

Figure 8:
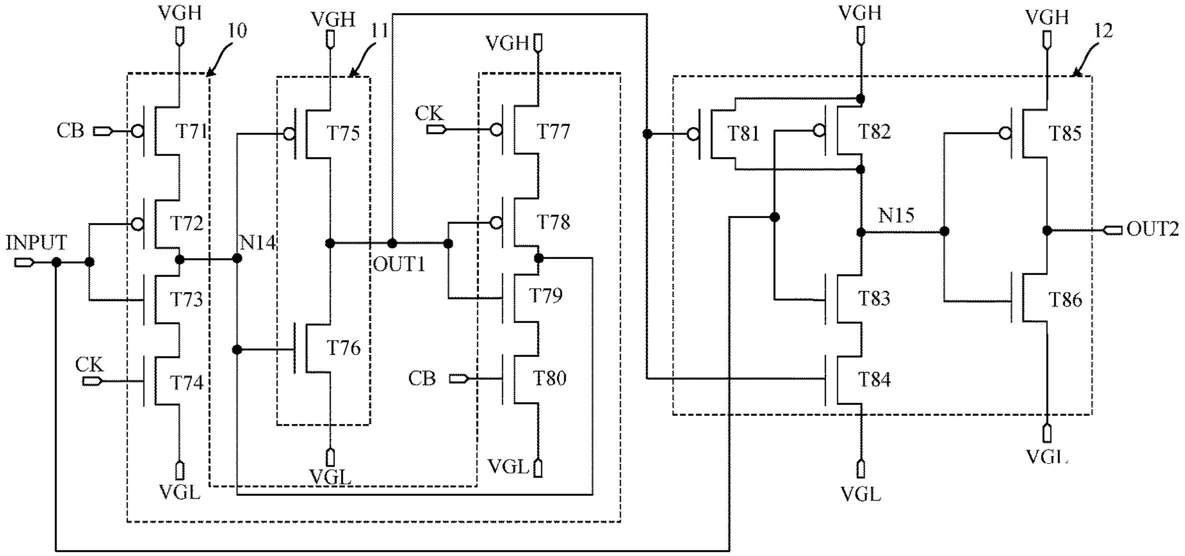
FIG. 8 is another equivalent circuit diagram of a drive control circuit according to at least one embodiment of the present disclosure.
Figure 9:
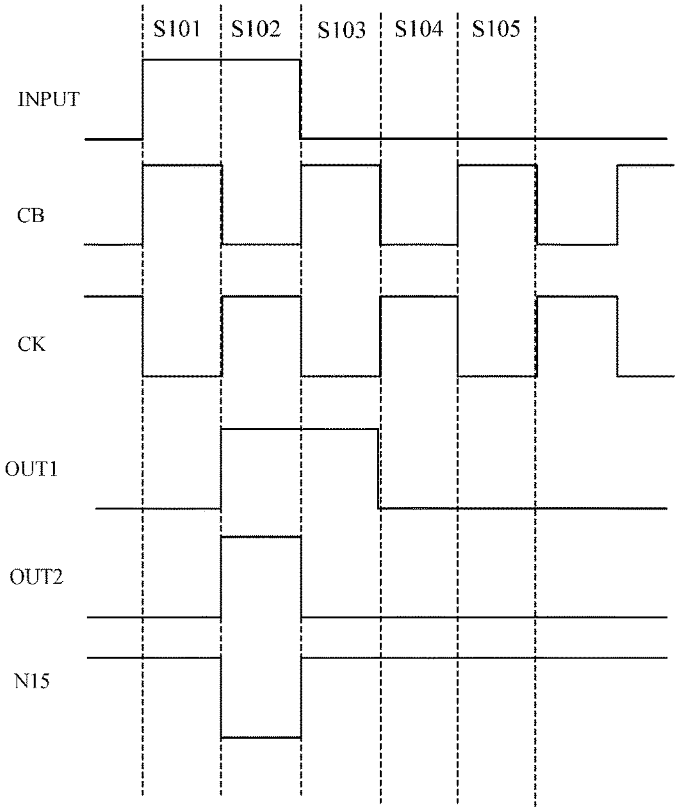
FIG. 9 is a working timing diagram of the drive control circuit provided in FIG. 8.

FIG. 8 is another equivalent circuit diagram of a drive control circuit according to at least one embodiment of the present disclosure. FIG. 9 is a working timing diagram of the drive control circuit provided in FIG. 8.

In some exemplary implementation modes, as shown in FIG. 8, an input circuit 10 is electrically connected with a signal input end INPUT, a first clock end CK, a second clock end CB, a first power supply line VGH, a second power supply line VGL, and a fourteenth node N14, and is configured to control a potential of the fourteenth node N14 under control of the signal input end INPUT, the first clock end CK, and the second clock end CB. The first output circuit 11 is electrically connected with the fourteenth node N14, a first output end OUT1, the first power supply line VGH, and the second power supply line VGL, and is configured to control the first output end OUT1 to output a first output signal under control of the fourteenth node N14. The second output circuit 12 is electrically connected with the signal input end INPUT, the first output end OUT1, and a second output end OUT2, and is configured to control the second output end OUT2 to output a second output signal under control of the first output end OUT1 and the signal input end INPUT.

In some exemplary implementation modes, as shown in FIG. 8, the input circuit 10 may include a seventy-first transistor T71 to a seventy-fourth transistor T74, and a seventy-seventh transistor T77 to an eightieth transistor T80. The first output circuit 11 may include a seventy-fifth transistor T75 and a seventy-sixth transistor T76. The second output circuit 12 may include an eighty-first transistor T81 to an eighty-sixth transistor T86.

In some exemplary implementation modes, as shown in FIG. 8, a control electrode of the seventy-first transistor T71 is electrically connected with the second clock end CB, a first electrode of the seventy-first transistor T71 is electrically connected with the first power supply line VGH, and a second electrode of the seventy-first transistor T71 is electrically connected with a first electrode of the seventy-second transistor T72. A control electrode of the seventy-second transistor T72 is electrically connected with the signal input end INPUT, and a second electrode of the seventy-second transistor T72 is electrically connected with the fourteenth node N14. A control electrode of the seventy-third transistor T73 is electrically connected with the signal input end INPUT, a first electrode of the seventy-third transistor T73 is electrically connected with a second electrode of the seventy-fourth transistor T74, and a second electrode of the seventy-third transistor T73 is electrically connected with the fourteenth node N14. A control electrode of the seventy-fourth transistor T74 is electrically connected with the first clock end CK, and a first electrode of the seventy-fourth transistor T74 is electrically connected with the second power supply line VGL. A control electrode of the seventy-fifth transistor T75 is electrically connected with the fourteenth node N14, a first electrode of the seventy-fifth transistor T75 is electrically connected with the first power supply line VGH, and a second electrode of the seventy-fifth transistor T75 is electrically connected with the first output end OUT1. A control electrode of the seventy-sixth transistor T76 is electrically connected with the fourteenth node N14, a first electrode of the seventy-sixth transistor T76 is electrically connected with the second power supply line VGL, and a second electrode of the seventy-sixth transistor T76 is electrically connected with the first output end OUT1. A control electrode of the seventy-seventh transistor T77 is electrically connected with the first clock end CK, a first electrode of the seventy-seventh transistor T77 is electrically connected with the first power supply line VGH, and a second electrode of the seventy-seventh transistor T77 is electrically connected with a first electrode of the seventy-eighth transistor T78. A control electrode of the seventy-eighth transistor T78 is electrically connected with the first output end OUT1, and a second electrode of the seventy-eighth transistor T78 is electrically connected with the fourteenth node N14. A control electrode of the seventy-ninth transistor T79 is electrically connected with the first output end OUT1, a first electrode of the seventy-ninth transistor T79 is electrically connected with a second electrode of the eightieth transistor T80, and a second electrode of the seventy-ninth transistor T79 is electrically connected with the fourteenth node N14. A control electrode of the eightieth transistor T80 is electrically connected with the second clock end CB, and a first electrode of the eightieth transistor T80 is electrically connected with the second power supply line VGL. A control electrode of the eighty-first transistor T81 is electrically connected with the first output end OUT1, a first electrode of the eighty-first transistor T81 is electrically connected with the first power supply line VGH, and a second electrode of the eighty-first transistor T81 is electrically connected with a fifteenth node N15. A control electrode of the eighty-second transistor T82 is electrically connected with the signal input end INPUT, a first electrode of the eighty-second transistor T82 is electrically connected with the first power supply line VGH, and a second electrode of the eighty-second transistor T82 is electrically connected with the fifteenth node N15. A control electrode of the eighty-third transistor T83 is electrically connected with the signal input end INPUT, a first electrode of the eighty-third transistor T83 is electrically connected with a second electrode of the eighty-fourth transistor T84, and a second electrode of the eighty-third transistor T83 is electrically connected with the fifteenth node N15. A control electrode of the eighty-fourth transistor T84 is electrically connected with the first output end OUT1, and a first electrode of the eighty-fourth transistor T84 is electrically connected with the second power supply line VGL. A control electrode of the eighty-fifth transistor T85 is electrically connected with the fifteenth node N15, a first electrode of the eighty-fifth transistor T85 is electrically connected with the first power supply line VGH, and a second electrode of the eighty-fifth transistor T85 is electrically connected with the second output end OUT2. A control electrode of the eighty-sixth transistor T86 is electrically connected with the fifteenth node N15, a first electrode of the eighty-sixth transistor T86 is electrically connected with the second power supply line VGL, and a second electrode of the eighty-sixth transistor T86 is electrically connected with the second output end OUT2.

In this example, the fourteenth node N14 is a connection point for the seventy-second transistor T72, the seventy-third transistor T73, the seventy-fifth transistor T75, the seventy-sixth transistor T76, the seventy-eighth transistor T78, and the seventy-ninth transistor T79. The fifteenth node N15 is a connection point for the eighty-first transistor T81, the eighty-second transistor T82, the eighty-third transistor T83, the eighty-fifth transistor T85, and the eighty-sixth transistor T86.

In this example, the fourteenth node N14 is an output control node. The first output circuit 11 may include one inverting sub-circuit and the second output circuit 12 may include three inverting sub-circuits. However, the embodiment is not limited thereto.

In some examples, the seventy-first transistor T71, the seventy-second transistor T72, the seventy-fifth transistor T75, the seventy-seventh transistor T77, the seventy-eighth transistor T78, the eighty-first transistor T81, the eighty-second transistor T82, and the eighty-fifth transistor T85 may be first semiconductor-type transistors, for example, may be P-type transistors. The seventy-third transistor T73, the seventy-fourth transistor T74, the seventy-sixth transistor T76, the seventy-ninth transistor T79, the eightieth transistor T80, the eighty-third transistor T83, the eighty-fourth transistor T84, and the eighty-sixth transistor T86 may be second semiconductor-type transistors, for example, may be N-type transistors. For example, a P-type transistor may be an LTPS thin film transistor, and an N-type transistor may be an oxide thin film transistor, such as an IGZO thin film transistor. However, the embodiment is not limited thereto.

A working process of the drive control circuit shown in FIG. 8 will be described below with reference to FIG. 9. Among them, a signal input end of a first stage drive control circuit may be electrically connected with a start signal line. The drive control circuit of the embodiment includes: sixteen transistor units (i.e., the seventy-first transistor T71 to the eighty-sixth transistor T86), three input ends (i.e., the first clock end CK, the second clock end CB, and the signal input end INPUT), two output ends (i.e., the first output end OUT1 and the second output end OUT2), and two power supply ends (i.e., the first power supply line VGH and the second power supply line VGL). The first power supply line VGH may provide a high-level first power supply signal continuously, and the second power supply line VGL may provide a low-level second power supply signal continuously.

As shown in FIG. 9, the working process of the drive control circuit of this example may include following stages.

In a first stage S101, the signal input end INPUT provides a high-level signal, the first clock end CK provides a low-level signal, and the second clock end CB provides a high-level signal.

The seventy-first transistor T71, the seventy-second transistor T72, and the seventy-fourth transistor T74 are turned off, the seventy-third transistor T73 is turned on, the fourteenth node N14 is kept at a high potential of a previous stage, the seventy-sixth transistor T76 is turned on, and the seventy-fifth transistor T75 is turned off. The first output end OUT1 outputs a low-level signal. The seventy-seventh transistor T77, the seventy-eighth transistor T78, and the eightieth transistor T80 are turned on, the seventy-ninth transistor T79 is turned off, and the fourteenth node N14 is kept at a high potential. The eighty-first transistor T81 is turned on, the eighty-fourth transistor T84 is turned off, the eighty-second transistor T82 is turned off, the eighty-third transistor T83 is turned on, and the fifteenth node N15 is at a high potential. The eighty-fifth transistor T85 is turned off, the eighty-sixth transistor T86 is turned on, and the second output end OUT2 outputs a low-level signal.

In a second stage S102, the signal input end INPUT provides a high-level signal, the first clock end CK provides a high-level signal, and the second clock end CB provides a low-level signal.

The seventy-second transistor T72 is turned off, the seventy-third transistor T73 is turned on, the seventy-first transistor T71 is turned on, the seventy-fourth transistor T74 is turned on, and the fourteenth node N14 is at a low potential. The seventy-fifth transistor T75 is turned on, the seventy-sixth transistor T76 is turned off, and the first output end OUT1 outputs a high-level signal. The seventy-eighth transistor T78 is turned off, the seventy-ninth transistor T79 is turned on, the seventy-seventh transistor T77 is turned off, and the eightieth transistor T80 is turned off. The eighty-first transistor T81 is turned off, the eighty-fourth transistor T84 is turned on, the eighty-second transistor T82 is turned off, and the eighty-third transistor T83 is turned on. The fifteenth node N15 is at a low potential. The eighty-fifth transistor T85 is turned on, the eighty-sixth transistor T86 is turned off, and the second output end OUT2 outputs a high-level signal.

In a third stage S103, the signal input end INPUT provides a low-level signal, the first clock end CK provides a low-level signal, and the second clock end CB provides a high-level signal.

The seventy-second transistor T72 is turned on, the seventy-first transistor T71 is turned off, the seventy-third transistor T73 is turned off, the seventy-fourth transistor T74 is turned off, and the fourteenth node N14 is kept at a low potential. The seventy-fifth transistor T75 is turned on, the seventy-sixth transistor T76 is turned off, and the first output end OUT1 outputs a high-level signal. The seventy-ninth transistor T79 is turned on, the eightieth transistor T80 is turned on, the seventy-eighth transistor T78 is turned off, and the seventy-seventh transistor T77 is turned on, keeping the fourteenth node N14 at a low potential. The eighty-first transistor T81 is turned off, the eighty-fourth transistor T84 is turned on, the eighty-second transistor T82 is turned on, the eighty-third transistor T83 is turned off, and the fifteenth node N15 is at a high potential. The eighty-fifth transistor T85 is turned off, the eighty-sixth transistor T86 is turned on, and the second output end OUT2 outputs a low-level signal.

In a fourth stage S104, the signal input end INPUT provides a low-level signal, the first clock end CK provides a high-level signal, and the second clock end CB provides a low-level signal.

The seventy-second transistor T72 is turned on, the seventy-third transistor T73 is turned off, the seventy-first transistor T71 is turned on, the seventy-fourth transistor T74 is turned on, and the fourteenth node N14 is at a high potential. The seventy-sixth transistor T76 is turned on, the seventy-fifth transistor T75 is turned off, and the first output end OUT1 outputs a low-level signal. The seventy-eighth transistor T78 is turned on, the seventy-ninth transistor T79 is turned off, the seventy-seventh transistor T77 is turned off, and the eightieth transistor T80 is turned off. The eighty-first transistor T81 is turned on, the eighty-fourth transistor T84 is turned off, the eighty-second transistor T82 is turned on, the eighty-third transistor T83 is turned off, and the fifteenth node N15 is at a high potential. The eighty-fifth transistor T85 is turned off, the eighty-sixth transistor T86 is turned on, and the second output end OUT2 outputs a low-level signal.

In a fifth stage S105, the signal input end INPUT provides a low-level signal, the first clock end CK provides a low-level signal, and the second clock end CB provides a high-level signal.

The seventy-second transistor T72 is turned on, the seventy-first transistor T71 is turned off, the seventy-third transistor T73 and the seventy-fourth transistor T74 are turned off, and the fourteenth node N14 is kept at a high potential. The seventy-fifth transistor T75 is turned off, the seventy-sixth transistor T76 is turned on, and the first output end OUT1 outputs a low-level signal. The seventy-eighth transistor T78 is turned on, the seventy-ninth transistor T79 is turned off, the seventy-seventh transistor T77 is turned on, and the eightieth transistor T80 is turned on, keeping the fourteenth node N14 at a high potential. The eighty-first transistor T81 is turned on, the eighty-fourth transistor T84 is turned off, the eighty-second transistor T82 is turned on, the eighty-third transistor T83 is turned off, and the fifteenth node N15 is at a high potential. The eighty-fifth transistor T85 is turned off, the eighty-sixth transistor T86 is turned on, and the second output end OUT2 outputs a low-level signal.

According to the abovementioned working process of the drive control circuit, the first output end OUT1 outputs a high-level signal in the second stage S102 and the third stage S103, and outputs a low-level signal in other stages. The second output end OUT2 outputs a high-level signal in the second stage S102, and outputs a low-level signal in other stages. In this example, polarities of effective levels of a first output signal and a second output signal are the same, for example, the effective levels of the first output signal and the second output signal are both high levels. Absolute values of voltages of the effective levels of the first output signal and the second output signal may be approximately the same. A time length of an effective level of the first output signal within a time length of one frame is greater than a time length of an effective level of the second output signal within a time length of one frame. For example, a time length of an effective level of the first output signal within a time length of one frame may be greater than or equal to 1.5 times a time length of an effective level of the second output signal within a time length of one frame. However, the embodiment is not limited thereto.

In some exemplary implementation modes, a first output signal provided by the first output end OUT1 may be configured to start an N-type transistor with a shorter drive time required in a pixel circuit, and a second output signal provided by the second output end OUT2 may be configured to start an N-type transistor with a greater drive time required in a pixel circuit. For example, the first output signal and the second output signal may be transmitted to a pixel circuit through a scan line as scan signals. In some examples, a first output signal provided by a first output end of a present stage drive control circuit may be transmitted to a signal input end of a next stage drive control circuit as an input signal of the next stage drive control circuit. However, the embodiment is not limited thereto.

In other examples, in the drive control circuit shown in FIG. 8, a third output end directly electrically connected with the fifteenth Node N15 may be provided, thereby obtaining a third output signal with a phase opposite to that of the second output signal. However, the embodiment is not limited thereto.

Figure 10:
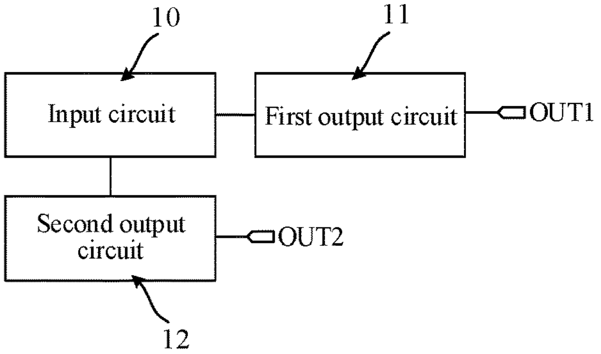
FIG. 10 is another schematic diagram of a structure of a drive control circuit according to at least one embodiment of the present disclosure.

FIG. 10 is another schematic diagram of a structure of a drive control circuit according to at least one embodiment of the present disclosure. As shown in FIG. 10, the drive control circuit of the embodiment may include an input circuit 10, a first output circuit 11, and a second output circuit 12. Among them, the first output circuit 11 is electrically connected with the input circuit 10 and a first output end OUT1, and is configured to output a first output signal from the first output end OUT1 under control of the input circuit 10. The second output circuit 12 is electrically connected with the input circuit 10 and the second output end OUT2, and is configured to output a second output signal from the second output end OUT2 under control of the input circuit 10.

In some exemplary implementation modes, polarities of effective levels of the first output signal and the second output signal may be different, and time lengths of effective levels of the first output signal and the second output signal within a time length of one frame may be different, and absolute values of voltages of effective levels of the first output signal and the second output signal may be the same. For example, an effective level of the first output signal is a high level, an effective level of the second output signal is a low level, and a time length of the effective level of the first output signal is greater than a time length of the effective level of the second output signal. In other examples, polarities of effective levels of the first output signal and the second output signal may be the same, and time lengths of effective levels of the first output signal and the second output signal within a time length of one frame may be the same, while absolute values of voltages of effective levels of the first output signal and the second output signal may be different. However, the embodiment is not limited thereto.

Figure 11:
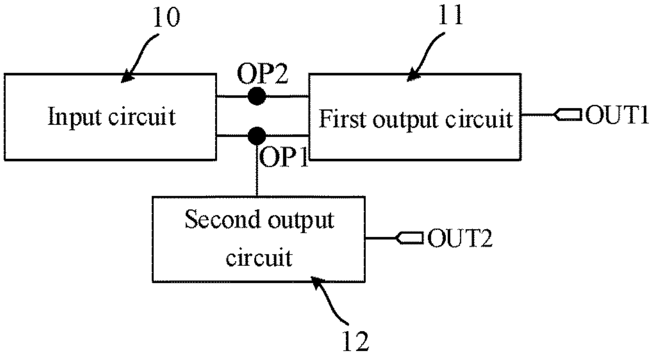
FIG. 11 is another schematic diagram of a structure of a drive control circuit according to at least one embodiment of the present disclosure.

FIG. 11 is another schematic diagram of a structure of a drive control circuit according to at least one embodiment of the present disclosure. As shown in FIG. 11, an input circuit 10 is electrically connected with a first output control node OP1 and a second output control node OP2. A first output circuit 11 is electrically connected with the first output control node OP1, the second output control node OP2, and a first output end OUT1, and is configured to control the first output end OUT1 to output a first output signal under control of the first output control node OP1 and the second output control node OP2. A second output circuit 12 is electrically connected with the first output control node OP1 and a second output end OUT2, and is configured to control the second output end OUT2 to output a second output signal under control of the first output control node OP1.

Figure 12:
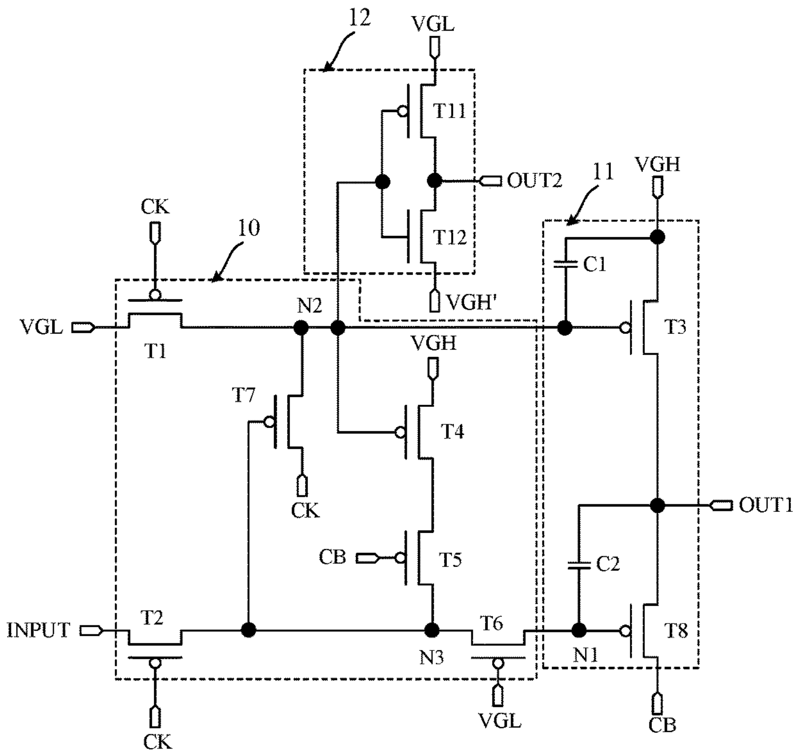
FIG. 12 is another equivalent circuit diagram of a drive control circuit according to at least one embodiment of the present disclosure.
Figure 13:
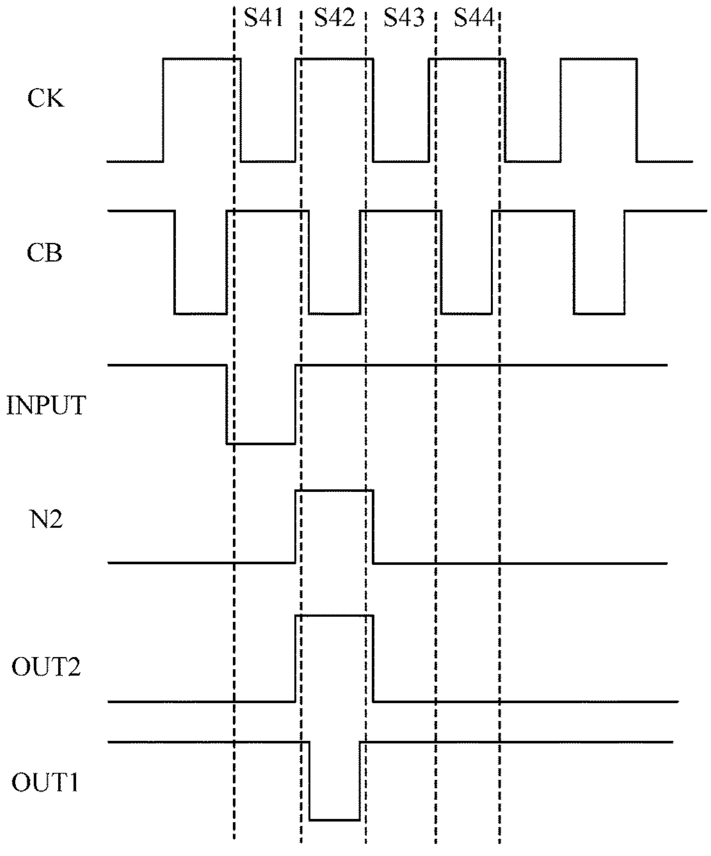
FIG. 13 is a working timing diagram of the drive control circuit provided in FIG. 12.

FIG. 12 is an equivalent circuit diagram of a drive control circuit according to at least one embodiment of the present disclosure. FIG. 13 is a working timing diagram of the drive control circuit provided in FIG. 12.

In some exemplary implementation modes, as shown in FIG. 12, the drive control circuit may include an input circuit 10, a first output circuit 11, and a second output circuit 12. Among them, the input circuit 10 is electrically connected with a signal input end INPUT, a first clock end CK, a second clock end CB, a first power supply line VGH, a second power supply line VGL, a first node N1, and a second node N2, and is configured to control potentials of the first node N1 and the second node N2 under control of the signal input end INPUT, the first clock end CK, and the second clock end CB. The first output circuit 11 is electrically connected with the first power supply line VGH, the second clock end CB, a first output end OUT1, the first node N1, and the second node N2, and is configured to control the first output end OUT1 to output a first output signal under control of the first node N1 and the second node N2. The second output circuit 12 is electrically connected with the first power supply line VGH, a third power supply line VGH', the second node N2, and a second output end OUT2, and is configured to control the second output end OUT2 to output a second output signal under control of the second node N2.

In some exemplary implementation modes, as shown in FIG. 12, the input circuit 10 may include a first transistor T1, a second transistor T2, a fourth transistor T4, a fifth transistor T5, a sixth transistor T6, and a seventh transistor T7. The first output circuit 11 includes a third transistor T3, an eighth transistor T8, a first capacitor C1, and a second capacitor C2. The second output circuit 12 includes an eleventh transistor T11 and a twelfth transistor T12. Structures and a connection relationship of the input circuit 10 and the first output circuit 11 of this example may be referred to description of the input circuit 10 and the first output circuit 11 in the embodiment shown in FIG. 2 and therefore will not be repeated here.

In some exemplary implementation modes, as shown in FIG. 12, a control electrode of the eleventh transistor T11 is electrically connected with the second node N2, a first electrode of the eleventh transistor T11 is electrically connected with the second power supply line VGL, and a second electrode of the eleventh transistor T11 is electrically connected with the second output end OUT2. A control electrode of the twelfth transistor T12 is electrically connected with the second node N2, a first electrode of the twelfth transistor T12 is electrically connected with the third power supply line VGH', and a second electrode of the twelfth transistor T12 is electrically connected with the second output end OUT2.

In this example, the first node N1 is a connection point for the sixth transistor T6, the eighth transistor T8, and the second capacitor C2. The second node N2 is a connection point for the first transistor T1, the seventh transistor T7, the fourth transistor T4, the third transistor T3, the first capacitor C1, the eleventh transistor T11, and the twelfth transistor T12. The third node N3 is a connection point for the second transistor T2, the fifth transistor T5, the sixth transistor T6, and the seventh transistor T7.

In this example, the first node N1 and the second node N2 are output control nodes. Among them, the first Node N1 is a second output control node and the second Node N2 is a first output control node. The eleventh transistor T11 is a first output transistor, and the twelfth transistor T12 is a second output transistor.

In an embodiment of the present disclosure, the first power supply line VGH continuously provides a first power supply signal, the second power supply line VGL continuously provides a second power supply signal, and the third power supply line VGH' continuously provides a third power supply signal. Effective levels of the first power supply signal and the third power supply signal may be high levels, and an effective level of the second power supply signal may be a low level. An absolute value of a voltage of an effective level of the first power supply signal and an absolute value of a voltage of an effective level of the second power supply signal may be approximately the same, and an absolute value of a voltage of the effective level of the third power supply signal is greater than the absolute value of the voltage of the effective level of the first power supply signal. However, the embodiment is not limited thereto.

In some examples, the first transistor T1 to the eighth transistor T8 and the eleventh transistor T11 may be first semiconductor-type transistors, and the twelfth transistor T12 may be a second semiconductor-type transistor. Transistor types of a first semiconductor-type transistor and the second semiconductor-type transistor are opposite. For example, the first transistor T1 to the eighth transistor T8 and the eleventh transistor T11 may be P-type transistors, and the twelfth transistor T12 may be an N-type transistor. In some examples, a P-type transistor may be an LTPS thin film transistor, and the N-type transistor may be an oxide thin film transistor. However, the embodiment is not limited thereto.

A working process of the drive control circuit will be described below with reference to FIG. 13. A working process of a first stage drive control circuit is taken as an example for description, and a signal input end INPUT of the first stage drive control circuit may be electrically connected with a start signal line. The drive control circuit of the embodiment may include: ten transistor units (i.e., the first transistor T1 to the eighth transistor T8, the eleventh transistor T11, and the twelfth transistor T12), two capacitor units (i.e., the first capacitor C1 and the second capacitor C2), three input ends (i.e., the first clock end CK, the second clock end CB, and the signal input end INPUT), two output ends (i.e., the first output end OUT1 and the second output end OUT2), and three power supply ends (i.e., the first power supply line VGH, the second power supply line VGL, and the third power supply line VGH').

As shown in FIG. 13, the working process of the drive control circuit of this example may include following stages.

In a first stage S41, the first clock end CK provides a low-level signal, the second clock end CB provides a high-level signal, and the signal input end INPUT provides a low-level signal.

The first transistor T1, the second transistor T2, the third transistor T3, the fourth transistor T4, the sixth transistor T6, the seventh transistor T7, and the eighth transistor T8 are turned on; the fifth transistor T5 is turned off. The third node N3 and the first node N1 are at a low potential, and the second node N2 is at a low potential. The first output end OUT1 outputs a high-level signal. The eleventh transistor T11 is turned on, the twelfth transistor T12 is turned off, and the second output end OUT2 outputs a low-level signal provided by the second power supply line VGL.

In a second stage S42, the first clock end CK provides a high-level signal, the second clock end CB provides a low-level signal, and the signal input end INPUT provides a high-level signal.

The sixth transistor T6, the seventh transistor T7, the eighth transistor T8, and the fifth transistor T5 are turned on; the first transistor T1, the second transistor T2, the third transistor T3, and the fourth transistor T4 are turned off. The third node N3 and the first node N1 are kept at a low potential. The second node N2 is at a high potential. The first output end OUT1 outputs a low-level signal provided by the second clock end CB. The eleventh transistor T11 is turned off, the twelfth transistor T12 is turned on, and the second output end OUT2 outputs a high-potential third power supply signal provided by the third power supply line VGH'.

In a third stage S43, the first clock end CK provides a low-level signal, the second clock end CB provides a high-level signal, and the signal input end INPUT provides a high-level signal.

The first transistor T1, the second transistor T2, the third transistor T3, the fourth transistor T4, and the sixth transistor T6 are turned on; the seventh transistor T7, the eighth transistor T8, and the fifth transistor T5 are turned off. The third node N3 and the first node N1 are at a high potential. The second node N2 is at a low potential. The first output end OUT1 outputs a high-level signal. The eleventh transistor T11 is turned on, the twelfth transistor T12 is turned off, and the second output end OUT2 outputs a low-level signal provided by the second power supply line VGL.

In a fourth stage S44, the first clock end CK provides a high-level signal, the second clock end CB provides a low-level signal, and the signal input end INPUT provides a high-level signal.

The third transistor T3, the fourth transistor T4, the fifth transistor T5, and the sixth transistor T6 are turned on; the first transistor T1, the second transistor T2, the seventh transistor T7, and the eighth transistor T8 are turned off. The third node N3 and the first node N1 are kept at a high potential, and the second node N2 is kept at a low potential. The first output end OUT1 outputs a high-level signal. The eleventh transistor T11 is turned on, the twelfth transistor T12 is turned off, and the second output end OUT2 outputs a low-level signal provided by the second power supply line VGL.

After the fourth stage S44, the third stage S43 and the fourth stage S44 may be repeated until the signal input end INPUT provides a low-level signal, and then the process is restarted from the first stage S41.

According to the abovementioned working process, in the second stage S42, the first output end OUT1 outputs a low-level signal, the second node N2 is at a high potential, and the second output end OUT2 outputs a high-level third power supply signal provided by the third power supply line. Among them, a voltage value of a high-level signal outputted by the second output end OUT2 is larger than a voltage value of a high potential of the second node N2. In other stages, the first output end OUT1 outputs a high-level signal, the second node N2 is at a low potential, and the second output end OUT2 outputs a low-level signal provided by the second power supply line. In this example, an effective level of a first output signal is a low level, and a time length of an effective level of the first output signal within a time length of one frame is approximately the same as a time length of a low level of a second clock signal provided by the second clock end CB within one pulse. An effective level of a second output signal is a high level, and a time length of an effective level of the second output signal within a time length of one frame is approximately the same as a time length of a high level of a first clock signal provided by the first clock end CK within one pulse.

In this example, polarities of effective levels of the first output signal and the second output signal are opposite. Time lengths of effective levels of the first output signal and the second output signal within a time length of one frame are different, and a time length of an effective level of the second output signal may be greater than a time length of an effective level of the first output signal. Absolute values of voltages of effective levels of the first output signal and the second output signal are different, wherein an absolute value of a voltage of the effective level of the second output signal may be greater than an absolute value of a voltage of the effective level of the first output signal.

In this example, a first output signal provided by the first output end OUT1 may be configured to start a P-type transistor in a pixel circuit (i.e., an effective level of the first output signal is a low level), and a second output signal provided by the second output end OUT2 may be configured to start an N-type transistor in a pixel circuit (i.e., an effective level of the second output signal is a high level). For example, the first output signal and the second output signal may be transmitted to a pixel circuit through a scan line as scan signals. In some examples, a first output signal provided by a first output end of a present stage drive control circuit may be transmitted to a signal input end of a next stage drive control circuit as an input signal of the next stage drive control circuit. However, the embodiment is not limited thereto.

In this exemplary implementation mode, a polarity of an effective level (i.e., a low level) of a second power supply signal provided by the second power supply line VGL is the same as a polarity of an effective level (i.e., a low level) for starting the eleventh transistor T11, and a polarity of an effective level (i.e., a high level) of a third power supply signal is the same as a polarity of an effective level (i.e., a high level) for starting the twelfth transistor T12. In this example, the second output signal is obtained by connecting the second output circuit 12 at the second node N2 (i.e., the first output control node), so that a stable output of the second output signal may be achieved, thereby the drive control circuit can provide two different output signals.

Figure 14:
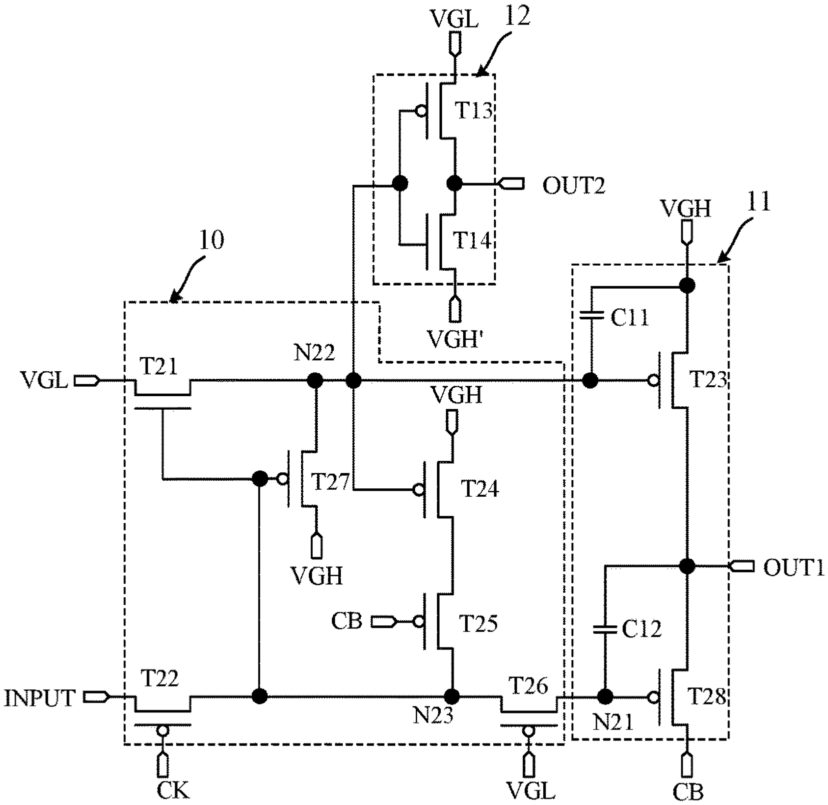
FIG. 14 is another equivalent circuit diagram of a drive control circuit according to at least one embodiment of the present disclosure.
Figure 15:
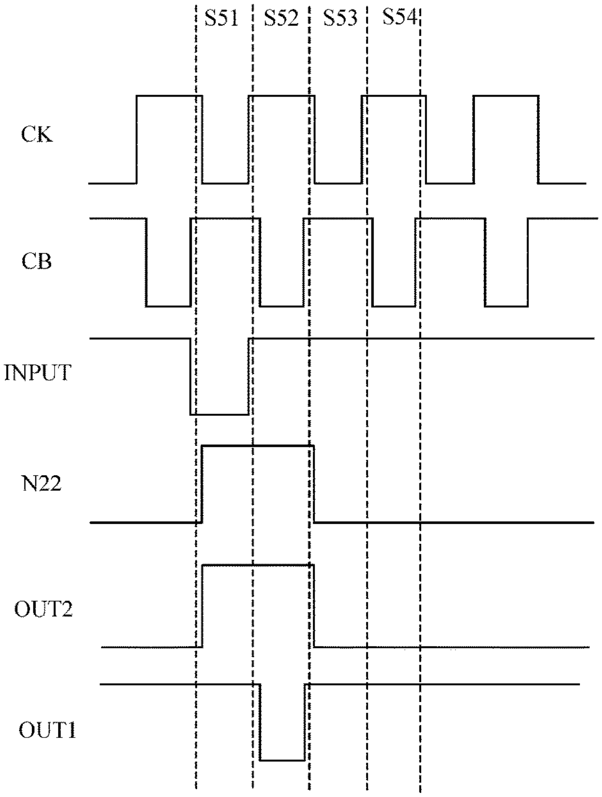
FIG. 15 is a working timing diagram of the drive control circuit provided in FIG. 14.

FIG. 14 is another equivalent circuit diagram of a drive control circuit according to at least one embodiment of the present disclosure. FIG. 15 is a working timing diagram of the drive control circuit provided in FIG. 14.

In some exemplary implementation modes, as shown in FIG. 14, the drive control circuit includes an input circuit 10, a first output circuit 11, and a second output circuit 12. The input circuit 10 is electrically connected with a signal input end INPUT, a first clock end CK, a second clock end CB, a first power supply line VGH, a second power supply line VGL, a twenty-first node N21, and a twenty-second node N22, and is configured to control potentials of the twenty-first node N21 and the twenty-second node N22 under control of the signal input end INPUT, the first clock end CK, and the second clock end CB. The first output circuit 11 is electrically connected with the first power supply line VGH, the second clock end CB, a first output end OUT1, the twenty-first node N21, and the twenty-second node N22, and is configured to control the first output end OUT1 to output a first output signal under control of the twenty-first node N21 and the twenty-second node N22. The second output circuit 12 is electrically connected with the first power supply line VGH, a third power supply line VGH', the twenty-second node N22, and a second output end OUT2, and is configured to control the second output end OUT2 to output a second output signal under control of the twenty-second node N22.

In some exemplary implementation modes, as shown in FIG. 14, the input circuit 10 may include a twenty-first transistor T21, a twenty-second transistor T22, a twenty-fourth transistor T24, a twenty-fifth transistor T25, a twenty-sixth transistor T26, and a twenty-seventh transistor T27. The first output circuit 11 may include a twenty-third transistor T23, a twenty-eighth transistor T28, an eleventh capacitor C11, and a twelfth capacitor C12. The second output circuit 12 may include a thirteenth transistor T13 and a fourteenth transistor T14.

In some exemplary implementation modes, as shown in FIG. 14, a control electrode of the twenty-first transistor T21 is electrically connected with a twenty-third node N23, a first electrode of the twenty-first transistor T21 is electrically connected with the second power supply line VGL, and a second electrode of the twenty-first transistor T21 is electrically connected with the twenty-second node N22. A control electrode of the twenty-second transistor T22 is electrically connected with the first clock end CK, a first electrode of the twenty-second transistor T22 is electrically connected with the signal input end INPUT, and a second electrode of the twenty-second transistor T22 is electrically connected with the twenty-third node N23. A control electrode of a twenty-third transistor T23 is electrically connected with the twenty-second node N22, a first electrode of the twenty-third transistor T23 is electrically connected with the first power supply line VGH, and a second electrode of the twenty-third transistor T23 is electrically connected with the first output end OUT1. A control electrode of a twenty-fourth transistor T24 is electrically connected with the twenty-second node N22, a first electrode of the twenty-fourth transistor T24 is electrically connected with the first power supply line VGH, and a second electrode of the twenty-fourth transistor T24 is electrically connected with a first electrode of the twenty-fifth transistor T25. A control electrode of the twenty-fifth transistor T25 is electrically connected with the second clock end CB, and a second electrode of the twenty-fifth transistor T25 is electrically connected with the twenty-third node N23. A control electrode of the twenty-sixth transistor T26 is electrically connected with the first power supply line VGL, a first electrode of the twenty-sixth transistor T26 is electrically connected with the twenty-third node N23, and a second electrode of the twenty-sixth transistor T26 is electrically connected with the twenty-first node N21. A control electrode of the twenty-seventh transistor T27 is electrically connected with the twenty-third node N23, a first electrode of the twenty-seventh transistor T27 is electrically connected with the first power supply line VGH, and a second electrode of the twenty-seventh transistor T27 is electrically connected with the twenty-second node N22. A control electrode of the twenty-eighth transistor T28 is electrically connected with the twenty-first node N21, a first electrode of the twenty-eighth transistor T28 is electrically connected with the second clock end CB, and a second electrode of the twenty-eighth transistor T28 is electrically connected with the first output end OUT1. A control electrode of the thirteenth transistor T13 is electrically connected with the twenty-second node N22, a first electrode of the thirteenth transistor T13 is electrically connected with the second power supply line VGL, and a second electrode of the thirteenth transistor T13 is electrically connected with the second output end OUT2. A control electrode of the fourteenth transistor T14 is electrically connected with the twenty-second node N22, a first electrode of the fourteenth transistor T14 is electrically connected with the third power supply line VGH', and a second electrode of the fourteenth transistor T14 is electrically connected with the second output end OUT2. A first electrode plate of the eleventh capacitor C11 is electrically connected with the twenty-second node N22, and a second electrode plate of the eleventh capacitor C11 is electrically connected with the first power supply line VGH. A second electrode plate of the twelfth capacitor C12 is electrically connected with the twenty-first node N21, and a second electrode plate of the twelfth capacitor C12 is electrically connected with the first output end OUT1.

In this example, the twenty-first node N21 is a connection point for the twenty-sixth transistor T26, the twenty-eighth transistor T28, and the twelfth capacitor C12. The twenty-second node N22 is a connection point for the twenty-first transistor T21, the twenty-seventh transistor T27, the twenty-fourth transistor T24, the twenty-third transistor T23, the eleventh capacitor C11, the thirteenth transistor T13, and the fourteenth transistor T14. The twenty-third node N23 is a connection point for the twenty-second transistor T22, the twenty-fifth transistor T25, the twenty-sixth transistor T26, the twenty-seventh transistor T27, and the twenty-first transistor T21.

In this example, the twenty-first node N21 and the twenty-second node N22 are output control nodes. Among them, the twenty-second node N22 is a first output control node, and the twenty-first node N21 is a second output control node. The thirteenth transistor T13 is a first output transistor, and the fourteenth transistor T14 is a second output transistor.

In some examples, the twenty-first transistor T21 and the fourteenth transistor T14 may be second semiconductor-type transistors, for example, may be N-type transistors. The twenty-second transistor T22 to the twenty-eighth transistor T28 and the thirteenth transistor T13 may be first semiconductor-type transistors, for example, may be P-type transistors. However, the embodiment is not limited thereto.

A working process of the drive control circuit will be described below with reference to FIG. 15. A working process of a first stage drive control circuit is taken as an example for description, and a signal input end INPUT of the first stage drive control circuit may be electrically connected with a start signal line. The drive control circuit of the embodiment may include: ten transistor units (i.e., the twenty-first transistor T21 to the twenty-eighth transistor T28, the thirteenth transistor T13, and the fourteenth transistor T14), two capacitor units (i.e., the eleventh capacitor C11 and the twelfth capacitor C12), three input ends (i.e., the first clock end CK, the second clock end CB, and the signal input end INPUT), two output ends (i.e., the first output end OUT1 and the second output end OUT2), and three power supply ends (i.e., the first power supply line VGH, the second power supply line VGL, and the third power supply line VGH').

As shown in FIG. 15, the working process of the drive control circuit of this example may include following stages.

In a first stage S51, the first clock end CK inputs a low-level signal, the second clock end CB inputs a high-level signal, and the signal input end INPUT inputs a low-level signal.

The first clock end CK inputs the low-level signal, the twenty-second transistor T22 is turned on, in addition, the twenty-sixth transistor T26 is turned on, the twenty-third node N23 and the twenty-first node N21 are at a low potential, the twenty-seventh transistor T27 and the twenty-eighth transistor T28 are turned on, and the twenty-first transistor T21 is turned off. The first output end OUT1 outputs the high-level signal provided by the second clock end CB. A high-level signal provided by the first power supply line VGH is transmitted to the twenty-second node N22 via the turned-on twenty-seventh transistor T27, so that the twenty-second node N22 is at a high potential, and the twenty-third transistor T23 and the twenty-fourth transistor T24 are turned off. The second clock end CB inputs the high-level signal, and the twenty-fifth transistor T25 is turned off. The twenty-second node N22 is at a high potential, the fourteenth transistor T14 is turned on, the thirteenth transistor T13 is turned off, and the second output end OUT2 outputs a high-level third power supply signal provided by the third power supply line VGH'.

In a second stage S52, the first clock end CK inputs a high-level signal, the second clock end CB inputs a low-level signal, and the signal input end INPUT inputs a high-level signal.

The first clock end CK inputs the high-level signal, the twenty-second transistor T22 is turned off, the twenty-third node N23 and the twenty-first node N21 are kept at a low level of a previous stage, the twenty-seventh transistor T27 and the twenty-eighth transistor T28 are turned on, and the twenty-first transistor T21 is turned off. The first output end OUT1 outputs the low-level signal provided by the second clock end CB. A high-level signal provided by the first power supply line VGH is transmitted to the twenty-second node N22 via the turned-on twenty-seventh transistor T27, so that the twenty-second node N22 is at a high potential, the fourteenth transistor T14 is turned on, and the thirteenth transistor T13, the twenty-third transistor T23, and the twenty-fourth transistor T24 are turned off. The second output end OUT2 outputs a high-level third power supply signal provided by the third power supply line VGH'. The second clock end CB provides the low-level signal and the twenty-fifth transistor T25 is turned on.

In a third stage S53, the first clock end CK inputs a low-level signal, the second clock end CB inputs a high-level signal, and the signal input end INPUT inputs a high-level signal.

The first clock end CK inputs the low-level signal, the twenty-second transistor T22 is turned on, the twenty-third node N23 and the twenty-first node N21 are at a high potential, the twenty-eighth transistor T28 and the twenty-seventh transistor T27 are turned off, and the twenty-first transistor T21 is turned on. A low-level signal provided by the second power supply line VGL is transmitted to the twenty-second node N22 via the turned-on twenty-first transistor T21, so that the twenty-second node N22 is at a low potential, the twenty-third transistor T23, the twenty-fourth transistor T24, and the thirteenth transistor T13 are turned on, and the fourteenth transistor T14 is turned off. The first output end OUT1 outputs a high-level signal provided by the first power supply line VGH. The second output end OUT2 outputs the low-level signal provided by the second power supply line VGL. The second clock end CB provides the high-level signal and the twenty-fifth transistor T25 is turned off.

In a fourth stage S54, the first clock end CK inputs a high-level signal, the second clock end CB inputs a low-level signal, and the signal input end INPUT inputs a high-level signal.

The first clock end CK inputs the high-level signal, the twenty-second transistor T22 is turned off, the twenty-third node N23 and the twenty-first node N21 are kept at a high potential of a previous stage, the twenty-eighth transistor T28 and the twenty-seventh transistor T27 are turned off, and the twenty-first transistor T21 is turned on. The twenty-second node N22 is at a low potential, the thirteenth transistor T13, the twenty-fourth transistor T24, and the twenty-third transistor T23 are turned on, and the fourteenth transistor T14 is turned off. The second clock end CB provides the low-level signal, and the twenty-fifth transistor T25 is turned on. A high-level signal provided by the first power supply line VGH may be transmitted to the twenty-third node N23 via the twenty-fourth transistor T24 and the twenty-fifth transistor T25 which are turned on to ensure that the twenty-third node N23 is kept at a high potential. The first output end OUT1 outputs a high-level first power supply signal provided by the first power supply line VGH. The second output end OUT2 outputs a low-level second power supply signal provided by the second power supply line VGL.

After the fourth stage S54, the third stage S53 and the fourth stage S54 may be repeated until the signal input end INPUT provides a low-level signal, and then the process is restarted from the first stage S51.

According to the abovementioned working process, in the second stage S52, the first output end OUT1 outputs a low-level signal, and in other stages, the first output end OUT1 outputs a high-level signal. In the first stage S51 and the second stage S52, the twenty-second node N22 is at a high potential, and the second output end OUT2 outputs a high-level signal provided by the third power supply line. In other stages, the twenty-second node N22 is at a low potential, and the second output end OUT2 outputs a low-level signal provided by the second power supply line.

In this example, polarities of effective levels of a first output signal and a second output signal are opposite, for example, an effective level of the first output signal is a low level and an effective level of the second output signal is a high level. Time lengths of effective levels of the first output signal and the second output signal within a time length of one frame are different, wherein a time length of an effective level of the second output signal may be greater than a time length of an effective level of the first output signal. For example, a time length of an effective level of the second output signal may be greater than 1.5 times a time length of an effective level of the first output signal. Absolute values of voltages of effective levels of the first output signal and the second output signal are different, wherein an absolute value of a voltage of the effective level of the second output signal may be greater than an absolute value of a voltage of the effective level of the first output signal. However, the embodiment is not limited thereto. For example, absolute values of voltages of effective levels of the first output signal and the second output signal may be approximately the same.

In this example, a first output signal provided by the first output end OUT1 may be configured to start a P-type transistor in a pixel circuit (i.e., an effective level of the first output signal is a low level), and a second output signal provided by the second output end OUT2 may be configured to start an N-type transistor in a pixel circuit (i.e., an effective level of the second output signal is a high level). For example, the first output signal and the second output signal may be transmitted to a pixel circuit through a scan line as scan signals. In some examples, a first output signal provided by a first output end of a present stage drive control circuit may be transmitted to a signal input end of a next stage drive control circuit as an input signal of the next stage drive control circuit. However, the embodiment is not limited thereto.

In this exemplary implementation mode, a polarity of an effective level (i.e., a low level) of a second power supply signal provided by the second power supply line VGL is the same as a polarity of an effective level (i.e., a low level) for starting the thirteenth transistor T13, and a polarity of an effective level (i.e., a high level) of a third power supply signal is the same as a polarity of an effective level (i.e., a high level) for starting the fourteenth transistor T14. In this example, the second output signal is obtained by connecting the second output circuit 12 at the twenty-second node N22 (i.e., the first output control node), so that a stable output of the second output signal may be achieved, thereby the drive control circuit can provides two different output signals.

Figure 16:
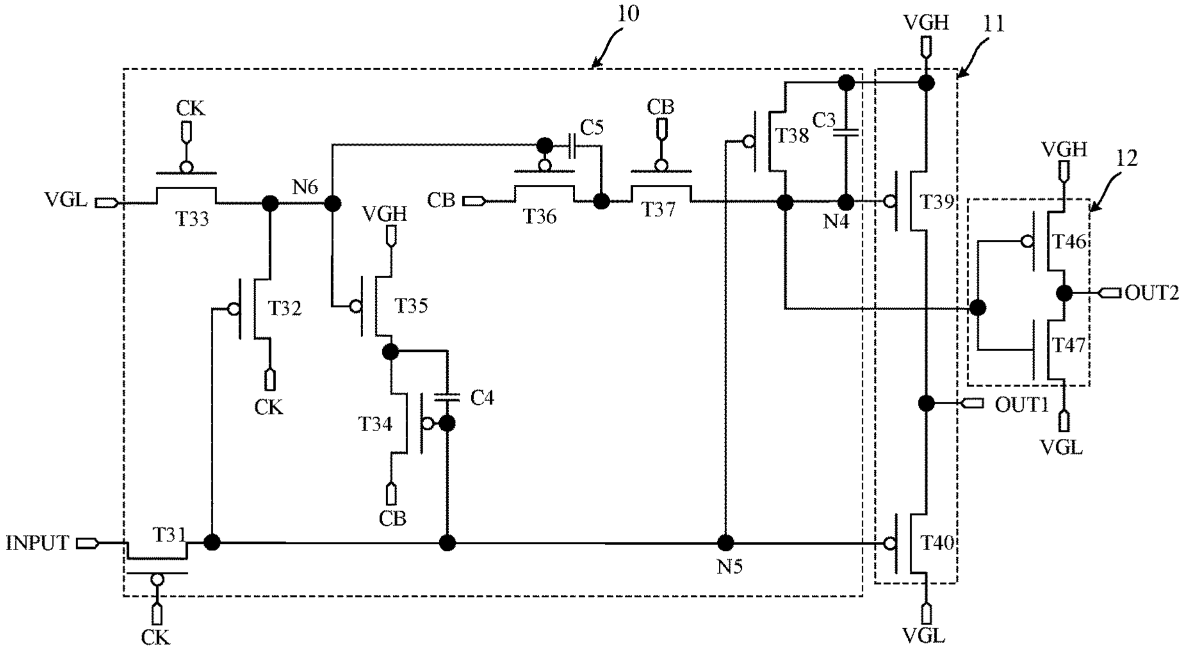
FIG. 16 is another equivalent circuit diagram of a drive control circuit according to at least one embodiment of the present disclosure.
Figure 17:
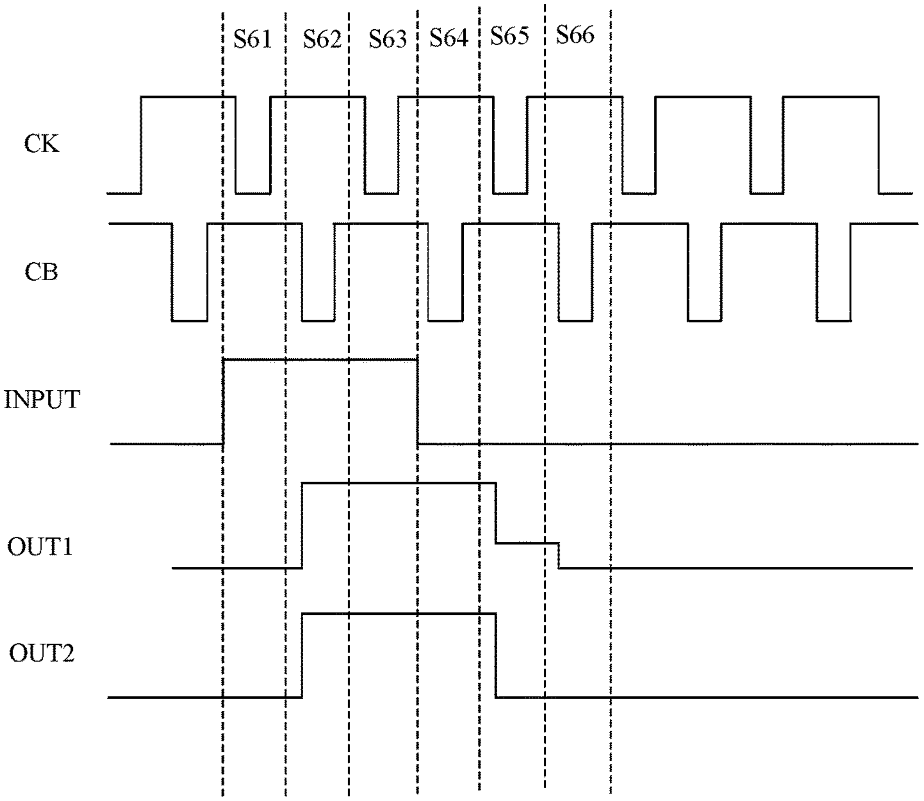
FIG. 17 is a working timing diagram of the drive control circuit provided in FIG. 16.

FIG. 16 is another equivalent circuit diagram of a drive control circuit according to at least one embodiment of the present disclosure. FIG. 17 is a working timing diagram of the drive control circuit provided in FIG. 16. As shown in FIG. 16, a second output circuit 12 is electrically connected with a fourth node N4 and a second output end OUT2, and is configured to control the second output end OUT2 to output a second output signal under control of the fourth node N4.

In some exemplary implementation modes, as shown in FIG. 16, an input circuit 10 may include a thirty-first transistor T31, a thirty-second transistor T32, a thirty-third transistor T33, a thirty-fourth transistor T34, a thirty-fifth transistor T35, a thirty-sixth transistor T36, a thirty-seventh transistor T37, a thirty-eighth transistor T38, a third transistor C3, a fourth capacitor C4, and a fifth capacitor C5. A first output circuit 11 may include a thirty-ninth transistor T39 and a fortieth transistor T40. The second output circuit 12 may include a forty-sixth transistor T46 and a forty-seventh transistor T47.

In this example, the fourth node N4 is a connection point for the thirty-seventh transistor T37, the thirty-eighth transistor T38, the thirty-ninth transistor T39, the third capacitor C3, the forty-sixth transistor T46, and the forty-seventh transistor T47. A fifth node N5 is a connection point for the thirty-first transistor T31, the thirty-second transistor T32, the thirty-fourth transistor T34, the thirty-eighth transistor T38, the fortieth transistor T40, and the fourth capacitor C4. A sixth node N6 is a connection point for the thirty-second transistor T32, the thirty-third transistor T33, the thirty-fifth transistor T35, the thirty-sixth transistor T36, and the fifth capacitor C5.

In some examples, as shown in FIG. 16, a control electrode of the forty-sixth transistor T46 is electrically connected with the fourth node N4, a first electrode of the forty-sixth transistor T46 is electrically connected with the first power supply line VGH, and a second electrode of the forty-sixth transistor T46 is electrically connected with the second output end OUT2. A control electrode of the forty-seventh transistor T47 is electrically connected with the fourth node N4, a first electrode of the forty-seventh transistor T47 is electrically connected with the second power supply line VGL, and a second electrode of the forty-seventh transistor T47 is electrically connected with the second output end OUT2. A connection relationship of transistors and a connection relationship of capacitors, of the input circuit 10 and the first output circuit 11, may be referred to description of an equivalent circuit of the embodiment shown in FIG. 4 and therefore will not be repeated here.

In this example, the fourth node N4 and the fifth node N5 are output control nodes. For example, the fourth node N4 is a first output control node, and the fifth node N5 is a second output control node. The forty-sixth transistor T46 is a first output transistor, and the forty-seventh transistor T47 is a second output transistor.

In this example, the thirty-first transistor T31 to the fortieth transistor T40 and the forty-sixth transistor T46 may be first semiconductor-type transistors, such as P-type transistors. The forty-seventh transistor T47 may be a second semiconductor-type transistor, such as an N type transistor. However, the embodiment is not limited thereto.

With reference to FIG. 17, a working process of the drive control circuit shown in FIG. 16 will be described below by taking a working process of a first stage drive control circuit as an example. Among them, a signal input end INPUT of the first stage drive control circuit may be electrically connected with a start signal line. The drive control circuit of the embodiment may include: twelve transistor units (i.e., the thirty-first transistor T31 to the forty transistor T40, the forty-sixth transistor T46, and the forty-seventh transistor T47), three capacitor units (i.e., the third capacitor C3 to the fifth capacitor C5), three input ends (i.e., the first clock end CK, the second clock end CB, and the signal input end INPUT), two output ends (i.e., the first output end OUT1 and the second output end OUT2), and two power supply ends (i.e., the first power supply line VGH and the second power supply line VGL). The first power supply line VGH may provide a high-level first power supply signal continuously, and the second power supply line VGL may provide a low-level second power supply signal continuously.

As shown in FIG. 17, the working process of the drive control circuit of this example may include following stages.

In a first stage S61, the first clock end CK inputs a low-level signal, the second clock end CB inputs a high-level signal, and the signal input end INPUT inputs a high-level signal.

The thirty-first transistor T31 and the thirty-third transistor T33 are turned on, the fifth node N5 is at a high potential, and the thirty-second transistor T32, the thirty-fourth transistor T34, the thirty-eighth transistor T38, and the fortieth transistor T40 are turned off. The sixth node N6 is at a low potential, and the thirty-fifth transistor T35 and the thirty-sixth transistor T36 are turned on. The second clock signal end CB inputs a high level signal, and the thirty-seventh transistor T37 is turned off. The fourth node N4 is kept at a high potential of a previous stage, the thirty-ninth transistor T39 and the forty-sixth transistor T46 are turned off, and the forty-seventh transistor T47 is turned on. The first output end OUT1 keeps a previous low-level output, and the second output end OUT2 outputs a low-level signal provided by the second power supply line VGL.

In a second stage S62, the first clock end CK inputs a high-level signal, the second clock end CB inputs a low-level signal, and the signal input end INPUT inputs a high-level signal.

The thirty-first transistor T31 and the thirty-third transistor T33 are turned off, the fifth node N5 is kept at a high potential, and the thirty-second transistor T32, the thirty-fourth transistor T34, the thirty-eighth transistor T38, and the fortieth transistor T40 are turned off. The sixth node N6 is kept at a low potential, and the thirty-fifth transistor T35 and the thirty-sixth transistor T36 are turned on. The second clock end CB inputs a low-level signal, and the thirty-seventh transistor T37 is turned on. The fourth node N4 is at a low potential, the thirty-ninth transistor T39 and the forty-sixth transistor T46 are turned on, and the forty-seventh transistor T47 is turned off. The first output end OUT1 outputs a high-level signal provided by the first power supply line VGH, and the second output end OUT2 outputs a high-level signal provided by the first power supply line VGH.

In a third stage S63, the first clock end CK inputs a low-level signal, the second clock end CB inputs a high-level signal, and the signal input end INPUT inputs a high-level signal.

The thirty-first transistor T31 and the thirty-third transistor T33 are turned on, the fifth node N5 is at a high potential, and the thirty-second transistor T32, the thirty-fourth transistor T34, the thirty-eighth transistor T38, and the fortieth transistor T40 are turned off. The sixth node N6 is at a low potential, and the thirty-fifth transistor T35 and the thirty-sixth transistor T36 are turned on. The second clock end CB inputs the high-level signal, and the thirty-seventh transistor T37 is turned off. The fourth node N4 is kept at a low potential, the thirty-ninth transistor T39 and the forty-sixth transistor T46 are turned on, and the forty-seventh transistor T47 is turned off. The first output end OUT1 outputs a high-level signal, and the second output end OUT2 outputs a high-level signal.

In a fourth stage S64, the first clock end CK inputs a high-level signal, the second clock end CB inputs a low-level signal, and the signal input end INPUT inputs a low-level signal.

The thirty-first transistor T31 and the thirty-third transistor T33 are turned off, the fifth node N5 is at a high potential, and the thirty-second transistor T32, the thirty-fourth transistor T34, the thirty-eighth transistor T38, and the fortieth transistor T40 are turned off. The sixth node N6 is kept at a low potential, and the thirty-fifth transistor T35 and the thirty-sixth transistor T36 are turned on. The second clock end CB provides the low-level signal and the thirty-seventh transistor T37 is turned on. The fourth node N4 is at a low potential, the thirty-ninth transistor T39 and the forty-sixth transistor T46 are turned on, and the forty-seventh transistor T47 is turned off. The first output end OUT1 and the second output end OUT2 both output high-level signals.

In a fifth stage S65, the first clock end CK inputs a low-level signal, the second clock end CB inputs a high-level signal, and the signal input end INPUT inputs a low-level signal.

The thirty-first transistor T31 and the thirty-third transistor T33 are turned on, the fifth node N5 is at a low potential, and the thirty-second transistor T32, the thirty-fourth transistor T34, the thirty-eighth transistor T38, and the fortieth transistor T40 are turned on. The sixth node N6 is at a low potential, and the thirty-fifth transistor T35 and the thirty-sixth transistor T36 are turned on. The thirty-seventh transistor T37 is turned off. The fourth node N4 is at a high potential, the thirty-ninth transistor T39 and the forty-sixth transistor T46 are turned off, and the forty-seventh transistor T47 is turned on. The second output end OUT2 outputs a low-level signal. Since the fortieth transistor T40 transmitting a low-level signal has a threshold loss, a second power supply signal cannot be completely output to the first output end OUT1. A voltage value of an output signal of the first output end OUT1 in this stage is less than a voltage value of a first power supply signal and larger than a voltage value of a second power supply signal.

In a sixth stage S66, the first clock end CK inputs a high-level signal, the second clock end CB inputs a low-level signal, and the signal input end INPUT inputs a low-level signal.

The thirty-first transistor T31 and the thirty-third transistor T33 are turned off, the fifth node N5 is kept at a low potential, the thirty-second transistor T32, the thirty-fourth transistor T34, the thirty-eighth transistor T38, and the fortieth transistor T40 are turned on, and the first output end OUT1 outputs a low-level signal. The sixth node N6 is at a high potential, and the thirty-fifth transistor T35 and the thirty-sixth transistor T36 are turned off. The thirty-seventh transistor T37 is turned on. The fourth node N4 is at a high potential, the thirty-ninth transistor T39 and the forty-sixth transistor T46 are turned off, the forty-seventh transistor T47 is turned on, and the second output end OUT2 outputs a low-level signal.

According to the abovementioned working process of the drive control circuit, in the second stage S62 to the fourth stage S64, both the first output end OUT1 and the second output end OUT2 may output high-level signals, and in the fifth stage S65, the first output end OUT1 outputs a first voltage signal, a voltage value of the first voltage signal is less than the voltage value of the first power supply signal and larger than the voltage value of the second power supply signal. The stage in which the first output end OUT1 outputs the first voltage signal may be referred to as a voltage fluctuation stage, and a time length during which the first output end OUT1 outputs the first voltage signal may be referred to as a voltage fluctuation time length. In this example, polarities of effective levels of the first output signal provided by the first output end OUT1 and the second output signal provided by the second output end OUT2 are the same, that is, they are both effective at a high level. A time length of an effective level of the first output signal within a time length of one frame and a time length of an effective level of the second output signal within a time length of one frame may be approximately the same. The first output signal has a continuous voltage fluctuation stage after an effective level, and a time length of the effective level of the first output signal is greater than a voltage fluctuation time length thereof. The second output signal does not have a voltage fluctuation stage. Compared with the first output signal, the second output signal in this example may eliminate voltage fluctuation of the first output signal, thereby improving performance of an output signal of the drive control circuit.

In this example, the second output circuit 12 may include an inverting sub-circuit, and the inverting sub-circuit may include the forty-sixth transistor T46 and the forty-seventh transistor T47. A polarity of an effective level (i.e., a high level) of a first power supply signal is opposite to a polarity of an effective level (i.e., a low level) for starting the forty-sixth transistor T46, and a polarity of an effective level (i.e., a low level) of a second power supply signal is opposite to a polarity of an effective level (i.e., a high level) for starting the forty-seventh transistor T47. The inverting sub-circuit may perform an inverting processing on a signal of the fourth node N4 to obtain a second output signal.

In some exemplary implementation modes, a first output signal provided by the first output end OUT1 and a second output signal provided by the second output end OUT2 may be configured to start an N-type transistor in a pixel circuit. In some examples, the first output signal may be transmitted to a pixel circuit through a light emitting control line as a light emitting control signal; the second output signal may be transmitted to a pixel circuit through a reset control line as a reset control signal, to control to reset an anode of a light emitting element. In some examples, a first output signal provided by a first output end of a present stage drive control circuit may be transmitted to a signal input end of a next stage drive control circuit as an input signal of the next stage drive control circuit. However, the embodiment is not limited thereto.

Figure 18:
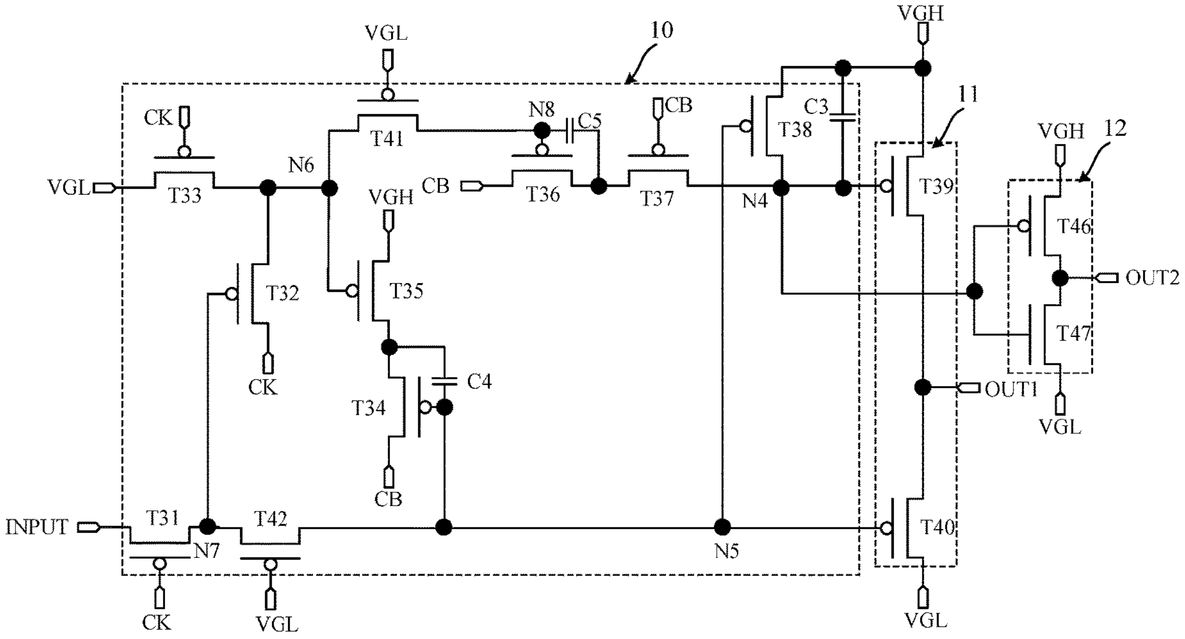
FIG. 18 is another equivalent circuit diagram of a drive control circuit according to at least one embodiment of the present disclosure.

FIG. 18 is another equivalent circuit diagram of a drive control circuit according to at least one embodiment of the present disclosure. Compared with the drive control circuit shown in FIG. 16, an input circuit 10 of the drive control circuit shown in FIG. 18 may further include: a forty-first transistor T41 and a forty-second transistor T42. The forty-second transistor T42 is connected between a fifth node N5 and a seventh node N7, and is configured to stabilize a potential of the seventh node N7; the forty-first transistor T41 is connected between a sixth node N6 and an eighth node N8, and is configured to stabilize a potential of the sixth node N6. A connection relationship between transistors and capacitors of the input circuit 10 and a first output circuit 11 of the drive control circuit of the embodiment may be referred to related description of the drive control circuit shown in FIG. 4, and a structure of a second output circuit 12 may be referred to related description of the drive control circuit shown in FIG. 16 and therefore will not be repeated here. A working timing of the drive control circuit shown in FIG. 18 may be referred to description of FIG. 17 and therefore will not be repeated here.

Figure 19:
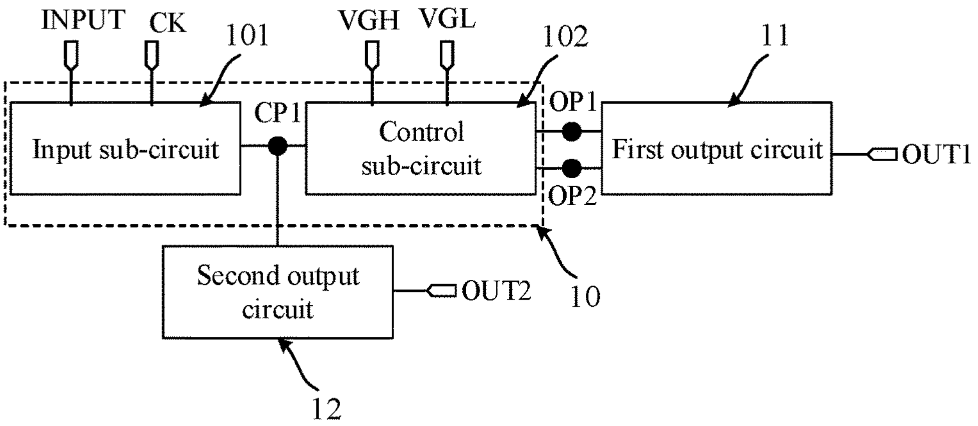
FIG. 19 is another schematic diagram of a structure of a drive control circuit according to at least one embodiment of the present disclosure.

FIG. 19 is another schematic diagram of a structure of a drive control circuit according to at least one embodiment of the present disclosure. As shown in FIG. 19, an input circuit 10 may include an input sub-circuit 101 and a control sub-circuit 102. The input sub-circuit 101 is electrically connected with a signal input end INPUT, a first clock end CK, and a first control node CP1, and is configured to control a potential of the first control node CP1 under control of the signal input end INPUT and the first clock end CK. The control sub-circuit 102 is at least electrically connected with the first control node CP1, a first power supply line VGH, a second power supply line VGL, a first output control node OP1, and a second output control node OP2, and is configured to control potentials of the first output control node OP1 and the second output control node OP2 under control of the first control node CP1. A first output circuit 11 is electrically connected with the first output control node OP1, the second output control node OP2, and a first output end OUT1, and is configured to control the first output end OUT1 to output a first output signal under control of the first output control node OP1 and the second output control node OP2. A second output circuit 12 is electrically connected with the first control node CP1 and a second output end OUT2, and is configured to control the second output end OUT2 to output a second output signal under control of the first control node CP1.

Figure 20:
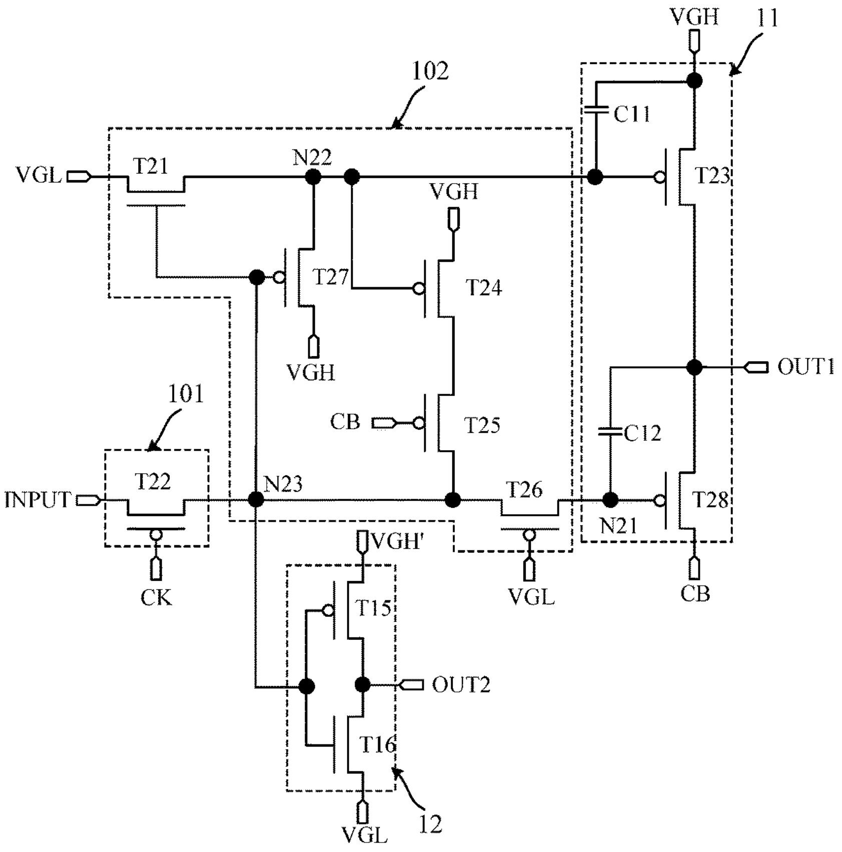
FIG. 20 is another equivalent circuit diagram of a drive control circuit according to at least one embodiment of the present disclosure.
Figure 21:
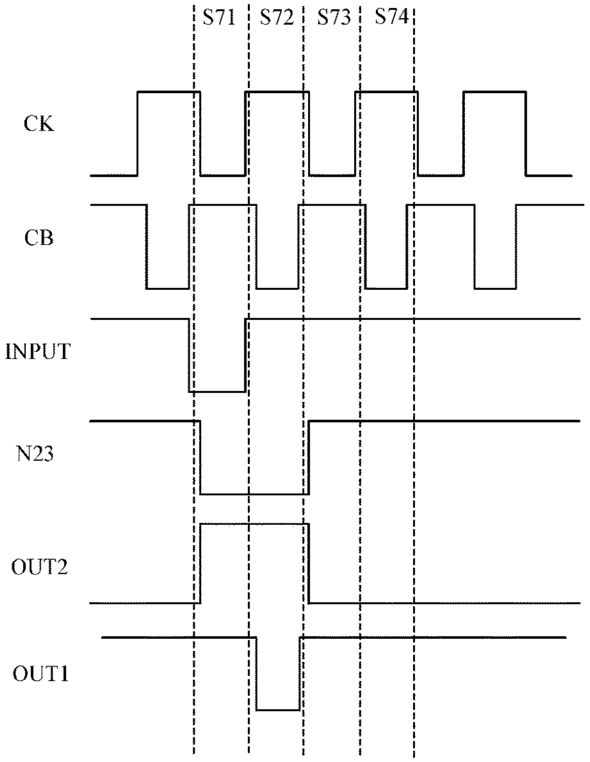
FIG. 21 is a working timing diagram of the drive control circuit provided in FIG. 20.

FIG. 20 is an equivalent circuit diagram of a drive control circuit according to at least one embodiment of the present disclosure. FIG. 21 is a working timing diagram of the drive control circuit provided in FIG. 20.

In some exemplary implementation modes, as shown in FIG. 20, an input sub-circuit 101 may include a twenty-second transistor T22. A control sub-circuit 102 may include a twenty-first transistor T21, a twenty-fourth transistor T24, a twenty-fifth transistor T25, a twenty-sixth transistor T26, and a twenty-seventh transistor T27. A first output circuit 11 may include a twenty-third transistor T23, a twenty-eighth transistor T28, an eleventh capacitor C11, and a twelfth capacitor C12. A second output circuit 12 may include a fifteenth transistor T15 and a sixteenth transistor T16. A structure and a connection relationship of the input circuit 10 and the first output circuit 11 may be referred to description of the drive control circuit shown in FIG. 14 and therefore will not be repeated here.

In some examples, as shown in FIG. 20, a control electrode of the fifteenth transistor T15 is electrically connected with a twenty-third node N23, a first electrode of the fifteenth transistor T15 is electrically connected with a third power supply line VGH', and a second electrode of the fifteenth transistor T15 is electrically connected with a second output end OUT2. A control electrode of the sixteenth transistor T16 is electrically connected with the twenty-third node N23, a first electrode of the sixteenth transistor T16 is electrically connected with a second power supply line VGL, and a second electrode of the sixteenth transistor T16 is electrically connected with the second output end OUT2.

In this example, the twenty-first node N21 is a connection point for the twenty-sixth transistor T26, the twenty-eighth transistor T28, and the twelfth capacitor C12. The twenty-second node N22 is a connection point for the twenty-first transistor T21, the twenty-seventh transistor T27, the twenty-fourth transistor T24, the twenty-third transistor T23, and the eleventh capacitor C11. The twenty-third node N23 is a connection point for the twenty-second transistor T22, the twenty-fifth transistor T25, the twenty-sixth transistor T26, the twenty-seventh transistor T27, the twenty-first transistor T21, the fifteenth transistor T15, and the sixteenth transistor T16.

In this example, the twenty-first node N21 and the twenty-second node N22 may be output control nodes. The twenty-third node N23 may be a first control node. The fifteenth transistor T15 is a first output transistor, and the sixteenth transistor T16 is a second output transistor.

In some examples, the twenty-first transistor T21 and the sixteenth transistor T16 may be second semiconductor-type transistors, for example, may be N-type transistors. The twenty-second transistor T22 to the twenty-eighth transistor T28 and the fifteenth transistor T15 may be first semiconductor-type transistors, for example, may be P-type transistors. However, the embodiment is not limited thereto.

A working process of the drive control circuit will be described below with reference to FIG. 21. A working process of a first stage drive control circuit is taken as an example for description, and a signal input end INPUT of the first stage drive control circuit may be electrically connected with a start signal line. The drive control circuit of the embodiment may include: ten transistor units (i.e., the twenty-first transistor T21 to the twenty-eighth transistor T28, the fifteenth transistor T15, and the sixteenth transistor T16), two capacitor units (i.e., the eleventh capacitor C11 and the twelfth capacitor C12), three input ends (i.e., the first clock end CK, the second clock end CB, and the signal input end INPUT), two output ends (i.e., the first output end OUT1 and the second output end OUT2), and three power supply ends (i.e., the first power supply line VGH, the second power supply line VGL, and the third power supply line VGH').

As shown in FIG. 21, the working process of the drive control circuit of this example may include following stages.

In a first stage S71, the first clock end CK inputs a low-level signal, the second clock end CB inputs a high-level signal, and the signal input end INPUT inputs a low-level signal.

The twenty-second transistor T22, the twenty-sixth transistor T26, the twenty-seventh transistor T27, the twenty-eighth transistor T28, and the fifteenth transistor T15 are turned on. The twenty-first transistor T21, the twenty-third transistor T23, the twenty-fourth transistor T24, the twenty-fifth transistor T25, and the sixteenth transistor T16 are turned off. The twenty-third node N23 and the twenty-first node N21 are at a low potential, and the twenty-second node N22 is at a high potential. The first output end OUT1 outputs a high-level signal, and the second output end OUT2 outputs a high-level signal provided by the third power supply line VGH'.

In a second stage S72, the first clock end CK inputs a high-level signal, the second clock end CB inputs a low-level signal, and the signal input end INPUT inputs a high-level signal.

The twenty-first transistor T21, the twenty-second transistor T22, the twenty-fourth transistor T24, the twenty-third transistor T23, and the sixteenth transistor T16 are turned off, and the twenty-fifth transistor T25, the twenty-sixth transistor T26, the twenty-seventh transistor T27, the twenty-eighth transistor T28, and the fifteenth transistor T15 are turned on. The twenty-third node N23 and the twenty-first node N21 are at a low potential, and the twenty-second node N22 is at a high potential. The first output end OUT1 outputs a low-level signal, and the second output end OUT2 outputs a high-level signal provided by the third power supply line VGH'.

In a third stage S73, the first clock end CK inputs a low-level signal, the second clock end CB inputs a high-level signal, and the signal input end INPUT inputs a high-level signal.

The twenty-first transistor T21, the twenty-second transistor T22, the twenty-third transistor T23, the twenty-fourth transistor T24, the twenty-sixth transistor T26, and the sixteenth transistor T16 are turned on, and the twenty-fifth transistor T25, the twenty-seventh transistor T27, the twenty-eighth transistor T28, and the fifteenth transistor T15 are turned off. The twenty-third node N23 and the twenty-first node N21 are at a high potential, and the twenty-second node N22 is at a low potential. The first output end OUT1 outputs a high-level signal, and the second output end OUT2 outputs a low-level signal.

In a fourth stage S74, the first clock end CK inputs a high-level signal, the second clock end CB inputs a low-level signal, and the signal input end INPUT inputs a high-level signal.

The twenty-second transistor T22, the twenty-seventh transistor T27, the twenty-eighth transistor T28, and the fifteenth transistor T15 are turned off, and the twenty-first transistor T21, the twenty-third transistor T23, the twenty-fourth transistor T24, the twenty-fifth transistor T25, the twenty-sixth transistor T26, and the sixteenth transistor T16 are turned on.

The twenty-third node N23 and the twenty-first node N21 are at a high potential, and the twenty-second node N22 is at a low potential. The first output end OUT1 outputs a high-level first power supply signal provided by the first power supply line VGH. The second output end OUT2 outputs a low-level second power supply signal provided by the second power supply line VGL.

According to the abovementioned working process, in the first stage S71 and the second stage S72, the second output end OUT2 outputs a high-level signal provided by the third power supply line VGH' and outputs a low-level signal in other stages. The first output end OUT1 outputs a low-level signal in the second stage S72 and outputs a high-level signal in other stages.

In this example, polarities of effective levels of a first output signal and a second output signal are opposite, for example, an effective level of the first output signal is a low level and an effective level of the second output signal is a high level. Time lengths of effective levels of the first output signal and the second output signal within a time length of one frame are different. A time length of an effective level of the second output signal may be greater than a time length of an effective level of the first output signal, for example, the time length of the effective level of the second output signal may be greater than 1.5 times the time length of the effective level of the first output signal. Absolute values of voltages of effective levels of the first output signal and the second output signal are different, wherein an absolute value of a voltage of the effective level of the second output signal may be greater than an absolute value of a voltage of the effective level of the first output signal. However, the embodiment is not limited thereto. For example, absolute values of voltages of effective levels of the first output signal and the second output signal may be approximately the same.

In this example, a first output signal provided by the first output end OUT1 may be configured to start a P-type transistor in a pixel circuit (i.e., an effective level of the first output signal is a low level), and a second output signal provided by the second output end OUT2 may be configured to start an N-type transistor in a pixel circuit (i.e., an effective level of the second output signal is a high level). In some examples, the first output signal and the second output signal may be transmitted to a pixel circuit through a scan line as scan signals. In some examples, a first output signal provided by a first output end of a present stage drive control circuit may be transmitted to a signal input end of a next stage drive control circuit as an input signal of the next stage drive control circuit. However, the embodiment is not limited thereto.

In this exemplary implementation mode, a polarity of an effective level (i.e., a low level) of a second power supply signal provided by the second power supply line VGL is opposite to a polarity of an effective level (i.e., a high level) for starting the sixteenth transistor T16, and a polarity of an effective level (i.e., a high level) of a third power supply signal is opposite to a polarity of an effective level (i.e., a low level) for starting the fifteenth transistor T15. The second output circuit 12 may include an inverting sub-circuit, and the inverting sub-circuit may include the fifteenth transistor T15 and the sixteenth transistor T16. The inverting sub-circuit may perform an inverting output on a signal of the twenty-third node N23 (i.e., the first control node) to obtain a second output signal, thus the drive control circuit can provide two different output signals.

Figure 22:
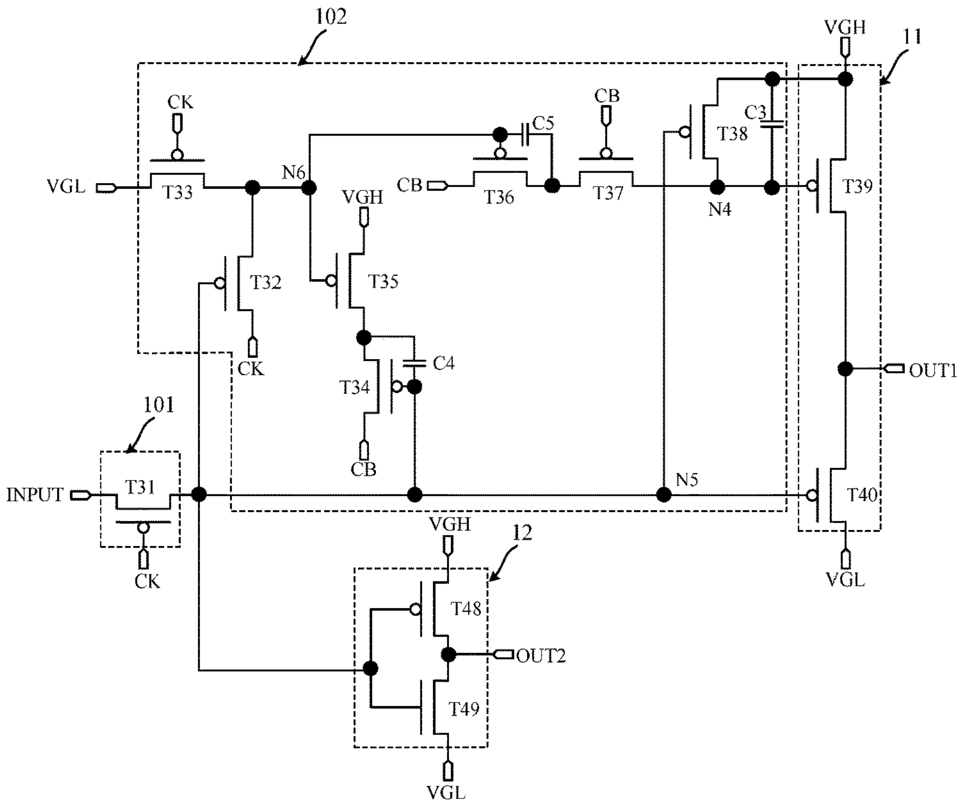
FIG. 22 is another equivalent circuit diagram of a drive control circuit according to at least one embodiment of the present disclosure.
Figure 23:
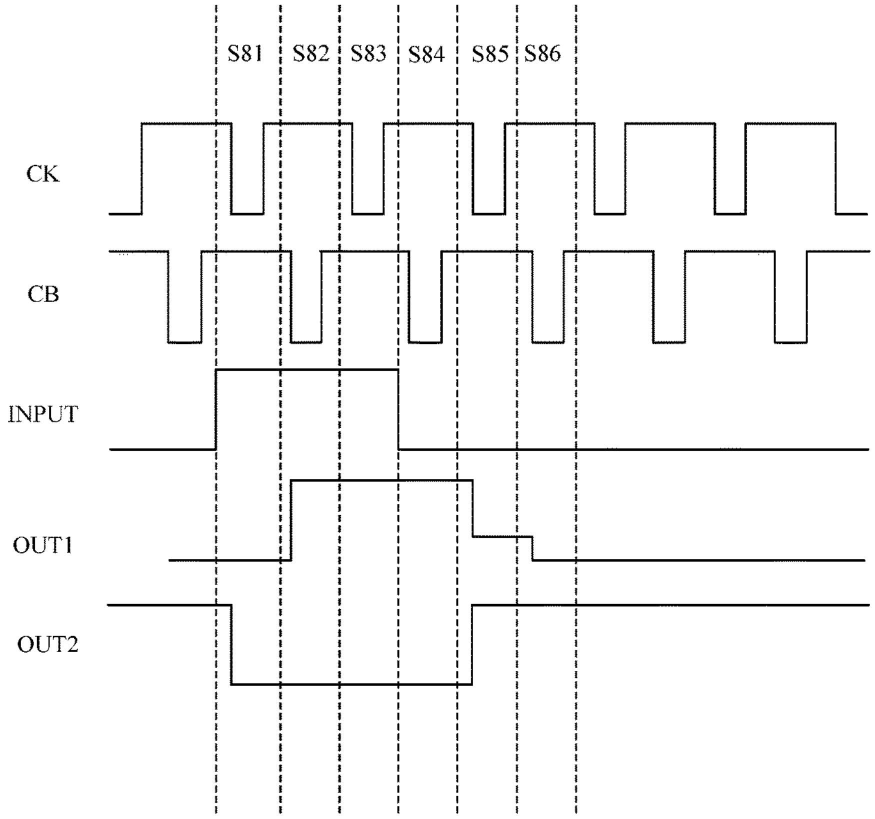
FIG. 23 is a working timing diagram of the drive control circuit provided in FIG. 22.

FIG. 22 is another equivalent circuit diagram of a drive control circuit according to at least one embodiment of the present disclosure. FIG. 23 is a working timing diagram of the drive control circuit provided in FIG. 22. As shown in FIG. 22, an input sub-circuit 101 may include a thirty-first transistor T31. A control sub-circuit 102 may include: a thirty-second transistor T32 to a thirty-eighth transistor T38, and a third capacitor C3 to a fifth capacitor C5. A first output circuit 11 may include a thirty-ninth transistor T39 and a fortieth transistor T40. A second output circuit 12 may include a forty-eighth transistor T48 and a forty-ninth transistor T49.

In this example, a fourth node N4 is a connection point for the thirty-seventh transistor T37, the thirty-eighth transistor T38, the thirty-ninth transistor T39, and the third capacitor C3. A fifth node N5 is a connection point for the thirty-first transistor T31, the thirty-second transistor T32, the thirty-fourth transistor T34, the thirty-eighth transistor T38, the fortieth transistor T40, the forty-eighth transistor T48, the forty-ninth transistor T49, and a fourth capacitor C4. A sixth node N6 is a connection point for the thirty-second transistor T32, the thirty-third transistor T33, the thirty-fifth transistor T35, the thirty-sixth transistor T36, and a fifth capacitor C5. A connection relationship of transistors and capacitors of an input circuit 10 and the first output circuit 11 may be referred to description of an equivalent circuit of the embodiment shown in FIG. 4 and therefore will not be repeated here.

In some examples, as shown in FIG. 22, a control electrode of the forty-eighth transistor T48 is electrically connected with the fifth node N5, a first electrode of the forty-eighth transistor T48 is electrically connected with a first power supply line VGH, and a second electrode of the forty-eighth transistor T48 is electrically connected with a second output end OUT2. A control electrode of the forty-ninth transistor T49 is electrically connected with the fifth node N5, a first electrode of the forty-ninth transistor T49 is electrically connected with a second power supply line VGL, and a second electrode of the forty-ninth transistor T49 is electrically connected with the second output end OUT2.

In this example, the fourth node N4 and the fifth node N5 are output control nodes. The fifth node N5 is also a first control node. The forty-eighth transistor T48 is a first output transistor, and the forty-ninth transistor T49 is a second output transistor.

In this example, the thirty-first transistor T31 to the fortieth transistor T40 and the forty-eighth transistor T48 may be first semiconductor-type transistors, such as P-type transistors. The forty-ninth transistor T49 may be a second semiconductor-type transistor, such as an N type transistor. However, the embodiment is not limited thereto.

With reference to FIG. 23, a working process of the drive control circuit shown in FIG. 22 will be described below by taking a working process of a first stage drive control circuit as an example. Among them, a signal input end INPUT of the first stage drive control circuit may be electrically connected with a start signal line. The drive control circuit of the embodiment may include: twelve transistor units (i.e., the thirty-first transistor T31 to the forty transistor T40, the forty-eighth transistor T48, and the forty-ninth transistor T49), three capacitor units (i.e., the third capacitor C3 to the fifth capacitor C5), three input ends (i.e., the first clock end CK, the second clock end CB, and the signal input end INPUT), two output ends (i.e., the first output end OUT1 and the second output end OUT2), and two power supply ends (i.e., the first power supply line VGH and the second power supply line VGL). The first power supply line VGH may provide a high-level first power supply signal continuously, and the second power supply line VGL may provide a low-level second power supply signal continuously.

As shown in FIG. 23, the working process of the drive control circuit of this example may include following stages.

In a first stage S81, the first clock end CK inputs a low-level signal, the second clock end CB inputs a high-level signal, and the signal input end INPUT inputs a high-level signal.

The thirty-first transistor T31, the thirty-third transistor T33, the thirty-fifth transistor T35, the thirty-sixth transistor T36, and the forty-ninth transistor T49 are turned on, and the thirty-second transistor T32, the thirty-fourth transistor T34, the thirty-seventh transistor T37, the thirty-eighth transistor T38, the thirty-ninth transistor T39, the fortieth transistor T40, and the forty-eighth transistor T48 are turned off. The fifth node N5 is at a high potential, the sixth node N6 is at a low potential, and the fourth node N4 is at a high potential. The first output end OUT1 outputs a low-level signal, and the second output end OUT2 outputs a low-level signal.

In a second stage S82, the first clock end CK inputs a high-level signal, the second clock end CB inputs a low-level signal, and the signal input end INPUT inputs a high-level signal.

The thirty-first transistor T31, the thirty-third transistor T33, the thirty-second transistor T32, the thirty-fourth transistor T34, the thirty-eighth transistor T38, the fortieth transistor T40, and the forty-eighth transistor T48 are turned off, and the thirty-fifth transistor T35, the thirty-sixth transistor T36, the thirty-seventh transistor T37, the thirty-ninth transistor T39, and the forty-ninth transistor T49 are turned on. The fifth node N5 is at a high potential, the sixth node N6 is at a low potential, and the fourth node N4 is at a low potential. The first output end OUT1 outputs a high-level signal, and the second output end OUT2 outputs a low-level signal.

In a third stage S83, the first clock end CK inputs a low-level signal, the second clock end CB inputs a high-level signal, and the signal input end INPUT inputs a high-level signal.

The thirty-first transistor T31, the thirty-third transistor T33, the thirty-fifth transistor T35, the thirty-sixth transistor T36, the thirty-ninth transistor T39, and the forty-ninth transistor T49 are turned on, and the thirty-second transistor T32, the thirty-fourth transistor T34, the thirty-seventh transistor T37, the thirty-eighth transistor T38, the fortieth transistor T40, and the forty-eighth transistor T48 are turned off. The fifth node N5 is at a high potential, the sixth node N6 is at a low potential, and the fourth node N4 is at a low potential. The first output end OUT1 outputs a high-level signal, and the second output end OUT2 outputs a low-level signal.

In a fourth stage S84, the first clock end CK inputs a high-level signal, the second clock end CB inputs a low-level signal, and the signal input end INPUT inputs a low-level signal.

The thirty-first transistor T31, the thirty-third transistor T33, the thirty-second transistor T32, the thirty-fourth transistor T34, the thirty-eighth transistor T38, the fortieth transistor T40, and the forty-eighth transistor T48 are turned off, and the thirty-fifth transistor T35, the thirty-sixth transistor T36, the thirty-seventh transistor T37, the thirty-ninth transistor T39, and the forty-ninth transistor T49 are turned on. The fifth node N5 is at a high potential, the sixth node N6 is at a low potential, and the fourth node N4 is at a low potential. The first output end OUT1 outputs a high-level signal, and the second output end OUT2 outputs a low-level signal.

In a fifth stage S85, the first clock end CK inputs a low-level signal, the second clock end CB inputs a high-level signal, and the signal input end INPUT inputs a low-level signal.

The thirty-first transistor T31, the thirty-third transistor T33, the thirty-second transistor T32, the thirty-fourth transistor T34, the thirty-fifth transistor T35, the thirty-sixth transistor T36, the thirty-eighth transistor T38, the fortieth transistor T40, and the forty-eighth transistor T48 are turned on, and the thirty-seventh transistor T37, the thirty-ninth transistor T39, and the forty-ninth transistor T49 are turned off. The fifth node N5 is at a low potential, the sixth node N6 is at a low potential, and the fourth node N4 is at a high potential. Since there is a threshold loss when the fortieth transistor T40 transmits a low-level signal, a second power supply signal cannot be completely output to the first output end OUT1. A voltage value of an output signal of the first output end OUT1 in this stage is less than a voltage value of a first power supply signal and larger than a voltage value of a second power supply signal. The second output end OUT2 outputs a high-level signal.

In a sixth stage S86, the first clock end CK inputs a high-level signal, the second clock end CB inputs a low-level signal, and the signal input end INPUT inputs a low-level signal.

The thirty-first transistor T31, the thirty-third transistor T33, the thirty-fifth transistor T35, the thirty-sixth transistor T36, the thirty-ninth transistor T39, and the forty-ninth transistor T49 are turned off, and the thirty-second transistor T32, the thirty-fourth transistor T34, the thirty-seventh transistor T37, the thirty-eighth transistor T38, the fortieth transistor T40, and the forty-eighth transistor T48 are turned on. The fifth node N5 is at a low potential, the sixth node N6 is at a high potential, and the fourth node N4 is at a high potential. The first output end OUT1 and the second output end OUT2 both output low-level signals.

According to the abovementioned working process of the drive control circuit, the first output end OUT1 outputs a high-level signal in the second stage S82 to the fourth stage S84, and outputs a first voltage signal in the fifth stage S85. The second output end OUT2 outputs a low-level signal in the first stage S81 to the fourth stage S84, and outputs a high-level signal in other stages.

In this example, polarities of effective levels of a first output signal and a second output signal are opposite, for example, an effective level of the first output signal is a high level and an effective level of the second output signal is a low level. A time length of an effective level of the first output signal within a time length of one frame may be less than a time length of an effective level of the second output signal within a time length of one frame. Absolute values of voltages of the effective levels of the first output signal and the second output signal may be approximately the same. The first output signal has a continuous voltage fluctuation stage after an effective level, and a voltage fluctuation time length is less than a time length of the effective level. The second output signal does not have a voltage fluctuation stage after an effective level.

In this example, the second output circuit 12 may include an inverting sub-circuit, and the inverting sub-circuit includes the forty-eighth transistor T48 and the forty-ninth transistor T49. A polarity of an effective level (i.e., a high level) of a first power supply signal is opposite to a polarity of an effective level (i.e., a low level) for starting the forty-eighth transistor T48, and a polarity of an effective level (i.e., a low level) of a second power supply signal is opposite to a polarity of an effective level (i.e., a high level) for starting the forty-ninth transistor T49. The inverting sub-circuit may perform an inverting processing on a signal of the fifth node N5 to obtain a second output signal.

In some exemplary implementation modes, a first output signal provided by the first output end OUT1 may be configured to start an N-type transistor in a pixel circuit. A second output signal provided by the second output end OUT2 may be configured to start a P-type transistor in a pixel circuit. In some examples, the first output signal may be transmitted to a pixel circuit through a light emitting control line as a light emitting control signal; the second output signal may be transmitted to a pixel circuit through a reset control line as a reset control signal, to control to reset an anode of a light emitting element. In some examples, a first output signal provided by a first output end of a present stage drive control circuit may be transmitted to a signal input end of a next stage drive control circuit as an input signal of the next stage drive control circuit. However, the embodiment is not limited thereto.

Figure 24:
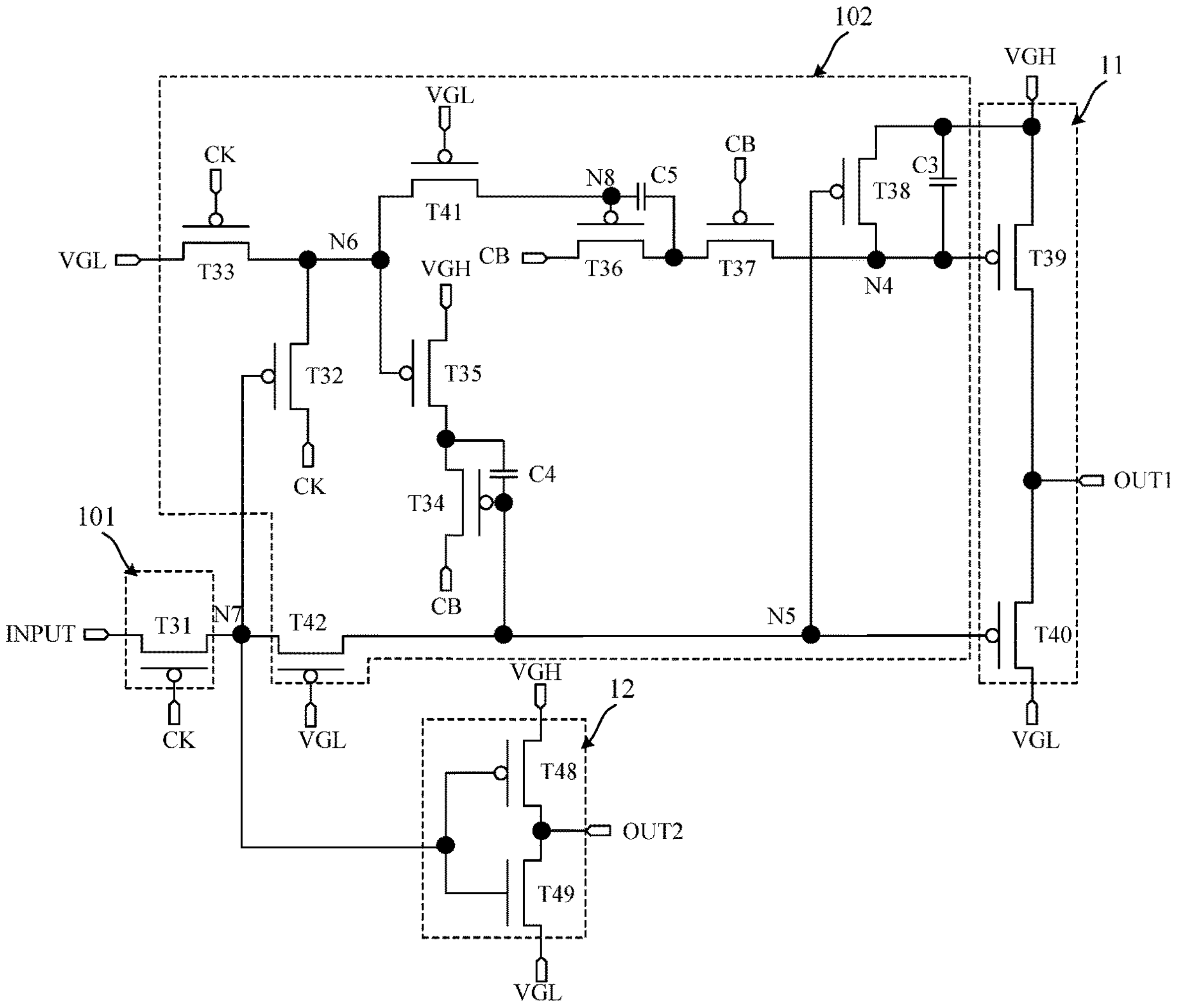
FIG. 24 is another equivalent circuit diagram of a drive control circuit according to at least one embodiment of the present disclosure.

FIG. 24 is another equivalent circuit diagram of a drive control circuit according to at least one embodiment of the present disclosure. Compared with the drive control circuit shown in FIG. 22, an input circuit 10 of the drive control circuit shown in FIG. 24 may further include: a forty-first transistor T41 and a forty-second transistor T42. The forty-second transistor T42 is connected between a fifth node N5 and a seventh node N7, and is configured to stabilize a potential of the seventh node N7. The forty-first transistor T41 is connected between a sixth node N6 and an eighth node N8, and is configured to stabilize a potential of the sixth node N6. Structures of the input circuit and the first output circuit of the drive control circuit of the embodiment may be referred to related description of the drive control circuit shown in FIG. 4, and a structure of a second output circuit may be referred to related description of the drive control circuit shown in FIG. 22 and therefore will not be repeated here. A working timing of the drive control circuit shown in FIG. 24 may be referred to description of FIG. 23 and therefore will not be repeated here.

Figure 25:
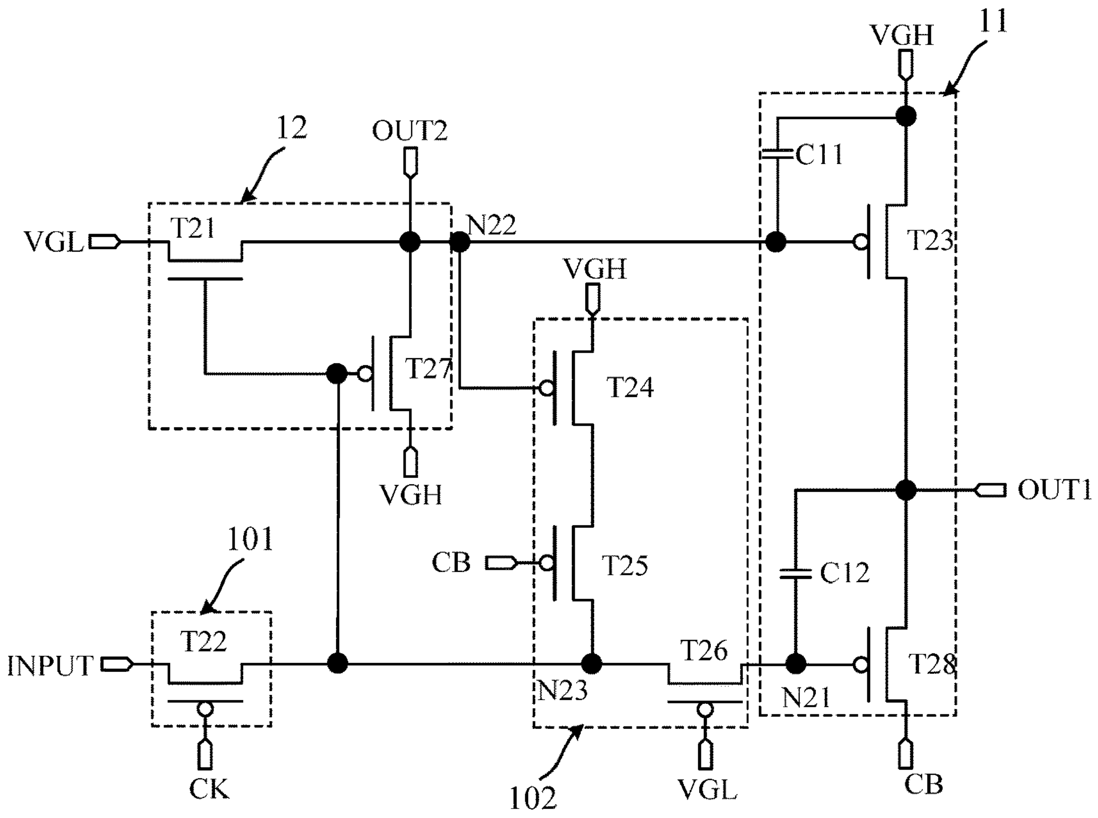
FIG. 25 is another equivalent circuit diagram of a drive control circuit according to at least one embodiment of the present disclosure.
Figure 26:
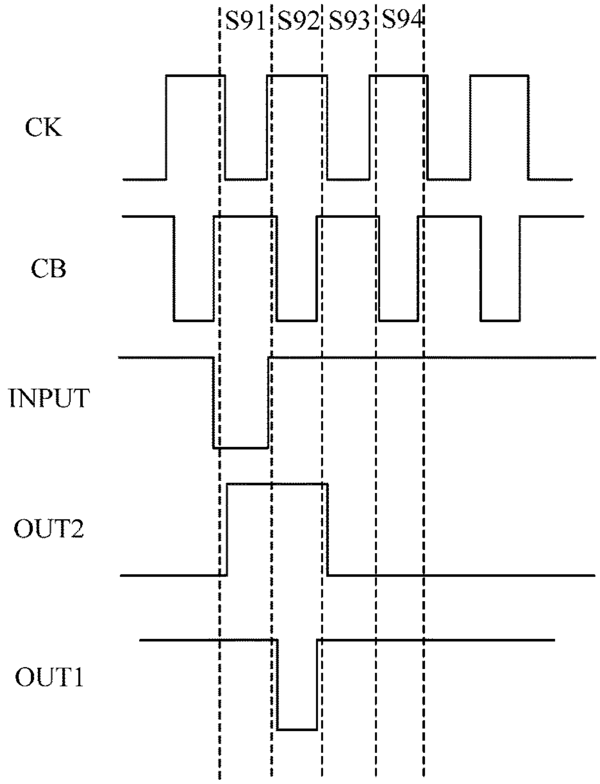
FIG. 26 is a working timing diagram of the drive control circuit provided in FIG. 25.

FIG. 25 is an equivalent circuit diagram of a drive control circuit according to at least one embodiment of the present disclosure. FIG. 26 is a working timing diagram of the drive control circuit provided in FIG. 25.

In some exemplary implementation modes, as shown in FIG. 25, an input sub-circuit 101 may include a twenty-second transistor T22. A control sub-circuit 102 may include a twenty-fourth transistor T24, a twenty-fifth transistor T25, and a twenty-sixth transistor T26. A first output circuit 11 may include a twenty-third transistor T23, a twenty-eighth transistor T28, an eleventh capacitor C11, and a twelfth capacitor C12. A second output circuit 12 may include a twenty-first transistor T21 and a twenty-seventh transistor T27. A connection relationship of the twenty-first transistor T21 to the twenty-eighth transistor T28, the eleventh capacitor C11, and the twelfth capacitor C12 may be referred to description of the drive control circuit shown in FIG. 12 and therefore will not be repeated here.

In this example, a twenty-first node N21 is a connection point for the twenty-sixth transistor T26, the twenty-eighth transistor T28, and the twelfth capacitor C12. A twenty-second node N22 is a connection point for the twenty-first transistor T21, the twenty-seventh transistor T27, the twenty-fourth transistor T24, the twenty-third transistor T23, and the eleventh capacitor C11. A twenty-third node N23 is a connection point for the twenty-second transistor T22, the twenty-fifth transistor T25, the twenty-sixth transistor T26, the twenty-seventh transistor T27, and the twenty-first transistor T21.

In this example, the twenty-first node N21 and the twenty-second node N22 may be output control nodes. Among them, the twenty-second node N22 is a first output control node, and the twenty-first node N21 is a second output control node. The twenty-third node N23 may be a first control node. A second output end OUT2 may be electrically connected directly with the twenty-second node N22. The twenty-seventh transistor T27 may be a first output transistor, and the twenty-first transistor T21 may be a second output transistor.

In some examples, the twenty-first transistor T21 may be a second semiconductor-type transistor, for example, may be an N-type transistor. The twenty-second transistor T22 to the twenty-eighth transistor T28 may be first semiconductor-type transistors, for example, may be P-type transistors. However, the embodiment is not limited thereto.

A working process of the drive control circuit will be described below with reference to FIG. 26. A working process of a first stage drive control circuit is taken as an example for description, and a signal input end INPUT of the first stage drive control circuit may be electrically connected with a start signal line. The drive control circuit of the embodiment may include: eight transistor units (i.e., the twenty-first transistor T21 to the twenty-eighth transistor T28), two capacitor units (i.e., the eleventh capacitor C11 and the twelfth capacitor C12), three input ends (i.e., the first clock end CK, the second clock end CB, and the signal input end INPUT), two output ends (i.e., the first output end OUT1 and the second output end OUT2), and two power supply ends (i.e., the first power supply line VGH and the second power supply line VGL).

As shown in FIG. 26, the working process of the drive control circuit of this example may include following stages.

In a first stage S91, the first clock end CK inputs a low-level signal, the second clock end CB inputs a high-level signal, and the signal input end INPUT inputs a low-level signal.

The twenty-second transistor T22, the twenty-sixth transistor T26, the twenty-seventh transistor T27, and the twenty-eighth transistor T28 are turned on. The twenty-first transistor T21, the twenty-third transistor T23, the twenty-fourth transistor T24, and the twenty-fifth transistor T25 are turned off. The twenty-third node N23 and the twenty-first node N21 are at a low potential, and the twenty-second node N22 is at a high potential. The first output end OUT1 outputs a high-level signal, and the second output end OUT2 outputs a high-level signal.

In a second stage S92, the first clock end CK inputs a high-level signal, the second clock end CB inputs a low-level signal, and the signal input end INPUT inputs a high-level signal.

The twenty-first transistor T21, the twenty-second transistor T22, the twenty-fourth transistor T24, and the twenty-third transistor T23 are turned off, and the twenty-fifth transistor T25, the twenty-sixth transistor T26, the twenty-seventh transistor T27, and the twenty-eighth transistor T28 are turned on. The twenty-third node N23 and the twenty-first node N21 are at a low potential, and the twenty-second node N22 is at a high potential. The first output end OUT1 outputs a low-level signal, and the second output end OUT2 outputs a high-level signal.

In a third stage S93, the first clock end CK inputs a low-level signal, the second clock end CB inputs a high-level signal, and the signal input end INPUT inputs a high-level signal.

The twenty-first transistor T21, the twenty-second transistor T22, the twenty-third transistor T23, the twenty-fourth transistor T24, and the twenty-sixth transistor T26 are turned on, and the twenty-fifth transistor T25, the twenty-seventh transistor T27, and the twenty-eighth transistor T28 are turned off. The twenty-third node N23 and the twenty-first node N21 are at a high potential, and the twenty-second node N22 is at a low potential. The first output end OUT1 outputs a high-level signal, and the second output end OUT2 outputs a low-level signal.

In a fourth stage S94, the first clock end CK inputs a high-level signal, the second clock end CB inputs a low-level signal, and the signal input end INPUT inputs a high-level signal.

The twenty-second transistor T22, the twenty-seventh transistor T27, and the twenty-eighth transistor T28 are turned off, and the twenty-first transistor T21, the twenty-third transistor T23, the twenty-fourth transistor T24, the twenty-fifth transistor T25, and the twenty-sixth transistor T26 are turned on. The twenty-third node N23 and the twenty-first node N21 are at a high potential, and the twenty-second node N22 is at a low potential. The first output end OUT1 outputs a high-level signal. The second output end OUT2 outputs a low-level signal.

According to the abovementioned working process, the second output end OUT2 outputs a high-level signal in the first stage S91 and the second stage S92, and outputs a low-level signal in other stages. The first output end OUT1 outputs a low-level signal in the second stage S92 and outputs a high-level signal in other stages.

In this example, polarities of effective levels of a first output signal and a second output signal are opposite, for example, an effective level of the first output signal is a low level and an effective level of the second output signal is a high level. Time lengths of effective levels of the first output signal and the second output signal within a time length of one frame are different. A time length of an effective level of the second output signal may be greater than a time length of an effective level of the first output signal, for example, the time length of the effective level of the second output signal may be greater than 1.5 times the time length of the effective level of the first output signal. Absolute values of voltages of the effective levels of the first output signal and the second output signal may be approximately the same.

In this example, a first output signal provided by the first output end OUT1 may be configured to start a P-type transistor in a pixel circuit (i.e., an effective level of the first output signal is a low level), and a second output signal provided by the second output end OUT2 may be configured to start an N-type transistor in a pixel circuit (i.e., an effective level of the second output signal is a high level). In some examples, the first output signal and the second output signal may be transmitted to a pixel circuit as scan signals. In some examples, a first output signal provided by a first output end of a present stage drive control circuit may be transmitted to a signal input end of a next stage drive control circuit as an input signal of the next stage drive control circuit. However, the embodiment is not limited thereto.

In this exemplary implementation mode, the second output circuit 12 may include an inverting sub-circuit, and the inverting sub-circuit may include the twenty-first transistor T21 and the twenty-seventh transistor T27. A polarity of an effective level (i.e., a low level) of a second power supply signal provided by the second power supply line VGL is opposite to a polarity of an effective level (i.e., a high level) for starting the twenty-first transistor T21, and a polarity of an effective level (i.e., a high level) of the second power supply signal is opposite to a polarity of an effective level (i.e., a low level) for starting the twenty-seventh transistor T27. In this example, by connecting the second output end at the twenty-second node N22, a signal of the twenty-third node N23 (i.e., the first control node) may be inverted and output to obtain a second output signal, thus the drive control circuit can provide two different output signals.

Figure 27:
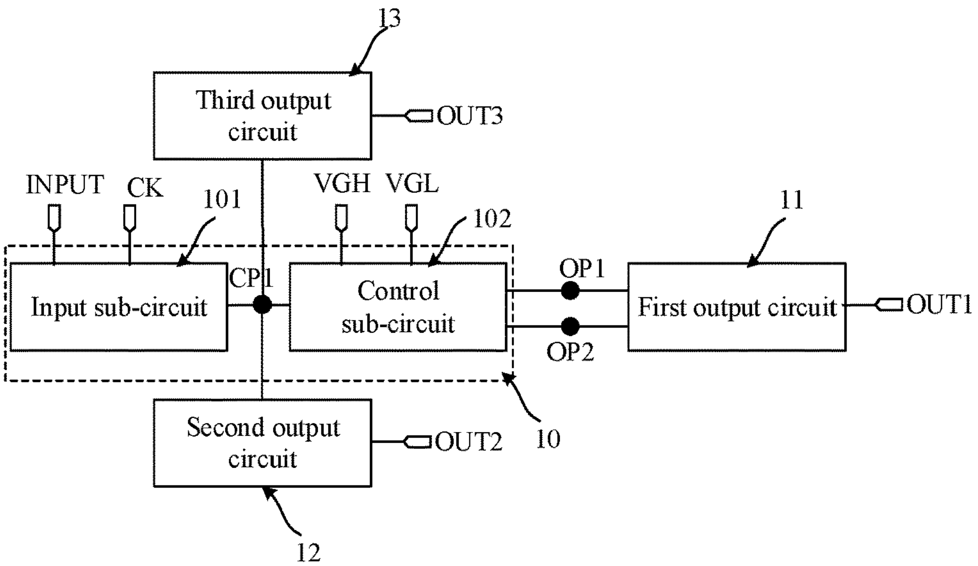
FIG. 27 is another schematic diagram of a structure of a drive control circuit according to at least one embodiment of the present disclosure.

FIG. 27 is another schematic diagram of a structure of a drive control circuit according to at least one embodiment of the present disclosure. As shown in FIG. 27, the drive control circuit of the embodiment may include: an input circuit 10, a first output circuit 11, a second output circuit 12, and a third output circuit 13. The input circuit 10 may include an input sub-circuit 101 and a control sub-circuit 102. The input sub-circuit 101 is electrically connected with a signal input end INPUT, a first clock end CK, and a first control node CP1, and is configured to control a potential of the first control node CP1 under control of the signal input end INPUT and the first clock end CK. The control sub-circuit 102 is electrically connected with the first control node CP1, a first power supply line VGH, a second power supply line VGL, a first output control node OP1, and a second output control node OP2, and is configured to control potentials of the first output control node OP1 and the second output control node OP2 under control of the first control node CP1. The first output circuit 11 is electrically connected with the first output control node OP1, the second output control node OP2, and a first output end OUT1, and is configured to control the first output end OUT1 to output a first output signal under control of the first output control node OP1 and the second output control node OP2. The second output circuit 12 is electrically connected with the first control node CP1 and a second output end OUT2, and is configured to control the second output end OUT2 to output a second output signal under control of the first control node CP1. The third output circuit 13 is electrically connected with the first control node CP1 and a third output end OUT3, and is configured to control the third output end OUT3 to output a third output signal under control of the first control node CP1. Among them, the first output signal, the second output signal, and the third output signal are all different. However, the embodiment is not limited thereto. In other examples, the third output circuit may be electrically connected with the first output control node and the third output end, and is configured to control the third output end to output a third output signal under control of the first output control node. Or, the third output circuit may be electrically connected with the first output end and the third output end, and is configured to control the third output end to output a third output signal under control of the first output end.

Figure 28:
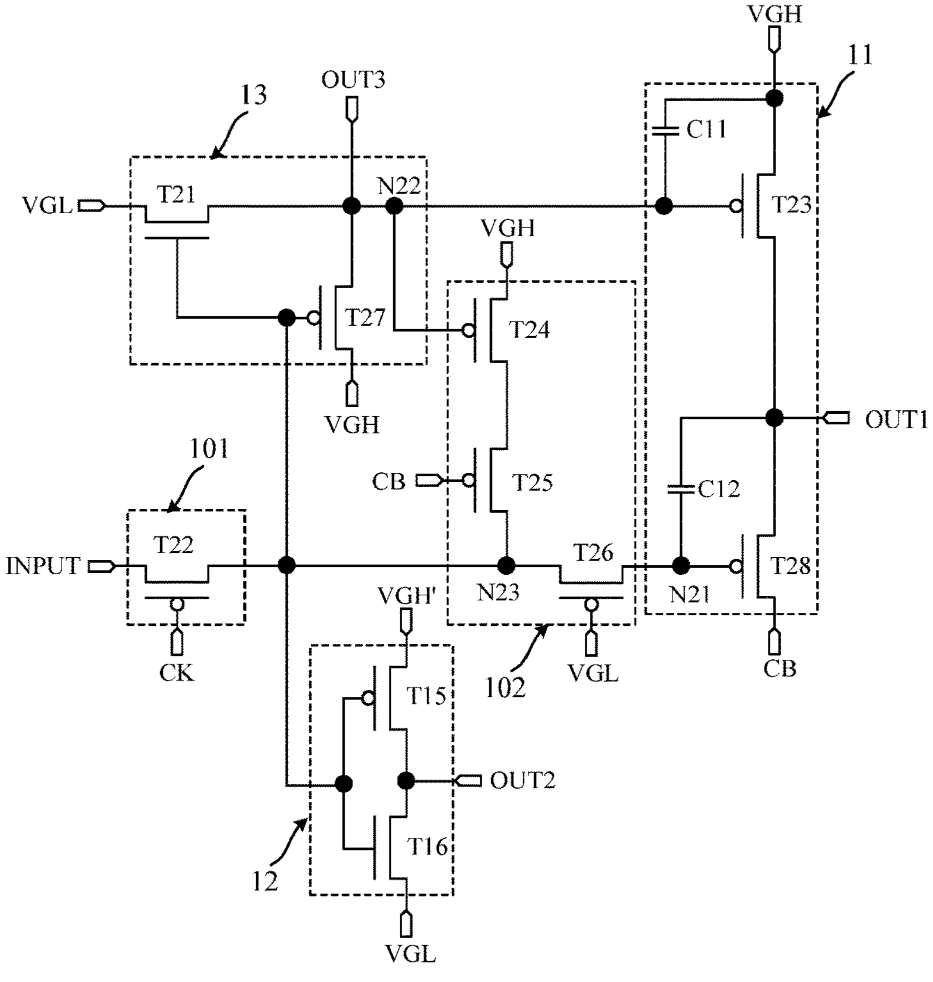
FIG. 28 is another equivalent circuit diagram of a drive control circuit according to at least one embodiment of the present disclosure.
Figure 29:
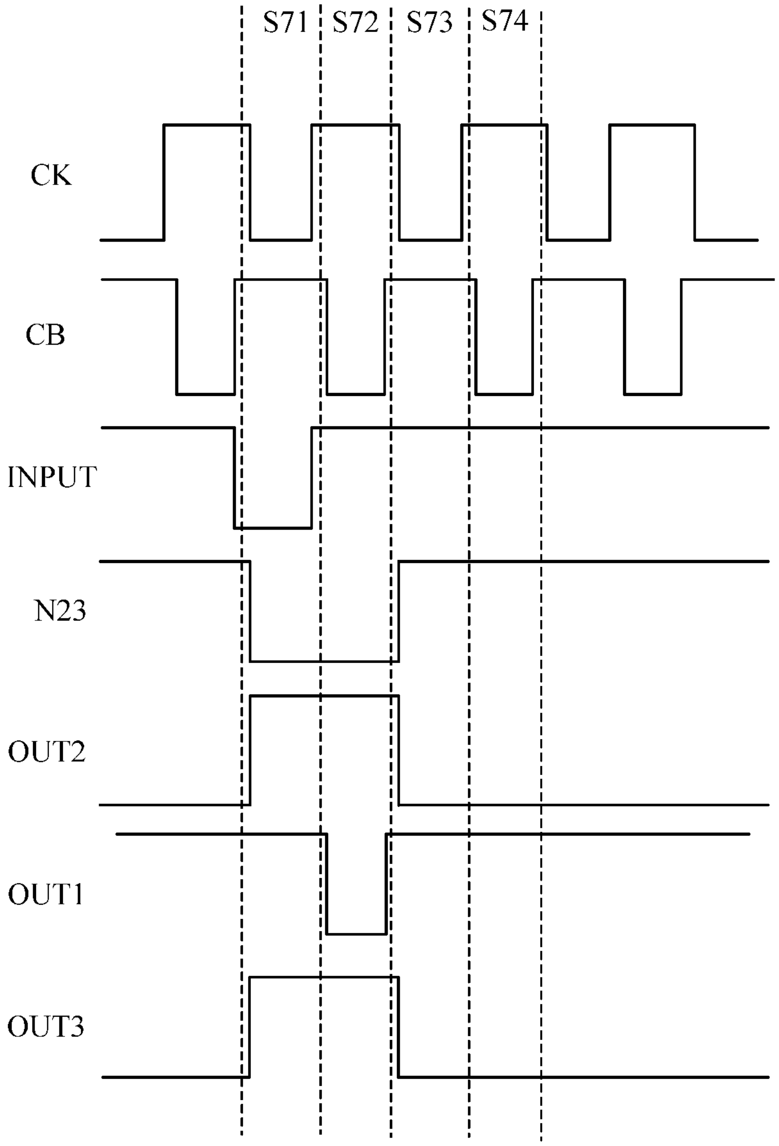
FIG. 29 is a working timing diagram of the drive control circuit provided in FIG. 28.

FIG. 28 is an equivalent circuit diagram of a drive control circuit according to at least one embodiment of the present disclosure. FIG. 29 is a working timing diagram of the drive control circuit provided in FIG. 28.

In some exemplary implementation modes, as shown in FIG. 28, an input sub-circuit 101 may include a twenty-second transistor T22. A control sub-circuit 102 may include a twenty-fourth transistor T24, a twenty-fifth transistor T25, and a twenty-sixth transistor T26. A first output circuit 11 may include a twenty-third transistor T23, a twenty-eighth transistor T28, an eleventh capacitor C11, and a twelfth capacitor C12. A second output circuit 12 may include a fifteenth transistor T15 and a sixteenth transistor T16. A third output circuit 13 may include a twenty-first transistor T21 and a twenty-seventh transistor T27.

A connection relationship of transistors and capacitors of the drive control circuit of the embodiment may be referred to description of the drive control circuit shown in FIG. 20, and therefore will not be repeated here.

In this example, a twenty-first node N21 and a twenty-second node N22 may be output control nodes. Among them, the twenty-second node N22 is a first output control node, and the twenty-first node N21 is a second output control node. A twenty-third node N23 may be a first control node. A third output end OUT3 is directly electrically connected with the twenty-second node N22. The fifteenth transistor T15 is a first output transistor, and the sixteenth transistor T16 is a second output transistor.

In some examples, the twenty-first transistor T21 and the sixteenth transistor T16 may be second semiconductor-type transistors, for example, may be N-type transistors. A twenty-second transistor T22 to a twenty-eighth transistor T28 and the fifteenth transistor T15 may be first semiconductor-type transistors, for example, may be P-type transistors. However, the embodiment is not limited thereto.

As shown in FIG. 29, a working process of a drive control circuit of the embodiment may be referred to description of working processes in FIG. 20 and FIG. 21, and therefore will not be repeated here.

As shown in FIG. 29, a second output end OUT2 and the third output end OUT3 both output high-level signals in a first stage S71 and a second stage S72, and output low-level signals in other stages. A first output end OUT1 outputs a low-level signal in the second stage S72 and outputs a high-level signal in other stages.

In this example, polarities of effective levels of a first output signal and a second output signal are opposite, and polarities of effective levels of the second output signal and a third output signal are the same. For example, an effective level of the first output signal is a low level, and effective levels of the second output signal and the third output signal are high levels. Time lengths of effective levels of the first output signal and the second output signal within a time length of one frame are different, and a time length of an effective level of the second output signal may be greater than a time length of an effective level of the first output signal. For example, a time length of an effective level of the second output signal may be greater than 1.5 times a time length of an effective level of the first output signal. Absolute values of voltages of effective levels of the first output signal and the second output signal are different, wherein an absolute value of a voltage of the effective level of the second output signal may be greater than an absolute value of a voltage of the effective level of the first output signal. Absolute values of voltages of effective levels of the second output signal and the third output signal are different, wherein an absolute value of a voltage of the effective level of the second output signal may be greater than an absolute value of a voltage of the effective level of the third output signal. Time lengths of effective levels of the second output signal and the third output signal within a time length of a frame may be approximately the same.

In this example, a first output signal provided by the first output end OUT1 may be configured to start a P-type transistor in a pixel circuit (i.e. an effective level of the first output signal is a low level), a second output signal provided by the second output end OUT2 and a third output signal provided by the third output end OUT3 may be configured to start an N-type transistor in a pixel circuit (i.e., effective levels of the second output signal and the third output signal are high levels). In some examples, a first output signal provided by a first output end of a present stage drive control circuit may be transmitted to a signal input end of a next stage drive control circuit as an input signal of the next stage drive control circuit. However, the embodiment is not limited thereto.

In this example, the second output circuit 12 may include an inverting sub-circuit, the inverting sub-circuit may include the fifteenth transistor T15 and the sixteenth transistor T16, and may achieve performing an inverting processing on a signal of the twenty-third node N23 (i.e., the first control node). The third output circuit 13 may include an inverting sub-circuit, the inverting sub-circuit may include the twenty-first transistor T21 and the twenty-seventh transistor T27, and may achieve performing an inverting processing on a signal of the twenty-third node N23 (i.e., the first control node). In this example, the drive control circuit may output three different signals, and drive requirements of different types of pixel circuits may be met.

The above drive control circuit provided by the embodiment may be combined as required, so that the drive control circuit can output at least two different signals, thereby meeting drive requirements of different types of pixel circuits. The embodiment is not limited thereto.

Figure 30:
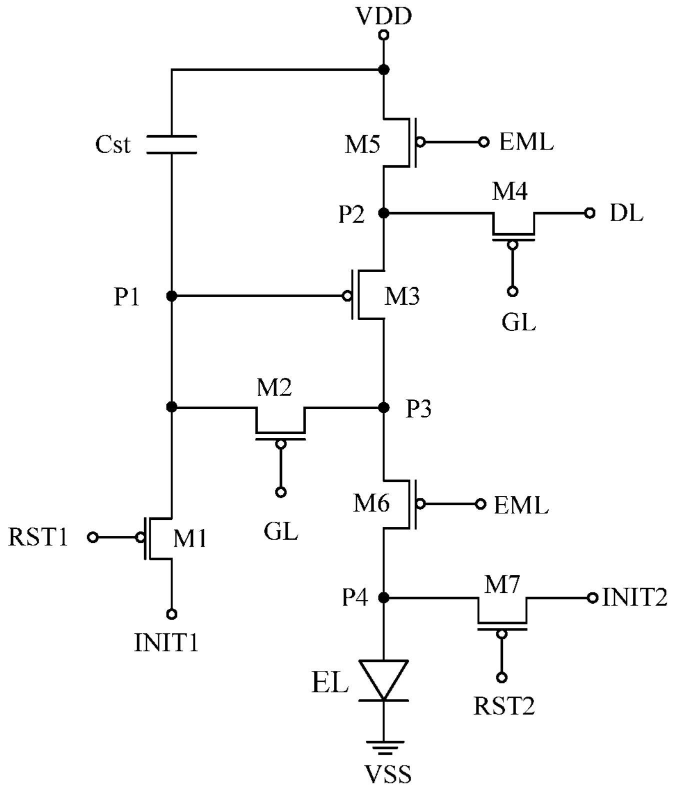
FIG. 30 is an equivalent circuit diagram of a pixel circuit according to at least one embodiment of the present disclosure.
Figure 31:
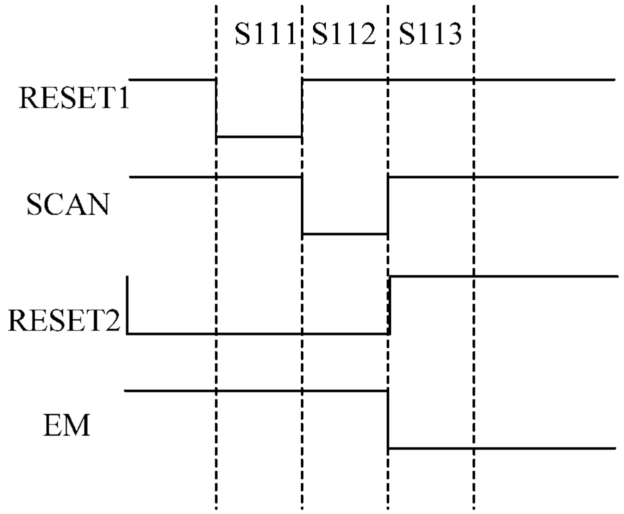
FIG. 31 is a working timing diagram of the pixel circuit provided in FIG. 30.

FIG. 30 is an equivalent circuit diagram of a pixel circuit according to at least one embodiment of the present disclosure. FIG. 31 is a working timing diagram of the pixel circuit provided in FIG. 30. The pixel circuit of the exemplary embodiment is described by taking a 7T1C structure as an example. However, the embodiment is not limited thereto.

In some exemplary implementations, as shown in FIG. 30, the pixel circuit of this example includes six switch transistors (M1, M2, and M4 to M7), one drive transistor M3, and a storage capacitor Cst. The six switch transistors are a data writing transistor M4, a threshold compensation transistor M2, a first light emitting control transistor M5, a second light emitting control transistor M6, a first reset transistor M1, and a second reset transistor M7 respectively. A light emitting element EL includes an anode, a cathode, and an organic emitting layer disposed between the anode and the cathode.

In some exemplary implementation modes, the drive transistor and the six switch transistors may be P-type transistors, or may be N-type transistors. Adopting a same type of transistors in a pixel circuit may simplify a process flow, reduce a process difficulty of a display substrate, and improve a yield of products. In some possible implementation modes, the drive transistor and the six switch transistors may include a P-type transistor and an N-type transistor.

In some exemplary implementation modes, Low Temperature Poly-Silicon thin film transistors, or oxide thin film transistors, or a Low Temperature Poly-Silicon thin film transistor and an oxide thin film transistor may be adopted as the drive transistor and the six switch transistors. An active layer of a Low Temperature Poly-Silicon thin film transistor is made of Low Temperature Poly-Silicon (LTPS), and an active layer of an oxide thin film transistor is made of an oxide semiconductor (Oxide). A Low-temperature Poly-Silicon thin film transistor has advantages such as a high mobility and fast charging, while an oxide thin film transistor has an advantage such as a low leakage current. The Low Temperature Poly-Silicon thin film transistor and the oxide thin film transistor are integrated on one display substrate to form a Low Temperature Polycrystalline Oxide (LTPO) display substrate, and advantages of both the Low Temperature Poly-Silicon thin film transistor and the oxide thin film transistor may be utilized, which may achieve low frequency drive, reduce power consumption, and improve display quality.

In some exemplary implementation modes, as shown in FIG. 30, a fourth power supply line VDD is configured to provide a constant high-level signal to the pixel circuit, and a fifth power supply line VSS is configured to provide a constant low-potential signal to the pixel circuit. A scan line GL is configured to provide a scan signal SCAN to the pixel circuit, a data line DL is configured to provide a data signal DATA to the pixel circuit, a light emitting control line EML is configured to provide a light emitting control signal EM to the pixel circuit, a first reset control line RST1 is configured to provide a first reset control signal RESET1 to the pixel circuit, and a second reset control line RST2 is configured to provide a second reset control signal RESET2 to the pixel circuit. In some examples, in an n-th row pixel circuit, the first reset control line RST1 may be electrically connected with a scan line GL of an (n−1)-th row pixel circuit, to be inputted with a scan signal SCAN(n−1), that is, a first reset control signal RESET1(*n*) is the same as the scan signal SCAN(n−1). The second reset control line RST2 may be electrically connected with a scan line GL of the n-th row pixel circuit, to be inputted with a scan signal SCAN(n), that is, a second reset control signal RESET2(*n*) is the same as the scan signal SCAN(n). In some examples, the second reset control line RST2 with which an n-th row pixel circuit is electrically connected and the first reset control line RST1 with which an (n+1)-th row pixel circuit is electrically connected may be of an integral structure. Among them, n is an integer. Thus, signal lines of a display substrate may be reduced, and a narrow frame design of the display substrate may be achieved. However, the embodiment is not limited thereto.

In some exemplary implementation modes, a first initial signal line INIT1 is configured to provide a first initial signal to the pixel circuit, a second initial signal line INIT2 is configured to provide a second initial signal to the pixel circuit. Magnitudes of the first initial signal and the second initial signal may be the same or different. For example, the first initial signal and the second initial signal may be constant voltage signals, and their magnitudes may be between a first voltage signal and a second voltage signal, but not limited to that.

In some exemplary implementation modes, as shown in FIG. 30, a control electrode of a data writing transistor M4 is electrically connected with a scan line GL, a first electrode of the data writing transistor M4 is electrically connected with a data line DL, and a second electrode of the data writing transistor M4 is electrically connected with a first electrode of a drive transistor M3. A gate of a threshold compensation transistor M2 is electrically connected with a scan line GL, a first electrode of the threshold compensation transistor M2 is electrically connected with a gate of the drive transistor M3, and a second electrode of the threshold compensation transistor M2 is electrically connected with a second electrode of the drive transistor M3. A gate of a first light emitting control transistor M5 is electrically connected with a light emitting control line EML, a first electrode of the first light emitting control transistor M5 is electrically connected with a fourth power supply line VDD, and a second electrode of the first light emitting control transistor M5 is electrically connected with the first electrode of the drive transistor M3. A gate of a second light emitting control transistor M6 is electrically connected with the light emitting control line EML, a first electrode of the second light emitting control transistor M6 is electrically connected with the second electrode of the drive transistor M3, and a second electrode of the second light emitting control transistor M6 is electrically connected with an anode of the light emitting element EL. A first reset transistor M1 is electrically connected with the gate of the drive transistor M3 and configured to reset the gate of the drive transistor M3, and a second reset transistor M7 is electrically connected with the anode of the light emitting element EL and configured to reset the anode of the light emitting element EL. A gate of the first reset transistor M1 is electrically connected with a first reset control line RST1, a first electrode of the first reset transistor M1 is electrically connected with a first initial signal line INIT1, and a second electrode of the first reset transistor M1 is electrically connected with the gate of the drive transistor M3. A gate of the second reset transistor M7 is electrically connected with a second reset control line RST2, a first electrode of the second reset transistor M7 is electrically connected with a second initial signal line INIT2, and a second electrode of the second reset transistor M7 is electrically connected with the anode of the light emitting element EL. A first electrode plate of a storage capacitor Cst is electrically connected with the gate of the drive transistor M3, and a second electrode plate of the storage capacitor Cst is electrically connected with the fourth power supply line VDD.

In this example, a first pixel node P1 is a connection point for the storage capacitor Cst, the first reset transistor M1, the drive transistor M3, and the threshold compensation transistor M2, a second pixel node P2 is a connection point for the first light emitting control transistor M5, the data writing transistor M4, and the drive transistor M3, a third pixel node P3 is a connection point for the drive transistor M3, the threshold compensation transistor M2, and the second light emitting control transistor M6, and a fourth pixel node P4 is a connection point for the second light emitting control transistor M6, the second reset transistor M7, and the light emitting element EL.

A working process of the pixel circuit illustrated in FIG. 30 will be described below with reference to FIG. 31. The description is made by taking a case in which multiple transistors included in the pixel circuit shown in FIG. 30 are all P-type transistors as an example.

In some exemplary embodiments, as shown in FIG. 31, during one frame display period, the working process of the pixel circuit includes: a first stage S111, a second stage S112, and a third stage S113.

The first stage S111 is referred to as a reset stage. A first reset control signal RESET1 provided by the first reset control line RST1 is a low-level signal, so that the first reset transistor M1 is turned on, and a first initial signal provided by the first initial signal line INIT1 is provided to the first pixel node P1 to initialize the first pixel node P1 and clear an original data voltage in the storage capacitor Cst. A scan signal SCAN provided by the scan line GL is a high-level signal, a light emitting control signal EM provided by the light emitting control line EML is a high-level signal, so that the data writing transistor M4, the threshold compensation transistor M2, the first light emitting control transistor M5, and the second light emitting control transistor M6 are turned off, a second reset control signal RESET2 provided by the second reset control line RST2 is a low-level signal, the second reset transistor M7 is turned on, and a second initial signal provided by the second initial signal line INIT2 is provided to the fourth pixel node P4 to reset the anode of the light emitting element EL. In this stage, the light emitting element EL does not emit light.

The second stage S112 is referred to as a data writing stage or a threshold compensation stage. A scan signal SCAN provided by the scan line GL is a low-level signal, a first reset control signal RESET1 provided by the first reset control line RST1 and a light emitting control signal EM provided by the light emitting control line EML are both high-level signals, and the data line DL outputs a data signal DATA. In this stage, since the first electrode plate of the storage capacitor Cst is at a low level, the drive transistor M3 is turned on. The scan signal SCAN is a low-level signal, so that the threshold compensation transistor M2 and the data writing transistor M4 are turned on. The threshold compensation transistor M2 and the data writing transistor M4 are turned on, so that a data voltage Vdata output by the data line DL is provided to the first pixel node P1 through the second pixel node P2, the turned-on drive transistor M3, the third pixel node P3, and the turned-on threshold compensation transistor M2, and a difference between the data voltage Vdata output by the data line DL and a threshold voltage of the drive transistor M3 is charged into the storage capacitor Cst. A voltage of the first electrode plate (that is, the first pixel node P1) of the storage capacitor Cst is Vdata-|Vth|, wherein Vdata is the data voltage output by the data line DL, and Vth is the threshold voltage of the drive transistor M3. A second reset control signal provided by the second reset control line RST2 is a low-level signal, the second reset transistor M7 is turned on, so that a second initial signal provided by the second initial signal line INIT2 is provided to the anode of the light emitting element EL to initialize (reset) the anode of the light emitting element EL and clear a pre-stored voltage therein, so as to complete initialization, thereby ensuring that the light emitting element EL does not emit light. The first reset control signal RESET1 provided by the first reset control line RST1 is a high-level signal, so that the first reset transistor M1 is turned off. The light emitting control signal EM provided by the light emitting control signal line EML is a high-level signal, so that the first light emitting control transistor M5 and the second light emitting control transistor M6 are turned off.

The third stage S113 is referred to as a light emitting stage. A light emitting control signal EM provided by the light emitting control signal line EML is a low-level signal, and a scan signal SCAN provided by the scan line GL and a first reset control signal RESET1 provided by the first reset control line RST1 are high-level signals. A light emitting control signal EM provided by the light emitting control signal line EML is a low-level signal, so that the first light emitting control transistor M5 and the second light emitting control transistor M6 are turned on, and a high-level signal output by the first power supply line PL1 provides a drive voltage to the anode of the light emitting element EL through the turned-on first light emitting control transistor M5, the drive transistor M3, and the second light emitting control transistor M6 to drive the light emitting element EL to emit light. A second reset control signal RESET2 provided by the second reset control line RST2 is a high-level signal, and the second reset transistor M7 is turned off.

In a drive process of the pixel circuit, a drive current flowing through the drive transistor M3 is determined by a voltage difference between the gate and the first electrode of the drive transistor T3. Since a voltage of the first pixel node P1 is Vdata-|Vth|, a drive current of the drive transistor M3 is as follows.

$$I=K\times(Vgs-Vth)^2=K\times[(VDD-V\text{data}+|Vth|)-Vth]^2=K\times[VDD-V\text{data}]^2.$$

Among them, I is the drive current flowing through the drive transistor M3, that is, a drive current for driving the light emitting element EL, K is a constant, Vgs is a voltage difference between the gate and the first electrode of the drive transistor M3, Vth is a threshold voltage of the drive transistor M3, Vdata is a data voltage output by the data line DL, and VDD is a high-level signal output by the first power supply line VDD.

It may be seen from the above formula that a current flowing through the light emitting element EL has nothing to do with the threshold voltage of the drive transistor M3. Therefore, the pixel circuit of the embodiment may well compensate the threshold voltage of the drive transistor M3.

In some examples, a first output signal of the drive control circuit shown in FIG. 4 or 6 may be provided as a light emitting control signal to the pixel circuit shown in FIG. 30, and a second output signal of the drive control circuit shown in FIG. 4 or 6 may be provided as a second reset control signal to the pixel circuit shown in FIG. 30. In other examples, the threshold compensation transistor M2 of the pixel circuit shown in FIG. 30 may be an N-type transistor, the data writing transistor M4 may be a P-type transistor, a first output signal of the drive control circuit shown in FIG. 2 or FIG. 12 may be configured to start a data writing transistor M4 in a pixel circuit, and a second output signal of the drive control circuit shown in FIG. 2 or FIG. 12 may be configured to start a threshold compensation transistor M2 in the pixel circuit. In other examples, the second reset transistor M7 of the pixel circuit shown in FIG. 30 may be an N-type transistor, a first output signal of the drive control circuit shown in FIG. 16 or FIG. 18 may be provided to a pixel circuit as a light emitting control signal, and a second output signal of the drive control circuit shown in FIG. 16 or FIG. 18 may be provided to the pixel circuit as a second reset control signal. In other examples, the first light emitting control transistor and the second light emitting control transistor of the pixel circuit shown in FIG. 30 may be N-type transistors, a first output signal of the drive control circuit shown in FIG. 22 or FIG. 24 may be provided to a pixel circuit as a light emitting control signal, and a second output signal shown in FIG. 22 or FIG. 24 may be provided to the pixel circuit as a second reset control signal. However, the embodiment is not limited thereto.

An embodiment of the present disclosure also provides a gate driver circuit including multiple cascaded drive control circuits.

Figure 32:
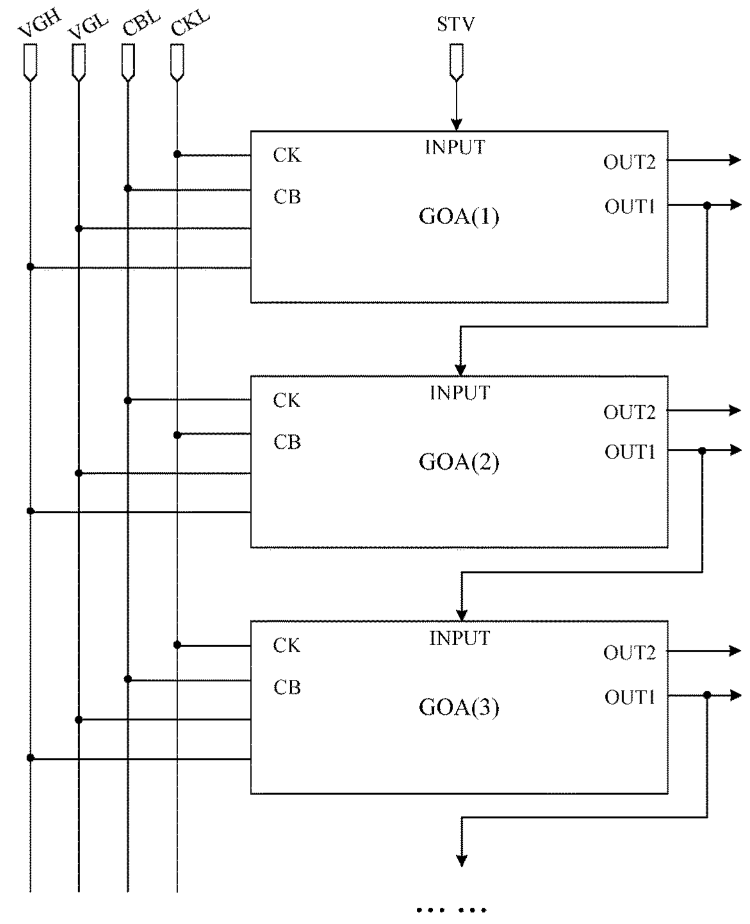
FIG. 32 is a schematic diagram of a gate driver circuit according to at least one embodiment of the present disclosure.

FIG. 32 is a schematic diagram of a gate driver circuit according to at least one embodiment of the present disclosure. As shown in FIG. 32, the gate driver circuit provided by the exemplary embodiment may include multiple cascaded drive control circuits GOA. A structure of a drive control circuit may be as described in the foregoing embodiments, and the implementation principle and the implementation effect thereof are similar, so will not be described here.

In the exemplary embodiment, as shown in FIG. 32, a signal input end INPUT of a first stage drive control circuit GOA (1) is electrically connected with a start signal line STV, and a signal input end of an (i+1)-th stage drive control circuit GOA (i+1) is electrically connected with a first output end of an i-th stage drive control circuit GOA (i). Herein, i is an integer greater than 0.

In some exemplary implementation modes, a first clock end CK of multiple drive control circuits is electrically connected with a first clock signal line CKL and is configured to receive a first clock signal; a second clock end CB is electrically connected with a second clock signal line CBL and is configured to receive a second clock signal. The first clock signal and the second clock signal may both be pulse signals. For example, duty ratios of the first clock signal and the second clock signal may be approximately the same, and the first clock signal and the second clock signal are not at a low level simultaneously. The multiple drive control circuits are also electrically connected with a second power supply line VGL continuously providing a low-level signal and a first power supply line VGH continuously providing a high-level signal, respectively. However, the embodiment is not limited thereto.

In some exemplary implementation modes, a first clock end CK of a k-th stage drive control circuit is electrically connected with a first clock signal line CKL, a second clock end CB is electrically connected with a second clock signal line CBL; a first clock end CK of a (k+1)-th stage drive control circuit is electrically connected with a second clock signal line CBL, and a second clock end CB is electrically connected with a first clock signal line CKL. Among them, a value of k is 2n or 2n−1, and n is an integer greater than 0. Two cascaded drive control circuits of the gate driver circuit of this example may be used as a repetition unit with a minimum period to drive two rows of sub-pixels of a display region. However, the embodiment is not limited thereto.

Figure 33:
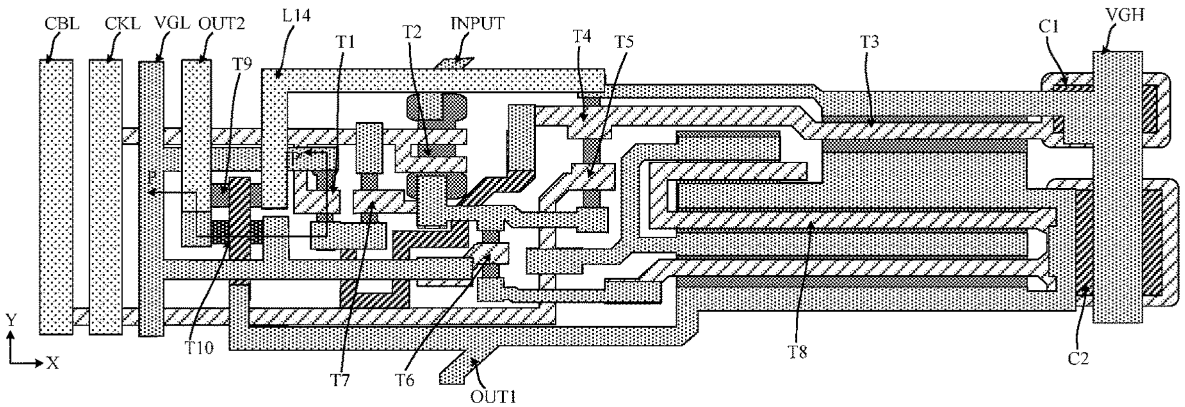
FIG. 33 is a top view of a drive control circuit according to at least one embodiment of the present disclosure.
Figure 34:
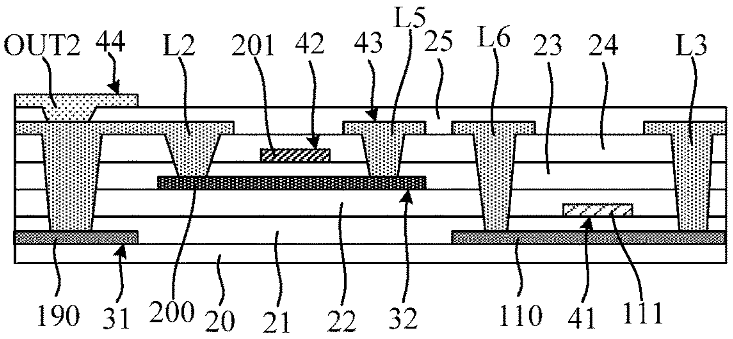
FIG. 34 is a partial cross-section view taken along a P-P' direction in FIG. 33.

FIG. 33 is a top view of a drive control circuit according to at least one embodiment of the present disclosure. FIG. 34 is a partial cross-section view taken along a P-P' direction in FIG. 33. An equivalent circuit of the drive control circuit of this example is shown in FIG. 2. In this exemplary implementation mode, description is made by taking a case in which a first transistor T1 to a ninth transistor T9 in the drive control circuit are P-type transistors and are Low Temperature Poly-Silicon thin film transistors, and a tenth transistor T10 is an N-type transistor and is an oxide thin film transistor, as an example. However, the embodiment is not limited thereto.

In some exemplary implementation modes, as shown in FIG. 33, in a plane parallel to a display substrate, a second output circuit is located between a second power supply line VGL and an input circuit in a first direction X, a first output circuit and a first power supply line VGH are located on a side of the input circuit away from a second input circuit in the first direction X, and clock signal lines (e.g., including a first clock signal line CKL and a second clock signal line CBL) are located on a side of the second power supply line VGL away from the second output circuit in the first direction X. In other words, the clock signal line, the second power supply line VGL, the second output circuit, the input circuit, and the first output circuit are sequentially arranged along the first direction X. Among them, the first clock signal line CKL may be located between the second clock signal line CBL and the second power supply line VGL. An orthographic projection of the first power supply line VGH on a base substrate is overlapped with an orthographic projection of the first output circuit on the base substrate. However, the embodiment is not limited thereto.

In some exemplary implementation modes, as shown in FIG. 33, in a plane parallel to a display substrate, a ninth transistor T9 and a tenth transistor T10 of the second output circuit may be sequentially arranged along a second direction Y. A third transistor T3 and an eighth transistor T8 of the first output circuit may be sequentially arranged along the second direction Y. A first capacitor C1 and a second capacitor C2 may be sequentially arranged along the second direction Y, and an orthographic projection of the first power supply line VGH on a base substrate is overlapped with an orthographic projection of the first capacitor C1 on the base substrate and an orthographic projection of the second capacitor C2 on the base substrate. The third transistor T3 and the first capacitor C1 are adjacent in the first direction X, and the eighth transistor T8 and the second capacitor C2 are adjacent in the first direction X. A seventh transistor T7 of the input circuit is located between a first transistor T1 and a second transistor T2 in the first direction X, and the first transistor T1 is adjacent to the ninth transistor T9 and the tenth transistor T10 of the second output circuit in the first direction X. A fourth transistor T4 and a fifth transistor T5 are sequentially arranged along the second direction Y, and are located between the second transistor T2 and the eighth transistor T8 in the first direction X. A sixth transistor T6 is located between the second transistor T2 and the fifth transistor T5 in the first direction X. The second direction Y and the first direction X are located in a same plane, and the first direction X intersects with the second direction Y, for example, the first direction X is perpendicular to the second direction Y.

In some exemplary implementation modes, as shown in FIG. 34, in a direction perpendicular to a display substrate, a non-display region of the display substrate may include: a base substrate 20, and a first semiconductor layer 31, a first conductive layer 41, a second semiconductor layer 32, a second conductive layer 42, a third conductive layer 43, and a fourth conductive layer 44 sequentially disposed on the base substrate 20. Among them, a first insulation layer 21 is disposed between the first semiconductor layer 31 and the first conductive layer 41, a second insulation layer 22 is disposed between the first conductive layer 41 and the second semiconductor layer 32, a third insulation layer 23 is disposed between the second semiconductor layer 32 and the second conductive layer 42, a fourth insulation layer 24 is disposed between the second conductive layer 42 and the third conductive layer 43, and a fifth insulation layer 25 is disposed between the third conductive layer 43 and the fourth conductive layer 44. In some examples, the first insulation layer 21 to the fifth insulation layer 25 may all be inorganic insulation layers. However, the embodiment is not limited thereto.

Figure 35A:
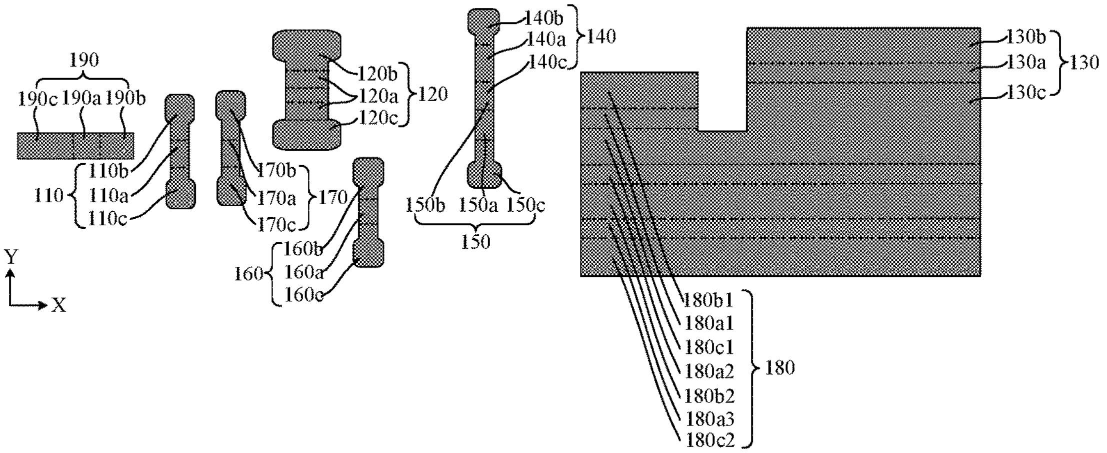
FIG. 35A is a top view of the drive control circuit after a first semiconductor layer is formed in FIG. 33.

FIG. 35A is a top view of the drive control circuit after a first semiconductor layer is formed in FIG. 33. As shown in FIG. 33 to FIG. 35A, the first semiconductor layer 31 of the non-display region at least includes active layers of multiple first semiconductor-type transistors of the drive control circuit. For example, the first semiconductor layer 31 at least includes: an active layer 110 of the first transistor T1, an active layer 120 of the second transistor T2, an active layer 130 of the third transistor T3, an active layer 140 of the fourth transistor T4, an active layer 150 of the fifth transistor T5, an active layer 160 of the sixth transistor T6, an active layer 170 of the seventh transistor T7, an active layer 180 of the eighth transistor T8, and an active layer 190 of the ninth transistor T9.

In some exemplary implementation modes, as shown in FIG. 35A, the active layer 110 of the first transistor T1, the active layer 120 of the second transistor T2, the active layer 130 of the third transistor T3, the active layer 140 of the fourth transistor T4, the active layer 150 of the fifth transistor T5, the active layer 160 of the sixth transistor T6, the active layer 170 of the seventh transistor T7, and the active layer 180 of the eighth transistor T8 all extend along the second direction Y, and the active layer 190 of the ninth transistor T9 extends along the first direction X.

In some exemplary implementation modes, as shown in FIG. 35A, the active layer 140 of the fourth transistor T4 and the active layer 150 of the fifth transistor T5 may be of an integral structure, for example, may be long strip-shaped. The active layer 130 of the third transistor T3 and the active layer 180 of the eighth transistor T8 may be of an integral structure, for example, in a shape of "□". However, the embodiment is not limited thereto.

In some exemplary implementation modes, a material of the first semiconductor layer 31 may include, for example, poly-silicon. An active layer may include at least one channel region and multiple doped regions. The channel region may not be doped with an impurity, and has characteristics of a semiconductor. The multiple doped regions may be on two sides of the channel region and doped with impurities, and thus have conductivity. The impurities may be changed according to a type of a transistor. A doped region of the active layer may be interpreted as a source electrode or a drain electrode of a transistor. For example, a first electrode of a transistor may correspond to a first doped region at a periphery of a channel region of an active layer and doped with an impurity, and a second electrode of the transistor may correspond to a second doped region at the periphery of the channel region of the active layer and doped with an impurity. In addition, the parts of active layers between transistors may be interpreted as wirings doped with impurities, and may be used for electrically connecting the transistors.

In some exemplary implementation modes, as shown in FIG. 35A, the active layer 110 of the first transistor T1 may include: a channel region 110*a*, and a first doped region 110*b* and a second doped region 110*c* located on two sides of the channel region 110*a* along a second direction Y. The active layer 120 of the second transistor T2 may include: a channel region 120*a*, and a first doped region 120*b* and a second doped region 120*c* located on two sides of the channel region 120*a* along the second direction Y. The active layer 130 of the third transistor T3 may include: a channel region 130*a*, and a first doped region 130*b* and a second doped region 130*c* located on two sides of the channel region 130*a* along the second direction Y. The active layer 140 of the fourth transistor T4 may include: a channel region 140*a*, and a first doped region 140*b* and a second doped region 140*c* located on two sides of the channel region 140*a* along the second direction Y. The active layer 150 of the fifth transistor T5 may include: a channel region 150*a*, and a first doped region 150*b* and a second doped region 150*c* located on two side of the channel region 150*a* along the second direction Y. The first doped region 150*b* of the fifth transistor T5 is connected with the second doped region 140*c* of the fourth transistor T4. The active layer 160 of the sixth transistor T6 may include: a channel region 160*a*, and a first doped region 160*b* and a second doped region 160*c* located on two sides of the channel region 160*a* along the second direction Y. The active layer 170 of the seventh transistor T7 may include: a channel region 170*a*, and a first doped region 170*b* and a second doped region 170*c* located on two sides of the channel region 170*a* along the second direction Y. The active layer 180 of the eighth transistor T8 may include: channel regions 180*a*1, 180*a*2, and 180*a*3 arranged in sequence along the second direction Y, a first doped region 180*b*1 and a second doped region 180*cl* located on two sides of the channel region 180*al* along the second direction Y, and a third doped region 180*b*2 and a fourth doped region 180*c*2 located on two sides of the channel region 180*a*3 along the second direction Y. The second doped region 180*cl* of the eighth transistor T8 is connected with the second doped region 130*c* of the third transistor T3.

Figure 35B:
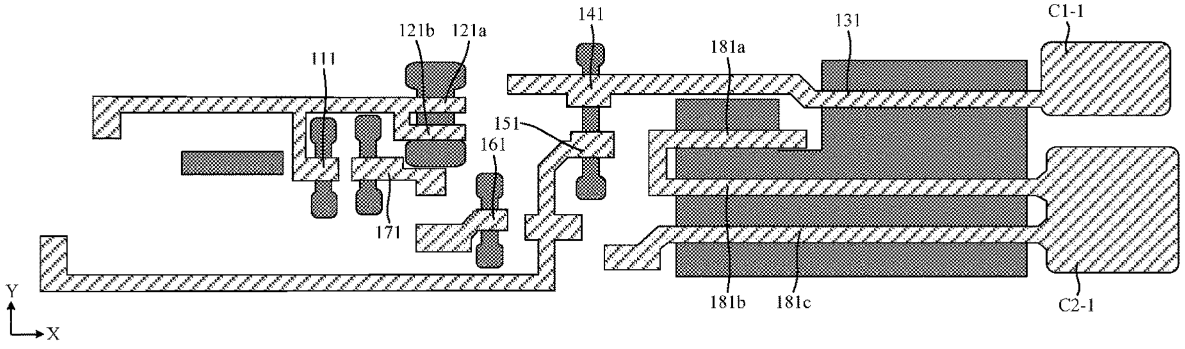
FIG. 35B is a top view of the drive control circuit after a first conductive layer is formed in FIG. 33.

FIG. 35B is a top view of the drive control circuit after a first conductive layer is formed in FIG. 33. As shown in FIG.

33 to FIG. 35B, the first conductive layer 41 of the non-display region at least includes a control electrode of a first semiconductor-type transistor of a drive control circuit and first electrode plates of multiple capacitors. For example, the first conductive layer 41 may include: a control electrode 111 of the first transistor T1, control electrodes 121*a* and 121*b* of the second transistor T2, a control electrode 131 of the third transistor T3, a control electrode 141 of the fourth transistor T4, a control electrode 151 of the fifth transistor T5, a control electrode 161 of the sixth transistor T6, a control electrode 171 of the seventh transistor T7, control electrodes 181*a*, 181*b*, and 181*c* of the eighth transistor T8, a first electrode plate C1-1 of the first capacitor C1, and a first electrode plate C2-1 of the second capacitor C2.

In some examples, as shown in FIG. 35B, the control electrode 111 of the first transistor T1 and the control electrodes 121*a* and 121*b* of the second transistor T2 may be of an integral structure. The control electrode 131 of the third transistor T3, the control electrode 141 of the fourth transistor T4, and the first electrode plate C1-1 of the first capacitor C1 may be of an integral structure. The control electrodes 181*a*, 181*b*, and 181*c* of the eighth transistor T8 and the first electrode plate C2-1 of the second capacitor C2 may be of an integral structure. However, the embodiment is not limited thereto.

In this example, the second transistor T2 may be a double-gate transistor and the eighth transistor T8 may be a triple-gate transistor to prevent and reduce occurrence of a leakage current. However, the embodiment is not limited thereto.

Figure 35C:
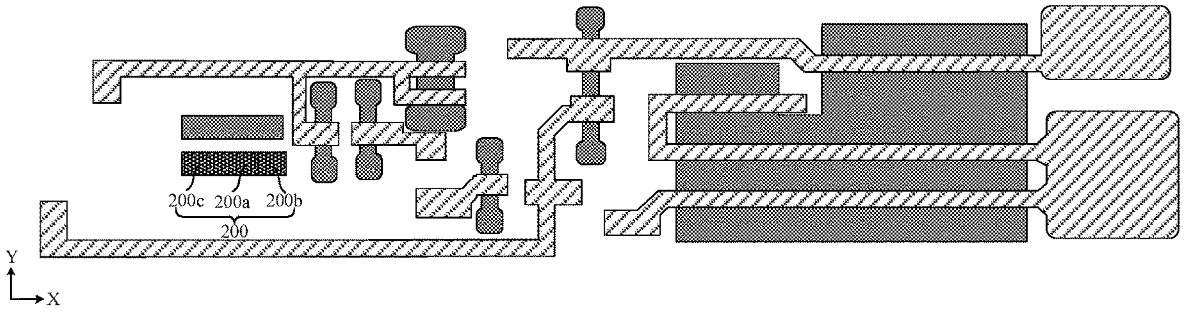
FIG. 35C is a top view of the drive control circuit after a second semiconductor layer is formed in FIG. 33.

FIG. 35C is a top view of the drive control circuit after a second semiconductor layer is formed in FIG. 33. As shown in FIG. 33 to FIG. 35C, the second semiconductor layer 32 of the non-display region at least includes an active layer of a second semiconductor-type transistor of the drive control circuit. For example, the second semiconductor layer 32 may include an active layer 200 of the tenth transistor T10. In some examples, a material of the second semiconductor layer 32 may include an IGZO. The active layer 200 of the tenth transistor T10 extends along the first direction X. The active layer 200 of the tenth transistor T10 may include: a channel region 200*a*, and a first region 200*b* and a second region 200*c* located on two sides of the channel region 200*a* along the first direction X. The first region 200*b* corresponds to a first electrode of the tenth transistor T10 and the second region 200*c* corresponds to a second electrode of the tenth transistor T10.

Figure 35D:
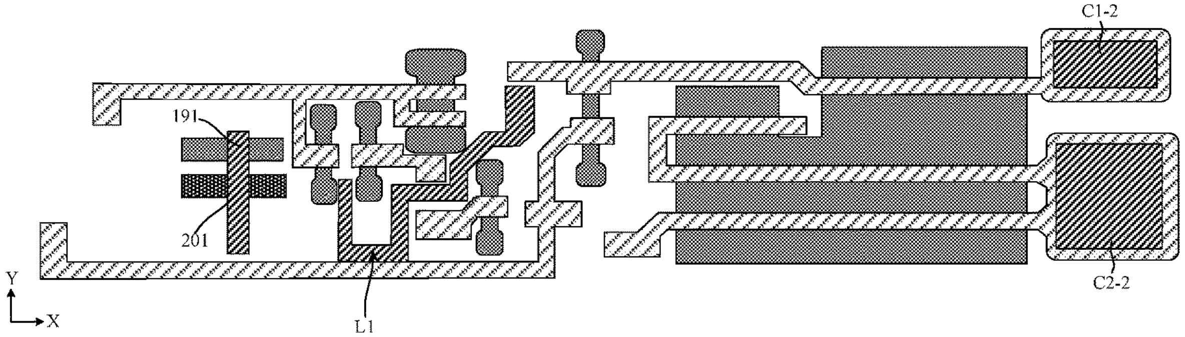
FIG. 35D is a top view of the drive control circuit after a second conductive layer is formed in FIG. 33.

FIG. 35D is a top view of the drive control circuit after a second conductive layer is formed in FIG. 33. As shown in FIG. 33 to FIG. 35D, the second conductive layer 42 of the non-display region at least includes a control electrode of a second semiconductor-type transistor of the drive control circuit and second electrode plates of multiple capacitors. For example, the second conductive layer 42 may include a control electrode 201 of the tenth transistor T10, a control electrode 191 of the ninth transistor T9, a second electrode plate C1-2 of the first capacitor C1, a second electrode plate C2-2 of the second capacitor C2, and a first connection electrode L1. An orthographic projection of the second electrode plate C1-2 of the first capacitor C1 on the base substrate is located within an orthographic projection of the first electrode plate C1-1 on the base substrate, and an orthographic projection of the second electrode plate C2-2 of the second capacitor C2 on the base substrate is located within an orthographic projection of the first electrode plate C2-1 on the base substrate. An orthographic projection of the first connection electrode L1 on the base substrate may not be overlapped with orthographic projections of the first semiconductor layer 31, the first conductive layer 41, and the second semiconductor layer 32 on the base substrate.

In some examples, as shown in FIG. 35D, the control electrode 191 of the ninth transistor T9 and the control electrode 201 of the tenth transistor T10 may be of an integral structure, for example, may be of a strip shape extending along the second direction Y. However, the embodiment is not limited thereto.

Figure 35E:
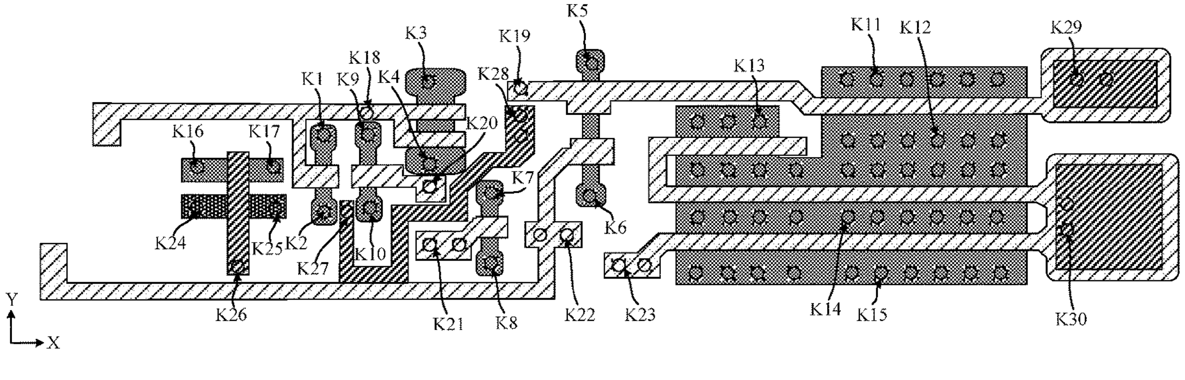
FIG. 35E is a top view of the drive control circuit after a fourth insulation layer is formed in FIG. 33.

FIG. 35E is a top view of the drive control circuit after a fourth insulation layer is formed in FIG. 33. As shown in FIG. 33 to FIG. 35E, multiple vias are formed on a fourth insulation layer 24 of the non-display region. The multiple vias may include multiple first type vias, multiple second type vias, multiple third type vias, and multiple fourth type vias. The fourth insulation layer 24, the third insulation layer 23, the second insulation layer 22, and the first insulation layer 21 within the first type via are removed to expose a surface of the first semiconductor layer 31. The fourth insulation layer 24, the third insulation layer 23, and the second insulation layer 22 within the second type via are removed to expose a surface of the first conductive layer 41. The fourth insulation layer 24 and the third insulation layer 23 within the third type via are removed to expose a surface of the second semiconductor layer 32. The fourth insulation layer 24 within the four type via is removed to expose a surface of the second conductive layer 42. For example, the first type vias may include a first via K1 to a seventeenth via K17, the second type vias may include an eighteenth via K18 to a twenty-third via K23, the third type vias may include a twenty-fourth via K24 and a twenty-fifth via K25, and the fourth type vias may include a twenty-sixth via K26 to a thirtieth via K30.

Figure 35F:
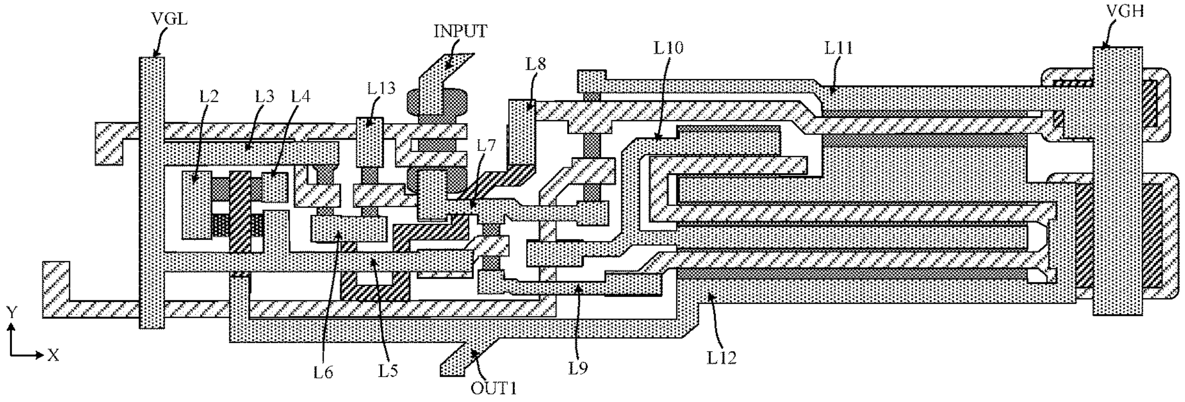
FIG. 35F is a top view of the drive control circuit after a third conductive layer is formed in FIG. 33.

FIG. 35F is a top view of the drive control circuit after a third conductive layer is formed in FIG. 33. As shown in FIG. 33 to FIG. 35F, the third conductive layer 43 of the non-display region may include multiple connection electrodes (for example, a second connection electrode L2 to a thirteenth connection electrode L13), the first output end OUT1, the signal input end INPUT, the first power supply line VGH, and the second power supply line VGL. The first power supply line VGH and the second power supply line VGL may both extend along the second direction Y. A signal input end INPUT of a present stage drive control circuit may be electrically connected with a first output end of a previous stage drive control circuit, for example, the two may be of an integral structure. However, the embodiment is not limited thereto. In other examples, a signal input end of a present stage drive control circuit may be located in a fourth conductive layer, and may be electrically connected with a first output end of a previous stage drive control circuit located in a third conductive layer through a connection electrode.

In some examples, as shown in FIG. 33 to FIG. 35F, the second connection electrode L2 may be electrically connected with the second doped region 190*c* of the active layer 190 of the ninth transistor T9 through the sixteenth via K16, and may also be electrically connected with the second region 200*c* of the active layer 200 of the tenth transistor T10 through the twenty-fourth via K24. The third connection electrode L3 may be electrically connected with the first doped region 110*b* of the active layer 110 of the first transistor T1 through the first via K1. The fifth connection electrode L5 may be electrically connected with the first region 200*b* of the active layer 200 of the tenth transistor T10 through the twenty-fifth via K25, and may also be electrically connected with the control electrode 161 of the sixth transistor T6 through two twenty-first vias K21 arranged side by side. The third connection electrode L3, the fifth connection electrode L5, and the second power supply line VGL may be of an integral structure. The fourth connection electrode L4 may be electrically connected with the first doped region 190*b* of the active layer 190 of the ninth transistor T9 through the seventeenth via K17. The sixth connection electrode L6 may be electrically connected with the second doped region 110*c* of the active layer 110 of the first transistor T1 through the second via K2, may also be electrically connected with the second doped region 170*c* of the active layer 170 of the seventh transistor T7 through the tenth via K10, and may also be electrically connected with the first connection electrode L1 through the twenty-seventh via K27. The seventh connection electrode L7 may be electrically connected with the second doped region 120*c* of the active layer 120 of the second transistor T2 through the fourth via K4, may also be electrically connected with the control electrode 171 of the seventh transistor T7 through the twentieth via K20, may also be electrically connected with the first doped region 160*b* of the active layer 160 of the sixth transistor T6 through the seventh via K7, and may also be electrically connected with the second doped region 150*c* of the active layer 150 of the fifth transistor T5 through the sixth via K6. The eighth connection electrode L8 may be electrically connected with the first connection electrode L1 through two twenty-eighth vias K28 arranged vertically, and may also be electrically connected with the control electrode 141 of the fourth transistor T4 through the nineteenth via K19. The ninth connection electrode L9 may be electrically connected with the second doped region 160*c* of the active layer 160 of the sixth transistor T6 through the eighth via K8, and may also be electrically connected with the control electrode 181*c* of the eighth transistor T8 through two twenty-third vias K23 arranged side by side. The tenth connection electrode L10 may be electrically connected with the control electrode 151 of the fifth transistor T5 through two twenty-second vias K22 arranged side by side, may also be electrically connected with the first doped region 180*b*1 of the active layer 180 of the eighth transistor T8 through three thirteenth vias K13 arranged side by side, and may also be electrically connected with the third doped region 180*b*2 of the active layer 180 of the eighth transistor T8 through ten fourteenth vias K14 arranged side by side. The eleventh connection electrode L11 may be electrically connected with the first doped region 140*b* of the active layer 140 of the fourth transistor T4 through the fifth via K5, and may also be electrically connected with the first doped region 130*b* of the active layer 130 of the third transistor T3 through multiple (e.g. six) eleventh vias K11 arranged side by side. The eleventh connection electrode L11 and the first power supply line VGH may be of an integral structure. The first power supply line VGH may be electrically connected with the second electrode plate C1-2 of the first capacitor C1 through two twenty-ninth vias K29 arranged side by side. The twelfth connection electrode L12 may be electrically connected with the second doped region 130*c* of the active layer 130 of the third transistor T3 through multiple (e.g. six) twelfth vias K12 arranged side by side, may also be electrically connected with the second doped region 180*cl* of the active layer 180 of the eighth transistor T8 through multiple (e.g. ten) twelfth vias K12 arranged side by side, may also be electrically connected with the fourth doped region 180*c*2 of the active layer 180 of the eighth transistor T8 through multiple (e.g. ten) fifteenth vias K15 arranged side by side, and may also be electrically connected with the second electrode plate C2-2 of the second capacitor C2 through two thirtieth vias K30 arranged vertically. The twelfth connection electrode L12 and the first output end OUT1 may be of an integral structure. The first output end OUT1 may be electrically connected with the control electrode 201 of the tenth transistor T10 through the twenty-sixth via K26. The thirteenth connection electrode L13 may be electrically connected with the first doped region 170*b* of the active layer 170 of the seventh transistor T7 through the ninth via K9, and may also be electrically connected with the control electrode 121*a* of the second transistor T2 through the eighteenth via K18. The signal input end INPUT may be electrically connected with the first doped region 120*b* of the active layer 120 of the second transistor T2 through the third via K3.

In the embodiments of the present disclosure, "arranged side by side" may mean being arranged in sequence along the first direction X, and "arranged vertically" may mean being arranged in sequence along the second direction Y.

Figure 35G:
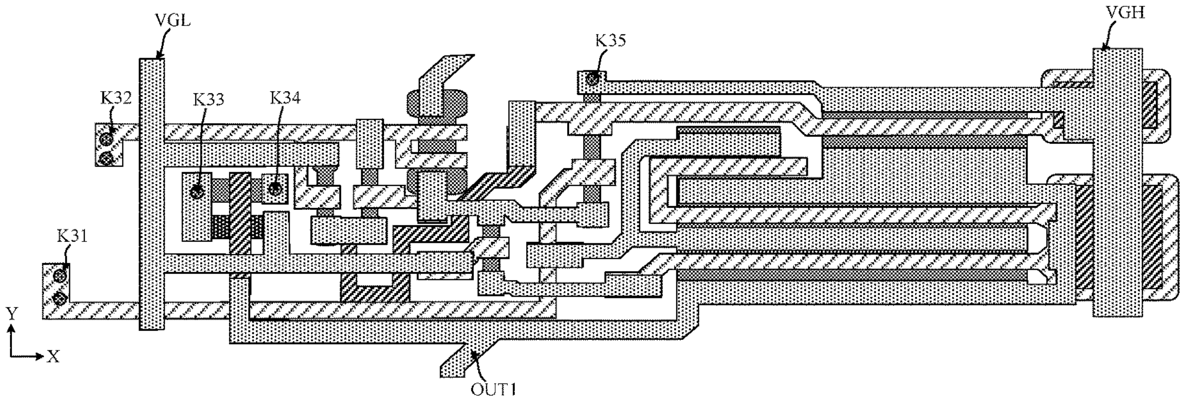
FIG. 35G is a top view of the drive control circuit after a fifth insulation layer is formed in FIG. 33.

FIG. 35G is a top view of the drive control circuit after a fifth insulation layer is formed in FIG. 33. As shown in FIG. 33 to FIG. 35G, the fifth insulation layer 25 of the non-display region is provided with multiple vias, including, for example, multiple fifth type vias and sixth type vias. The fifth insulation layer 25, the fourth insulation layer 24, the third insulation layer 23, and the second insulation layer 22 within the fifth type via are removed to expose a surface of the first conductive layer 41. The fifth insulation layer 25 within the sixth type via is removed to expose a surface of the third conductive layer 43. For example, the fifth type vias may include a thirty-first via K31 and a thirty-second via K32. The sixth type vias may include a thirty-third via K33 to a thirty-fifth via K35.

In some exemplary implementation modes, as shown in FIG. 33 to FIG. 35G, the fourth conductive layer 44 of the non-display region may include the first clock signal line CKL, the second clock signal line CBL, the second output end OUT2, and a fourteenth connection electrode L14. The first clock signal line CKL and the second clock signal line CBL both extend along the second direction Y. The second output end OUT2 extends along the second direction Y and is located on a side of the second power supply line VGL close to the second output circuit in the first direction X. However, the embodiment is not limited thereto. In other examples, the first clock signal line and the second clock signal line may be located in the third conductive layer, and the first power supply line and the second power supply line may be located in the fourth conductive layer.

In some examples, as shown in FIG. 33 to FIG. 35G, the second output end OUT2 may be electrically connected with the second connection electrode L2 through the thirty-third via K33. In this example, the first output end OUT1 and the second output end OUT2 are of a different-layer structure, and the second output end OUT2 is located on a side of the first output end OUT1 away from the base substrate. In the second direction Y, the first output end OUT1 and the second output end OUT2 are located on opposite sides of the present stage drive control circuit, and the first output end OUT1 and the second output end OUT2 extend in opposite directions.

In some examples, as shown in FIG. 33 to FIG. 35G, the first clock signal line CKL is electrically connected with the control electrode 111 of the first transistor T1 through two thirty-second vias K32 arranged vertically. The second clock signal line CBL is electrically connected with the control electrode 151 of the fifth transistor T5 through two thirty-first vias K31 arranged vertically. The fourteenth connection electrode L14 may be electrically connected with the fourth connection electrode L4 through the thirty-fourth via K34, and may also be electrically connected with the eleventh connection electrode L11 through the thirty-fifth via K35, thereby achieving an electrical connection between the second output circuit and the first power supply line VGH.

In this exemplary implementation mode, by arranging the second output circuit between the second power supply line and the input circuit, arrangement of the drive control circuit may be optimized, thereby saving space.

Figure 36:
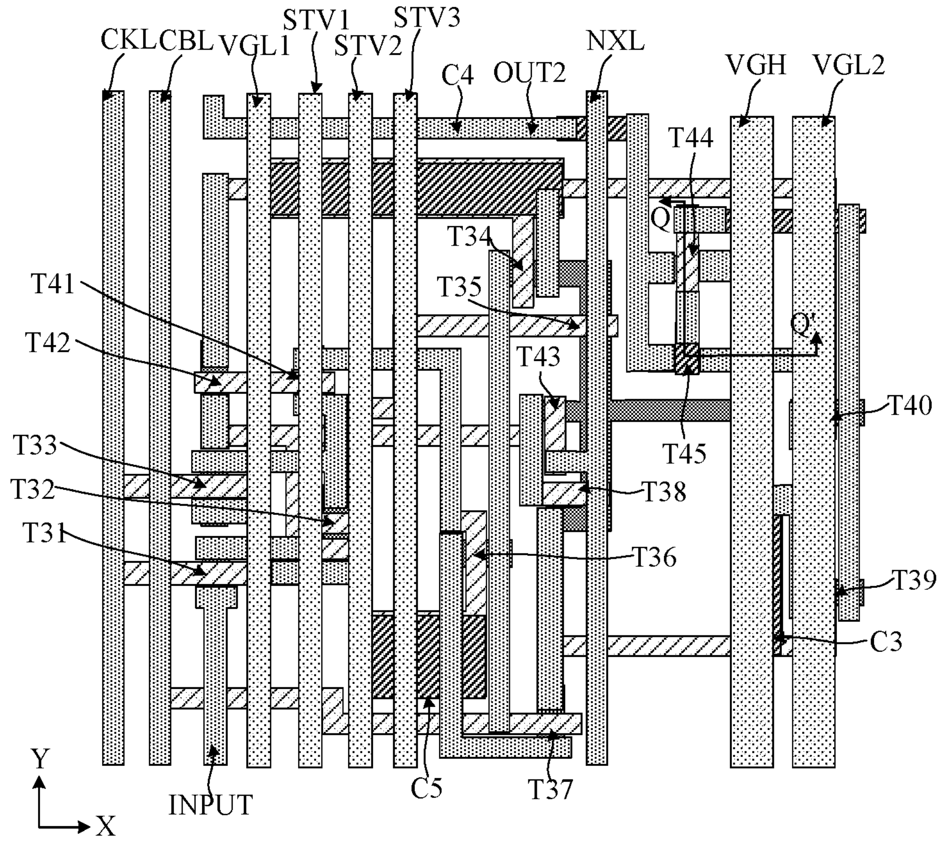
FIG. 36 is another top view of a drive control circuit according to at least one embodiment of the present disclosure.
Figure 37:
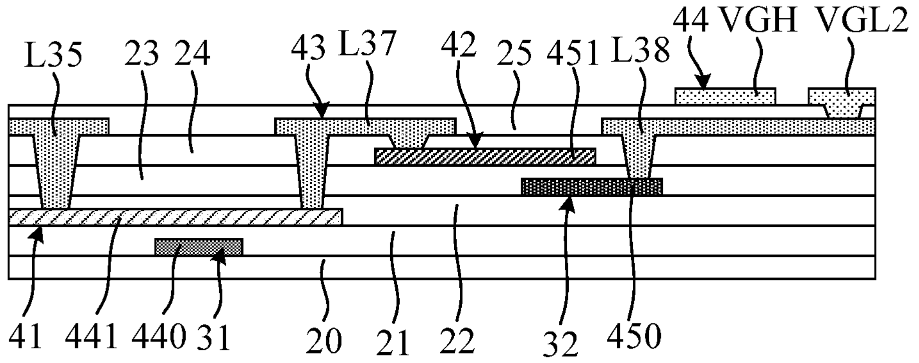
FIG. 37 is a partial cross-section view taken along a Q-Q' direction in FIG. 36.

FIG. 36 is another top view of a drive control circuit according to at least one embodiment of the present disclosure. FIG. 37 is a partial cross-section view taken along a Q-Q' direction in FIG. 36. An equivalent circuit of the drive control circuit of this exemplary embodiment may be shown in FIG. 4. In this exemplary implementation mode, description is made by taking a case in which a thirty-first transistor T31 to a forty-fourth transistor T44 in the drive control circuit are P-type transistors and are LTPS transistors, and a forty-fifth transistor T45 is an N-type transistor and is an oxide thin film transistor, as an example. However, the embodiment is not limited thereto.

In some exemplary implementation modes, as shown in FIG. 36, in a plane parallel to a display substrate, a second output circuit is located between an input circuit and a first output circuit in a first direction X. The input circuit and the second output circuit are located between a clock signal line (e.g., including a first clock signal line CKL and a second clock signal line CBL) and a first power supply line VGH in the first direction X. The first clock signal line CKL is located on a side of the second clock signal line CBL away from the input circuit in the first direction X. In other words, the clock signal line, the input circuit, the second output circuit, and the first output circuit are sequentially arranged in the first direction X. An orthographic projection of a first second power supply line VGL1 on a base substrate is overlapped with an orthographic projection of the input circuit on the base substrate. A second second power supply line VGL2 is located on a side of the first power supply line VGH away from the second output circuit in the first direction X. That is, the first power supply line VGH is located between the second output circuit and the second second power supply line VGL2 in the first direction X. An orthographic projection of the second second power supply line VGL2 on the base substrate is overlapped with an orthographic projection of the first output circuit on the base substrate. An orthographic projection of the first power supply line VGH on the base substrate is overlapped with the orthographic projection of the first output circuit on the base substrate.

In some exemplary implementation modes, as shown in FIG. 36, in a plane parallel to a display substrate, a forty-fourth transistor T44 and a forty-fifth transistor T45 of a second output circuit may be sequentially arranged along a second direction Y. A fortieth transistor T40 and a thirty-ninth transistor T39 of a first output circuit are sequentially arranged in the second direction Y. A third capacitor C3 is adjacent to the thirty-ninth transistor T39 in a first direction X and is located on a side of the thirty-ninth transistor T39 close to an input circuit. An orthographic projection of the third capacitor C3 on a base substrate is overlapped with an orthographic projection of a first power supply line VGH on the base substrate. An orthographic projection of a second second power supply line VGL2 on the base substrate is overlapped with orthographic projections of the thirty-ninth transistor T39 and the fortieth transistor T40 on the base substrate.

In some exemplary implementation modes, as shown in FIG. 36, a forty-second transistor T42, a thirty-third transistor T33, and a thirty-first transistor T31 of the input circuit are sequentially arranged along the second direction Y and are located between a second clock signal line CBL and a first second power supply line VGL1 in a first direction X. A forty-first transistor T41 and a thirty-second transistor T32 are sequentially arranged along the second direction Y. The forty-first transistor T41 is adjacent to the forty-second transistor T42 in the first direction X. The thirty-second transistor T32 is adjacent to the thirty-first transistor T31 and the thirty-third transistor T33 in the first direction X.

In some examples, as shown in FIG. 36, multiple start signal lines (for example, start signal lines STV1, STV2, and STV3) and a first control signal line NXL are provided between the first second power supply line VGL1 and the first power supply line VGH. The multiple start signal lines are sequentially arranged along the first direction X. The start signal line STV1 may provide an input signal to a first stage drive control circuit of this example, and the start signal lines STV2 and STV3 may provide input signals to first stage drive control circuits of remaining gate control circuits. The first control signal line NXL is located between the start signal line STV3 and the first power supply line VGH. However, the embodiment is not limited thereto.

In some examples, as shown in FIG. 36, a thirty-fourth transistor T34, a thirty-fifth transistor T35, a forty-third transistor T43, a thirty-eighth transistor T38, a thirty-sixth transistor T36, and a thirty-seventh transistor T37 may be sequentially arranged along the second direction Y, and are all located between the start signal line STV3 and the first control signal line NXL. A fourth capacitor C4 is located between the thirty-fourth transistor T34 and a second output end OUT2 in the second direction Y. A fifth capacitor C5 is located between the thirty-sixth transistor T36 and the thirty-seventh transistor T37 in the second direction Y.

In some exemplary implementation modes, as shown in FIG. 37, in a plane perpendicular to a display substrate, a non-display region of the display substrate may include: a base substrate 20, and a first semiconductor layer 31, a first conductive layer 41, a second semiconductor layer 32, a second conductive layer 42, a third conductive layer 43, and a fourth conductive layer 44 sequentially disposed on the base substrate 20. Among them, a first insulation layer 21 is disposed between the first semiconductor layer 31 and the first conductive layer 41, a second insulation layer 22 is disposed between the first conductive layer 41 and the second semiconductor layer 32, a third insulation layer 23 is disposed between the second semiconductor layer 32 and the second conductive layer 42, a fourth insulation layer 24 is disposed between the second conductive layer 42 and the third conductive layer 43, and a fifth insulation layer 25 is disposed between the third conductive layer 43 and the fourth conductive layer 44. In some examples, the first insulation layer 21 to the fifth insulation layer 25 may all be inorganic insulation layers. However, the embodiment is not limited thereto.

Figure 38A:
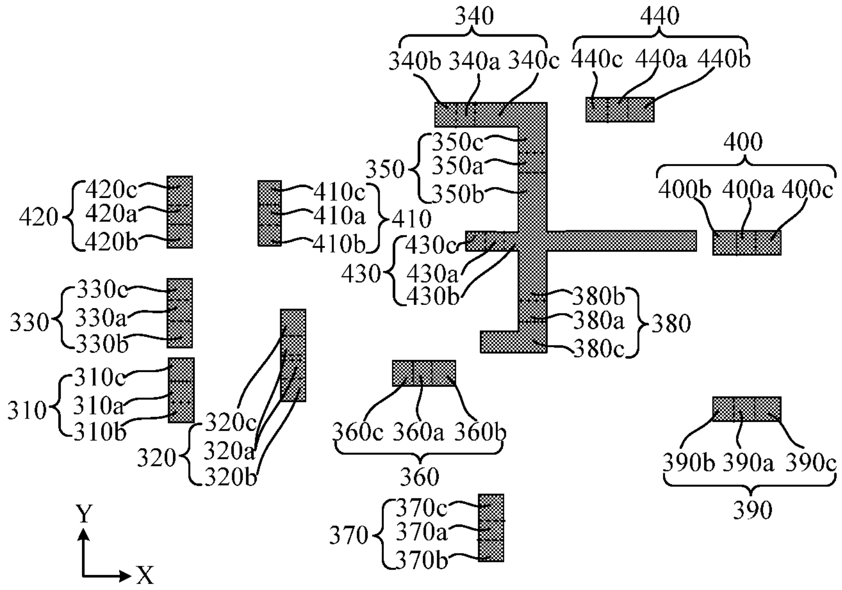
FIG. 38A is a top view of the drive control circuit after a first semiconductor layer is formed in FIG. 36.

FIG. 38A is a top view of the drive control circuit after a first semiconductor layer is formed in FIG. 36. As shown in FIG. 36 to FIG. 38A, the first semiconductor layer 31 of the non-display region at least includes an active layer of a first semiconductor-type transistor of the drive control circuit. For example, the first semiconductor layer 31 at least includes: an active layer 310 of the thirty-first transistor T31, an active layer 320 of the thirty-second transistor T32, an active layer 330 of the thirty-third transistor T33, an active layer 340 of the thirty-fourth transistor T34, an active layer

350 of the thirty-fifth transistor T35, an active layer 360 of the thirty-sixth transistor T36, an active layer 370 of the thirty-seventh transistor T37, an active layer 380 of the thirty-eighth transistor T38, an active layer 390 of the thirty-ninth transistor T39, an active layer 400 of the fortieth transistor T40, an active layer 410 of the forty-first transistor T41, an active layer 420 of the forty-second transistor T42, and an active layer 440 of the forty-fourth transistor T44.

In some examples, as shown in FIG. 38A, the active layer 310 of the thirty-first transistor T31, the active layer 320 of the thirty-second transistor T32, the active layer 330 of the thirty-third transistor T33, the active layer 350 of the thirty-fifth transistor T35, the active layer 370 of the thirty-seventh transistor T37, the active layer 380 of the thirty-eighth transistor T38, the active layer 410 of the forty-first transistor T41 and the active layer 420 of the forty-second transistor T42 may all extend along the second direction Y. The active layer 340 of the thirty-fourth transistor T34, the active layer 360 of the thirty-sixth transistor T36, the active layer 390 of the thirty-ninth transistor T39, the active layer 400 of the fortieth transistor T40, the active layer 430 of the forty-third transistor T43, and the active layer 440 of the forty-fourth transistor T44 may all extend along the first direction X. The active layer 340 of the thirty-fourth transistor T34, the active layer 350 of the thirty-fifth transistor T35, the active layer 380 of the thirty-eighth transistor T38, and the active layer 430 of the forty-third transistor T43 may be of an integral structure. However, the embodiment is not limited thereto.

In some examples, as shown in FIG. 38A, the active layer 310 of the thirty-first transistor T31 may include: a channel region 310*a*, and a first doped region 310*b* and a second doped region 310*c* located on two sides of the channel region 310*a* along the second direction Y. The active layer 320 of the thirty-second transistor T32 may include: a channel region 320*a*, and a first doped region 320*b* and second doped region 320*c* located on two sides of the channel region 320*a* along the second direction Y. The active layer 330 of the thirty-third transistor T33 may include: a channel region 330*a*, and a first doped region 330*b* and a second doped region 330*c* located on two sides of the channel region 330*a* along the second direction Y. The active layer 340 of the thirty-fourth transistor T34 may include: a channel region 340*a*, and a first doped region 340*b* and a second doped region 340*c* located on two sides of the channel region 340*a* along the first direction X. The active layer 350 of the thirty-fifth transistor T35 may include: a channel region 350*a*, and a first doped region 350*b* and a second doped region 350*c* located on two sides of the channel region 350*a* along the second direction Y. The second doped region 350*c* of the active layer 350 of the thirty-fifth transistor T35 is connected with the second doped region 340*c* of the active layer 340 of the thirty-fourth transistor T34. The active layer 360 of the thirty-sixth transistor T36 may include: a channel region 360*a*, and a first doped region 360*b* and a second doped region 360*c* located on two sides of the channel region 360*a* along the first direction X. The active layer 370 of the thirty-seventh transistor T37 may include: a channel region 370*a*, and a first doped region 370*b* and a second doped region 370*c* located on two sides of the channel region 370*a* along the second direction Y. The active layer 380 of the thirty-eighth transistor T38 may include: a channel region 380*a*, and a first doped region 380*b* and a second doped region 380*c* located on two sides of the channel region 380*a* along the second direction Y. The first doped region 380*b* of the active layer 380 of the thirty-eighth transistor T38 is connected with the first doped region 350*b* of the active layer 350 of the thirty-fifth transistor T35. The active layer 390 of the thirty-ninth transistor T39 may include: a channel region 390*a*, and a first doped region 390*b* and a second doped region 390*c* located on two sides of the channel region 390*a* along the first direction X. The active layer 400 of the fortieth transistor T40 may include: a channel region 400*a*, and a first doped region 400*b* and a second doped region 400*c* located on two sides of the channel region 400*a* along the first direction X. The active layer 410 of the forty-first transistor T41 may include: a channel region 410*a*, and a first doped region 410*b* and a second doped region 410*c* located on two sides of the channel region 410*a* along the second direction Y. The active layer 420 of the forty-second transistor T42 may include: a channel region 420*a*, and a first doped region 420*b* and a second doped region 420*c* located on two sides of the channel region 420*a* along the second direction Y. The active layer 430 of the forty-third transistor T43 may include: a channel region 430*a*, and a first doped region 430*b* and a second doped region 430*c* located on two sides of the channel region 430*a* along the first direction X. The first doped region 430*b* of the active layer 430 of the forty-third transistor T43 is connected with the first doped region 350*b* of the active layer 350 of the thirty-fifth transistor T35. The active layer 440 of the forty-fourth transistor T44 may include: a channel region 440*a*, and a first doped region 440*b* and a second doped region 440*c* located on two sides of the channel region 440*a* along the first direction X.

Figure 38B:
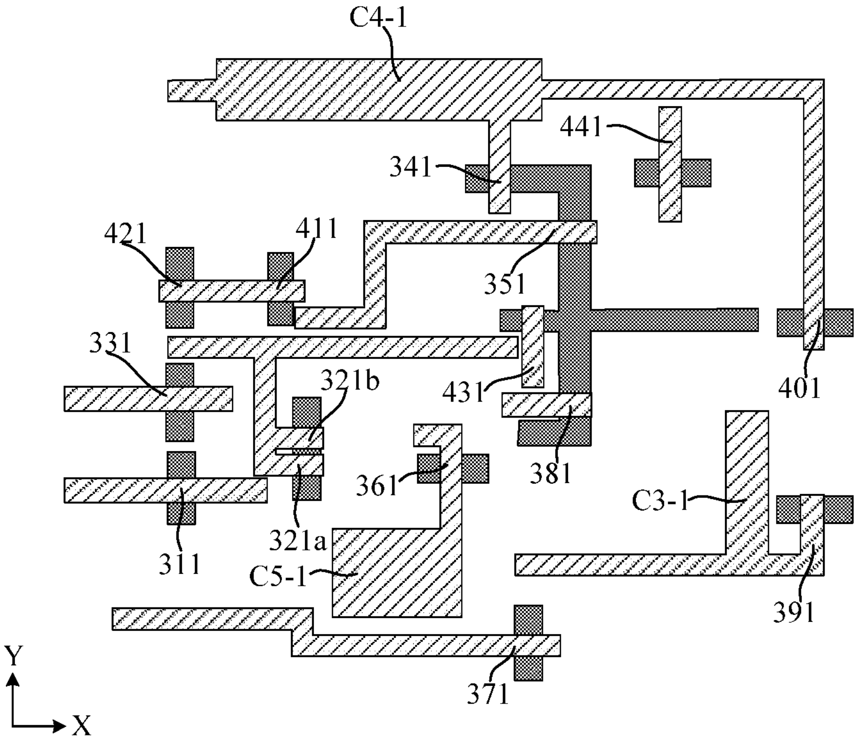
FIG. 38B is a top view of the drive control circuit after a first conductive layer is formed in FIG. 36.

FIG. 38B is a top view of the drive control circuit after a first conductive layer is formed in FIG. 36. As shown in FIG. 36 to FIG. 38B, the first conductive layer 41 of the non-display region at least includes a control electrode of a first semiconductor-type transistor of the drive control circuit and first electrode plates of multiple capacitors. For example, the first conductive layer 41 may include: a control electrode 311 of the thirty-first transistor T31, control electrodes 321*a* and 321*b* of the thirty-second transistor T32, a control electrode 331 of the thirty-third transistor T33, a control electrode 341 of the thirty-fourth transistor T34, a control electrode 351 of the thirty-fifth transistor T35, a control electrode 361 of the thirty-sixth transistor T36, a control electrode 371 of the thirty-seventh transistor T37, a control electrode 381 of the thirty-eighth transistor T38, a control electrode 391 of the thirty-ninth transistor T39, a control electrode 401 of the fortieth transistor T40, a control electrode 411 of the forty-first transistor T41, a control electrode 421 of the forty-second transistor T42, a control electrode 431 of the forty-third transistor T43, a control electrode 441 of the forty-fourth transistor T44, a first electrode plate C3-1 of a third capacitor C3, a first electrode plate C4-1 of a fourth capacitor C4, and a first electrode plate C5-1 of a fifth capacitor C5.

In some examples, as shown in FIG. 38B, the control electrodes 321*a* and 321*b* of the thirty-second transistor T32 may be of an integral structure. The control electrode 341 of the thirty-fourth transistor T34, the control electrode 401 of the fortieth transistor T40, and the first electrode plate C4-1 of the fourth capacitor C4 may be of an integral structure. The control electrode 361 of the thirty-sixth transistor T36 and the first electrode plate C5-1 of the fifth capacitor C5 may be of an integral structure. The control electrode 391 of the thirty-ninth transistor T39 and the first electrode plate C3-1 of the third capacitor C3 may be of an integral structure. In this example, the thirty-second transistor T32 may be a double-gate transistor to prevent and reduce occurrence of a leakage current. However, the embodiment is not limited thereto.

Figure 38C:
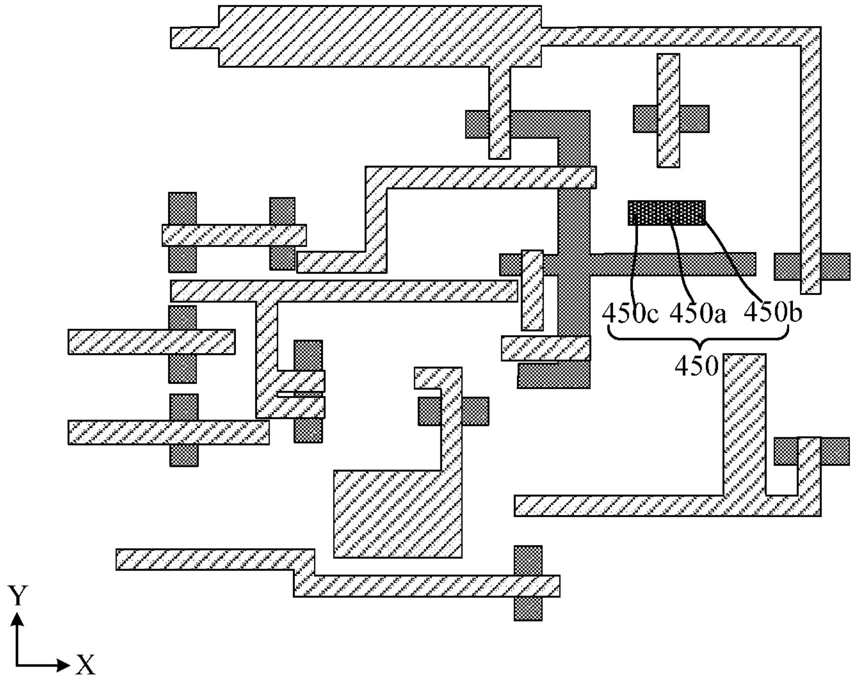
FIG. 38C is a top view of the drive control circuit after a second semiconductor layer is formed in FIG. 36.

FIG. 38C is a top view of the drive control circuit after a second semiconductor layer is formed in FIG. 36. As shown in FIG. 36 to FIG. 38C, the second semiconductor layer 32 of the non-display region at least includes an active layer of a second semiconductor-type transistor of the drive control circuit. For example, the second semiconductor layer 32 may include an active layer 450 of the forty-fifth transistor T45. In some examples, a material of the second semiconductor layer 32 may include an IGZO. The active layer 450 of the forty-fifth transistor T45 extends along the first direction X. The active layer 450 of the forty-fifth transistor T45 may include: a channel region 450*a*, and a first region 450*b* and a second region 450*c* located on two sides of the channel region 450*a* along the first direction X. The first region 450*b* corresponds to a first electrode of the forty-fifth transistor T45, and the second region 450*c* corresponds to a second electrode of the forty-fifth transistor T45.

Figure 38D:
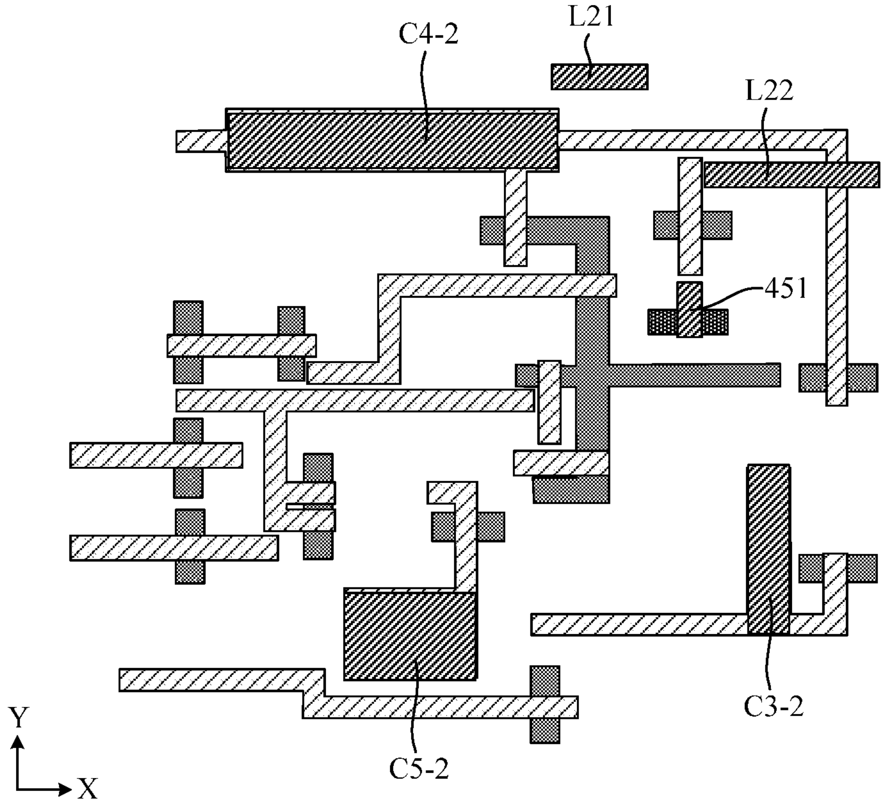
FIG. 38D is a top view of the drive control circuit after a second conductive layer is formed in FIG. 36.

FIG. 38D is a top view of the drive control circuit after a second conductive layer is formed in FIG. 36. As shown in FIG. 36 to FIG. 38D, the second conductive layer 42 of the non-display region at least includes a control electrode of a second semiconductor-type transistor of the drive control circuit and second electrode plates of multiple capacitors. For example, the second conductive layer 42 may include a control electrode 451 of the forty-fifth transistor T45, a second electrode plate C3-2 of the third capacitor C3, a second electrode plate C4-2 of the fourth capacitor C4, a second electrode plate C5-2 of the fifth capacitor C5, a twenty-first connection electrode L21, and a twenty-second connection electrode L22. An orthographic projection of the second electrode plate C3-2 of the third capacitor C3 on the base substrate is located within an orthographic projection of the first electrode plate C3-1 on the base substrate, an orthographic projection of the second electrode plate C4-2 of the fourth capacitor C4 on the base substrate is located within an orthographic projection of the first electrode plate C4-1 on the base substrate, and an orthographic projection of the second electrode plate C5-2 of the fifth capacitor C5 on the base substrate is located within an orthographic projection of the first electrode plate C5-1 on the base substrate.

Figure 38E:
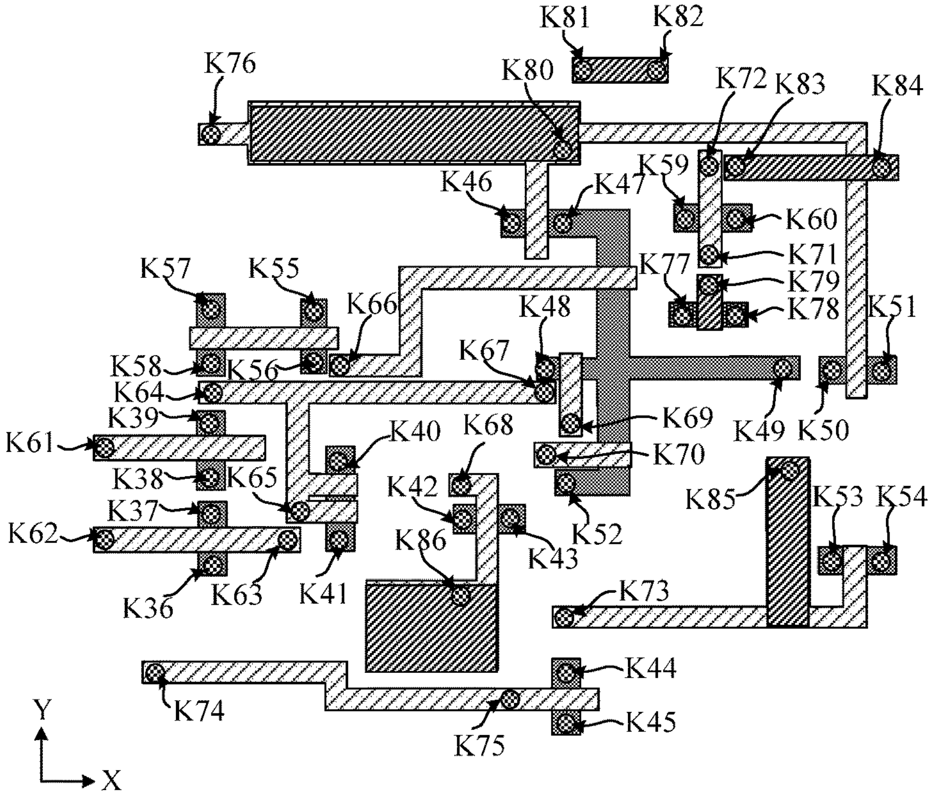
FIG. 38E is a top view of the drive control circuit after a fourth insulation layer is formed in FIG. 36.

FIG. 38E is a top view of the drive control circuit after a fourth insulation layer is formed in FIG. 36. As shown in FIG. 36 to FIG. 38E, multiple vias are formed on a fourth insulation layer 24 of the non-display region. The multiple vias may include a first type via, multiple second type vias, multiple third type vias, and multiple fourth type vias. The fourth insulation layer 24, the third insulation layer 23, the second insulation layer 22, and the first insulation layer 21 within the first type via are removed to expose a surface of the first semiconductor layer 31. The fourth insulation layer 24, the third insulation layer 23, and the second insulation layer 22 within the second type via are removed to expose a surface of the first conductive layer 41. The fourth insulation layer 24 and the third insulation layer 23 within the third type via are removed to expose a surface of the second semiconductor layer 32. The fourth insulation layer 24 within the four type via is removed to expose a surface of the second conductive layer 42. For example, the first type vias may include a thirty-sixth via K36 to a sixtieth via K60, the second type vias may include a sixty-first via K61 to a seventy-sixth via K76, the third type vias may include a seventy-seventh via K77 and a seventy-eighth via K78, and the fourth type vias may include a seventy-ninth via K79 to an eighty-sixth via K86.

Figure 38F:
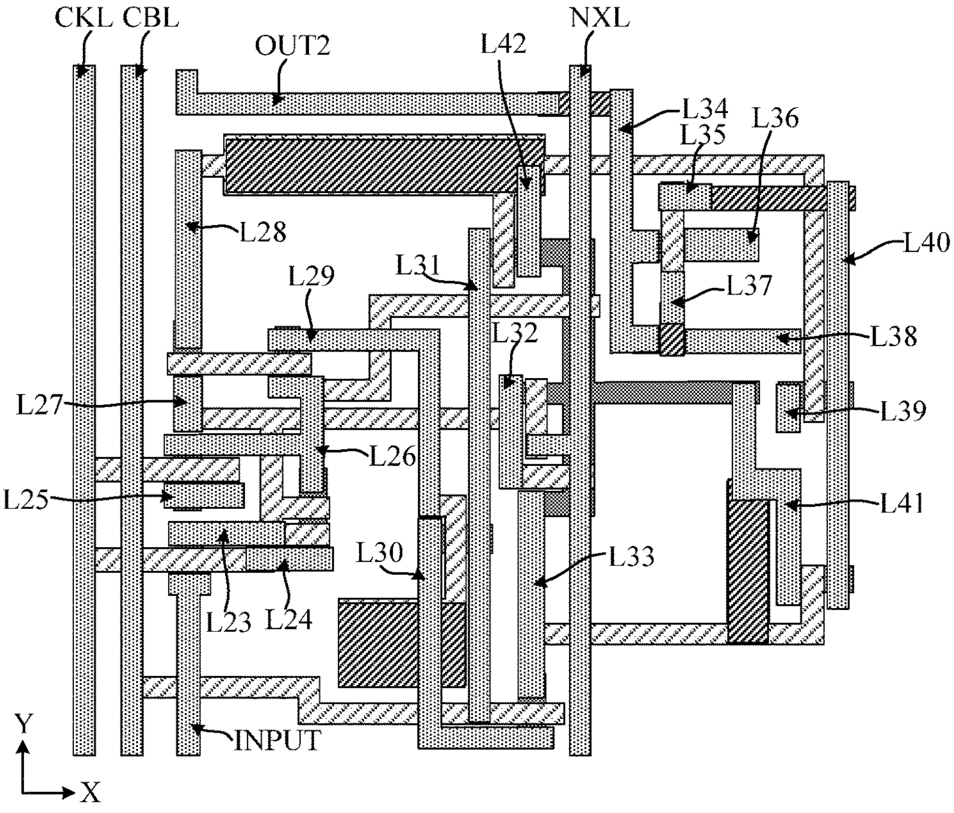
FIG. 38F is a top view of the drive control circuit after a third conductive layer is formed in FIG. 36.

FIG. 38F is a top view of the drive control circuit after a third conductive layer is formed in FIG. 36. As shown in FIG. 36 to FIG. 38F, the third conductive layer 43 of the non-display region may include multiple connection electrodes (for example, a twenty-third connection electrode L23 to a forty-second connection electrode L42), the signal input end INPUT, the second output end OUT2, the first clock signal line CKL, the second clock signal line CBL, and the first control signal line NXL. The first clock signal line CKL, the second clock signal line CBL, and the first control signal line NXL may all extend along the second direction Y. A signal input end INPUT of a present stage drive control circuit may be electrically connected with a first output end of a previous stage drive control circuit, for example, the two may be of an integral structure. The first output end of the drive control circuit may be electrically connected with the fortieth connection electrode L40, for example, may be of an integral structure. However, the embodiment is not limited thereto. In other examples, the first output end may be located in the fourth conductive layer and electrically connected with the fortieth connection electrode.

In some examples, as shown in FIG. 36 to FIG. 38F, the signal input end INPUT may be electrically connected with the first doped region 310*b* of the active layer 310 of the thirty-first transistor T31 through the thirty-sixth via K36. The twenty-third connection electrode L23 may be electrically connected with the second doped region 310*c* of the active layer 310 of the thirty-first transistor T31 through the thirty-seventh via K37, and may also be electrically connected with the control electrode 321*b* of the thirty-second transistor T32 through the sixty-fifth via K65. The twenty-fourth connection electrode L24 may be electrically connected with the first doped region 320*b* of the active layer 320 of the thirty-second transistor T32 through the forty-first via K41, and may also be electrically connected with the control electrode 311 of the thirty-first transistor T31 through the sixty-third via K63. The twenty-fifth connection electrode L25 may be electrically connected with the first doped region 330*b* of the active layer 330 of the thirty-third transistor T33 through the thirty-eighth via K38. The twenty-sixth connection electrode L26 may be electrically connected with the second doped region 330*c* of the active layer 330 of the thirty-third transistor T33 through the thirty-ninth via K39, may also be electrically connected with the second doped region 320*c* of the active layer 320 of the thirty-second transistor T32 through the fortieth via K40, may also be electrically connected with the first doped region 410*b* of the active layer 410 of the forty-first transistor T41 through the fifty-sixth via K56, and may also be electrically connected with the control electrode 351 of the thirty-fifth transistor T35 through the sixty-sixth via K66. The twenty-seventh connection electrode L27 may be electrically connected with the first doped region 420*b* of the active layer 420 of the forty-second transistor T42 through the fifty-eighth via K58, and may also be electrically connected with the control electrode 321*a* of the thirty-second transistor T32 through the sixty-fourth via K64. The twenty-eighth connection electrode L28 may be electrically connected with the second doped region 420*c* of the active layer 420 of the forty-second transistor T42 through the fifty-seventh via K57, and may also be electrically connected with the first electrode plate C4-1 of the fourth capacitor C4 through the seventy-sixth via K76. The twenty-ninth connection electrode L29 may be electrically connected with the second doped region 410*c* of the active layer 410 of the forty-first transistor T41 through the fifty-fifth via K55, and may be electrically connected with the control electrode 361 of the thirty-sixth transistor T36 through the sixty-eighth via K68. The thirtieth connection electrode L30 may be electrically connected with the second doped region 360*c* of the active layer 360 of the thirty-sixth transistor T36 through the forty-second via K42, may also be electrically connected with the second electrode plate C5-2 of the fifth capacitor C5 through the eighty-sixth via K86, and may also be electrically connected with the first doped region 370*b* of the active layer 370 of the thirty-seventh transistor T37 through the forty-fifth via K45. The thirty-first connection electrode L31 may be electrically connected with the first doped region 340*b* of the active layer 340 of the thirty-fourth transistor T34 through the forty-sixth via K46, may also be electrically connected with the second doped region 360*c* of the active layer 360 of the thirty-sixth transistor T36 through the forty-third via K43, and may also be electrically connected with the control electrode 371 of the thirty-seventh transistor T37 through the seventy-fifth via K75. The second clock signal line CBL is electrically connected with the control electrode 371 of the thirty-seventh transistor T37 through the seventy-fourth via K74. The thirty-second connection electrode L32 may be electrically connected with the second doped region 430*c* of the active layer 430 of the forty-third transistor T43 through the forty-eighth via K48, may also be electrically connected with the control electrode 321*a* of the thirty-second transistor T32 through the sixty-seventh via K67, and may also be electrically connected with the control electrode 381 of the thirty-eighth transistor T38 through the seventieth via K70. The thirty-third connection electrode L33 may be electrically connected with the second doped region 380*c* of the active layer 380 of the thirty-eighth transistor T38 through the fifty-second via K52, may also be electrically connected with the control electrode 391 of the thirty-ninth transistor T39 through the seventy-third via K73, and may also be electrically connected with the second doped region 370*c* of the active layer 370 of the thirty-seventh transistor T37 through the forty-fourth via K44. The thirty-fourth connection electrode L34 may be electrically connected with the twenty-first connection electrode L21 through the eighty-second via K82, may also be electrically connected with the second doped region 440*c* of the active layer 440 of the forty-fourth transistor T44 through the fifty-ninth via K59, and may also be electrically connected with the second region 450*c* of the active layer 450 of the forty-fifth transistor T45 through the seventy-seventh via K77. The second output end OUT2 may be electrically connected with the twenty-first connection electrode L21 through the eighty-first via K81. The thirty-fifth connection electrode L35 may be electrically connected with the control electrode 441 of the forty-fourth transistor T44 through the seventy-second via K72, and may also be electrically connected with the twenty-second connection electrode L22 through the eighty-third via K83. The thirty-sixth connection electrode L36 may be electrically connected with the first doped region 440*b* of the active layer 440 of the forty-fourth transistor T44 through the sixtieth via K60. The thirty-seventh connection electrode L37 may be electrically connected with the control electrode 441 of the forty-fourth transistor T44 through the seventy-first via K71, and may also be electrically connected with the control electrode 451 of the forty-fifth transistor T45 through the seventy-ninth via K79. The thirty-eighth connection electrode L38 may be electrically connected with the first region 450*b* of the active layer 450 of the forty-fifth transistor T45 through the seventy-eighth via K78. The thirty-ninth connection electrode L39 may be electrically connected with the first doped region 400*b* of the active layer 400 of the fortieth transistor T40 through the fiftieth via K50. The fortieth connection electrode L40 may be electrically connected with the twenty-second connection electrode L22 through the eighty-fourth via K84, may also be electrically connected with the second doped region 400*c* of the active layer 400 of the fortieth transistor T40 through the fifty-first via K51, and may also be electrically connected with the second doped region 390*c* of the active layer 390 of the thirty-ninth transistor T39 through the fifty-fourth via K54. The forty-first connection electrode L41 may be electrically connected with the first doped region 350*b* of the active layer 350 of the thirty-fifth transistor T35 through the forty-ninth via K49, may also be electrically connected with the second electrode plate C3-2 of the third capacitor C3 through the eighty-fifth via K85, and may also be electrically connected with the first doped region 390*b* of the active layer 390 of the thirty-ninth transistor T39 through the fifty-third via K53. The forty-second connection electrode L42 may be electrically connected with the second doped region 340*c* of the active layer 340 of the thirty-fourth transistor T34 through the forty-seventh via K47, and may also be electrically connected with the second electrode plate C4-2 of the fourth capacitor C4 through the eightieth via K80. The first control signal line NXL may be electrically connected with the control electrode 431 of the forty-third transistor T43 through the sixty-ninth via K69. The first clock signal line CKL may be electrically connected with the control electrode 331 of the thirty-third transistor T33 through the sixty-first via K61, and may also be electrically connected with the control electrode 311 of the thirty-first transistor T31 through the sixty-second via K62.

Figure 38G:
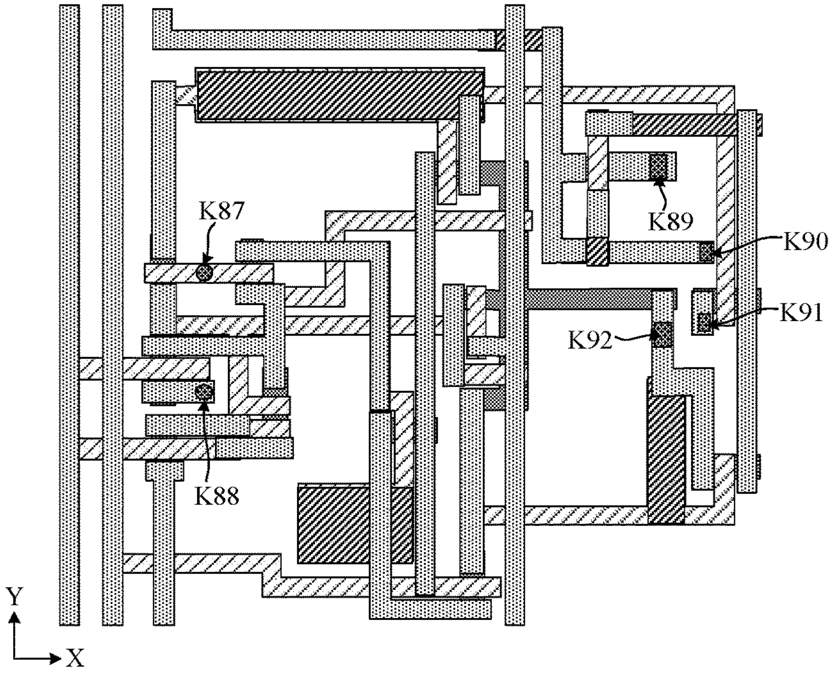
FIG. 38G is a top view of the drive control circuit after a fifth insulation layer is formed in FIG. 36.

FIG. 38G is a top view of the drive control circuit after a fifth insulation layer is formed in FIG. 36. As shown in FIG. 36 to FIG. 38G, the fifth insulation layer 25 of the non-display region is provided with multiple vias, including, for example, multiple fifth type vias and sixth type vias. The fifth insulation layer 25, the fourth insulation layer 24, the third insulation layer 23, and the second insulation layer 22 within the fifth type via are removed to expose a surface of the first conductive layer 41. The fifth insulation layer 25 within the sixth type via is removed to expose a surface of the third conductive layer 43. For example, the fifth type vias may include an eighty-seventh via K87. The sixth type vias may include an eighty-eighth via K88 to a ninety-second via K92.

In some exemplary implementation modes, as shown in FIG. 36 to FIG. 38G, the fourth conductive layer 44 of the non-display region may include multiple start signal lines (e.g., start signal lines STV1 to STV3), the first power supply line VGH, and two second power supply lines VGL1 and VGL2. The start signal lines, the first power supply line VGH, and the two second power supply lines VGL1 and VGL2 all extend along the second direction Y. In the first direction X, a first second power supply line VGL1, multiple start signal lines, the first power supply line VGH, and a second second power supply line VGL2 may be arranged in sequence. The first second power supply line VGL1 is electrically connected with the input circuit, and the second second power supply line VGL2 is electrically connected with the first output circuit and the second output circuit. The first second power supply line VGL1 may be electrically connected with the control electrode 411 of the forty-first transistor T41 through the eighty-seventh via K87, and may also be electrically connected with the twenty-fifth connection electrode L25 through the eighty-eighth via K88. The second second power supply line VGL2 may be electrically connected with the thirty-eighth connection electrode L38 through the ninetieth via K90, and may also be electrically connected with the thirty-ninth connection electrode L39 through the ninety-first via K91. The first power supply line VGH may be electrically connected with the thirty-sixth connection electrode L36 through the eighty-ninth via K89, and may also be electrically connected with the forty-first connection electrode L41 through the ninety-second via K92. However, the embodiment is not limited thereto. In other examples, the first power supply line and the second power supply line may be located in the third conductive layer and the clock signal line may be located in the fourth conductive layer.

In this exemplary implementation mode, by arranging the second output circuit between the input circuit and the first output circuit, arrangement of the drive control circuit may be optimized, thereby saving space.

Figure 39:
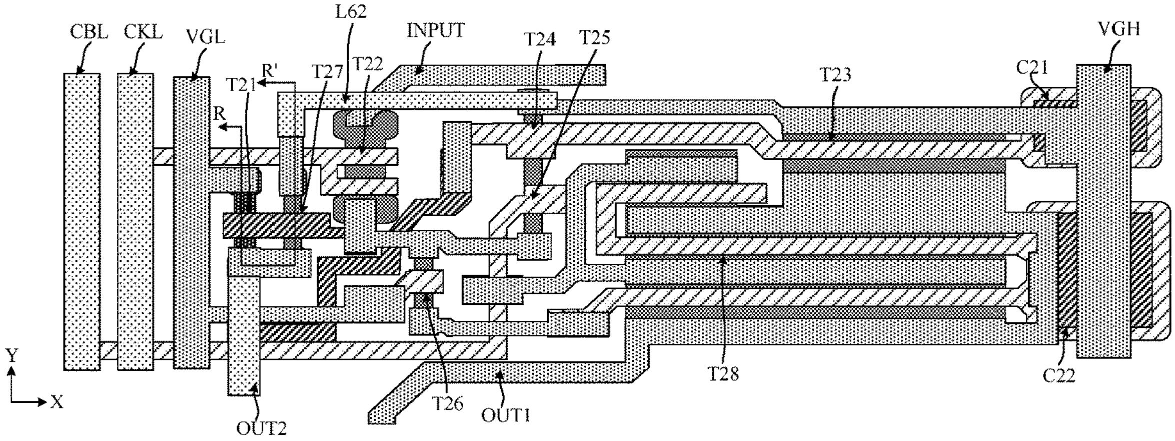
FIG. 39 is another top view of a drive control circuit according to at least one embodiment of the present disclosure.
Figure 40:
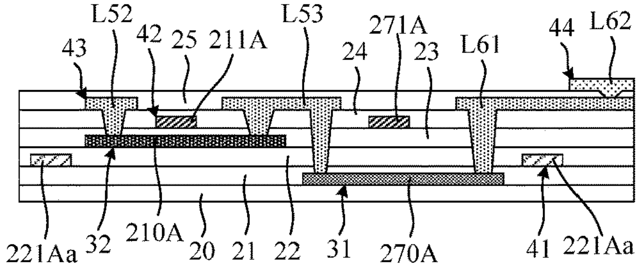
FIG. 40 is a partial cross-section view taken along an R-R' direction in FIG. 39.

FIG. 39 is another top view of a drive control circuit according to at least one embodiment of the present disclosure. FIG. 40 is a partial cross-section view taken along an R-R' direction in FIG. 39. An equivalent circuit of the drive control circuit of this exemplary embodiment may be shown in FIG. 25. In this exemplary implementation mode, description is made by taking a case in which a twenty-second transistor T22 to a twenty-eighth transistor T28 in the drive control circuit are P-type transistors and are LTPS transistors, and a twenty-first transistor T21 is an N-type transistor and is an oxide thin film transistor, as an example. However, the embodiment is not limited thereto.

In some exemplary implementation modes, as shown in FIG. 39, in a plane parallel to a display substrate, a second output circuit is located between an input circuit and a second power supply line VGL in a first direction X, a first output circuit is located at a side of the input circuit away from the second power supply line VGL, and a clock signal line (e.g., including a first clock signal line CKL and a second clock signal line CBL) is located on a side of the second power supply line VGL away from the second output circuit. In other words, the clock signal line, the second power supply line VGL, the second output circuit, the input circuit, and the first output circuit are sequentially arranged along the first direction X. A first power supply line VGH is located on a side of the input circuit away from the second output circuit, and an orthographic projection of the first power supply line VGH on a base substrate may be overlapped with an orthographic projection of the first output circuit on the base substrate. The second output circuit is located between the first power supply line VGL and an input sub-circuit in the first direction X, and a control sub-circuit is located between the input sub-circuit and the first output circuit in the first direction X. In some examples, the second clock signal line CBL may be located on a side of the first clock signal line CKL away from the second power supply line VGL. However, the embodiment is not limited thereto.

In some examples, as shown in FIG. 39, the twenty-first transistor T21 and the twenty-seventh transistor T27 may be sequentially arranged along the first direction X, and the twenty-first transistor T21 is located between the second power supply line VGL and the twenty-seventh transistor T27 in the first direction X. The twenty-second transistor T22 is located between the twenty-seventh transistor T27 and the twenty-fourth transistor T24 in the first direction X. The twenty-fourth transistor T24 and the twenty-fifth transistor T25 are sequentially arranged along a second direction Y. The twenty-third transistor T23 and the twenty-eighth transistor T28 are sequentially arranged along the second direction Y. The twenty-sixth transistor T26 is located between the twenty-second transistor T22 and the twenty-fifth transistor T25 in the first direction X. The twenty-fifth transistor T25 is adjacent to the twenty-eighth transistor T28 in the first direction X.

In some exemplary implementation modes, as shown in FIG. 40, in a plane perpendicular to a display substrate, a non-display region of the display substrate may include: a base substrate 20, and a first semiconductor layer 31, a first conductive layer 41, a second semiconductor layer 32, a second conductive layer 42, a third conductive layer 43, and a fourth conductive layer 44 sequentially disposed on the base substrate 20. Among them, a first insulation layer 21 is disposed between the first semiconductor layer 31 and the first conductive layer 41, a second insulation layer 22 is disposed between the first conductive layer 41 and the second semiconductor layer 32, a third insulation layer 23 is disposed between the second semiconductor layer 32 and the second conductive layer 42, a fourth insulation layer 24 is disposed between the second conductive layer 42 and the third conductive layer 43, and a fifth insulation layer 25 is disposed between the third conductive layer 43 and the fourth conductive layer 44. In some examples, the first insulation layer 21 to the fifth insulation layer 25 may all be inorganic insulation layers. However, the embodiment is not limited thereto.

Figure 41A:
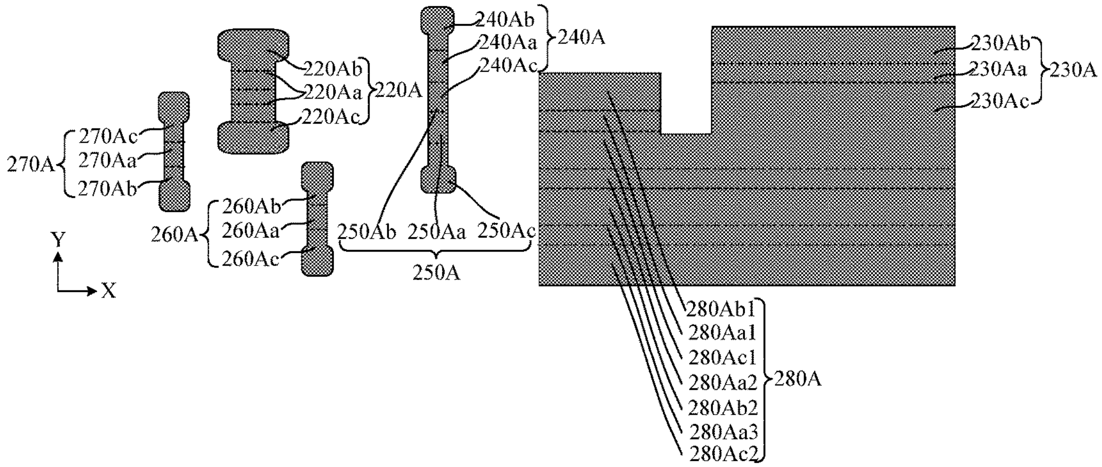
FIG. 41A is a top view of the drive control circuit after a first semiconductor layer is formed in FIG. 39.

FIG. 41A is a top view of the drive control circuit after a first semiconductor layer is formed in FIG. 39. As shown in FIG. 39 to FIG. 41A, the first semiconductor layer 31 of the non-display region at least includes an active layer of a first semiconductor-type transistor of the drive control circuit. For example, the first semiconductor layer 31 at least includes an active layer 220A of a twenty-second transistor T22 to an active layer 280A of a twenty-eighth transistor T28.

In some examples, as shown in FIG. 41A, an active layer 240A of a twenty-fourth transistor T24 and an active layer 250A of a twenty-fifth transistor T25 may be of an integral structure, such as a strip structure extending along a second direction Y. An active layer 230A of a twenty-third transistor T23 and the active layer 280A of the twenty-eighth transistor T28 may be of an integral structure. However, the embodiment is not limited thereto.

In some examples, as shown in FIG. 41, the active layer 220A of the twenty-second transistor T22 may include a channel region 220Aa, and a first doped region 220Ab and a second doped region 220Ac located on two sides of the channel region 220Aa along the second direction Y. The active layer 230A of the twenty-third transistor T23 may include a channel region 230Aa, and a first doped region 230Ab and a second doped region 230Ac located on two sides of the channel region 230Aa along the second direction Y. The active layer 240A of the twenty-fourth transistor T24 may include a channel region 240Aa, and a first doped region 240Ab and a second doped region 240Ac located on two sides of the channel region 240Aa along the second direction Y. The active layer 250A of the twenty-fifth transistor T25 may include a channel region 250Aa, and a first doped region 250Ab and a second doped region 250Ac located on two sides of the channel region 250Aa along the second direction Y. The first doped region 250Ab of the twenty-fifth transistor T25 is connected with the second doped region 240Ac of the twenty-fourth transistor T24. The active layer 260A of the twenty-sixth transistor T26 may include a channel region 260Aa, and a first doped region 260Ab and a second doped region 260Ac located on two sides of the channel region 260Aa along the second direction Y. The active layer 270A of the twenty-seventh transistor T27 may include a channel region 270Aa, and a first doped region 270Ab and a second doped region 270Ac located on two sides of the channel region 270Aa along the second direction Y. The active layer 280A of the twenty-eighth transistor T28 may include: channel regions 280Aa1, 280Aa2, and 280Aa3 arranged in sequence along the second direction Y, a first doped region 280Ab1 and a second doped region 280Ac1 located on two sides of the channel region 280Aa1 along the second direction Y, and a third doped region 280Ab2 and a fourth doped region 280Ac2 located on two sides of the channel region 280Aa3 along the second direction Y.

Figure 41B:
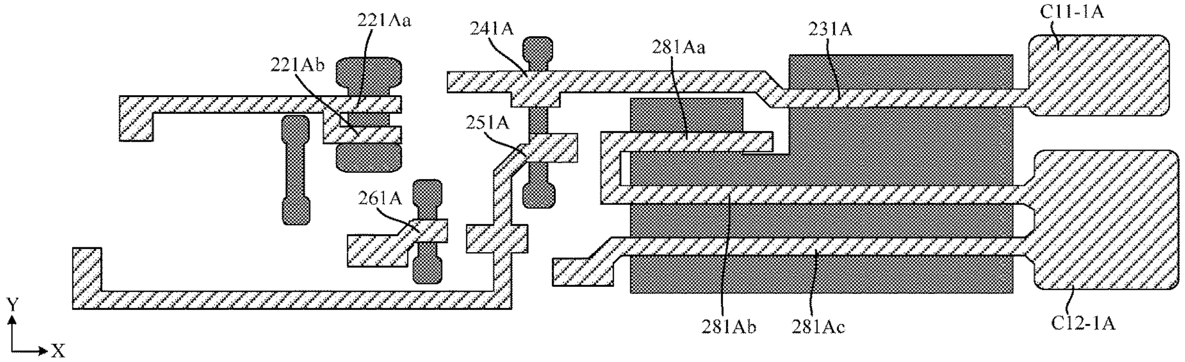
FIG. 41B is a top view of the drive control circuit after a first conductive layer is formed in FIG. 39.

FIG. 41B is a top view of the drive control circuit after a first conductive layer is formed in FIG. 39. As shown in FIG. 39 to FIG. 41B, the first conductive layer 41 of the non-display region at least includes a control electrode of a first semiconductor-type transistor of the drive control circuit and first electrode plates of multiple capacitors. For example, the first conductive layer 41 may include control electrodes 221Aa and 221Ab of the twenty-second transistor T22, a control electrode 231A of the twenty-third transistor T23, a control electrode 241A of the twenty-fourth transistor T24, a control electrode 251A of the twenty-fifth transistor T25, a control electrode 261A of the twenty-sixth transistor T26, control electrodes 281Aa, 281Ab, and 281Ac of the twenty-eighth transistor T28, a first electrode plate C11-1A of an eleventh capacitor C11, and a first electrode plate C12-1A of a twelfth capacitor C12.

In some examples, as shown in FIG. 41B, the control electrodes 221Aa and 221Ab of the twenty-second transistor T22 may be of an integral structure. The control electrode 231A of the twenty-third transistor T23, the control electrode 241A of the twenty-fourth transistor T24, and the first electrode plate C11-1A of the eleventh capacitor C11 are of an integral structure. The control electrodes 281Aa, 281Ab, and 281Ac of the twenty-eighth transistor T28 and the first electrode plate C12-1A of the twelfth capacitor C12 may be of an integral structure. In this example, the twenty-second transistor T22 may be a double-gate transistor and the twenty-eighth transistor T28 may be a triple-gate transistor to prevent and reduce occurrence of a leakage current. However, the embodiment is not limited thereto.

Figure 41C:
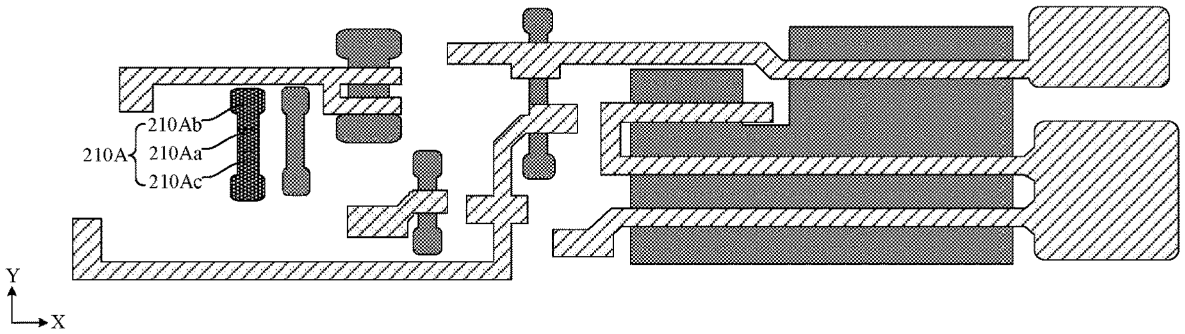
FIG. 41C is a top view of the drive control circuit after a second semiconductor layer is formed in FIG. 39.

FIG. 41C is a top view of the drive control circuit after a second semiconductor layer is formed in FIG. 39. As shown in FIG. 39 to FIG. 41C, the second semiconductor layer 32 of the non-display region at least includes an active layer of a second semiconductor-type transistor of the drive control circuit. For example, the second semiconductor layer 32 may include an active layer 210A of the twenty-first transistor T21. In some examples, a material of the second semiconductor layer 32 may include an IGZO. The active layer 210A of the twenty-first transistor T21 may extend along the second direction Y. The active layer 210A of the twenty-first transistor T21 may include a channel region 210Aa, and a first region 210Ab and a second region 210Ac located on two sides of the channel region 210Aa along the second direction Y. The first region 210Ab corresponds to a first electrode of the twenty-first transistor T21, and the second region 210Ac corresponds to a second electrode of the twenty-first transistor T21.

Figure 41D:
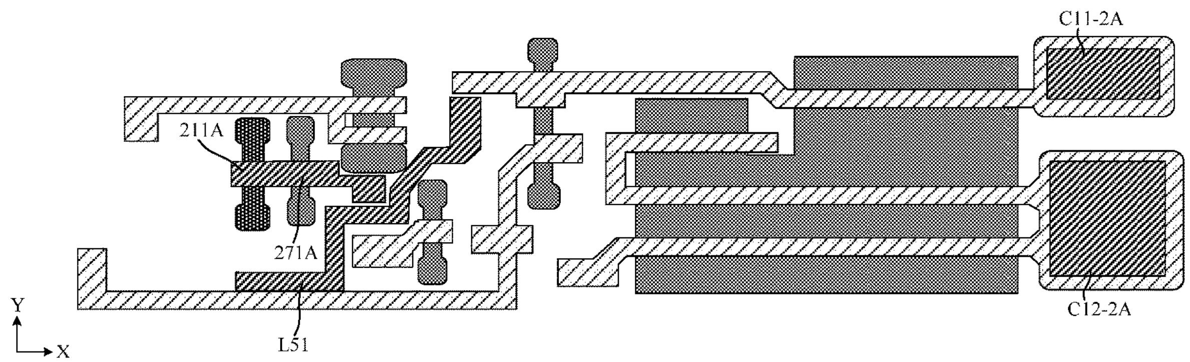
FIG. 41D is a top view of the drive control circuit after a second conductive layer is formed in FIG. 39.

FIG. 41D is a top view of the drive control circuit after a second conductive layer is formed in FIG. 39. As shown in FIG. 39 to FIG. 41D, the second conductive layer 42 of the non-display region at least includes a control electrode of a second semiconductor-type transistor of the drive control circuit and second electrode plates of multiple capacitors. For example, the second conductive layer 42 may include a control electrode 211A of the twenty-first transistor T21, a control electrode 271A of the twenty-seventh transistor T27, a second electrode plate C11-2A of the eleventh capacitor C11, a second electrode plate C12-2A of the twelfth capacitor C12, and a fifty-first connection electrode L51. An orthographic projection of the second electrode plate C11-2A of the eleventh capacitor C11 on the base substrate is located within an orthographic projection of the first electrode plate C11-1A on the base substrate, and an orthographic projection of the second electrode plate C12-2A of the twelfth capacitor C12 on the base substrate is located within an orthographic projection of the first electrode plate C12-1A on the base substrate. An orthographic projection of the fifty-first connection electrode L51 on the base substrate may not be overlapped with orthographic projections of the first semiconductor layer, the first conductive layer, and the second semiconductor layer on the base substrate. However, the embodiment is not limited thereto.

In some examples, as shown in FIG. 41D, the control electrode 211A of the twenty-first transistor T21 and the control electrode 271A of the twenty-seventh transistor T27 may be of an integral structure. However, the embodiment is not limited thereto.

Figure 41E:
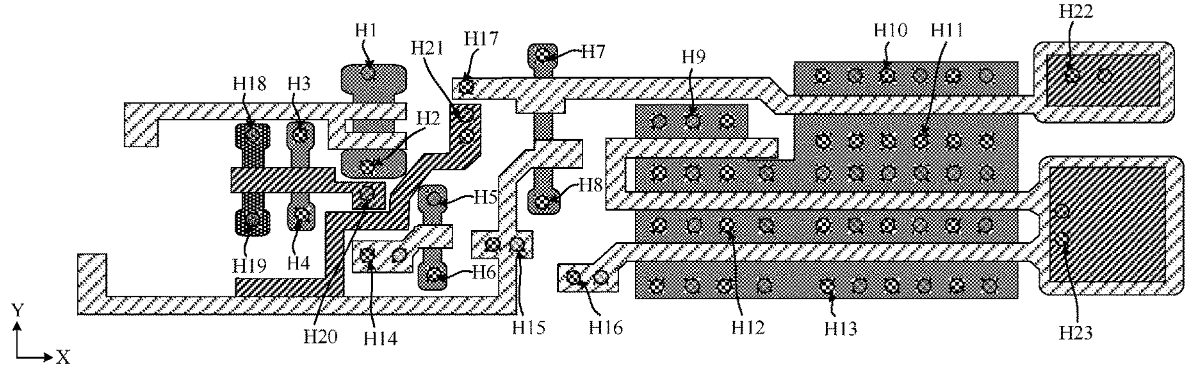
FIG. 41E is a top view of the drive control circuit after a fourth insulation layer is formed in FIG. 39.

FIG. 41E is a top view of the drive control circuit after a fourth insulation layer is formed in FIG. 39. As shown in FIG. 39 to FIG. 41E, multiple vias are formed on the fourth insulation layer 24 of the non-display region. The multiple vias may include multiple first type vias, multiple second type vias, multiple third type vias, and multiple fourth type vias. The fourth insulation layer 24, the third insulation layer 23, the second insulation layer 22, and the first insulation layer 21 within the first type via are removed to expose a surface of the first semiconductor layer 31. The fourth insulation layer 24, the third insulation layer 23, and the second insulation layer 22 within the second type via are removed to expose a surface of the first conductive layer 41. The fourth insulation layer 24 and the third insulation layer 23 within the third type via are removed to expose a surface of the second semiconductor layer 32. The fourth insulation layer 24 within the four type via is removed to expose a surface of the second conductive layer 42. For example, the first type vias may include: an one hundred and first via H1 to an one hundred and thirteenth via H13, the second type vias may include an one hundred and fourteenth via H14 to an one hundred and seventeenth via H17, the third type vias may include an one hundred and eighteenth via H18 and an one hundred and nineteenth via H19, and the fourth type vias may include an one hundred and twentieth via H20 to an one hundred and twenty-third via H23.

Figure 41F:
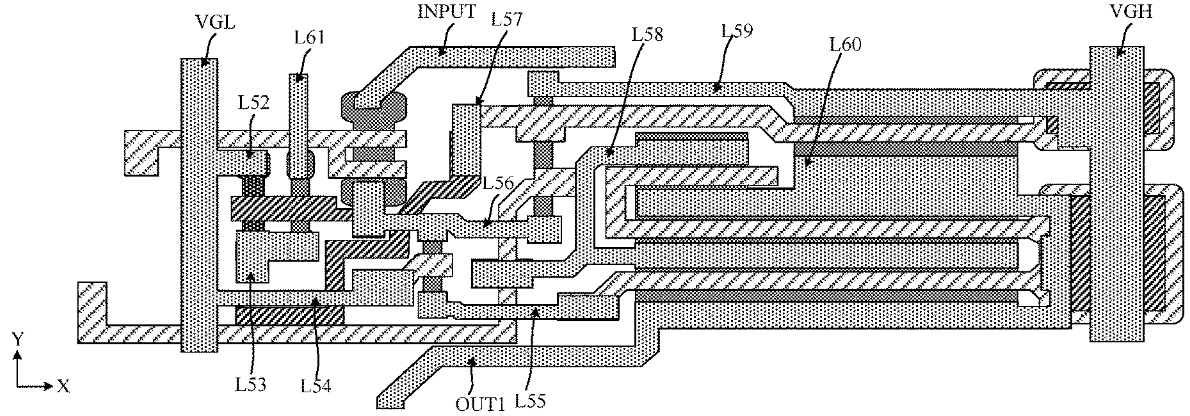
FIG. 41F is a top view of the drive control circuit after a third conductive layer is formed in FIG. 39.

FIG. 41F is a top view of the drive control circuit after a third conductive layer is formed in FIG. 39. As shown in FIG. 39 to FIG. 41F, the third conductive layer 43 of the non-display region may include multiple connection electrodes (for example, a fifty-second connection electrode L52 to a sixty-first connection electrode L61), the signal input end INPUT, the first output end OUT1, the first power supply line VGH, and the second power supply line VGL. The first power supply line VGH and the second power supply line VGL may both extend along the second direction Y. A signal input end INPUT of a present stage drive control circuit may be electrically connected with a first output end of a previous stage drive control circuit, for example, the two may be of an integral structure. However, the embodiment is not limited thereto. In other examples, a signal input end of a present stage drive control circuit may be located in a fourth conductive layer, and may be electrically connected with a first output end of a previous stage drive control circuit located in a third conductive layer through a connection electrode.

In some examples, as shown in FIG. 39 to FIG. 41F, the signal input end INPUT may be electrically connected with the first doped region 220Ab of the active layer 220A of the twenty-second transistor T22 through the one hundred and first via H1. The second power supply line VGL, the fifty-second connection electrode L52, and the fifty-fourth connection electrode L54 may be of an integral structure. The fifty-second connection electrode L52 may be electrically connected with the first region 210Ab of the active layer 210A of the twenty-first transistor T21 through the one hundred and eighteenth via H18. The fifty-fourth connection electrode L54 may be electrically connected with the control electrode 261A of the twenty-sixth transistor T26 through two one hundred and fourteenth vias H14 arranged side by side. The fifty-third connection electrode L53 may be electrically connected with the second region 210Ac of the active layer 210A of the twenty-first transistor T21 through the one hundred and nineteenth via H19, and may also be electrically connected with the second doped region 270Ac of the active layer 270A of the twenty-seventh transistor T27 through the one hundred and fourth via H4. The fifty-fifth connection electrode L55 may be electrically connected with the second doped region 260Ac of the active layer 260A of the twenty-sixth transistor T26 through the one hundred and sixth via H6, and may also be electrically connected with the control electrode 281A of the twenty-eighth transistor T28 through two one hundred and sixteenth vias H16 arranged side by side. The fifty-sixth connection electrode L56 may be electrically connected with the second doped region 220Ac of the active layer 220A of the twenty-second transistor T22 through the one hundred and second via H2, may also be electrically connected with the control electrode 271A of the twenty-seventh transistor T27 through the one hundred and twentieth via H20, may also be electrically connected with the first doped region 260*b* of the active layer 260A of the twenty-sixth transistor T26 through the one hundred and fifth via H5, and may also be electrically connected with the second doped region 250Ac of the active layer 250A of the twenty-fifth transistor T25 through the one hundred and eighth via H8. The fifty-seventh connection electrode L57 may be electrically connected with the fifty-first connection electrode L51 through two one hundred and twenty-first vias H21 arranged vertically, and may also be electrically connected with the control electrode 241A of the twenty-fourth transistor T24 through the one hundred and seventeenth via H17. The fifty-eighth connection electrode L58 may be electrically connected with the control electrode 251A of the twenty-fifth transistor T25 through two one hundred and fifteenth vias H15 arranged side by side, may also be electrically connected with the first doped region 280Ab1 of the active layer 280A of the twenty-eighth transistor T28 through multiple (e.g. three) one hundred and ninth vias H9 arranged side by side, and may also be electrically connected with the third doped region 280Ab2 of the active layer 280A of the twenty-eighth transistor T28 through multiple (e.g. ten) one hundred and twelfth vias H12 arranged side by side. The fifty-ninth connection electrode L59 may be electrically connected with the first doped region 240Ab of the active layer 240A of the twenty-fourth transistor T24 through the one hundred and seventh via H7, and may also be electrically connected with the first doped region 230Ab of the active layer 230A of the twenty-third transistor T23 through multiple (e.g. six) one hundred and tenth vias H10 arranged side by side. The fifty-ninth connection electrode L59 and the first power supply line VGH may be of an integral structure. The first power supply line VGH may be electrically connected with the second electrode plate C11-2A of the eleventh capacitor C11 through two one hundred and twenty-second vias H22 arranged side by side. The sixtieth connection electrode L60 may be electrically connected with the second doped region 230Ac of the active layer 230A of the twenty-third transistor T23 through multiple (e.g. six) one hundred and eleventh vias H11 arranged side by side, may also be electrically connected with the second doped region 280Ac1 of the active layer 280A of the twenty-eighth transistor T28 through multiple (e.g. ten) one hundred and eleventh vias H11 arranged side by side, may also be electrically connected with the fourth doped region 280Ac2 of the active layer 280A of the twenty-eighth transistor T28 through multiple (e.g. ten) one hundred and thirteenth vias H13 arranged side by side, and may also be electrically connected with the second electrode plate C12-2A of the twelfth capacitor C12 through two one hundred and twenty-third vias H23 arranged vertically. The sixty-first connection electrode L61 may be electrically connected with the first doped region 270Ab of the active layer 270A of the twenty-seventh transistor T27 through the one hundred and third via H3.

Figure 41G:
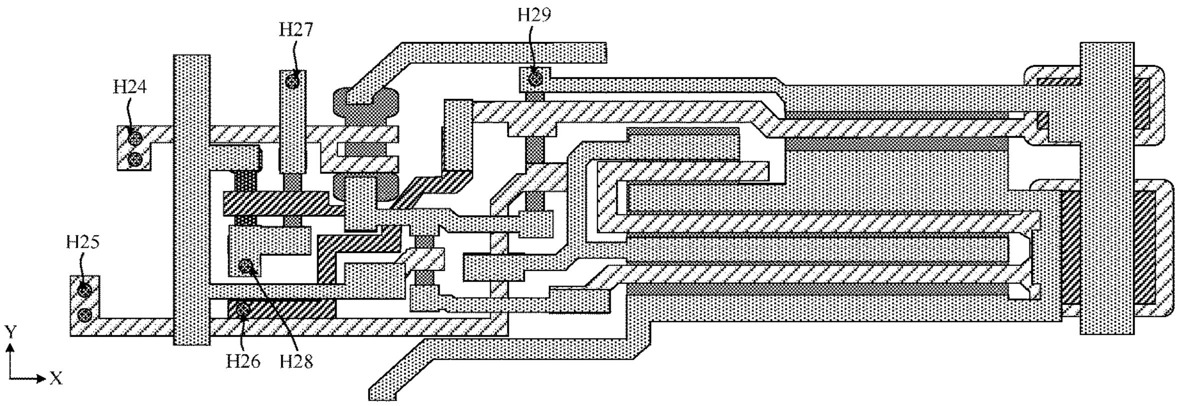
FIG. 41G is a top view of the drive control circuit after a fifth insulation layer is formed in FIG. 39.

FIG. 41G is a top view of the drive control circuit after a fifth insulation layer is formed in FIG. 39. As shown in FIG. 39 to FIG. 41G, the fifth insulation layer 25 of the non-display region is provided with multiple vias, including, for example, multiple fifth type vias, sixth type vias, and seventh type vias. The fifth insulation layer 25, the fourth insulation layer 24, the third insulation layer 23, and the second insulation layer 22 within the fifth type via are removed to expose a surface of the first conductive layer 41. The fifth insulation layer 25 within the sixth type via is removed to expose a surface of the third conductive layer 43. The fifth insulation layer 25 and the fourth insulation layer 24 within the seventh type via are removed to expose a surface of the second conductive layer 42. For example, the fifth type vias may include one hundred and twenty-fourth via H24 and one hundred and twenty-fifth via H25, the sixth type vias may include one hundred and twenty-seventh via H27 to one hundred and twenty-ninth via H29, and the seventh type vias may include one hundred and twenty-sixth via H26.

In some exemplary implementation modes, as shown in FIG. 39 to FIG. 41G, the fourth conductive layer 44 of the non-display region may include the first clock signal line CKL, the second clock signal line CBL, the second output end OUT2, and a sixty-second connection electrode L62. The second output end OUT2 extends along the second direction Y and is located on a side of the second power supply line VGL close to the second output circuit in the first direction X. However, the embodiment is not limited thereto. In other examples, the first clock signal line and the second clock signal line may be located in the third conductive layer, and the first power supply line and the second power supply line may be located in the fourth conductive layer.

In some examples, as shown in FIG. 39 to FIG. 41G, the second output end OUT2 may be electrically connected with the fifty-third connection electrode L53 through one hundred and twenty-eighth via H28, and may also be electrically connected with the fifty-first connection electrode L51 through one hundred and twenty-sixth via H26. In this example, the first output end OUT1 and the second output end OUT2 are of a different-layer structure, and the second output end OUT2 is located on a side of the first output end OUT1 away from the base substrate. In the second direction Y, the first output end OUT1 and the second output end OUT2 may be led out from a same side of a present stage drive control circuit.

In some examples, as shown in FIG. 39 to FIG. 41G, the second clock signal line CBL may be electrically connected with the control electrode 251A of the twenty-fifth transistor T25 through two one hundred and twenty-fifth vias H25 arranged vertically. The first clock signal line CKL may be electrically connected with the control electrode 221Aa of the twenty-second transistor T22 through two one hundred and twenty-fourth vias H24 arranged vertically. The sixty-second connection electrode L62 may be electrically connected with the sixty-first connection electrode L61 through one hundred and twenty-seventh via H27, and may also be electrically connected with the fifty-ninth connection electrode L59 through one hundred and twenty-ninth via H29, thereby achieving an electrical connection between the second output circuit and the first power supply line VGH.

According to an exemplary implementation mode, an arrangement of a dual-output drive control circuit may be achieved through a simple layout design, thereby saving arrangement space.

Figure 42A:
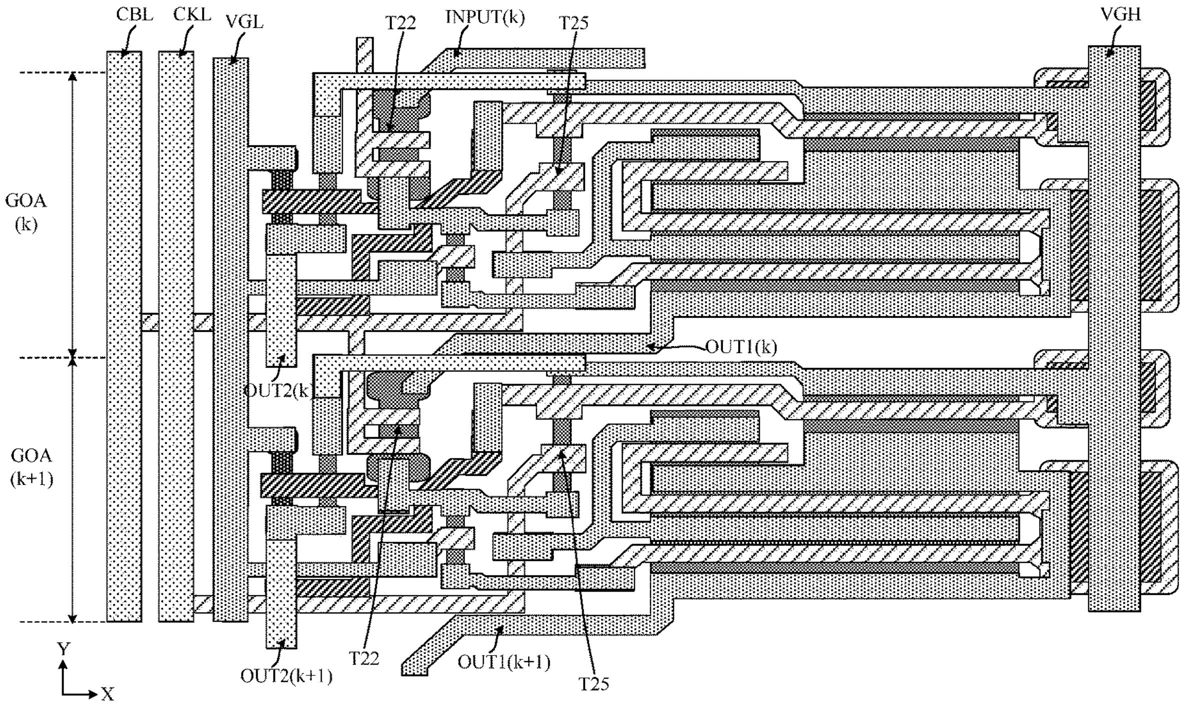
FIG. 42A is a top view of cascaded drive control circuits according to at least one embodiment of the present disclosure.
Figure 42B:
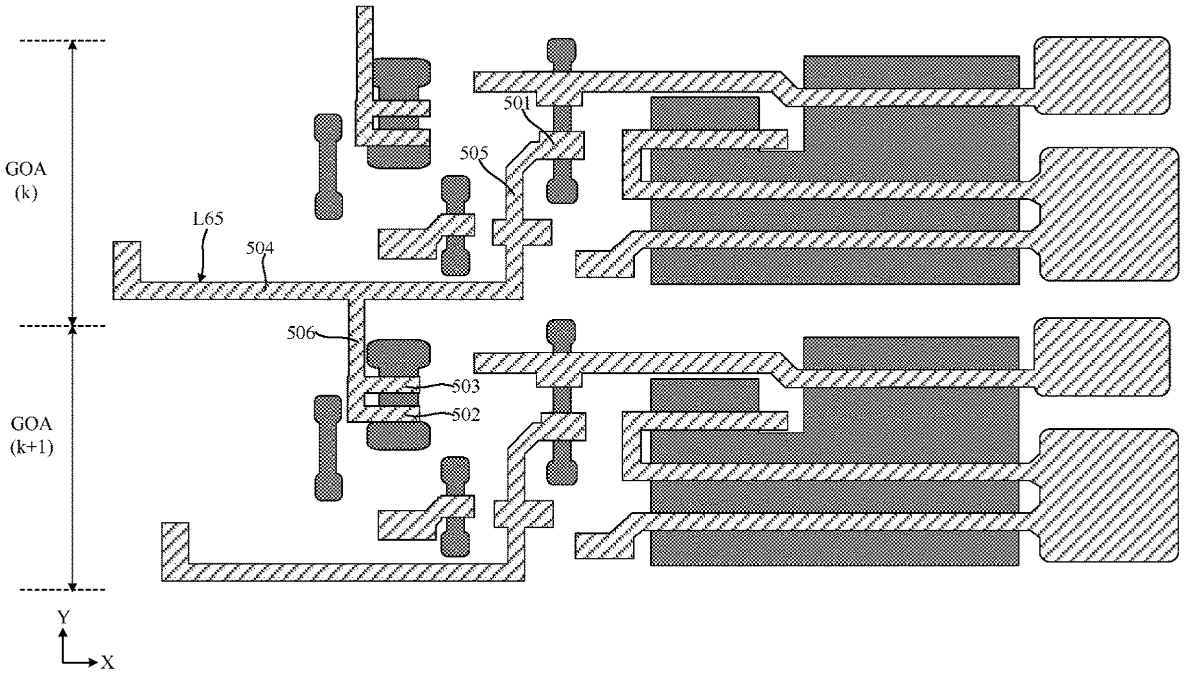
FIG. 42B is a top view of the drive control circuit after a first conductive layer is formed in FIG. 42A.

FIG. 42A is a top view of cascaded drive control circuits according to at least one embodiment of the present disclosure. Two cascaded drive control circuits are illustrated in FIG. 42A. FIG. 42B is a top view of the drive control circuit after a first conductive layer is formed in FIG. 42A.

In some exemplary implementation modes, a first clock end of a k-th stage drive control circuit is electrically connected with a first clock signal line CKL, and a second clock end thereof is electrically connected with a second clock signal line CBL. A first clock end of a (k+1)-th stage drive control circuit is electrically connected with the second clock signal line CLK2, and a second clock end thereof is electrically connected with the first clock signal line CLK. Among them, a value of k is 2n or 2n−1, and n is an integer greater than 0. For example, a first clock end of an odd-numbered stage drive control circuit is electrically connected with the first clock signal line CKL, a second clock end thereof is electrically connected with the second clock signal line CBL; and a first clock end of an even-numbered stage drive control circuit is electrically connected with the second clock signal line CBL, and a second clock end thereof is electrically connected with the first clock signal line CKL. Or, a first clock end of an even-numbered stage drive control circuit is electrically connected with the first clock signal line CKL, a second clock end thereof is electrically connected with the second clock signal line CBL; and a first clock end of an odd-numbered stage drive control circuit is electrically connected with the second clock signal line CBL, and a second clock end thereof is electrically connected with the first clock signal line CKL. However, the embodiment is not limited thereto.

In some exemplary implementation modes, as shown in FIG. 42A, a (k+1)-th stage drive control circuit GOA (k+1) is electrically connected with the second clock signal line CBL through a k-th stage drive control circuit GOA (k), and a (k+2)-th stage drive control circuit GOA (k+2) is electrically connected with the first clock signal line CKL through the (k+1)-th stage drive control circuit GOA (k+1). As shown in FIG. 42B, the (k+1)-th stage drive control circuit GOA (k+1) and the k-th stage drive control circuit GOA (k) are electrically connected with the second clock signal line CBL through a sixty-fifth connection electrode L65. The sixty-fifth connection electrode L65 may include a first portion 501, a second portion 502, a third portion 503, and a fourth portion 504 extending along a first direction X. The first portion 501 may be used as a control electrode of a twenty-fifth transistor T25 of the k-th stage drive control circuit GOA (k), and the second portion 502 and the third portion 503 may be used as a control electrode of a twenty-second transistor T22 of the (k+1)-th stage drive control circuit GOA (k+1). The fourth portion 504 may be used as an electrode connected with the second clock signal line CBL. The sixty-fifth connection electrode L65 further includes a fifth portion 505 and a sixth portion 506 extending along a second direction Y. The fifth portion 505 may be used for connecting the first portion 501 and the fourth portion 504, and the sixth portion 506 may be used for connecting the fourth portion 504, the second portion 502, and the third portion 503.

In some exemplary implementation modes, as shown in FIG. 42A and FIG. 42B, control electrodes of transistors, in the (k+1)-th stage drive control circuit GOA (k+1) and the k-th stage drive control circuit GOA (k), electrically connected with the second clock signal line CBL, may be of an integral structure, and control electrodes of transistors, in the (k+2)-th stage drive control circuit GOA (k+2) and the (k+1)-th stage drive control circuit GOA (k+1), electrically connected with the first clock signal line CKL, may be of an integral structure. For example, a control electrode of a twenty-second transistor T22 of the k-th stage drive control circuit GOA (k) is electrically connected with the first clock signal line CKL, and a control electrode of a twenty-fifth transistor T25 is electrically connected with the second clock signal line CBL. A control electrode of a twenty-second transistor T22 of the (k+1)-th stage drive control circuit GOA (k+1) is electrically connected with the second clock signal line CBL, and a control electrode of a twenty-fifth transistor T25 of the (k+1)-th stage drive control circuit GOA (k+1) is electrically connected with the first clock signal line CKL. A control electrode of a twenty-second transistor T22 of the (k+1)-th stage drive control circuit GOA (k+1) and the control electrode of the twenty-fifth transistor T25 of the k-th stage drive control circuit GOA (k) may be of an integral structure and electrically connected with the second clock signal line CBL. The control electrode of the twenty-second transistor T22 of the k-th stage drive control circuit GOA (k) and a control electrode of a twenty-fifth transistor of a (k−1)-th stage drive control circuit GOA (k−1) may be of an integral structure and electrically connected with the first clock signal line CKL. A control electrode of a twenty-second transistor of the (k+2)-th stage drive control circuit GOA (k+2) and the control electrode of the twenty-fifth transistor of the (k+1)-th stage drive control circuit GOA (k+1) may be of an integral structure and electrically connected with the first clock signal line CKL. In this example, the k-th stage drive control circuit may be electrically connected with only one clock signal line directly, and electrically connected with another clock signal line through an adjacent stage drive control circuit, thereby simplifying wiring arrangement and saving space.

Figure 43:
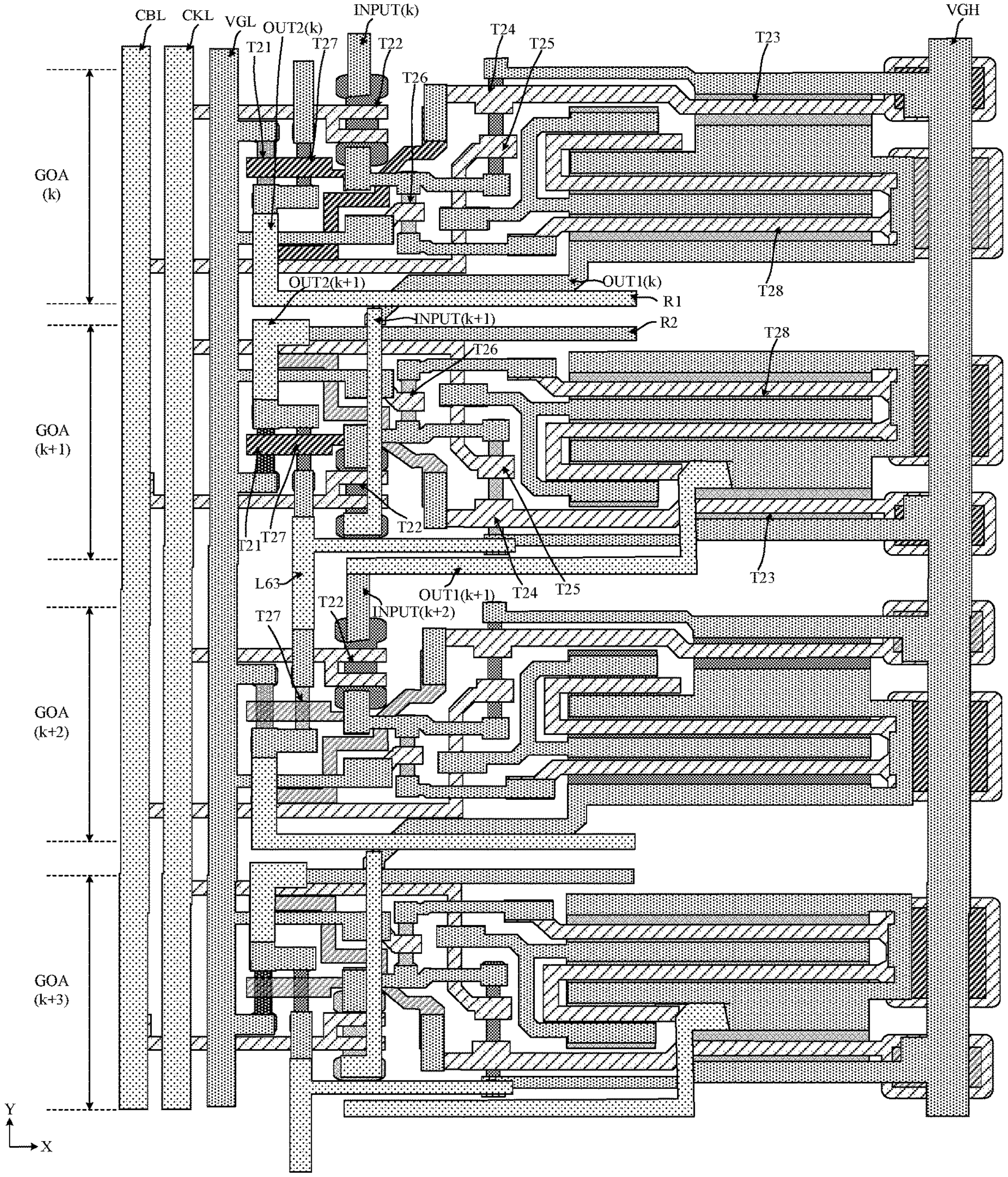
FIG. 43 is another top view of cascaded drive control circuits according to at least one embodiment of the present disclosure.

Rest of a top view structure of the drive control circuit of the embodiment may be referred to description of the embodiment shown in FIG. 39, and thus will not be repeated here. FIG. 43 is another top view of cascaded drive control circuits according to at least one embodiment of the present disclosure. Four cascaded drive control circuits are illustrated in FIG. 43.

In some exemplary implementation modes, a gate driver circuit includes multiple drive control circuit groups, and at least one drive control circuit group may include a k-th stage drive control circuit and a (k+1)-th stage drive control circuit, wherein a value of k is 2n or 2n−1 and n is an integer greater than 0. In other words, one drive control circuit group may include two adjacent cascaded drive control circuits. The k-th stage drive control circuit and the (k+1)-th stage drive control circuit are approximately symmetrical with respect to a center line of the drive control circuit group in a second direction Y. As shown in FIG. 43, the k-th drive control circuit GOA (k) and the (k+1)-th drive control circuit GOA (k+1) are a drive control circuit group, and are approximately symmetrical with respect to a center line of the drive control circuit group in the second direction Y. Among them, an arrangement of transistors and capacitors of the k-th stage drive control circuit GOA (k) and an arrangement of transistors and capacitors of the (k+1)-th stage drive control circuit GOA (k+1) are approximately symmetrical with respect to the center line of the drive control circuit group in the second direction Y. A (k+2)-th stage drive control circuit GOA (k+2) and a (k+3)-th stage drive control circuit GOA (k+3) are a drive control circuit group, and are approximately symmetrical with respect to a center line of the drive control circuit group in the second direction Y.

In some exemplary implementation modes, as shown in FIG. 43, a second output end OUT2 (*k*) of the k-th stage drive control circuit GOA (k) and a second output end OUT2 (k+1) of the (k+1)-th stage drive control circuit GOA (k+1) are adjacent in the second direction Y and are located between the k-th stage drive control circuit GOA (k) and the (k+1)-th stage drive control circuit GOA (k+1). The second output end OUT2 (*k*) of the k-th stage drive control circuit GOA (k) is electrically connected with a first lead line R1, for example, the second output end OUT2 (*k*) and the first lead line R1 may be of an integral structure. The first lead line R1 extends along a first direction X. The second output end OUT2 (*k*) of the k-th stage drive control circuit GOA (k) is located on a side of a first output end OUT1 (*k*) away from a base substrate. For example, the second output end OUT2 (*k*) of the k-th stage drive control circuit GOA (k) and the first lead line R1 may be located in a fourth conductive layer, and the first output end OUT1 (*k*) may be located in a third conductive layer. However, the embodiment is not limited thereto.

In some exemplary implementation modes, as shown in FIG. 43, a second output end OUT2 (k+1) of the (k+1)-th stage drive control circuit GOA (k+1) is electrically connected with a second lead line R2, and the second lead line R2 is located on a side of the second output end OUT2 (k+1) close to the base substrate. The second lead line R2 extends along the first direction X. For example, the second output end OUT2 (k+1) of the (k+1)-th stage drive control circuit GOA (k+1) may be located in the fourth conductive layer, and the second lead line R2 may be located in the third conductive layer. The second lead line R2 may be electrically connected with the second output end OUT2 (k+1) through a via provided in a fifth insulation layer. However, the embodiment is not limited thereto.

In some exemplary implementation modes, as shown in FIG. 43, a signal input end INPUT (k+1) of the (k+1)-th stage drive control circuit GOA (k+1) is electrically connected with a first output end OUT1 (*k*) of the k-th stage drive control circuit GOA (k), and the signal input end INPUT (k+1) is located on a side of the first output end OUT1 (*k*) away from the base substrate. For example, the signal input end INPUT (k+1) may be located in the fourth conductive layer, and the first output end OUT1 (*k*) may be located in the third conductive layer. An orthographic projection of the signal input end INPUT (k+1) on the base substrate may be overlapped with an orthographic projection of an input circuit of the (k+1)-th stage drive control circuit GOA (k+1) on the base substrate.

In some exemplary implementation modes, as shown in FIG. 43, a signal input end INPUT (k+2) of the (k+2)-th stage drive control circuit GOA (k+2) is electrically connected with a first output end OUT1 (k+1) of the (k+1)-th stage drive control circuit GOA (k+1), and the first output end OUT1 (k+1) is located on a side of the signal input end INPUT (k+2) away from the base substrate. For example, the first output end OUT1 (k+1) is located in the fourth conductive layer, and the signal input end INPUT (k+2) is located in the third conductive layer. The first output end OUT1 (k+1) may be electrically connected with a second electrode of a twenty-eighth transistor T28 of a first output circuit of the (k+1)-th stage drive control circuit GOA (k+1). However, the embodiment is not limited thereto.

In some exemplary implementation modes, as shown in FIG. 43, a second output circuit of the (k+2)-th stage drive control circuit GOA (k+2) may be electrically connected with a first power supply line VGH through a second output circuit of the (k+1)-th stage drive control circuit GOA (k+1). For example, a first electrode of a twenty-seventh transistor of the second output circuit of the (k+2)-th stage drive control circuit GOA (k+2) may be electrically connected with a first electrode of a twenty-seventh transistor of the second output circuit of the (k+1)-th stage drive control circuit GOA (k+1) through a sixty-third connection electrode L63, the sixty-third connection electrode L63 may also be electrically connected with a first electrode of a twenty-third transistor T23 of the first output circuit of the (k+1)-th stage drive control circuit GOA (k+1), thereby achieving an electrical connection with the first power supply line VGH. In this way, wiring between adjacent drive control circuits may be shortened, and arrangement space may be saved.

Rest of a top view structure of the drive control circuit of the embodiment may be referred to description of the embodiment shown in FIG. 39, and thus will not be repeated here.

In this exemplary implementation mode, by symmetrically arranging adjacent drive control circuits of two stages, it is beneficial to simplify wiring, thus saving wiring arrangement space.

Figure 44:
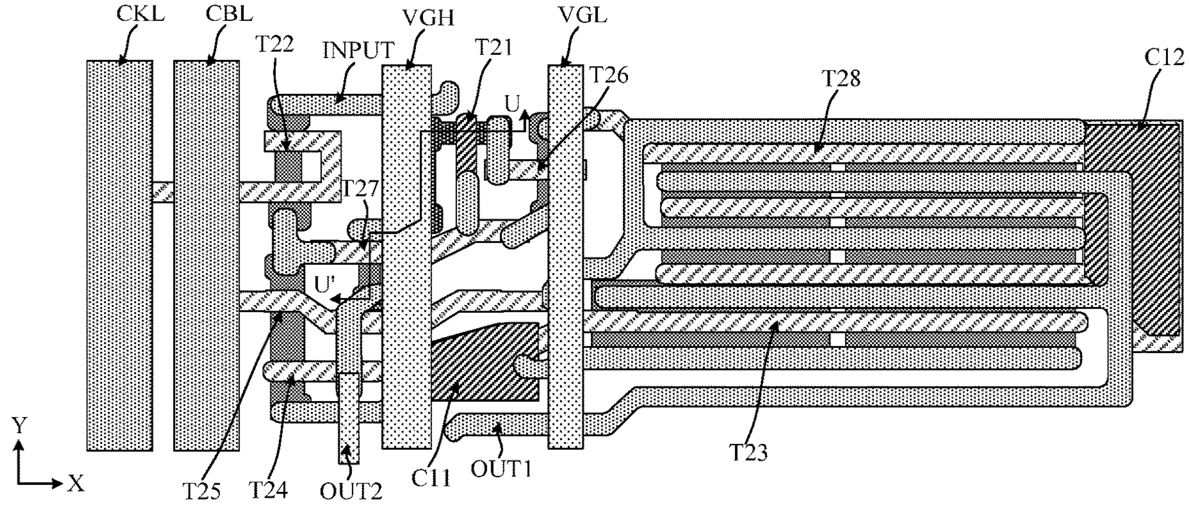
FIG. 44 is another top view of a drive control circuit according to at least one embodiment of the present disclosure.
Figure 45:
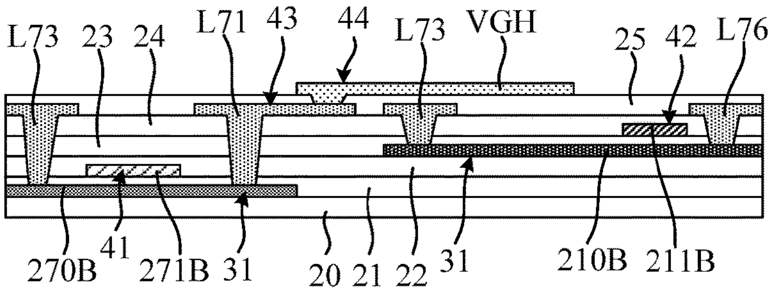
FIG. 45 is a partial cross-section view taken along a U-U' direction in FIG. 44.

FIG. 44 is another top view of a drive control circuit according to at least one embodiment of the present disclosure. FIG. 45 is a partial cross-section view taken along a U-U' direction in FIG. 44. An equivalent circuit of the drive control circuit of this exemplary embodiment may be shown in FIG. 25. In this exemplary implementation mode, description is made by taking a case in which a twenty-second transistor T22 to a twenty-eighth transistor T28 in the drive control circuit are P-type transistors and are LTPS transistors, and a twenty-first transistor T21 is an N-type transistor and is an oxide thin film transistor, as an example. However, the embodiment is not limited thereto.

In some exemplary implementation modes, as shown in FIG. 44, in a plane parallel to a display substrate, a second output circuit is located between an input sub-circuit and a control sub-circuit of an input circuit in a first direction X. A first output circuit is located on a side of the input circuit in the first direction X. A clock signal line (including, for example, a first clock signal line CKL and a second clock signal line CBL), a first power supply line VGH, and a second power supply line VGL are sequentially arranged along the first direction X. An orthographic projection of the first power supply line VGH on a base substrate is overlapped with an orthographic projection of the second output circuit on the base substrate. An orthographic projection of the second power supply line VGL on the base substrate is overlapped with an orthographic projection of the input circuit on the base substrate. However, the embodiment is not limited thereto.

In some examples, as shown in FIG. 44, the twenty-first transistor T21 and the twenty-seventh transistor T27 are sequentially arranged along a second direction Y. The twenty-second transistor T22, the twenty-fifth transistor T25, and the twenty-fourth transistor T24 are sequentially arranged along the second direction Y and adjacent to the second clock signal line CBL in the first direction X. The twenty-sixth transistor T26 is located between the twenty-first transistor T21 and the twenty-eighth transistor T28 in the first direction X. The twenty-eighth transistor T28 and the twenty-third transistor T23 are sequentially arranged along the second direction Y. An eleventh capacitor C11 is located between the twenty-fourth transistor T24 and the twenty-third transistor T23 in the first direction X. A twelfth capacitor C12 is located on a side of the twenty-eighth transistor T28 away from the twenty-sixth transistor T26 in the first direction X. An orthographic projection of the first power supply line VGH on the base substrate is overlapped with each of orthographic projections of the twenty-first transistor T21, the twenty-seventh transistor T27, and the eleventh capacitor C11 on the base substrate. An orthographic projection of the second power supply line VGL on the base substrate is overlapped with an orthographic projection of the twenty-sixth transistor T26 on the base substrate. However, the embodiment is not limited thereto.

In some exemplary implementation modes, as shown in FIG. 45, in a plane perpendicular to a display substrate, a non-display region of the display substrate may include: a base substrate 20, and a first semiconductor layer 31, a first conductive layer 41, a second semiconductor layer 32, a second conductive layer 42, a third conductive layer 43, and a fourth conductive layer 44 sequentially disposed on the base substrate 20. Among them, a first insulation layer 21 is disposed between the first semiconductor layer 31 and the first conductive layer 41, a second insulation layer 22 is disposed between the first conductive layer 41 and the second semiconductor layer 32, a third insulation layer 23 is disposed between the second semiconductor layer 32 and the second conductive layer 42, a fourth insulation layer 24 is disposed between the second conductive layer 42 and the third conductive layer 43, and a fifth insulation layer 25 is disposed between the third conductive layer 43 and the fourth conductive layer 44. In some examples, the first insulation layer 21 to the fifth insulation layer 25 may all be inorganic insulation layers. However, the embodiment is not limited thereto.

Figure 46A:
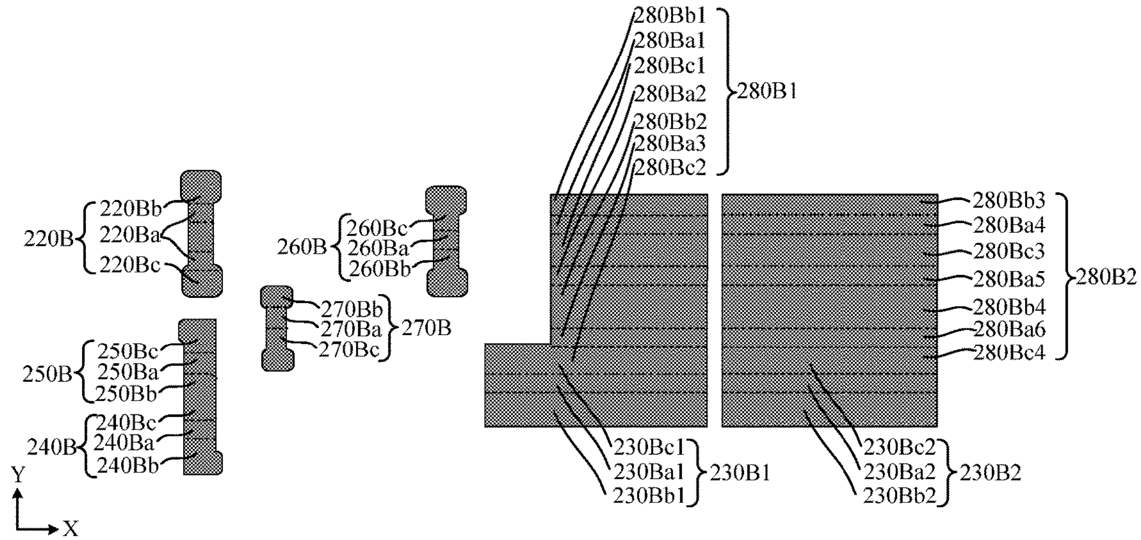
FIG. 46A is a top view of the drive control circuit after a first semiconductor layer is formed in FIG. 44.

FIG. 46A is a top view of the drive control circuit after a first semiconductor layer is formed in FIG. 44. As shown in FIG. 44 to FIG. 46A, the first semiconductor layer 31 of the non-display region at least includes an active layer of a first semiconductor-type transistor of the drive control circuit. For example, the first semiconductor layer 31 at least includes an active layer 220B of a twenty-second transistor T22 to an active layer of a twenty-eighth transistor T28.

In some examples, as shown in FIG. 46A, an active layer 240B of a twenty-fourth transistor T24 and an active layer 250B of a twenty-fifth transistor T25 may be of an integral structure, such as a strip structure extending along a second direction Y. A first partition 230B1 of an active layer of a twenty-third transistor T23 and a first partition 280B1 of the active layer of the twenty-eighth transistor T28 may be of an integral structure, and a second partition 230B2 of the active layer of the twenty-third transistor T23 and a second partition 280B2 of the active layer of the twenty-eighth transistor T28 may be of an integral structure. However, the embodiment is not limited thereto.

In some examples, as shown in FIG. 46A, the active layer 220B of the twenty-second transistor T22 may include a channel region 220Ba, and a first doped region 220Bb and a second doped region 220Bc located on two sides of the channel region 220Ba along the second direction Y. The active layer 240B of the twenty-fourth transistor T24 may include a channel region 240Ba, and a first doped region 240Bb and a second doped region 240Bc located on two sides of the channel region 240Ba along the second direction Y. The active layer 250B of the twenty-fifth transistor T25 may include a channel region 250Ba, and a first doped region 250Bb and a second doped region 250Bc located on two sides of the channel region 250Ba along the second direction Y. The first doped region 250Bb of the twenty-fifth transistor T25 is connected with the second doped region 240Bc of the twenty-fourth transistor T24. The active layer 260B of the twenty-sixth transistor T26 may include a channel region 260Ba, and a first doped region 260Bb and a second doped region 260Bc located on two sides of the channel region 260Ba along the second direction Y. The active layer 270B of the twenty-seventh transistor T27 may include a channel region 270Ba, and a first doped region 270Bb and a second doped region 270Bc located on two sides of the channel region 270Ba along the second direction Y.

In some examples, as shown in FIG. 46A, the active layer of the twenty-third transistor T23 may include a first partition 230B1 and a second partition 230B2. The first partition 230B1 of the active layer of the twenty-third transistor T23 may include a channel region 230Ba1, and a first doped region 230Bb1 and a second doped region 230Bc1 located on two sides of the channel region 230Ba1 along the second direction Y. The second partition 230B2 of the active layer of the twenty-third transistor T23 may include a channel region 230Ba2, and a first doped region 230Bb2 and a second doped region 230Bc2 located on two sides of the channel region 230Ba2 along the second direction Y.

In some examples, as shown in FIG. 46A, the active layer of the twenty-eighth transistor T28 may include a first partition 280B1 and a second partition 280B2. The first partition 280B1 of the active layer of the twenty-eighth transistor T28 may include: channel regions 280Ba1, 280Ba2, and 280Ba3 arranged in sequence along the second direction Y, a first doped region 280Bb1 and a second doped region 280Bc1 located on two sides of the channel region 280Ba1 along the second direction Y, and a third doped region 280Bb2 and a fourth doped region 280Bc2 located on two sides of the channel region 280Ba3 along the second direction Y. The fourth doped region 280Bc2 is connected with the second doped region 230Bc1 of the first partition 230B1 of the active layer of the twenty-third transistor T23. The first partition 280B2 of the active layer of the twenty-eighth transistor T28 may include: channel regions 280Ba4, 280Ba5, and 280Ba6 arranged in sequence along the second direction Y, a first doped region 280Bb3 and a second doped region 280Bc3 located on two sides of the channel region 280Ba4 along the second direction Y, and a third doped region 280Bb4 and a fourth doped region 280Bc4 located on two sides of the channel region 280Ba6 along the second direction Y. The fourth doped region 280Bc4 is connected with the second doped region 230Bc2 of the second partition 230B2 of the active layer of the twenty-third transistor T23.

Figure 46B:
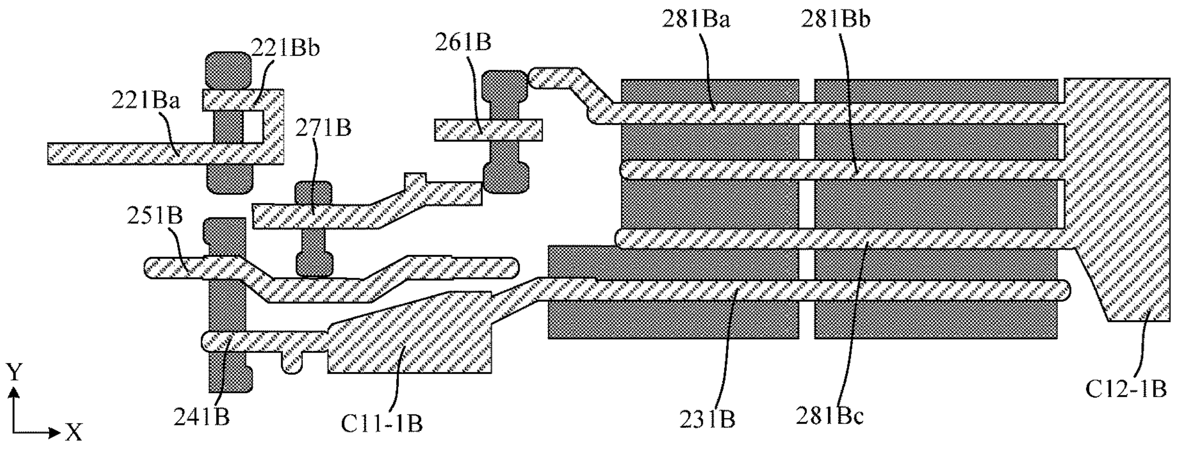
FIG. 46B is a top view of the drive control circuit after a first conductive layer is formed in FIG. 44.

FIG. 46B is a top view of the drive control circuit after a first conductive layer is formed in FIG. 44. As shown in FIG. 44 to FIG. 46B, the first conductive layer 41 of the non-display region at least includes a control electrode of a first semiconductor-type transistor of the drive control circuit and first electrode plates of multiple capacitors. For example, the first conductive layer 41 may include: control electrodes 221Ba and 221Bb of a twenty-second transistor T22, a control electrode 231B of a twenty-third transistor T23, a control electrode 241B of a twenty-fourth transistor T24, a control electrode 251B of a twenty-fifth transistor T25, a control electrode 261B of a twenty-sixth transistor T26, a control electrode 271B of a twenty-seventh transistor T27, control electrodes 281Ba, 281Bb, and 281Bc of a twenty-eighth transistor T28, a first electrode plate C11-1B of an eleventh capacitor C11, and a first electrode plate C12-1B of a twelfth capacitor C12.

In some examples, as shown in FIG. 46B, the control electrodes 221Ba and 221Bb of the twenty-second transistor T22 may be of an integral structure. The control electrode 231B of the twenty-third transistor T23, the control electrode 241B of the twenty-fourth transistor T24, and the first electrode plate C11-1B of the eleventh capacitor C11 may be of an integral structure. The control electrodes 281Ba, 281Bb, and 281Bc of the twenty-eighth transistor T28 and the first electrode plate C12-1B of the twelfth capacitor C12 may be of an integral structure. In this example, the twenty-second transistor T22 may be a double-gate transistor and the twenty-eighth transistor T28 may be a triple-gate transistor to prevent and reduce occurrence of a leakage current. However, the embodiment is not limited thereto.

Figure 46C:
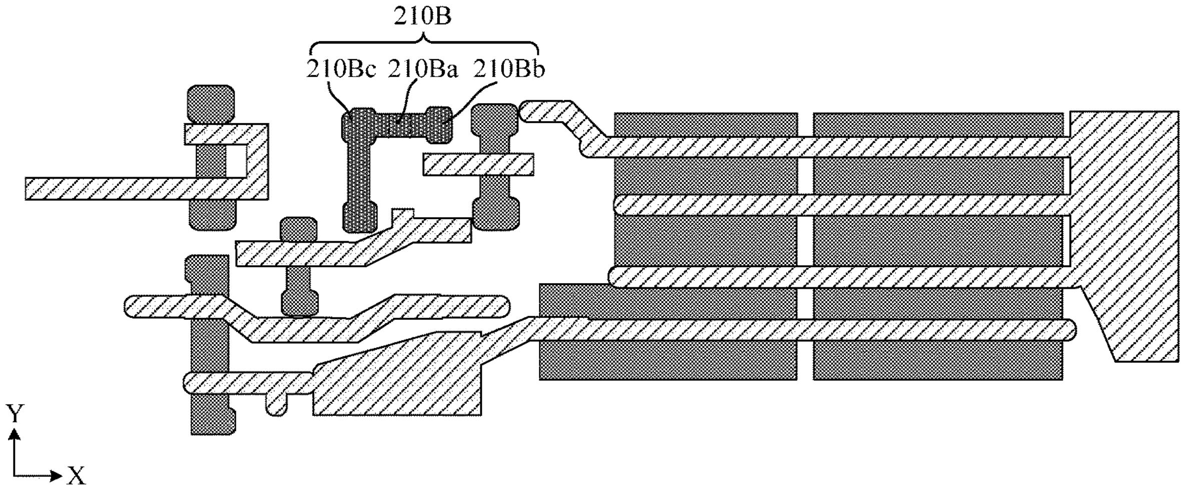
FIG. 46C is a top view of the drive control circuit after a second semiconductor layer is formed in FIG. 44.

FIG. 46C is a top view of the drive control circuit after a second semiconductor layer is formed in FIG. 44. As shown in FIG. 44 to FIG. 46C, the second semiconductor layer 32 of the non-display region at least includes an active layer of a second semiconductor-type transistor of the drive control circuit. For example, the second semiconductor layer 32 may include an active layer 210A of the twenty-first transistor T21. In some examples, a material of the second semiconductor layer 32 may include an IGZO. An orthographic projection of the active layer 210A of the twenty-first transistor T21 on a base substrate may be L-shaped. The active layer 210A of the twenty-first transistor T21 may include a channel region 210Ba, and a first region 210Bb and a second region 210Bc located on two sides of the channel region 210Ba along a first direction X. The first region 210Bb corresponds to a first electrode of the twenty-first transistor T21, and the second region 210Bc corresponds to a second electrode of the twenty-first transistor T21.

Figure 46D:
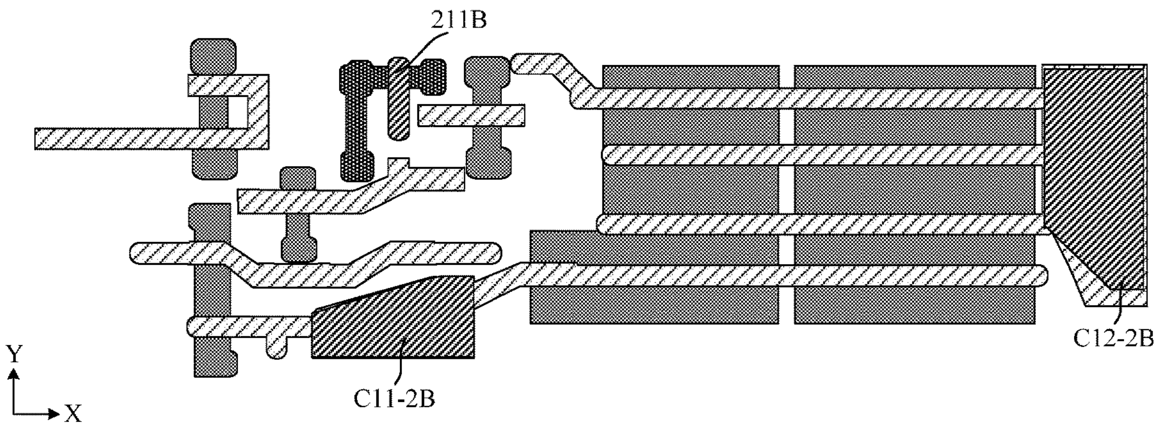
FIG. 46D is a top view of the drive control circuit after a second conductive layer is formed in FIG. 44.

FIG. 46D is a top view of the drive control circuit after a second conductive layer is formed in FIG. 44. As shown in FIG. 44 to FIG. 46D, the second conductive layer 42 of the non-display region at least includes a control electrode of a second semiconductor-type transistor of the drive control circuit and second electrode plates of multiple capacitors. For example, the second conductive layer 42 may include a control electrode 211B of the twenty-first transistor T21, a second electrode plate C11-2B of an eleventh capacitor C11, and a second electrode plate C12-2B of a twelfth capacitor C12. An orthographic projection of the second electrode plate C11-2B of the eleventh capacitor C11 on the base substrate is located within an orthographic projection of a first electrode plate C11-1B on the base substrate, and an orthographic projection of the second electrode plate C12-2B of the twelfth capacitor C12 on the base substrate is located within an orthographic projection of a first electrode plate C12-1B on the base substrate.

Figure 46E:
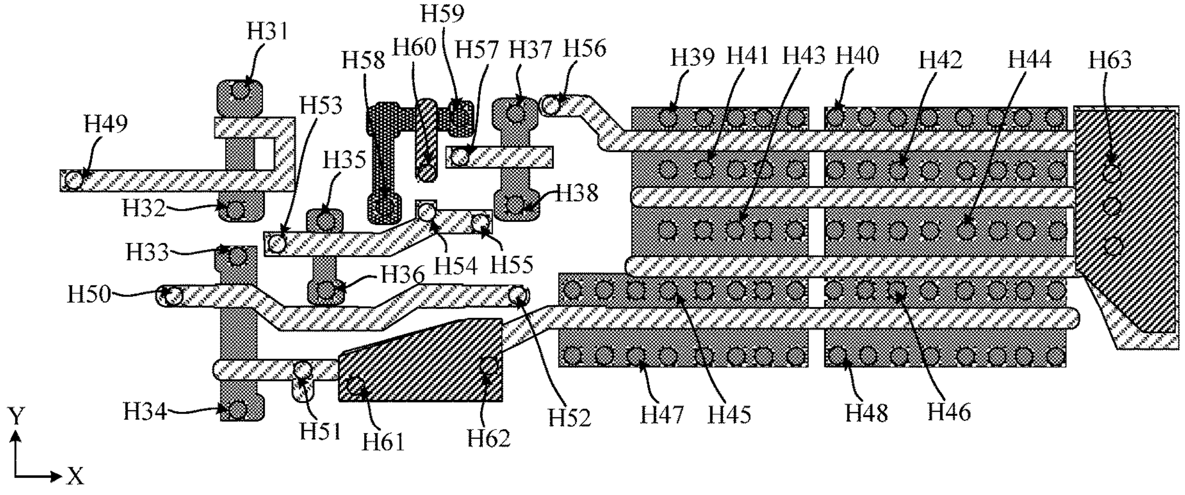
FIG. 46E is a top view of the drive control circuit after a fourth insulation layer is formed in FIG. 44.

FIG. 46E is a top view of the drive control circuit after a fourth insulation layer is formed in FIG. 44. As shown in FIG. 44 to FIG. 46E, multiple vias are formed on the fourth insulation layer 24 of the non-display region. The multiple vias may include multiple first type vias, multiple second type vias, multiple third type vias, and multiple fourth type vias. The fourth insulation layer 24, the third insulation layer 23, the second insulation layer 22, and the first insulation layer 21 within the first type via are removed to expose a surface of the first semiconductor layer 31. The fourth insulation layer 24, the third insulation layer 23, and the second insulation layer 22 within the second type via are removed to expose a surface of the first conductive layer 41. The fourth insulation layer 24 and the third insulation layer 23 within the third type via are removed to expose a surface of the second semiconductor layer 32. The fourth insulation layer 24 within the four type via is removed to expose a surface of the second conductive layer 42. For example, the first type vias may include: a 131st via H31 to a 148th via H48, the second type vias may include a 149th via H49 to a 157th via H57, the third type vias may include a 158th via H58 and a 159th via H59, and the fourth type vias may include a 160th via H60 to a 163rd via H63.

Figure 46F:
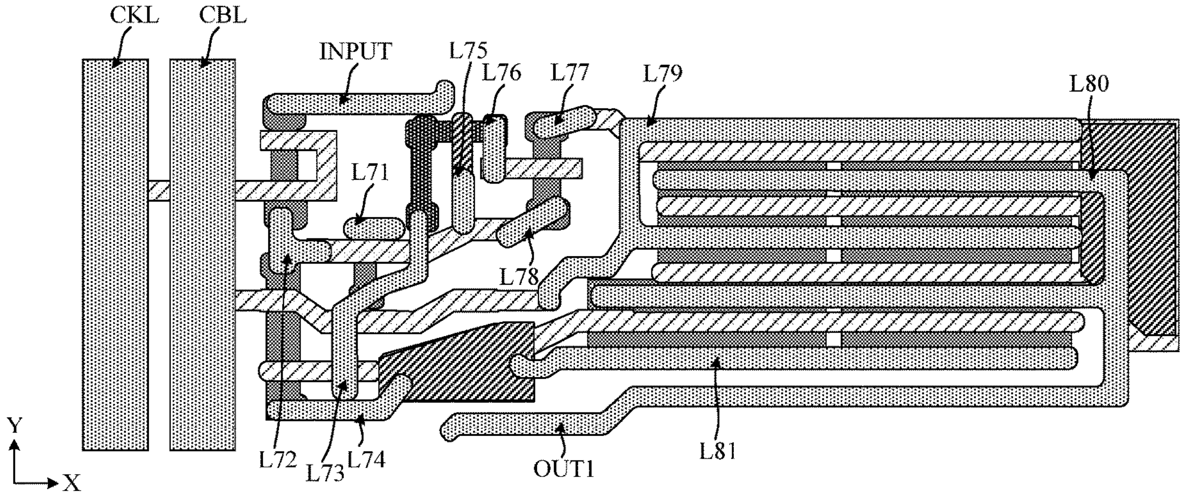
FIG. 46F is a top view of the drive control circuit after a third conductive layer is formed in FIG. 44.

FIG. 46F is a top view of the drive control circuit after a third conductive layer is formed in FIG. 44. As shown in FIG. 44 to FIG. 46F, the third conductive layer 43 of the non-display region may include multiple connection electrodes (for example, a seventy-first connection electrode L71 to an eighty-first connection electrode L81), a signal input end INPUT, a first output end OUT1, a first clock signal line CKL, and a second clock signal line CBL. The first clock signal line CKL and the second clock signal line CBL may both extend along the second direction Y. A signal input end INPUT of a present stage drive control circuit may be electrically connected with a first output end of a previous stage drive control circuit, for example, the two may be of an integral structure. However, the embodiment is not limited thereto. In other examples, a signal input end of a present stage drive control circuit may be located in a fourth conductive layer, and may be electrically connected with a first output end of a previous stage drive control circuit located in a third conductive layer through a connection electrode.

In some examples, as shown in FIG. 44 to FIG. 46F, a signal input end INPUT2 may be electrically connected with the first doped region 220Bb of the active layer 220B of the twenty-second transistor T22 through the 131st via H31. The seventy-first connection electrode L71 may be electrically connected with the first doped region 270Bb of the active layer 270B of the twenty-seventh transistor T27 through the 135th via H35. The seventy-second connection electrode L72 may be electrically connected with the second doped region 220Bc of the active layer 220B of the twenty-second transistor T22 through the 132nd via H32, may also be electrically connected with the second doped region 250Bc of the active layer 250B of the twenty-fifth transistor T25 through the 133rd via H33, and may also be electrically connected with the control electrode 271B of the twenty-seventh transistor T27 through the 153rd via H53. The seventy-third connection electrode L73 may be electrically connected with the control electrode 241B of the twenty-fourth transistor T24 through the 151st via H51, may also be electrically connected with the second doped region 270Bc of the active layer 270B of the twenty-seventh transistor T27 through the 136th via H36, and may also be electrically connected with the second region 210Bc of the active layer 210B of the twenty-first transistor T21 through the 158th via H58. The seventy-fourth connection electrode L74 may be electrically connected with the first doped region 240Bb of the active layer 240B of the twenty-fourth transistor T24 through the 134th via H34, and may also be electrically connected with the second electrode plate C11-2B of the eleventh capacitor C11 through the 161st via H61. The seventy-fifth connection electrode L75 may be electrically connected with the control electrode 211B of the twenty-first transistor T21 through the 160th via H60, and may also be electrically connected with the control electrode 271B of the twenty-seventh transistor T27 through the 154th via H54. The seventy-sixth connection electrode L76 may be electrically connected with the first region 210Bb of the active layer 210B of the twenty-first transistor T21 through the 159th via H59, and may also be electrically connected with the control electrode 261B of the twenty-sixth transistor T26 through the 157th via H57. The seventy-seventh connection electrode L77 may be electrically connected with the second doped region 260Bc of the active layer 260B of the twenty-sixth transistor T26 through the 137th via H37, and may also be electrically connected with the control electrode 281*a* of the twenty-eighth transistor T28 through the 156th via H56. The seventy-eighth connection electrode L78 may be electrically connected with the first doped region 260Bb of the active layer 260B of the twenty-sixth transistor T26 through the 138th via H38, and may also be electrically connected with the control electrode 271B of the twenty-seventh transistor T27 through the 155th via H55. The seventy-ninth connection electrode L79 may be electrically connected with the control electrode 251 of the twenty-fifth transistor T25 through the 152nd via H52, may also be electrically connected with the first doped region 280Bb1 of the first partition 280B1 of the active layer of the twenty-eighth transistor T28 through multiple (e.g. five) 139th vias H39 arranged side by side, may also be electrically connected with the first doped region 280Bb3 of the second partition 280B2 of the active layer of the twenty-eighth transistor T28 through multiple (e.g. eight) 140th vias H40 arranged side by side, may also be electrically connected with the third doped region 280Bb2 of the first partition 280B1 of the active layer of the twenty-eighth transistor T28 through multiple (e.g. five) 143rd vias H43 arranged side by side, and may also be electrically connected with the third doped region 280Bb4 of the second partition 280B2 of the active layer of the twenty-eighth transistor T28 through multiple (e.g. eight) 144th vias H44 arranged side by side. The eightieth connection electrode L80 may be electrically connected with the second doped region 280Bc1 of the first partition 280B1 of the active layer of the twenty-eighth transistor T28 through multiple (e.g. five) 141st vias H41 arranged side by side, may also be electrically connected with the second doped region 280Bc3 of the second partition 280B2 of the active layer of the twenty-eighth transistor T28 through multiple (e.g. eight) 142nd vias H42 arranged side by side, may also be electrically connected with the fourth doped region 280Bc2 of the first partition 280B1 of the active layer of the twenty-eighth transistor T28 through multiple (e.g. eight) 145th vias H45 arranged side by side, may also be electrically connected with the fourth doped region 280Bc4 of the second partition 280B2 of the active layer of the twenty-eighth transistor T28 through multiple (e.g. eight) 146th vias H46 arranged side by side, and may also be electrically connected with the second electrode plate C12-2B of the twelfth capacitor C12 through three 163rd vias H63 arranged vertically. The first output end OUT1 and the eightieth connection electrode L80 may be of an integral structure. The eighty-first connection electrode L81 may be electrically connected with the second electrode plate C11-2B of the eleventh capacitor C11 through the 162nd via H62, may also be electrically connected with the first doped region 230Bb1 of the first partition 230B1 of the active layer of the twenty-third transistor T23 through multiple (e.g. eight) 147th vias H47 arranged side by side, and may also be electrically connected with the first doped region 230Bb2 of the second partition 230B2 of the active layer of the twenty-third transistor T23 through multiple (e.g. eight) 148th vias H48 arranged side by side. The first clock signal line CKL may be electrically connected with the control electrode 221Ba of the twenty-second transistor T22 through the 149th via H49. The second clock signal line CBL may be electrically connected with the control electrode 251B of the twenty-fifth transistor T25 through the 150th via H50.

Figure 46G:
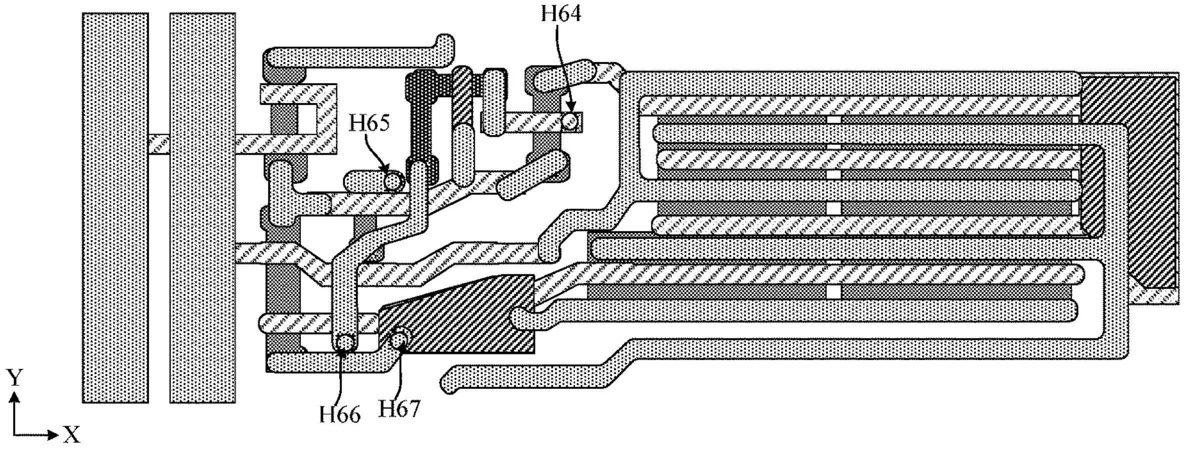
FIG. 46G is a top view of the drive control circuit after a fifth insulation layer is formed in FIG. 44.

FIG. 46G is a top view of the drive control circuit after a fifth insulation layer is formed in FIG. 44. As shown in FIG. 44 to FIG. 46G, the fifth insulation layer 25 of the non-display region is provided with multiple vias, including, for example, multiple fifth type vias and sixth type vias. The fifth insulation layer 25, the fourth insulation layer 24, the third insulation layer 23, and the second insulation layer 22 within the fifth type via are removed to expose a surface of the first conductive layer 41. The fifth insulation layer 25 within the sixth type via is removed to expose a surface of the third conductive layer 43. For example, the fifth type vias may include a 164th via H64, and the sixth type vias may include a 165th via H65 to a 167th via H67.

In some exemplary implementation modes, as shown in FIG. 44 to FIG. 46G, the fourth conductive layer 44 of the non-display region may include a first power supply line VGH, a second power supply line VGL, and a second output end OUT2. The first power supply line VGH and the second power supply line VGL both extend along a second direction Y. However, the embodiment is not limited thereto. In other examples, a first clock signal line and a second clock signal line may be located in a third conductive layer, and a first power supply line and a second power supply line may be located in a fourth conductive layer.

In some examples, as shown in FIG. 44 to FIG. 46G, the second output end OUT2 is located between the second clock signal line CBL and the first power supply line VGH in the first direction X. The second output end OUT2 may be electrically connected with the seventy-third connection electrode L73 through the 166th via H66 to achieve an electrical connection with a second output circuit. In this example, a first output end OUT1 and the second output end OUT2 are of a different-layer structure, and the second output end OUT2 is located on a side of the first output end OUT1 away from a base substrate. In the second direction Y, the first output end OUT1 and the second output end OUT2 may be led out from a same side of a present stage drive control circuit.

In some examples, as shown in FIG. 44 to FIG. 46G, the first power supply line VGH may be electrically connected with the seventy-first connection electrode L71 through the 165th via H65 to achieve an electrical connection with the twenty-seventh transistor T27, and may also be electrically connected with the seventy-fourth connection electrode L74 through the 167th via H67 to achieve an electrical connection with the twenty-fourth transistor T24, the eleventh capacitor C11, and the twenty-third transistor T23. The second power supply line VGL may be electrically connected with the control electrode 261B of the twenty-sixth transistor T26 through the 164th via H64 to achieve an electrical connection with the twenty-sixth transistor T26 and the twenty-first transistor T21.

In this exemplary implementation mode, the first power supply line and the second power supply line may be arranged to be overlapped with the drive control circuit, so as to simplify wiring and save arrangement space.

The structure of the display substrate will be described below through an example of a manufacturing process of the display substrate. A "patterning process" mentioned in the present disclosure includes processes, such as film layer deposition, photoresist coating, masking and exposure, development, etching, and photoresist stripping. Deposition may be any one or more of sputtering, evaporation, and chemical vapor deposition. Coating may be any one or more of spray coating and spin coating. Etching may be any one or more of dry etching and wet etching. A "thin film" refers to a layer of a thin film prepared from a material on a base substrate using a process of deposition or coating. If a patterning process is not needed for the "thin film" during a whole preparation process, the "thin film" may also be referred to as a "layer". When a patterning process is needed for the "thin film" during the whole preparation process, the thin film is referred to as a "thin film" before the patterning process and referred to as a "layer" after the patterning process. The "layer" after the patterning process includes at least one "pattern".

"A and B are arranged in the same layer" mentioned in the present disclosure refers to that A and B are simultaneously formed by the same patterning process. The "thickness" of the film layer is a size of the film layer in a direction perpendicular to the display substrate. In an exemplary embodiment of the present disclosure, "a projection of A includes a projection of B" refers to that a boundary of a projection of B falls within a range of a boundary of a projection of A or the boundary of a projection of A is overlapped with the boundary of a projection of B.

The preparation process of the display substrate according to the exemplary embodiment may include following acts.

(1) A base substrate is provided.

In some exemplary implementation modes, a base substrate 20 may be a rigid substrate or a flexible substrate. The rigid substrate may include one or more of glass and metal foil sheet. The flexible substrate may include one or more of polyethylene terephthalate, ethylene terephthalate, polyether ether ketone, polystyrene, polycarbonate, polyarylate, polyarylester, polyimide, polyvinyl chloride, polyethylene, and textile fiber.

(2) A pattern of a first semiconductor layer is formed.

In some exemplary implementation modes, a first semiconductor thin film is deposited on the base substrate 20, and the first semiconductor thin film is patterned through a patterning process to form a first semiconductor layer 31, as shown in FIG. 35A, FIG. 38A, FIG. 41A, or FIG. 46A. The first semiconductor layer 31 at least includes an active layer of a first semiconductor-type transistor in the drive control circuit. The active layer may include at least one channel region and multiple doped regions. The channel region may not be doped with an impurity, and has characteristics of a semiconductor. A doped region is doped with an impurity and therefore has conductivity. An impurity may be changed according to a type (e.g., an N type or a P type) of a transistor. In some examples, a material of the first semiconductor thin film may be poly-silicon.

(3) A pattern of a first conductive layer is formed.

In some exemplary implementation modes, a first insulation thin film and a first conductive thin film are sequentially deposited on the base substrate 20 where the aforementioned pattern is formed, and the first conductive thin film is patterned through a patterning process to form a first insulation layer 21 covering the first semiconductor layer 31 and a first conductive layer 41 disposed on the first insulation layer 21, as shown in FIG. 35B, FIG. 38B, FIG. 41B, or FIG. 46B. In some examples, the first conductive layer 41 may include control electrodes of multiple first semiconductor-type transistors of the drive control circuit and first electrode plates of multiple capacitors of the drive control circuit.

(4) A pattern of a second semiconductor layer is formed.

In some exemplary implementation modes, a second insulation thin film and a second semiconductor thin film are sequentially deposited on the base substrate 20 where the aforementioned patterns are formed, and the second semiconductor thin film is patterned through a patterning process to form a second insulation layer 22 covering the first conductive layer 41 and a second semiconductor layer 32 disposed on the second insulation layer 22, as shown in FIG. 35C, FIG. 38C, FIG. 41C, or FIG. 46C. In some examples, the second semiconductor layer 32 at least includes active layers of multiple second semiconductor-type transistors of the drive control circuit. In some examples, a material of the second semiconductor thin film may be an IGZO.

(5) A pattern of a second conductive layer is formed.

In some exemplary implementation modes, a third insulation thin film and a second conductive thin film are sequentially deposited on the base substrate 20 where the aforementioned patterns are formed, and the second conductive thin film is patterned through a patterning process to form a third insulation layer 23 covering the first conductive layer 41 and a second conductive layer 42 disposed on the third insulation layer 23, as shown in FIG. 35D, FIG. 38D, FIG. 41D, or FIG. 46D. In some examples, the second conductive layer 42 may include a control electrode of a second semiconductor-type transistor and second electrode plates of multiple capacitors of the drive control circuit.

(6) A pattern of a fourth insulation layer is formed.

In some exemplary implementation modes, a fourth insulation thin film is deposited on the base substrate 20 where the aforementioned patterns are formed, and the fourth insulation thin film is patterned through a patterning process to form a fourth insulation layer 24 covering the second conductive layer 42, as shown in FIG. 35E, FIG. 38E, FIG. 41E, or FIG. 46E. In some examples, multiple vias are provided on the fourth insulation layer 24. The multiple vias at least includes a first type via, a second type via, a third type via, and a fourth type via. The fourth insulation layer 24, the third insulation layer 23, the second insulation layer 22, and the first insulation layer 21 within the first type via are removed to expose a surface of the first semiconductor layer 31. The fourth insulation layer 24, the third insulation layer 23, and the second insulation layer 22 within the second type via are removed to expose a surface of the first conductive layer 41. The fourth insulation layer 24 and the third insulation layer 23 within the third type via are removed to expose a surface of the second semiconductor layer 32. The fourth insulation layer 24 within the four type via is removed to expose a surface of the second conductive layer 42.

(7) A pattern of a third conductive layer is formed.

In some exemplary implementation modes, a third conductive thin film is deposited on the base substrate 20 where the aforementioned patterns are formed, and the third conductive thin film is patterned through a patterning process to form a third conductive layer 43 on the fourth insulation layer 24, as shown in FIG. 35E, FIG. 38E, FIG. 41E, or FIG. 46E. In some examples, the third conductive layer 43 may include: multiple connection electrodes of the drive control circuit, a first power supply line VGH, and a second power supply line VGL; or, may include: multiple connection electrodes of the drive control circuit, a first clock signal line CKL, and a second clock signal line CBL.

(8) A fifth insulation layer is formed.

In some exemplary implementation modes, a fifth insulation thin film is deposited on the base substrate 20 where the aforementioned patterns are formed, and the fifth insulation thin film is patterned through a patterning process to form a fifth insulation layer 25 covering the third conductive layer 43, as shown in FIG. 35E, FIG. 38E, FIG. 41E, or FIG. 46E. In some examples, the fifth insulation layer 35 is provided with multiple vias, and the multiple vias at least includes a fifth type via and a sixth type via; or includes a fifth type via, a sixth type via, and a seventh type via. The fifth insulation layer 25, the fourth insulation layer 24, the third insulation layer 23, and the second insulation layer 22 within the fifth type via are removed to expose a surface of the first conductive layer 41. The fifth insulation layer 25 within the sixth type via is removed to expose a surface of the third conductive layer 43. The fifth insulation layer 25 and the fourth insulation layer 24 within the seventh type via are removed to expose a surface of the second conductive layer 42.

(9) A fourth conductive layer is formed.

In some exemplary implementation modes, a fourth conductive thin film is deposited on the base substrate 20 where the aforementioned patterns are formed, and the fourth conductive thin film is patterned through a patterning process to form a fourth conductive layer 44 on the fifth insulation layer 25, as show in in FIG. 33, FIG. 36, FIG. 39, or FIG. 44. In some examples, the fourth conductive layer 44 at least includes a first power supply line VGH and a second power supply line VGL; or includes a first clock signal line CKL and a second clock signal line CBL. However, the embodiment is not limited thereto.

In some exemplary implementation modes, while a drive control circuit is formed in a non-display region, a pixel circuit may be formed in a display region. For example, a first semiconductor layer of the display region may include an active layer of a first semiconductor-type transistor of a pixel circuit, a first conductive layer of the display region may include a control electrode of a first semiconductor-type transistor of a pixel circuit and a first electrode of a storage capacitor, a second semiconductor layer of the display region may include an active layer of a second semiconductor-type transistor of a pixel circuit, a second conductive layer of the display region may at least include a control electrode of a second semiconductor-type transistor of a pixel circuit and a second electrode of a storage capacitor, and a third conductive layer of the display region may at least include a first electrode and a second electrode of a transistor of a pixel circuit. However, the embodiment is not limited thereto.

In some exemplary implementation modes, after the fourth conductive layer is formed, patterns of a sixth insulation layer, an anode layer, a pixel definition layer, an organic emitting layer, a cathode layer, and an encapsulation layer may be sequentially formed in the display region. In some examples, on the base substrate where the aforementioned patterns are formed, a sixth insulation thin film is coated, and a pattern of a sixth insulation layer is formed through masking, exposing, and developing the sixth insulation thin film. Subsequently, an anode thin film is deposited on the base substrate where the aforementioned patterns are formed, and the anode thin film is patterned through a patterning process to form a pattern of an anode on the sixth insulation layer. Next, on the base substrate where the aforementioned patterns are formed, a pixel definition thin film is coated, and a pattern of a Pixel Definition layer (PDL) is formed through masking, exposure, and development processes. The pixel definition layer is formed in each sub-pixel in the display region. A pixel opening exposing the anode is formed in the pixel definition layer in each sub-pixel. Subsequently, an organic emitting layer is formed in the aforementioned pixel openings, and the organic emitting layer is connected with the anode. Subsequently, a cathode thin film is deposited, and the cathode thin film is patterned through a patterning process to form a pattern of a cathode. Subsequently, an encapsulation layer is formed on the cathode. The encapsulation layer may include a stacked structure of an inorganic material/an organic material/an inorganic material.

In some exemplary implementation modes, the first conductive layer 41, the second conductive layer 42, the third conductive layer 43, and the fourth conductive layer 44 may be made of a metal material, such as any one or more of Argentum (Ag), Copper (Cu), Aluminum (Al), and Molybdenum (Mo), or an alloy material of the aforementioned metals, such as an Aluminum-Neodymium alloy (AlNd) or a Molybdenum-Niobium alloy (MoNb), and may be in a single-layer structure, or a multi-layer composite structure such as Mo/Cu/Mo. The first conductive layer 41 may also be referred to as a first gate metal layer, the second conductive layer 42 may also be referred to as a second gate metal layer, the third conductive layer 43 may be referred to as a first source-drain metal layer, and the fourth conductive layer 44 may also be referred to as a second source-drain metal layer. The first insulation layer 21 to the fifth insulation layer 25 may be made of any one or more of Silicon Oxide (SiOx), Silicon Nitride (SiNx), and Silicon Oxynitride (SiON), and may be in a single layer, a multi-layer, or a composite layer. The sixth insulation layer and the pixel definition layer may be made of an organic material, such as polyimide, acrylic, or polyethylene terephthalate. The anode may be made of a transparent conductive material, e.g., Indium Tin Oxide (ITO) or Indium Zinc Oxide (IZO). The cathode may be made of any one or more of Magnesium (Mg), Argentum (Ag), Aluminum (Al), Copper (Cu), and Lithium (Li), or an alloy made of any one or more of the aforementioned metals. However, the embodiment is not limited thereto. For example, the anode may be made of a reflective material such as a metal, and the cathode may be made of a transparent conductive material.

The structure and the preparation process thereof shown in an exemplary embodiment are merely illustrative. In some exemplary implementation modes, a corresponding structure may be altered and a patterning process may be increased or decreased according to actual needs. In other examples, a second semiconductor layer may be prepared after a second conductive layer. For example, a first semiconductor layer, a first gate metal layer, a second gate metal layer, a second semiconductor layer, a third gate metal layer (including, for example, a control electrode of a second semiconductor-type transistor), a first source-drain metal layer, and a second source-drain metal layer may be sequentially formed on a base substrate. An insulation layer is disposed between the above adjacent film layers. In other examples, although uniformity of processes of an oxide thin film transistor is good, a threshold voltage of the oxide thin film transistor will drift under long-term pressurization and high temperature. Due to different display pictures, threshold drift amounts of Thin Film Transistors (TFT) of different parts of a display panel are different, which will cause a difference in display brightness. In order to enhance a stability of an N-type transistor, a double-gate structure may be adopted for the N-type transistor. For example, the N-type transistor may be a double-gate transistor with a top gate plus a bottom gate, wherein a bottom gate and a top gate of the transistor may be located in a first gate metal layer and a second gate metal layer, respectively, or may be located in a second gate metal layer and a third gate metal layer, respectively. At least two gates of the N-type transistor may be located in a same gate metal layer; or, at least two gates of the N-type transistor may be located on upper and lower sides of a second semiconductor layer, i.e., the at least two gates of the N-type transistor may be located in a gate metal layer on a side of the second semiconductor layer away from a base substrate and a gate metal layer on a side of the second semiconductor layer close to the base substrate, respectively. However, the embodiment is not limited thereto.

The preparation process of this exemplary embodiment may be implemented using an existing mature preparation device, and is compatible well with a related preparation process, simple in process implementation, easy to implement, high in a production efficiency, low in a production cost, and high in a yield.

In this exemplary embodiment, a reasonable arrangement of a dual-output drive control circuit may be achieved through a simple arrangement, arrangement space may be saved, and a display substrate with a narrow frame may be achieved.

An embodiment of the present disclosure also provides a display apparatus which includes the display substrate as described above.

Figure 47:
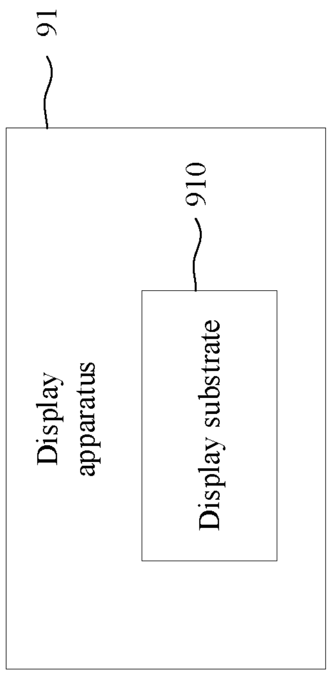
FIG. 47 is a schematic diagram of a display apparatus according to at least one embodiment of the present disclosure.

FIG. 47 is a schematic diagram of a display apparatus according to at least one embodiment of the present disclosure. As shown in FIG. 47, a display apparatus 91 according to the embodiment includes a display substrate 910. The display substrate 910 is the display substrate provided in the aforementioned embodiments. The display substrate 910 may be an OLED display substrate, a QLED display substrate, a micro-LED display substrate, or a mini-LED display substrate. The display apparatus 91 may be any product or component with a display function, such as an OLED display apparatus, a watch, a mobile phone, a tablet computer, a television, a display, a laptop computer, a digital photo frame, and a navigator. However, the embodiment is not limited thereto.

The drawings of the present disclosure only relate to structures involved in the present disclosure, and other structures may refer to conventional designs. The embodiments of the present disclosure and features in the embodiments may be combined to each other to obtain new embodiments if there is no conflict. Those of ordinary skills in the art should understand that modifications or equivalent replacements of the technical solutions of the present disclosure may be made without departing from the spirit and scope of the technical solutions of the present disclosure, and shall all fall within the scope of the claims of the present disclosure.

The invention claimed is:

1. A drive control circuit, comprising: an input circuit, a first output circuit, and a second output circuit; wherein the first output circuit is electrically connected with the input circuit and a first output end, and is configured to output a first output signal from the first output end under control of the input circuit;

the second output circuit is electrically connected with the input circuit and a second output end, or electrically connected with the first output end and the second output end, and is configured to output a second output signal from the second output end under control of the input circuit or the first output end;

the first output signal and the second output signal are different in at least one of following: an absolute value of a voltage of an effective level, a time length of an effective level within a time length of one frame, and a continuous voltage fluctuation stage after an effective level, wherein the first output signal and the second output signal are of opposite phases, wherein the second output circuit comprises: at least one inverting sub-circuit, the inverting sub-circuit is electrically connected with the first output end, the second output end, a first power supply line, and a second power supply line, and is configured to control the second output end to output a first power supply signal provided by the first power supply line or a second power supply signal provided by the second power supply line under control of the first output end; polarities of effective levels of the first power supply signal and the second power supply signal are different, wherein the first output circuit comprises at least one inverting sub-circuit, and the inverting sub-circuit is electrically connected with the input circuit and the first output end, wherein the inverting sub-circuit comprises: a first semiconductor-type transistor and a second semiconductor-type transistor, the first semiconductor-type transistor and the second semiconductor-type transistor are of different transistor types;

a first electrode of the first semiconductor-type transistor is electrically connected with the first power supply line, and a first electrode of the second semiconductor-type transistor is electrically connected with the second power supply line;

an effective level of the first power supply signal provided by the first power supply line and an effective level for starting the first semiconductor-type transistor are of opposite polarities, and an effective level of the second power supply signal provided by the second power supply line and an effective level for starting the second semiconductor-type transistor are of opposite polarities.

2. The drive control circuit according to claim 1, wherein the first output signal has a continuous voltage fluctuation phase after an effective level and a voltage fluctuation time length is less than a time length of the effective level; the second output signal does not have a continuous voltage fluctuation stage after an effective level.

3. A gate driver circuit, comprising a plurality of cascaded drive control circuits according to claim 1;

wherein a signal input end of a first stage drive control circuit is electrically connected with a start signal line, and a signal input end of an (i+1)-th stage drive control circuit is electrically connected with a first output end of an i-th stage drive control circuit, wherein i is an integer greater than 0.

4. A display substrate, comprising: a display region and a non-display region located at a periphery of the display region, wherein the non-display region is provided with a gate driver circuit, the gate driver circuit comprises a plurality of cascaded drive control circuits, a drive control circuit comprises: an input circuit, a first output circuit, and a second output circuit; the first output circuit is electrically connected with the input circuit, and the second output circuit is electrically connected with the input circuit or the first output circuit;

in a first direction, the input circuit is located between the first output circuit and the second output circuit, or, the second output circuit is located between the input circuit and the first output circuit, wherein the drive control circuit is electrically connected with a clock signal line, a second power supply line, and a first power supply line;

in the first direction, the clock signal line, the second power supply line, the second output circuit, the input circuit, and the first output circuit are arranged in sequence; an orthographic projection of the first power supply line on a base substrate is overlapped with an orthographic projection of the first output circuit on a base substrate.

5. The display substrate according to claim 4, wherein the second output circuit comprises at least one first semiconductor-type transistor and at least one second semiconductor-type transistor, the first semiconductor-type transistor and the second semiconductor-type transistor are of opposite transistor types, wherein control electrodes of the first semiconductor-type transistor and the second semiconductor-type transistor are of an integral structure, or wherein the first semiconductor-type transistor and the second semiconductor-type transistor are sequentially arranged along the first direction, and active layers of both the first semiconductor-type transistor and the second semiconductor-type transistor extend along the second direction; or the first semiconductor-type transistor and the second semiconductor-type transistor are sequentially arranged along a second direction, and active layers of both the first semiconductor-type transistor and the second semiconductor-type transistor extend along the first direction, wherein the first direction intersects with the second direction.

6. The display substrate according to claim 5, wherein in a direction perpendicular to the display substrate, the display substrate comprises: a base substrate, and a first semiconductor layer and a second semiconductor layer disposed on the base substrate, wherein the second semiconductor layer is located on a side of the first semiconductor layer away from the base substrate;

the first semiconductor layer comprises an active layer of the first semiconductor-type transistor;

the second semiconductor layer comprises an active layer of the second semiconductor-type transistor;

the first output circuit is electrically connected with a first output end, and the second output circuit is electrically connected with a second output end, the first output end and the second output end are located on a side of the second semiconductor layer away from the base substrate, wherein the first output end and the second output end are of a same-layer structure, or the second output end is located on a side of the first output end away from the base substrate.

7. The display substrate according to claim 4, wherein a first clock end of a k-th stage drive control circuit is electrically connected with a first clock signal line, and a second clock end of the k-th stage drive control circuit is electrically connected with a second clock signal line;

a first clock end of a (k+1)-th stage drive control circuit is electrically connected with the second clock signal line, and a second clock end of the (k+1)-th stage drive control circuit is electrically connected with the first clock signal line;

the (k+1)-th stage drive control circuit is electrically connected with the second clock signal line through the k-th stage drive control circuit, and a (k+2)-th stage drive control circuit is electrically connected with the first clock signal line through the (k+1)-th stage drive control circuit, wherein a value of k is 2n or 2n−1, and n is an integer greater than 0, wherein control electrodes of transistors electrically connected with the second clock signal line in the (k+1)-th stage drive control circuit and the k-th stage drive control circuit are of an integral structure, and control electrodes of transistors electrically connected with the first clock signal line in the (k+2)-th stage drive control circuit and the (k+1)-th stage drive control circuit are of an integral structure.

8. The display substrate according to claim 4, wherein the gate driver circuit comprises a plurality of drive control circuit groups, and at least one drive control circuit group comprises: a k-th stage drive control circuit and a (k+1)-th stage drive control circuit, wherein a value of k is 2n or 2n−1, and n is an integer greater than 0;

the k-th stage drive control circuit and the (k+1)-th stage drive control circuit are approximately symmetrical with respect to a center line of the drive control circuit group in a second direction, and the second direction intersects with the first direction, wherein a second output end of the k-th stage drive control circuit and a second output end of the (k+1)-th stage drive control circuit are adjacent in the second direction;

the second output end of the k-th stage drive control circuit is electrically connected with a first lead line, and the second output end of the k-th stage drive control circuit is located on a side of the first output end away from the base substrate;

a second output end of the (k+1)-th stage drive control circuit is electrically connected with a second lead line, and the second lead line is located on a side of the second output end close to the base substrate, wherein a signal input end of the (k+1)-th stage drive control circuit is electrically connected with a first output end of the k-th stage drive control circuit, the signal input end is located on a side of the first output end away from the base substrate, wherein a signal input end of a (k+2)-th stage drive control circuit is electrically connected with a first output end of the (k+1)-th stage drive control circuit, the first output end is located on a side of the signal input end away from the base substrate, wherein a second output circuit of a (k+2)-th stage drive control circuit is electrically connected with the first power supply line through a second output circuit of the (k+1)-th stage drive control circuit.

9. The display substrate according to claim 4, wherein the drive control circuit is electrically connected with a clock signal line, a second power supply line, and a first power supply line;

the clock signal line is located on a side of the input circuit away from the first output circuit in the first direction;

an orthographic projection of the second power supply line on a base substrate is overlapped with an orthographic projection of the input circuit on the base substrate, and an orthographic projection of the first power supply line on the base substrate is overlapped with an orthographic projection of the second output circuit on the base substrate, wherein the drive control circuit is electrically connected with a clock signal line, a first power supply line, and two second power supply lines;

in the first direction, the clock signal line, the input circuit, the second output circuit, and the first output circuit are sequentially arranged; an orthographic projection of a first second power supply line on a base substrate is overlapped with an orthographic projection of the input circuit on the base substrate, an orthographic projection of a second second power supply line on the base substrate is overlapped with an orthographic projection of the first output circuit on the base substrate, the first power supply line is located between the second output circuit and the second second power supply line in the first direction.

10. The display substrate according to claim 4, wherein the first power supply line and the second power supply line are of a same-layer structure, and the clock signal line is located on a side of the first power supply line away from a base substrate, wherein the first power supply line and the second power supply line are of a same-layer structure, and the clock signal line is located on a side of the first power supply line close to a base substrate.

11. A display apparatus, comprising the display substrate according to claim 4.

* * * * *